(12) United States Patent
Kunita et al.

(10) Patent No.: US 7,538,774 B2
(45) Date of Patent: May 26, 2009

(54) VIRTUAL VISUAL POINT IMAGE GENERATING METHOD AND 3-D IMAGE DISPLAY METHOD AND DEVICE

(75) Inventors: Yutaka Kunita, Mitaka (JP); Akihiko Hashimoto, Koganei (JP); Shiro Suyama, Suginami-ku (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 469 days.

(21) Appl. No.: 10/561,344

(22) PCT Filed: Jun. 18, 2004

(86) PCT No.: PCT/JP2004/008638

§ 371 (c)(1),
(2), (4) Date: Dec. 20, 2005

(87) PCT Pub. No.: WO2004/114224

PCT Pub. Date: Dec. 29, 2004

(65) Prior Publication Data

US 2007/0122027 A1    May 31, 2007

(30) Foreign Application Priority Data

| Jun. 20, 2003 | (JP) | ............................. 2003-176778 |
| Jan. 26, 2004 | (JP) | ............................. 2004-016551 |
| Jan. 26, 2004 | (JP) | ............................. 2004-016559 |
| Jan. 26, 2004 | (JP) | ............................. 2004-016831 |
| Jan. 26, 2004 | (JP) | ............................. 2004-016832 |

(51) Int. Cl.
*G09G 5/00* (2006.01)
*G09G 5/02* (2006.01)

(52) U.S. Cl. ........................ 345/589; 345/581; 345/619

(58) Field of Classification Search ................ 345/418, 345/589, 581, 595, 619
See application file for complete search history.

(56) References Cited

U.S. PATENT DOCUMENTS 7,098,908 B2 *    8/2006    Acosta et al. ............... 345/419

(Continued)

FOREIGN PATENT DOCUMENTS

EP          1 089 573          4/2001

(Continued)

OTHER PUBLICATIONS

Kanade et al., "Virtualized Reality: Constructing Virtual Worlds From Real Scenes", IEEE Multimedia, vol. 4, No. 1, pp. 34-46, 1997.

(Continued)

*Primary Examiner*—Chante Harrison
(74) *Attorney, Agent, or Firm*—Oblon, Spivak, McClelland, Maier & Neustadt, P.C.

(57) ABSTRACT

A virtual viewpoint image generation method for generating a virtual viewpoint image that is an image of an object viewed from a virtual viewpoint based on plural images of the object taken by plural cameras. Projection planes having a multi-layered structure are set on the images of the object, corresponding to a projection point of a projection plane. Color information of each projection point is determined based on color information of corresponding points, for each of the projection points overlapping when viewed from a reference viewpoint in a space. A degree of probability that the object exists at a distance corresponding to a position of the projection point is determined based on a degree of correlation of the corresponding points.

48 Claims, 102 Drawing Sheets

U.S. PATENT DOCUMENTS

| | | | |
|---|---|---|---|
| 7,102,634 B2* | 9/2006 | Kim et al. | 345/419 |
| 2002/0050988 A1* | 5/2002 | Petrov et al. | 345/418 |
| 2007/0291047 A1* | 12/2007 | Harville et al. | 345/589 |

FOREIGN PATENT DOCUMENTS

| | | |
|---|---|---|
| GB | 2 326 302 | 12/1998 |
| JP | 4 264207 | 9/1992 |
| JP | 11 351843 | 12/1999 |
| JP | 2000 215311 | 8/2000 |
| JP | 2000-350237 | 12/2000 |
| JP | 2001 67473 | 3/2001 |
| JP | 2001-291116 | 10/2001 |
| JP | 2003 99800 | 4/2003 |
| JP | 2003 163929 | 6/2003 |

OTHER PUBLICATIONS

Ikeuchi, "Model Generation of Real Object Using Images", Journal of the Robotics Society of Japan, vol. 16, No. 6, pp. 763-766, 1998.

Okutomi, "Why is Stereo Difficult?", Journal of the Robotics Society of Japan, vol. 16, No. 6, pp. 773-777, 1998.

Potmesil, "Generating Octree Models of 3D Objects From Their Silhouettes in a Sequence of Images", Computer Vision, Graphics, and Image Processing, vol. 40, pp. 1-29, 1987.

Shade et al., "Layered Depth Images", SIGGRAPH98 Conference Proceedings, pp. 231-242, 1998.

Tago et al., "Video-Based Rendering With Dynamic Layered Representation", Three-Dimensional Image Conference, pp. 33-36, 2001 (with English abstract).

Pentland, "A New Sense for Depth of Field", IEEE Transactions on Pattern Analysis and Machine Intelligence, vol. PAMI-9, No. 4, pp. 523-531, 1987.

Subbarao et al., "Depth From Defocus: A Spatial Domain Approach", International Journal of Computer Vision, vol. 13, No. 3, pp. 271-294, 1994.

Ishihara et al., "High Speed 3-D Shape Measuring Apparatus Using Shape From Focus Method", Precision Engineering, vol. 63, No. 1, pp. 124-128, 1997 (with English abstract).

Ooba et al., "Real Time All Focusing Microscope Camera", O Plus E, vol. 22, No. 12, pp. 1568-1576, 2000.

Moezzi et al., "Virtual View Generation for 3D Digital Video", IEEE Multimedia, pp. 18-26, 1997.

Kunita et al., "Real-Time Rendering System of 3D Moving Objects", 3D Image Conference, 1999 (with English abstract).

Naemura et al., "Video-Based Rendering", 3D Image Conference, pp. 165-170, 1998 (with English abstract).

* cited by examiner

FIG.23A
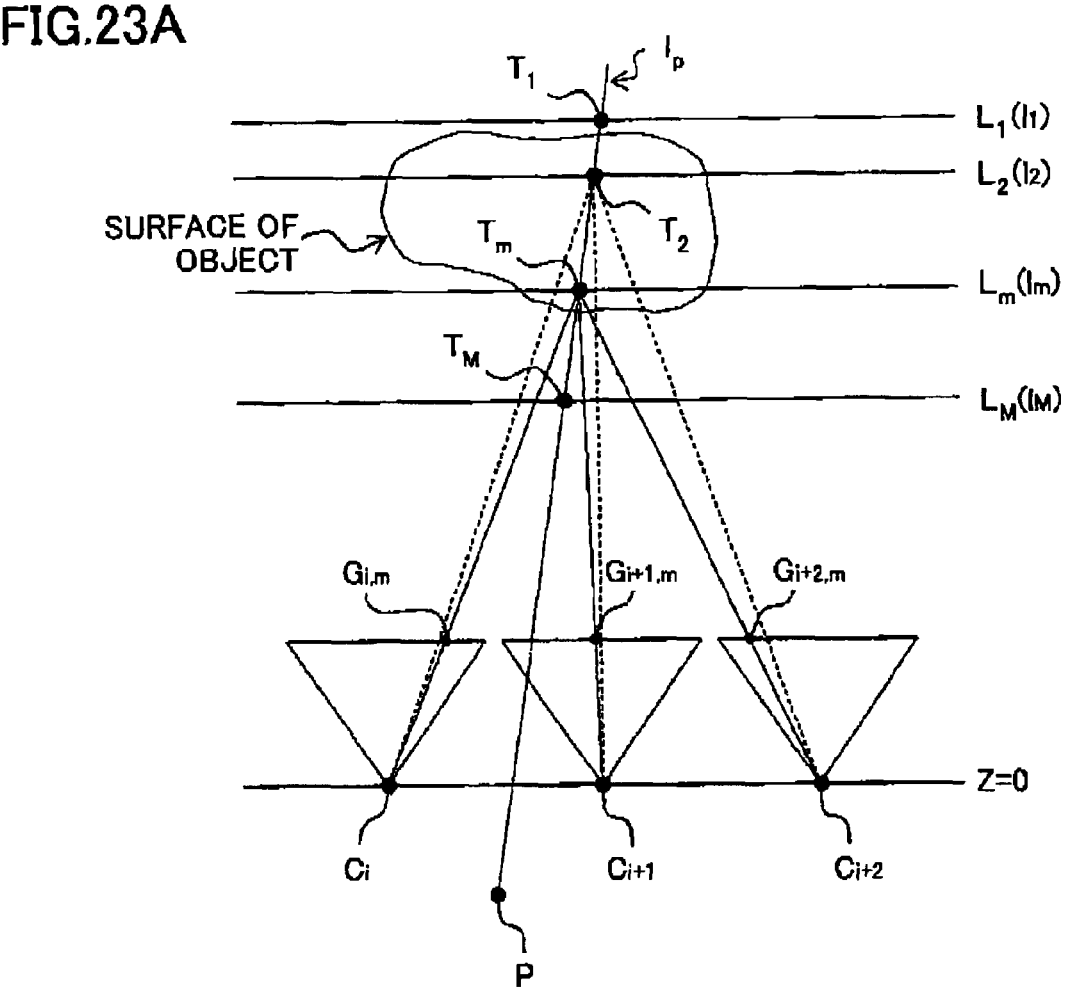
FIG.23B  (EXAMPLE IN WHICH RELIABILITY OF ESTIMATED DISTANCE IS HIGH)
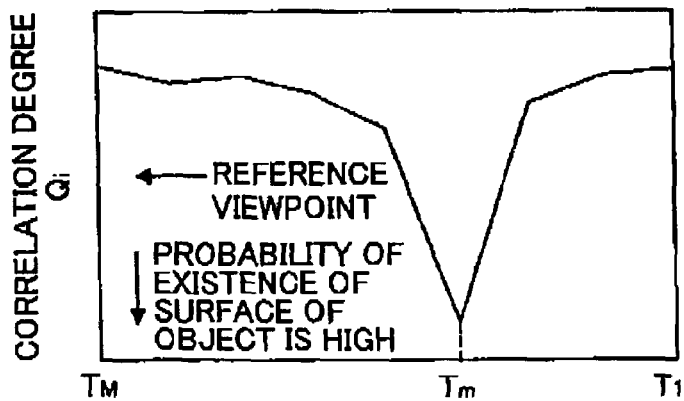
PROJECTION POINTS OVERLAPPING WHEN VIEWED FROM THE REFERENCE VIEWPOINT $T_j$ (EXAMPLE IN WHICH RELIABILITY OF ESTIMATED DISTANCE IS LOW)

PROJECTION POINTS OVERLAPPING WHEN VIEWED FROM THE REFERENCE VIEWPOINT $T_j$

PROJECTION POINTS OVERLAPPING WHEN
VIEWED FROM THE REFERENCE VIEWPOINT $T'_j$ $\beta_1 \cong 0, \quad \beta_2 \cong 1$
$\beta'_1 \cong 1, \quad \beta'_2 \cong 0$ $K_A = \beta'_1 K'_1 + \beta_2 K_2 \cong K'_1 + K_2$ $\beta_1 \cong 0, \quad \beta_2 \cong 1$
$\beta'_1 \cong 1, \quad \beta'_2 \cong 0$ $K_A = \beta'_1 K'_1 + \beta_2 K_2 \cong K'_1 + K_2$

FIG.53
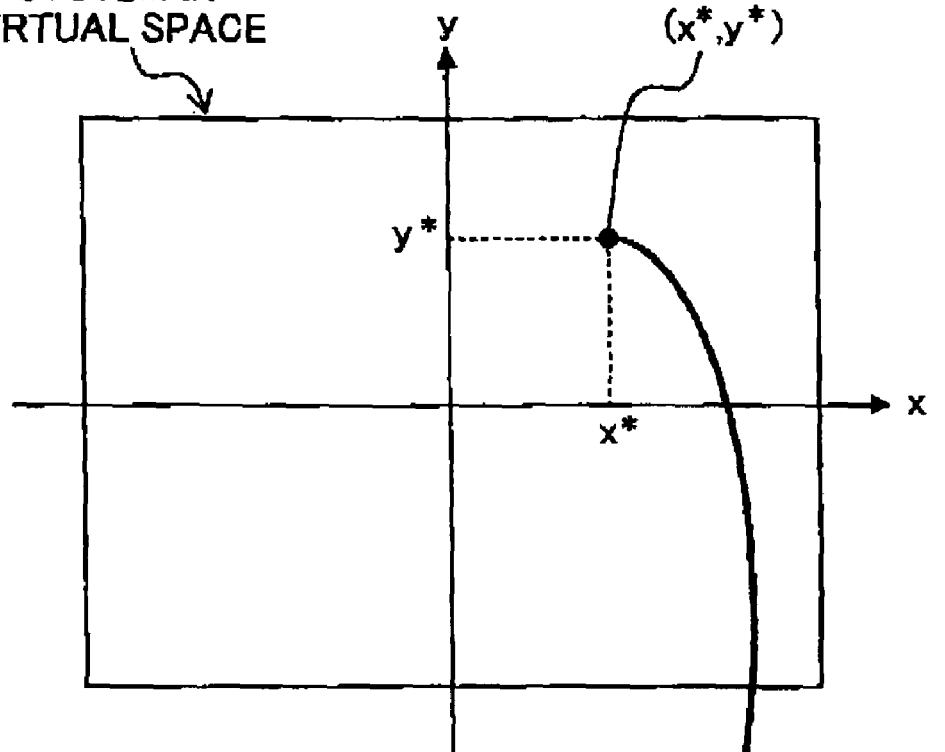
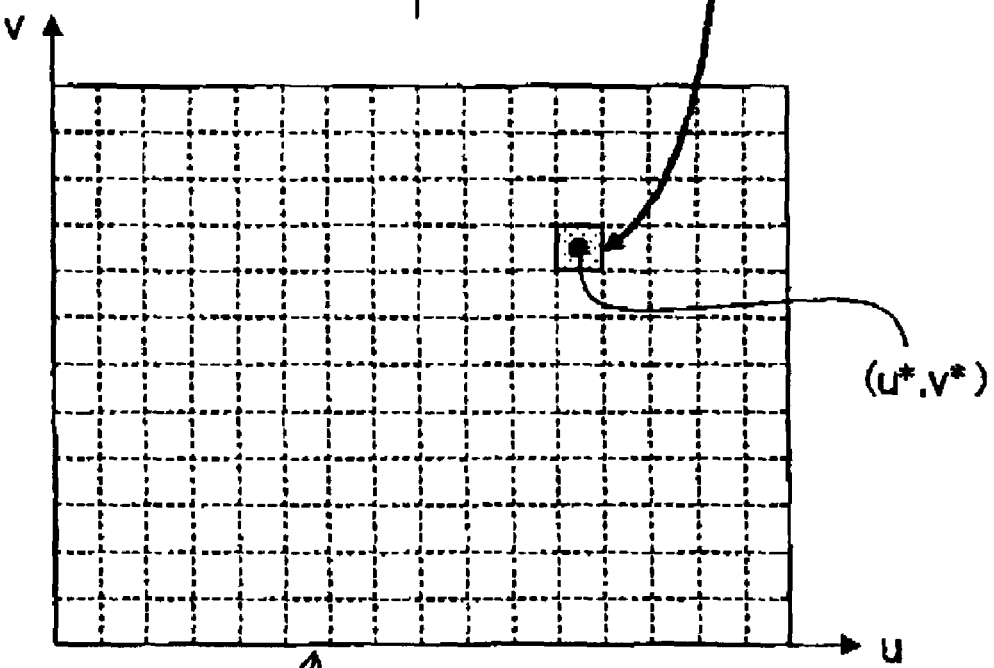

FIG.59A
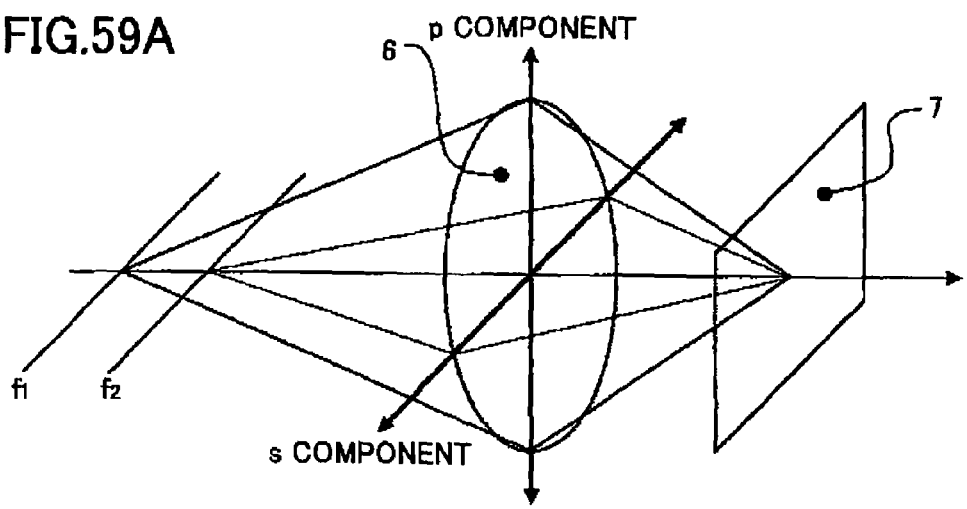
FIG.59B
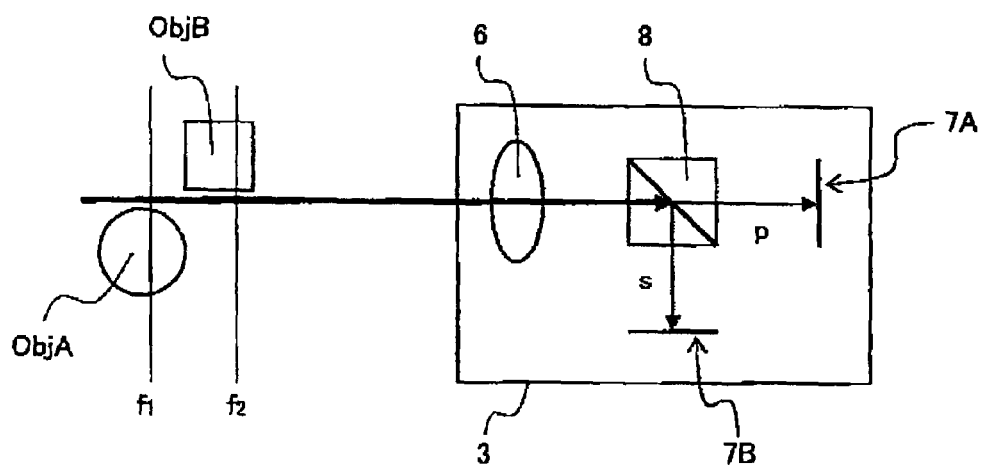
FIG.59C
(IMAGE OF p COMPONENT)
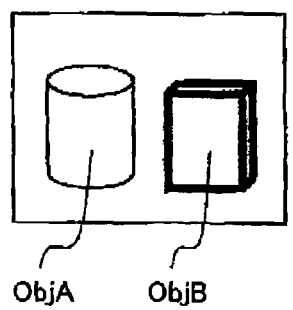
ObjA   ObjB
(IMAGE OF s COMPONENT)
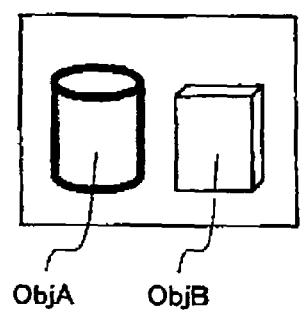
ObjA   ObjB → p COMPONENT
--→ s COMPONENT

IMAGE SENSOR

IMAGE PLANE OF
IMAGE TO BE GENERATED

PROJECTION POINTS OVERLAPPING WHEN
VIEWED FROM REFERENCE VIEWPOINT $T_j$

PROJECTION POINTS OVERLAPPING WHEN
VIEWED FROM REFERENCE VIEWPOINT $T_j$

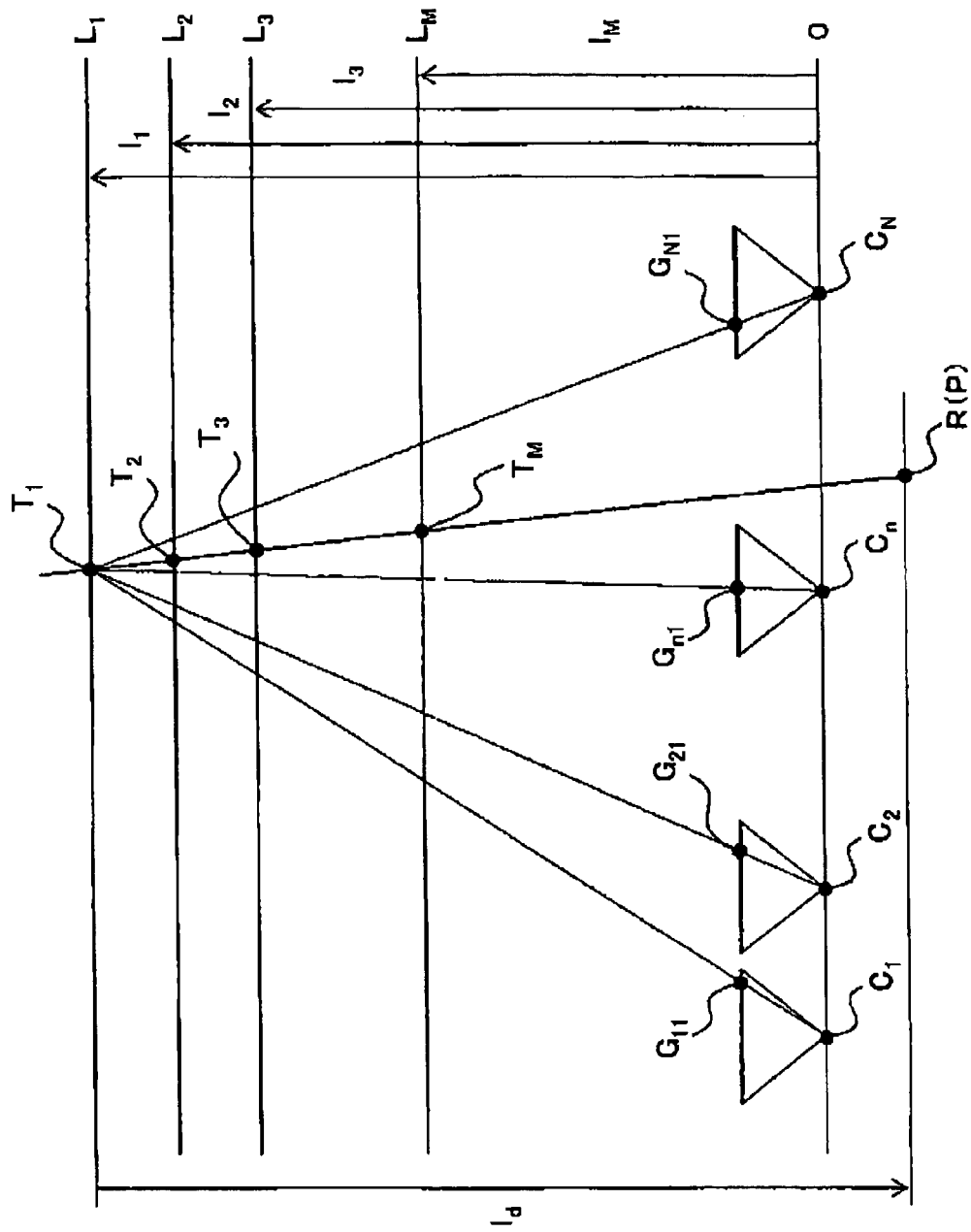

VIRTUAL VISUAL POINT IMAGE GENERATING METHOD AND 3-D IMAGE DISPLAY METHOD AND DEVICE

TECHNICAL FIELD

The present invention relates to a technology for estimating information on a three-dimensional shape of an object from plural images to generate an image using the information. The technology of the present invention can be applied to a system that supports visual communications such as a TV phone and the like.

BACKGROUND ART

From the past, in the fields of the computer graphics (CG) and the virtual reality (VR), technologies have been activity studied for generating an image of an object, by a computer, viewed not only from a viewpoint position at which a camera is placed but also from a viewpoint position desired by a user.

For example, there are methods for displaying a three-dimensional image of an object or generating an image (to be referred to as a virtual viewpoint image hereinafter) of an object viewed from a virtual viewpoint using plural images of the object taken under different conditions.

As a method for displaying a three-dimensional image of an object, there is a method using a display having plural image display planes such as a DFD (Depth-Fused 3-D) display, for example. The DFD is a display in which plural image display planes are layered at some intervals (for example, refer to document 1: Japanese Patent No. 3022558). The DFD can be roughly classified into a brightness modulation type and a transmission type.

For displaying an image of the object on the DFD, a two-dimensional image of the object is displayed on each image display plane. At this time, if the DFD is the brightness modulation type, brightness of each of pixels overlapping when viewed from a predetermined viewpoint of an observer (reference viewpoint) is set in a ratio according to the shape of the object in the depth direction for displaying the pixels. Accordingly, as to a point existing on the object, brightness of the pixel on an image display plane existing near from the observer becomes large, and as to another point, the brightness of the pixel on a display plane existing farther from the observer becomes large. As a result, the observer who observes images displayed on each image display plane of the DFD can see a stereoscopic image (three-dimensional image) of the object.

When the DFD is the transmission type, transmittance of each of pixels, on each image display plane, overlapping when viewed from a predetermined viewpoint of the observer (reference viewpoint) is set according to the shape of the object in the depth direction so as to display the pixels.

In addition to the displaying method using the DFD, as the method for displaying the three-dimensional image of the object, there is a method for displaying two images having parallax corresponding to an interval of right and left eyes of the observer on a screen such as a liquid crystal display and the like.

For generating the images for displaying the three-dimensional image of the object or for generating the image of the object viewed from arbitrary viewpoints, when the three-dimensional shape of the object is known since the object is generated by a computer graphics and the like, for example, each of the images can be generated using the model. On the other hand, when the three-dimensional shape of the object is not known, it is necessary to obtain the three dimensional shape of the object, namely, a geometrical model of the object before generating each image.

In addition, also when generating the virtual viewpoint image using the plural images, it is necessary to obtain the geometrical model of the object based on the plural images first. The geometrical model of the object is represented as a set of basic figures called polygon or voxel, for example.

There are various methods for obtaining the geometrical model of the object based on the plural images, and many studies are being performed as Shape from X in the field of the computer vision. In the Shape from X, the stereo method is a representative model obtaining method (refer to document 2 : Takeo Kanade et al.: "Virtualized Reality: Constructing Virtual Worlds from Real Scenes," IEEE MultiMedia, Vol. 4, No. 1, pp. 34-37, 1997, for example).

In the stereo method, the geometrical model of the object is obtained based on plural images of the object taken from different viewpoints.

At this time, a distance from the reference viewpoint for obtaining the model to each point of the object is calculated using triangulation techniques by performing corresponding point matching, that is, by associating points (pixels) on each image. But, the geometrical model of the object is not immediately obtained using the stereo method. A group of points on the surface of the object is obtained. Therefore, it is necessary to determine structural information indicating how the points included in the point group are connected and what surface is formed in order to obtain the geometrical model of the object (refer to document 3 : Katusi Ikeuchi "Model generation of real object using images", Journal of the Robotics Society of Japan, Vol. 16, No. 6, pp. 763-766, 1998, for example).

That is, in the method for obtaining the geometrical object using the stereo method, the apparatus (computer) for generating the image should perform complicated processing such as application of the shape of the object, statistical processing and the like. Therefore, high computing power is necessary.

In addition, as the method for obtaining the geometrical model of the object based on the plural images, there is a method called Shape from Silhouette for determining a region that the object occupies in the space based on an outline of the object in each image taken from plural viewpoints (to be referred to as Shape from Silhouette method hereinafter) (refer to document 4: Potmesil, M: "Generating Octree Models of 3D Objects from their Silhouettes in a Sequence of Images," CVGIP 40, pp. 1-29, 1987, for example).

In many cases, the geometrical model of the object obtained by the Shape from Silhouette method is represented as a set of small cubes called voxels. However, when the geometrical model of the object is represented by the voxels, large amount of data are required for representing the three-dimensional shape of the object. Therefore, high computing power is required for obtaining the geometrical model of the object using the Shape from Silhouette method.

Therefore, in recent years, instead of representing the geometrical model of the object using polygons or voxels like the stereo method and the Shape from Silhouette method, a method is proposed in which partial images of the object are texture-mapped to projection planes having a multi-layered structure so as to represent the three-dimensional shape of the object on the multi-layered planes (refer to document 5: Jonathan Shade et al.: "Layered Depth Images," SIGGRAPH98 Conference Proceedings, pp. 231-242, 1998, and document 6; Tago, Nitta, Inamura, Harashima, "Video-Based Rendering using dynamic layer representation", Three-dimensional image conference 2001, pp. 33-36, 2001, for example).

The texture mapping is a method for setting the projection planes of the multi-layered structure, and mapping each partial image (texture image) cut out from the taken image to a projection plane corresponding to a distance of the object appearing in the texture image so as to obtain stereoscopic visual effects. Thus, this method has advantages in that adequately high-speed processing can be performed even by graphics hardware in a generally widespread personal computer and in that handling of data is easy.

However, on the other hand, when representing the geometrical model of the object using the multi-layered planes based on the texture mapping, if intervals at which the projection planes are set are too wide, detailed shape of the object cannot be represented. Therefore, a contrivance is proposed in which a value (depth value) in addition to color information of R (red), G (green) and B (blue) is added for each pixel of the texture image for detailed shape, for example, while rough shape is represented by the projection planes (planes). In the document 5, a method is proposed in which positions of pixels of each texture image are changed according to the depth value so as to represent detailed depths that cannot be fully represented only by the multi-layered planes. In addition, in the document 6, a method is proposed in which transmittance of each pixel is set according to the depth value to represent detailed depths that cannot be fully represented only by the multi-layered planes.

DISCLOSURE OF THE INVENTION

Problem to be Solved by the Invention

However, in the above-mentioned methods for obtaining the geometrical model of the object, the method for obtaining the geometrical model of the object using the stereo method is susceptible to the shape of the object and the texture of the surface of the object, and surrounding environment of the object so that highly reliable information is not necessarily obtained for any shape of the object and for every point of the object (refer to document 7 : Masatoshi Okutomi: "Why is stereo difficult?", Journal of the Robotics Society of Japan, Vol. 16, No. 6, pp. 39-43, 1998, for example).

When estimating the distance of the object, if the reliability of the estimation is low, there is a case that erroneous distance is estimated. When the estimated distance is erroneous, discontinuous noise appears in positions at which the estimation of the distance is erroneous in a virtual viewpoint image generated using the geometrical model of the object, for example. Therefore, the virtual viewpoint image appears that a lost region 7B occurs in a part of the object 7 as shown in FIG. 1. In addition, according to the principle of the Shape from Silhouette method, the geometrical model of the object is obtained assuming that the object is gibbous. Therefore, there is a problem in that a correct model of the object cannot be obtained when the object is wholly or partially concave.

In addition, according to the Shape from Silhouette method, it is difficult in itself to correctly extract the outline of the object against the background on the image. Thus, the method for correctly extracting the outline is a main research task in the computer vision field now as in the past. That is, the geometrical model of the object obtained by the Shape from Silhouette method is a model obtained from an inaccurate outline, and the reliability is not high. Therefore, there is a problem in that the image generated from the geometrical model of the object obtained by the Shape from Silhouette method does not have sufficiently satisfactory quality.

In addition, as to the method for representing the three-dimensional shape of the object using multi-layered planes like the texture mapping, the depth value provided for each texture pixel is known. That is, the method assumes that the shape of the object is accurately obtained. Therefore, when the shape of the object is not known, it is necessary to obtain the geometrical model of the object first. As a result, when there is an unreliable portion in the shape estimation of the object, there is a case that the texture image is mapped to an incorrect projection plane, so that there is a problem in that the generated image is remarkably deteriorated.

In addition, in the method for representing the three-dimensional shape of the object using texture mapping, processing for mapping images on the multi-layered projection planes can be performed at high speed. However, higher processing ability is required for accurately obtaining the shape of the object in the processing for obtaining the depth values.

As described above, according to the conventional technologies, when there is an unreliable portion in estimation of the shape of the object, estimation of distance is tend to be incorrect, so that there is a problem in that discontinuous noise occurs on the generated image and the image quality is deteriorated.

In addition, it is necessary to increase reliability of estimation for avoiding deterioration of image quality due to estimation error of the shape of the object. For this purpose, it is necessary to use many images and perform strict computational processing so as to obtain the accurate geometrical model of the object. However, in this case, high processing ability (computational power) is necessary for the apparatus that generates the virtual viewpoint image and the like. Thus, there is a problem in that it is difficult for the generally used personal computer to generate the virtual viewpoint image having few deterioration at high speed.

In addition, for increasing reliability of the geometrical model of the object, pictures taken from more viewpoints are necessary. Thus, there is a problem in that the image taking apparatus becomes large and the apparatus configuration is complicated.

An object of the present invention is to provide a technology that can decrease remarkable deterioration of image quality that occurs at a part where the reliability of estimation of the shape of the object is low when generating the image of the object by obtaining the three-dimensional shape of the object from plural images.

Another object of the present invention is to provide a technology that can generate the image having small partial deterioration of image quality in a short time even by using an apparatus having low processing performance when generating the image of the object by obtaining the three-dimensional shape of the object from plural images.

Still another object of the present invention is to provide a technology that can downsize an image-taking apparatus for taking images used for obtaining the geometrical model of the object so as to simplify the apparatus configuration.

Before-mentioned and other objects, and new features of the present invention will become more apparent from the following detailed description when read in conjunction with the accompanying drawings.

Means for Solving the Problem

To solve the above-mentioned problem, the present invention is configured as a virtual viewpoint image generation method including:

a step of obtaining plural images of an object taken by plural cameras;

a step of determining a virtual viewpoint that is a position from which the object is viewed; and a step of generating a virtual viewpoint image that is an image of the object viewed from the virtual viewpoint based on the obtained images of the object, the step of generating the virtual viewpoint image including:

a step 1 of setting projection planes having a multi-layered structure;

a step 2 of obtaining each corresponding point, on the images of the object, corresponding to a projection point of a projection plane;

a step 3 of determining color information or brightness information of each projection point based on color information or brightness information of corresponding points;

a step of calculating, for each of the projection points overlapping when viewed from a reference viewpoint in a space, a degree of probability that the object exists at a distance corresponding to a position of the projection point based on a degree of correlation of the corresponding points or neighborhoods of the corresponding points;

a step 5 of performing mixing processing on color information or brightness information of reference points overlapping when viewed from the virtual viewpoint according to the degree of probability of existence of the object so as to determine color information or brightness information of each pixel of the virtual viewpoint image; and a step 6 of repeating steps from the step 1 to the steps 5 for every point corresponding to pixels of the virtual viewpoint image.

In addition, the image generation method of the present invention can be configured as an image generation method including:

a step of obtaining images of an object taken from different viewpoints;

a step of obtaining a three-dimensional shape of the object based on the images; and a step of generating an image of the object viewed from a viewpoint of an observer based on the obtained three-dimensional shape of the object, the step of obtaining the three-dimensional shape of the object including:

a step of setting projection planes having a multi-layered structure in a virtual three-dimensional space;

a step of determining a reference viewpoint for obtaining the three-dimensional shape of the object;

a step of determining color information or brightness information of projection points that are points on the projection planes based on color information or brightness information of corresponding points, on the obtained images, corresponding to the projection points;

a step of calculating correlation degrees among corresponding points corresponding to the projection points;

a step of calculating, for each of the projection points overlapping when viewed from the reference viewpoint, an existence probability that is a probability that the object exists at the projection point based on the correlation degree of each projection point;

the step of calculating the correlation degree including:

a step of preparing plural groups of camera sets each being a group of some viewpoints selected from the plural viewpoints; and a step of obtaining the correlation degree from the corresponding points on images included in each camera set, the step of determining the existence probability including:

a step of calculating the existence probability based on the correlation degree of each projection point obtained for each camera set; and a step of determining the existence probability of each projection point by performing integrating processing for the existence probability determined for each camera set.

In addition, the present invention can be configured as an image generation method including:

a step of obtaining images of an object taken by changing focusing distance;

a step of obtaining a virtual viewpoint that is a viewpoint from which the object appearing in the images is viewed;

a step of obtaining a three-dimensional shape of the object based on the images; and a step of generating an image of the object viewed from the virtual viewpoint based on the obtained three-dimensional shape of the object, the step of obtaining the three-dimensional shape of the object including:

a step of setting projection planes having a multi-layered structure in a virtual three-dimensional space;

a step of determining a reference viewpoint for obtaining the three-dimensional shape of the object;

a step of determining color information or brightness information of projection points, that are points on the projection planes, based on color information or brightness information of corresponding points, on the obtained images, corresponding to the projection points;

a step of determining focusing degrees of the projection points based on focusing degrees of the corresponding points corresponding to the projection points;

a step of calculating, for each of the projection points overlapping when viewed from the reference viewpoint, an existence probability that is a probability that the object exists at a distance corresponding to a position of the projection point based on the focusing degree of each projection point;

the step of generating the image of the object viewed from the virtual viewpoint including:

mixing color information or brightness information of the projection points overlapping when viewed from the virtual viewpoint in a ratio corresponding to the existence probability to determine color information or brightness information of each point of the image to be generated.

In addition, the present invention can be configured as an image generation method including:

a step of obtaining images of an object taken under different conditions;

a step of obtaining a three-dimensional shape of the object based on the images; and a step of generating an image of the object viewed from a viewpoint of an observer based on the obtained three-dimensional shape of the object, the step of obtaining the three-dimensional shape of the object including:

a step of setting projection planes having a multi-layered structure in a virtual three-dimensional space;

a step of determining a reference viewpoint for obtaining the three-dimensional shape of the object;

a step of determining color information or brightness information of projection points, that are points on the projection planes, based on color information or brightness information of corresponding points, on the obtained images, corresponding to the projection points;

a step of determining, for each of the projection points overlapping when viewed from the reference viewpoint, an existence probability that is a probability that a surface of the object exists at the projection point;

the step of determining the existence probability including:

a step of calculating an evaluation reference value of each projection point from image information of the corresponding points;

a step of performing statistical processing on the evaluation reference value of each projection point; and a step of calculating the existence probability of each projection point based on the evaluation reference value on which the statistical processing has been performed.

In addition, the present invention can be configured as a three-dimensional image display method including:

a step of obtaining images of an object taken under different conditions;

a step of obtaining a three-dimensional shape of the object based on the images;

a step of setting a viewpoint position from which an observer observes plural image display planes existing at different depth positions when viewed from the observer;

a step of generating two-dimensional images to be displayed on each image display plane based on the obtained three-dimensional shape of the object; and a step of presenting a three-dimensional image of the object by displaying the generated two-dimensional images on each display plane, the step of obtaining the three-dimensional shape of the object including:

a step of setting projection planes having a multi-layered structure in a virtual three-dimensional space;

a step of determining a reference viewpoint for obtaining the three-dimensional shape of the object;

a step of determining color information or brightness information of projection points, that are points on the projection planes, based on color information or brightness information of corresponding points, on the obtained images, corresponding to the projection points;

a step of determining, for each of the projection points overlapping when viewed from the reference viewpoint, an existence probability that is a probability that a surface of the object exists at the projection point;

the step of generating the two-dimensional images including:

converting the color information or the brightness information and the existence probability of the projection point into color information or brightness information and existence probability of each display point that is a point on the image display plane corresponding to the projection plane on which the projection point exists so as to generate the two dimensional images;

the step of presenting the three-dimensional image of the object including:

displaying the color information or brightness information on each display point with brightness according to the existence probability.

Effect of the Invention

According to the present invention, when generating the image of the object by obtaining the three-dimensional shape of the object from plural images, it becomes possible to reduce remarkable deterioration of image quality that occurs in a part where the reliability of estimation of the shape of the object is low. In addition, it becomes possible to generate the image having small partial deterioration of image quality in a short time even by using an apparatus having low processing performance. Further, it becomes possible to downsize a taking apparatus for taking images used for obtaining the geometrical model of the object so as to simplify the apparatus configuration.

BRIEF DESCRIPTION OF THE DRAWINGS

FIG. 23A and FIG. 23B are diagrams for explaining a method for obtaining the correlation degree of the corresponding points;

FIG. 53 is a schematic diagram for explaining the mathematical model of the image generation method of the third embodiment, and is a diagram for explaining a method for converting points on the space to pixels on the image;

FIG. 59 is a diagram for explaining a configuration example of the object image taking means the embodiment 3-1;

FIG. 92 is a schematic diagram for explaining the three-dimensional image display method of the embodiment 5-1, and is a diagram showing an example of a method for setting the projection plane;

EXPLANATION OF SYMBOLS

Figure 1:
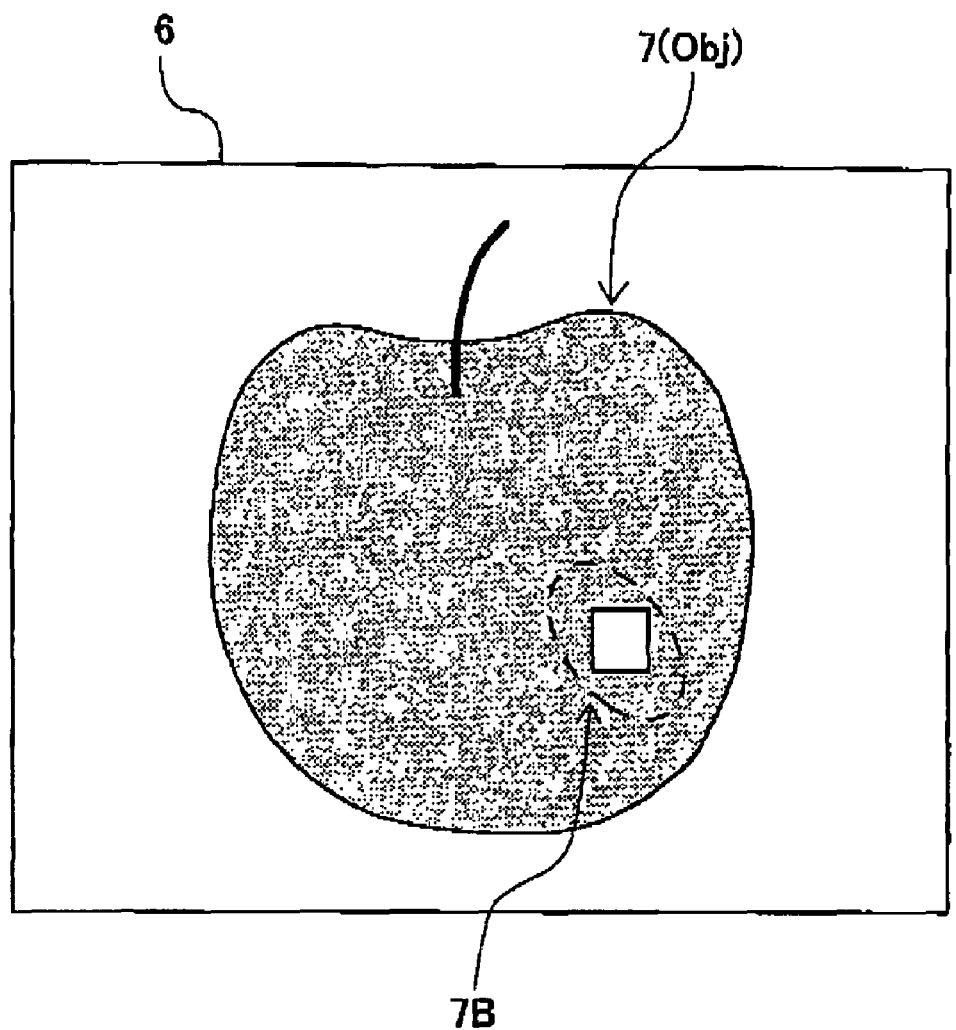
FIG. 1 is a diagram for explaining problems a conventional virtual viewpoint image.

First Embodiment 1,1A,1B,1C . . . virtual viewpoint image generation apparatus, 101 . . . virtual viewpoint determination means, 102 . . . object image obtaining means, 103 . . . image generation means, 103a . . . projection plane determination means, 103b . . . reference viewpoint determination means, 103c . . . texture array keeping means, 103d . . . corresponding point matching processing means, 103e . . . color information determination means, 103f . . . existence probability information determination means, 103g . rendering means, 104 . . . generated image output means, 2 . . . viewpoint position input means, 3 . . . object taking means (camera), 4 . . . image display means, 6 . . . virtual viewpoint image, 7 . . . image of object, 7A . . . a part where the image is deteriorated, 7B . . . a part where the image is lost Second Embodiment 6,6A,6B,6C . . . image generation apparatus, 601 . . . object image obtaining means, 602 . . . observer viewpoint setting means, 603 . . . projection plane setting means, 604 . . . projection plane information storing area keeping means, 605 . . . color information/existence probability determination means, 606 . projection plane information—display plane information conversion means, 607 . . . image output means, 7,7A,7B . . . image display means, 8,8A,8B . . . object image taking means, 9,9A,9B . . . reference viewpoint input means Third Embodiment 2,2A,2B,2C . . . image generation apparatus, 201 . . . object image obtaining means, 202 . . . virtual viewpoint setting means, 203 . . . projection plane etc. setting means, 204 . . . texture array keeping means, 205 . . . color information/existence probability determination means, 206 . . . rendering means, 207 generated image output means, 3,3A,3B . . . object image taking means, 4,4A,4B . . . viewpoint information input means, 5,5A,5B . . . image display means, 6 . . . polarizing binary optical system, 7,7A,7B . . . image sensor, 8 . . . beam splitter, 9 . . . polarizing filter, 10 . . . variable focus lens, 11a,11b,11c,11d . . . fixed focus lens, 12 . . . lens holder Fourth Embodiment 2,2A,2B,2C . . . image generation apparatus, 201 . . . object image obtaining means, 202 . . . observer viewpoint setting means, 203 . . . projection plane etc. setting means, 204 . . . texture array keeping means, 205 . . . color information/ existence probability determination means, 206 . . . projection plane information—display plane information conversion means, 207 . . . image output means, 208 . . . rendering means, 3,3A,3B . . . image display means, 4,4A,4B . . . object image taking means, 5,5A,5B . . . reference viewpoint information input means Fifth Embodiment 2,2A,2B,2C . . . three-dimensional image generation apparatus, 201 . . . object image obtaining means, 202 . . . observer viewpoint setting means, 203 . . . projection plane etc. setting means, 204 . . . texture array keeping means, 205 . . . color information/existence probability determination means, 206 . . . projection plane information—display plane information conversion means, 207 . . . image output means, 3,3A,3B . . . image display means, 4,4A,4B . . . object image taking means, 5,5A,5B . . . reference viewpoint input means

PREFERRED EMBODIMENTS FOR CARRYING OUT THE INVENTION

In the following, first to fifth embodiments are described as the preferred embodiments for carrying out the invention.

First Embodiment

First, the first embodiment of the present invention is described. The first embodiment mainly corresponds to claims 1-11. In this embodiment, although three primary colors of red (R), green (G) and blue (B) are used for representing color information as an example, other representation such as brightness (Y) or color difference (U, V) can be used. In addition, for black-and-white images, only brightness information can be used as the color information. In figures for explaining the first embodiment, the same reference signs are assigned for the same functions.

Before explaining each embodiment of the first embodiment, principle of a virtual viewpoint image generation method of the first embodiment is described.

Figure 2:
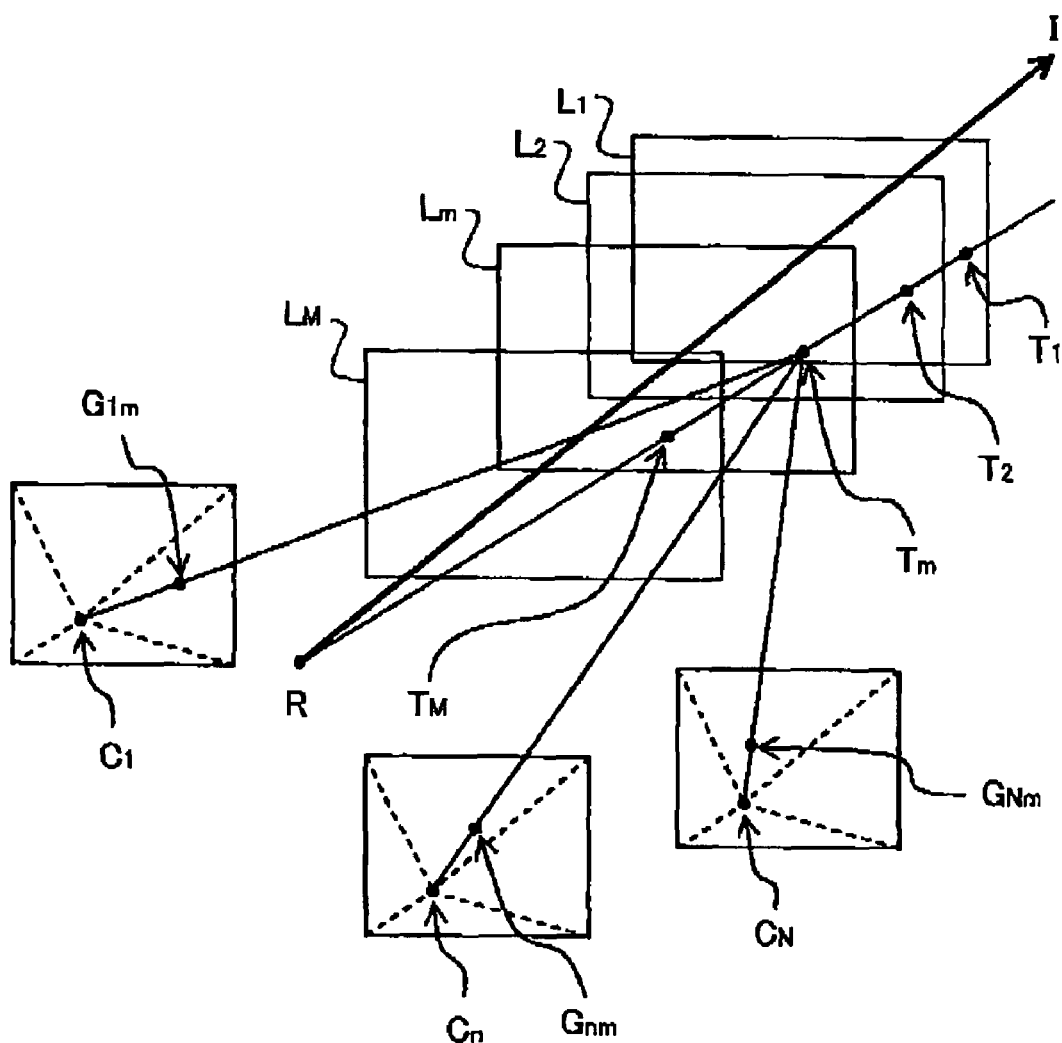
FIG. 2 is a schematic diagram for explaining the principle of the virtual viewpoint image generation method of the first embodiment, and is a diagram showing examples of projection plane group, camera, reference viewpoint, projection point and corresponding point.
Figure 3A:
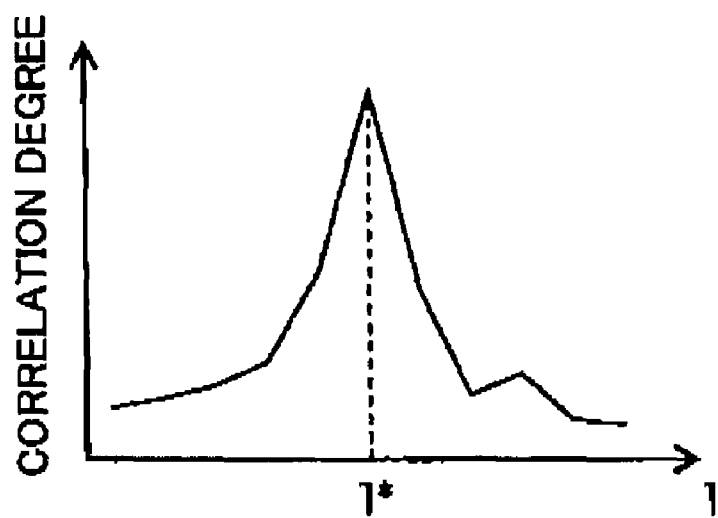
FIG. 3A and FIG. 3B are diagrams for explaining the principle of the virtual viewpoint image generation method of the first embodiment.
Figure 3B:
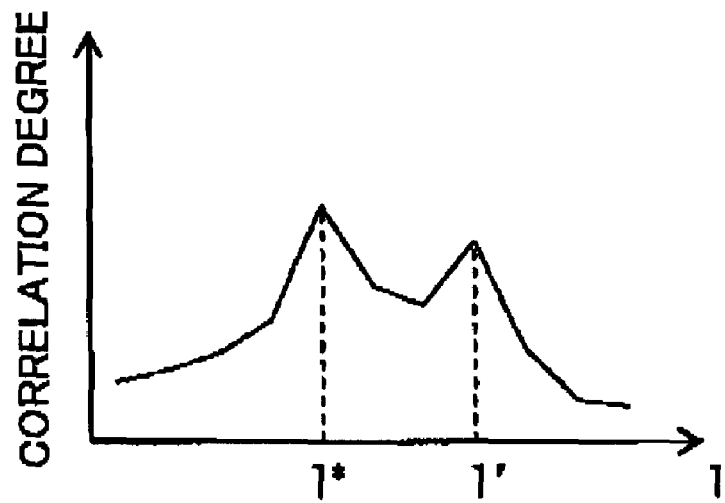
Figure 4A:
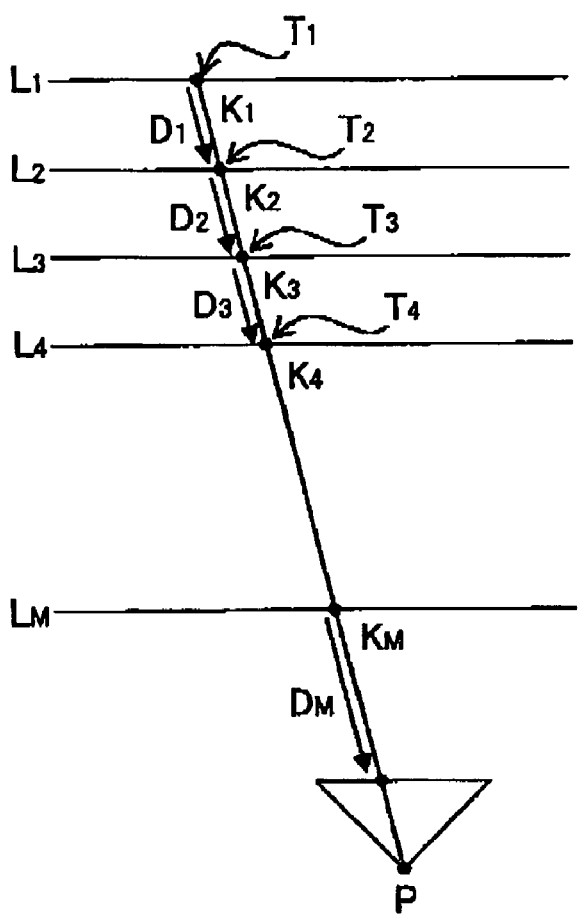
FIG. 4A and FIG. 4B are diagrams for explaining the principle of the virtual viewpoint image generation method of the first embodiment, and are diagrams showing an example of mixing processing according to transparency of projection points.
Figure 4B:
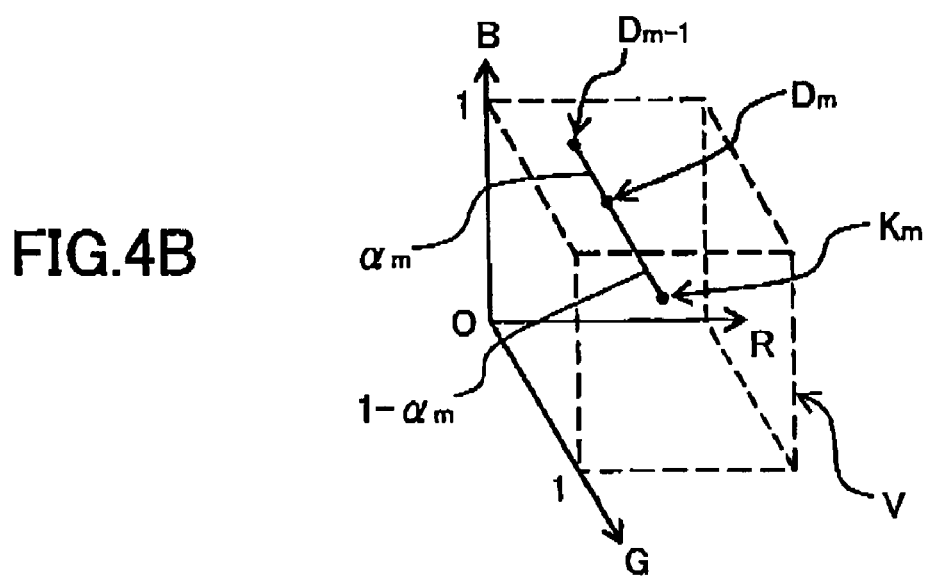
Figure 5:
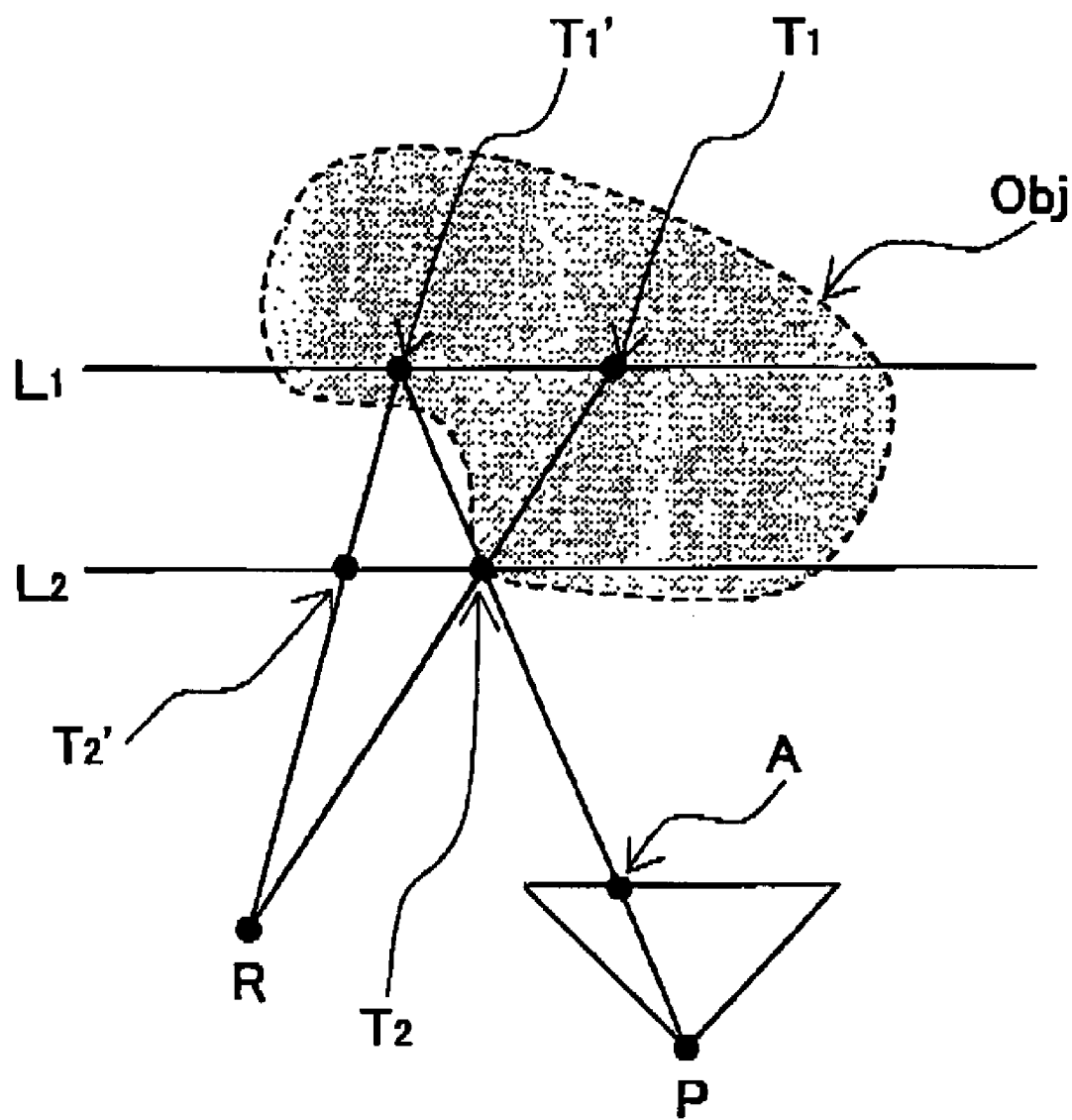
FIG. 5 is a schematic diagram for explaining the principle of the virtual viewpoint image generation method of the first embodiment, and is a diagram showing examples of object, projection plane group, reference viewpoint, virtual projection point and projection point.

FIGS. 2-5 are schematic diagrams for explaining the principle of the virtual viewpoint image generation method of the present invention. FIG. 2 shows examples of projection plane group, camera, reference viewpoint, projection point and corresponding point. FIG. 3A and FIG. 3B show examples of graphs of correlation degree between corresponding points. FIG. 4A shows an example of mixing processing according to the transparency of projection points, and FIG. 4B represents mixing processing for color information according to transparency in a color space. FIG. 5 shows examples of an object, a projection plane group, a reference viewpoint, a virtual viewpoint and a projection point.

The method for generating the virtual viewpoint image in this invention includes: a step 1 of setting the projection plane group having the multi-layered structure; a step 2 of obtaining points (corresponding points), on plural images taken by the camera, corresponding to each point (projection point) on the projection planes; a step 3 of mixing color information of the plural corresponding points or selecting one of them to determine color information of the projection point; a step 4 of calculating, based on correlation degrees of the corresponding points or the adjacent regions, degree (existence probability information) of probability that the object exists at the distance of the projection point for each of the plural projection points overlapping when viewed from a viewpoint (reference viewpoint) in a space; a step 5 of performing mixing processing on the color information of reference points overlapping when viewed from the virtual viewpoint according to the existence probability information so as to determine color information of each pixel in the virtual viewpoint; and a step 6 of repeating the steps 1-5 for every point corresponding to pixels of virtual viewpoint image. That is, the method of the present invention does not intend to obtain a geometrical object model accurate for every case and every portions like the conventional method. But, assuming that an estimated value having adequate reliability cannot be obtained in the distance estimation depending on picture-taking conditions and portions of the object, a portion, by which an estimated value of low reliability is obtained, is drawn vaguely so as to provide the portion with low contribution to image generation for avoiding extreme image deterioration, and a portion, by which distance data of high reliability is obtained, is drawn clearly so as to provide the portion with high contribution to image generation.

The reliability of estimation is determined in the following way according to the degree of correlation (correlation degree) of corresponding points of the taken images. For example, as shown in FIG. 2, a reference viewpoint R, center positions $C_i (i=1,2,\ldots,N)$ of the camera, and projection planes $L_j (j=1,2,\ldots,M)$ that are parallel each other are set, and it is assumed that a corresponding point obtained by taking a projection point $T_j$ by a camera at a center position $C_i$ is $G_{ij}$ As a result, for example, a set $\{G_{im}|i=1,2,\ldots,N\}$ of corresponding points with respect to a projection point $T_m$ on a projection plane $L_m$ is obtained, and the degree of correlation (correlation degree) of them can be calculated.

A graph shown in FIG. 3A or FIG. 3B can be obtained by calculating the correlation degrees for plural projection points $T_j (j=1,2,\ldots,M)$ that lie on a straight line when viewed from the reference viewpoint R, and by indicating the distance 1 between the reference viewpoint R and the projection plane using the lateral axis, and indicating the correlation degree using the horizontal axis. A concrete calculation method of the correlation degree is described in later-described embodiments. Here, the graph is shown assuming that the larger the correlation degree is, the larger the degree of the correlation among correspondence points is.

At a distance corresponding to high correlation degree, corresponding points in plural cameras are similar so that there is a high possibility that the same point of the object is taken at the position of the projection point by the cameras. Therefore, there is a high possibility that the object exists at the distance. When only one distance by which the object exits on the line passing through the reference viewpoint R exists, it can be estimated that the object exists at a distance 1=1* corresponding to the highest correlation degree as shown in FIG. 3A and FIG. 3B At this time, as shown in FIG. 3A, when the correlation degree of the corresponding points at the distance 1=1* is far higher than other candidates, highly reliable estimation can be performed. However, as shown in FIG. 3B, when there are plural candidates of estimation values such as the distance 1=1* and distance 1=1' and when the correlation degrees of the corresponding points are almost the same, the reliability of the estimation becomes low.

Figure 32:
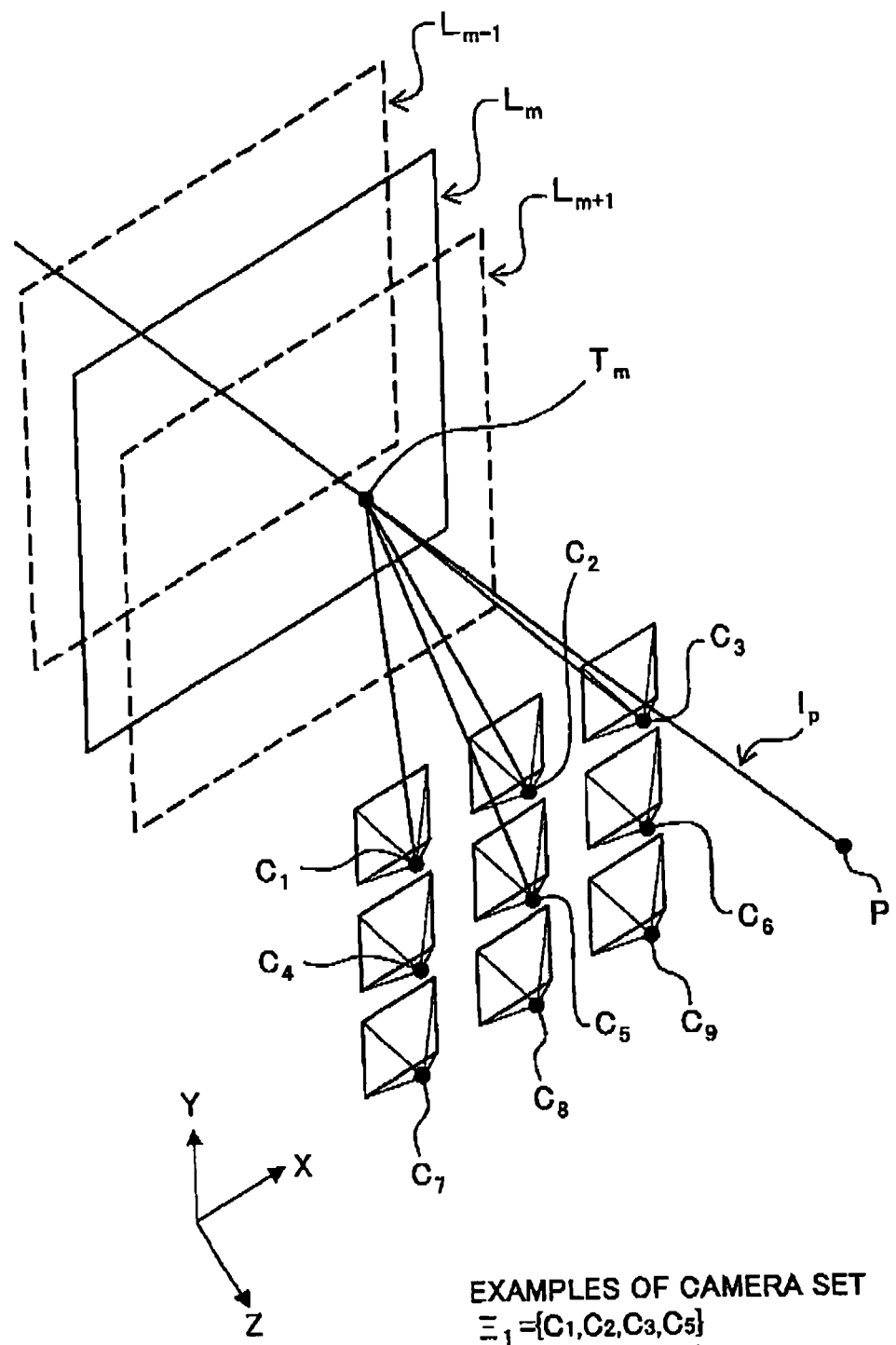
FIG. 32 is a schematic diagram for explaining an image generation method of the embodiment 2-1, and is a diagram showing an example foe setting a camera set.

In the case shown in FIG. 32, when a method for rendering only one projection point corresponding to the distance 1=1* of the highest correlation degree is adopted, large noise appears on a generated image if the object actually exists. at the distance 1=1' due to estimation error.

On the other hand, according to the present invention, a probability (existence probability information) that the object exists is calculated based on the correlation degree, so that plural projection points are rendered with clarity according to the existence probability information. As a result, plural projection points are rendered vaguely when the estimation reliability is low, so that there is an effect that noise is inconspicuous on the generated image and an image looks better for the observer can be generated.

On the other hand, a projection point corresponding to high existence probability is clearly rendered when the estimation reliability is high, so that a better image can be generated.

In addition, the rendering method of this invention can be simply implemented using texture-mapping that is a basic method in computer graphics, so that there is an effect that computing workload can be decreased such that even three-dimensional graphics hardware mounted on a popular personal computer can perform rendering processing nicely.

In addition, in the virtual viewpoint image generation method of this invention, each reference point on the projection plane has transparency with a gradation from transparent to opaque, and the transparency in each reference point is calculated by converting the existence probability information obtained by the step 4. In step 5, the mixing processing for obtaining color information of each point in the virtual viewpoint is successively performed from a projection point far from the virtual viewpoint to a projection point near to the virtual viewpoint. Color information obtained by the mixing processing up to a projection point is obtained by internally dividing, with a ratio according to transparency, between color information at the projection point and color information obtained by mixing processing up to a previous projection point. The color information obtained by the mixing processing is an internal division of color information at a stage and next color information.

For example, as shown in FIG. 4A, considering a case in which projection planes $L_j(j=1,2,\ldots,M)$, projection points $T_j(j=1,2,\ldots,M)$ and vectors $K_j(j=1,2,\ldots,M)$ having elements of red, green and blue (R,G,B) and indicating color information are set in a color space represented by the following equation 1.

$$K_j \in V, V \equiv \{(R,G,B) | 0 \leq R \leq 1, 0 \leq G \leq 1, 0 \leq B \leq 1\}$$ [Equation 1]

In addition, it is assumed that transparency $\alpha_j(j=1,2,\ldots,M)$ of the projection point is set as shown in the following equation 2.

$$0 \leq \alpha_j \leq 1$$ [Equation 2]

At this time, color information $D_m$ obtained by mixing processing up to j=m can be represented as recurrence formulas shown in the following equation 3 and equation 4, color information $D_M$ obtained by performing mixing processing up to j=M that is nearest to the virtual viewpoint becomes color information at the virtual viewpoint.

$$D_m = \alpha_m K_m + (1-\alpha_m) D_{m-1}$$ [Equation 3]

$$D_1 = \alpha_1 K_1$$ [Equation 4]

At this time, as represented by the relationship of the equation 2 and the equation 3, the color information $D_m$ is an internally divided point between $K_m$ and $D_{m-1}$ in a color space V. Thus, as shown in FIG. 4B, when $K_m, D_{m-1} \in V$ is satisfied, $D_m \in V$ holds true.

Then, if conditions of the equation 1 and the equation 2 are satisfied, it is ensured that the following equation 5 holds true with respect to the color information $D_M$ in the virtual viewpoint.

$$D_M \in V$$ [Equation 5]

The equation 5 can be proved using mathematical induction, but detailed description is not provided here.

That is, by setting the color information and the transparency at the projection point such that the equations 1 and 2 are satisfied, the color information of the virtual viewpoint can be limited within a proper color space v without fail.

According to the above-mentioned features, when plural virtual viewpoint images for the same object are generated, even when color information and transparency of projection points are calculated from one reference viewpoint, if the color information and the transparency satisfy the equation 1 and the equation 2, images can be generated with proper color information bounds for all virtual viewpoint images.

For example, as shown in FIG. 5, a case is considered in which, when an object Obj exists, and two projection planes $L_1$ and $L_2$, a reference viewpoint R and a virtual viewpoint P are set, pieces of color information of projection points $T_1, T_2, T_1', T_2'$ are $K_1, K_2, K_1', K_2'$ respectively, and degrees of probability of existence of object are $\beta_1, \beta_2, \beta_1', \beta_2'$ respectively.

The degree (existence probability information) of probability of existence of the object is calculated on a line passing through the virtual viewpoint R, and a sum of existence probability information at projection points on the same straight line is 1. Since the surface of the object exists near the projection points $T_1'$ and $T_2$, existence probability information at the points are higher than those of $T_1$ and $T_2'$. Then, the existence probability information is represented by the following equations 6 and 7.

$$\beta_1 \cong 0, \beta_2 \cong 1$$ [Equation 6]

$$\beta_1' \cong 1, \beta_2' \cong 0$$ [Equation 7]

At this time, color information $K_A$ at a point A of the image plane of the virtual viewpoint P can be calculated by assigning weights to color information of projection points on the line PA and adding the weighted color information of the projection points as represented by the following equation 8.

$$K_A = \beta_1' K_1' + \beta_2 K_2$$ [Equation 8]

The equation 8 can be represented as the following equation 9 according to the equations 6 and 7.

$$K_A \approx K_1' + K_2$$ [Equation 9]

When being viewed from the virtual viewpoint P, $T_A'$ is blocked by $T_A$. Therefore, brightness of each component of (R,G,B) is increased by $K_1'$ as shown in the equation 9 although actual color information at the point A is $K_A = K_2$.

In addition, when each component of $K_A$ and $K_A'$ has large brightness, $K_A$ exceeds effective region of the color space. Therefore, clipping processing becomes necessary for $K_A$ to fall within a predetermined limit.

Accordingly, for example, results shown in equations 10 and 11 are obtained by calculating transparency from existence probability information using a calculation method described in an after-mentioned example 1-2.

$$\alpha_2 = \beta_2, \alpha_1 = 1$$ [Equation 10]

$$\alpha_2' = \beta_2', \alpha_1' = 1$$ [Equation 11]

In the equation 10 and the equation 11, each of $\alpha_1, \alpha_2, \alpha_1'$ and $\alpha_2'$ is transparency at $T_1, T_2, T_1'$ and $T_2'$ respectively.

For obtaining color information of each point with respect to the virtual viewpoint, mixing processing is performed successively from a projection point far from the virtual viewpoint toward a projection point near the projection point, and color information obtained by mixing processing up to a projection point is obtained by performing interior division between color information at the projection point and color information obtained by mixing processing up to a previous projection point at a ratio of transparencies, so that $K_A$ is represented by the following equation 12.

$$K_A = \alpha_2 K_2 + (1-\alpha_2)\alpha_1' K_1' \quad \text{[Equation 12]}$$

The equation 12 can be represented as the following equation 13 according to the equation 6, the equation 7, the equation 10 and the equation 11. The equation 13 represents good approximation of actual color information.

$$K_A > K_2 \quad \text{[Equation 13]}$$

As mentioned above, when performing image generation using the existence probability information as it is, there is no problem if the reference viewpoint and the virtual viewpoint are the same. But, when they are different, brightness may increase near blocked region. On the other hand, according to image generation in which the existence probability information is changed to transparency, the above mentioned phenomenon can be prevented.

In addition, when the reference viewpoint and the virtual viewpoint are different in the image generation using the existence probability information as it is, there is no guarantee that color information that is calculated using after-mentioned equations falls within an effective color information limit, and correction processing is necessary, for example. On the other hand, according to the image generation in which the existence probability information is converted to the transparency, such correction is not necessary.

In addition, according to the image generation in which the existence probability information is converted to transparency, a semitransparent object can be efficiently represented, so that there is an effect that the present invention can be applied more widely to more objects in the actual world.

In addition, according to the virtual viewpoint image generation method, a group of projection planes specific for each camera is set in step 1. In step 3, as to color information of a projection point, color information of corresponding point of an image taken by a camera specific for a projection plane to which the projection point belongs is used. In step 4, the existence probability information is calculated using a viewpoint of the camera, as the reference viewpoint, specific to the projection plane to which the projection point belongs. In mixing processing of color information of the virtual viewpoint in step 5, correction is performed according to position relationship between the virtual viewpoint and each reference viewpoint. Accordingly, since the group of the projection planes specific to each camera is set irrespective of position relationship among cameras, even if placement of the cameras is complicated or random, processing for setting the group of the projection planes is not affected so that image generation can be performed by consistent processing method.

When the group of the projection planes specific to each camera is set, mixing processing between images taken by corresponding cameras is not necessary as to color information of the projection plane. Accordingly, for example, parallel processing can be performed when using a computer, so that the speed for generating the image can be increased.

In addition, since all pieces of color information of the group of the projection planes associated with the same camera are the same, a texture memory for storing the color information can be shared when performing processing by a computer. Therefore, even if the number of projection planes is large, the memory is not consumed very much, so that workload in the apparatus used for image generation can be decreased.

In addition, since the camera corresponding to a projection plane is uniquely determined, calibration such as correction of distortion of a lens can be performed easily and at high speed by setting corresponding relationship of coordinates of them.

Therefore, a program that causes a specific apparatus or a widespread personal computer or the like to perform the virtual viewpoint image generation method of the first embodiment of the present invention has wide application ranges and high versatility.

In the following, an apparatus for performing the virtual viewpoint image generation method of the first embodiment and a concrete image generation method are described by taking examples.

(Embodiment 1-1)

Figure 6:
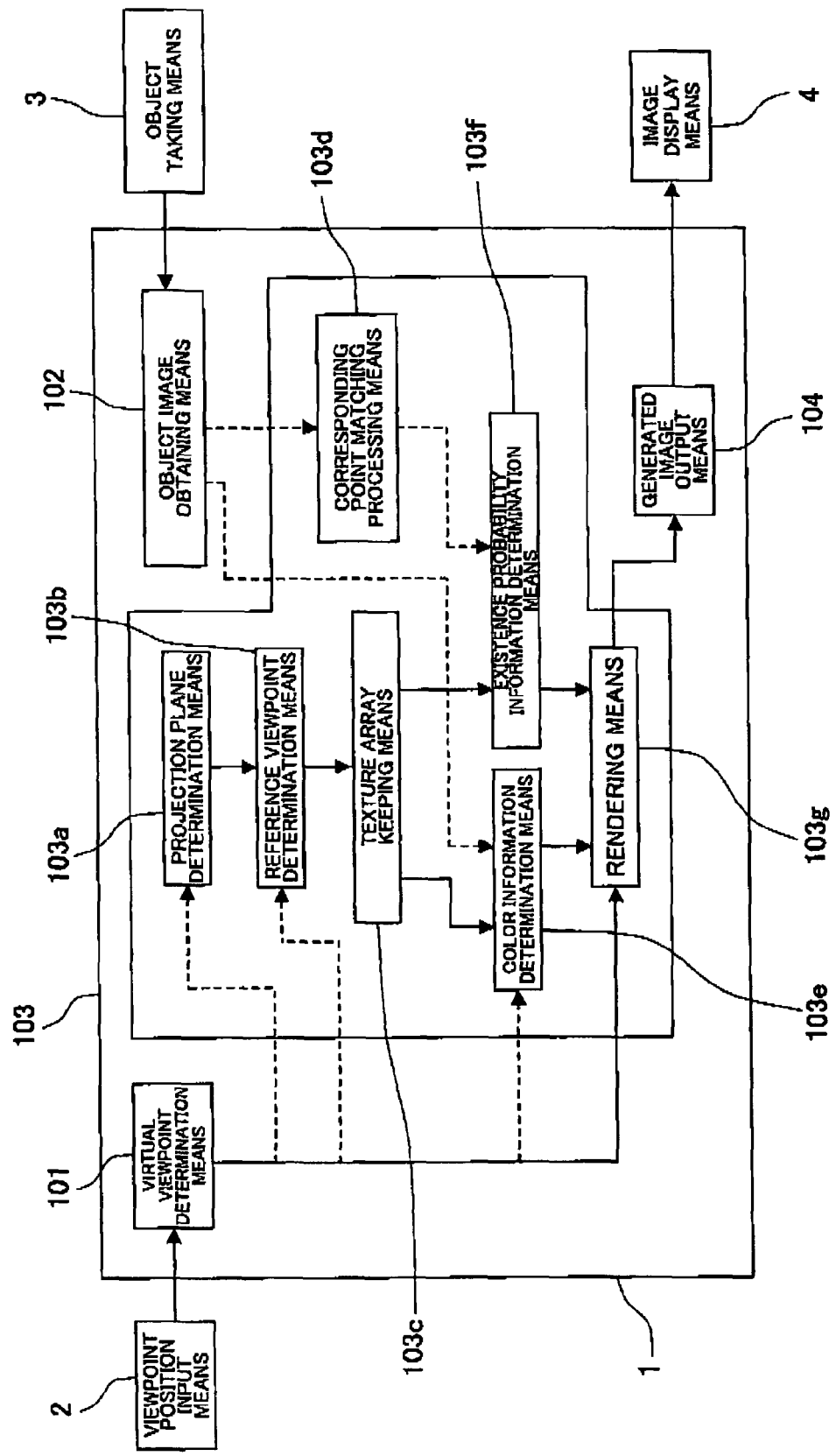
FIG. 6 is a schematic diagram showing an outline configuration of a virtual viewpoint image generation apparatus of an embodiment 1-1, and is a block diagram showing a configuration of the inside of the image generation apparatus.
Figure 7:
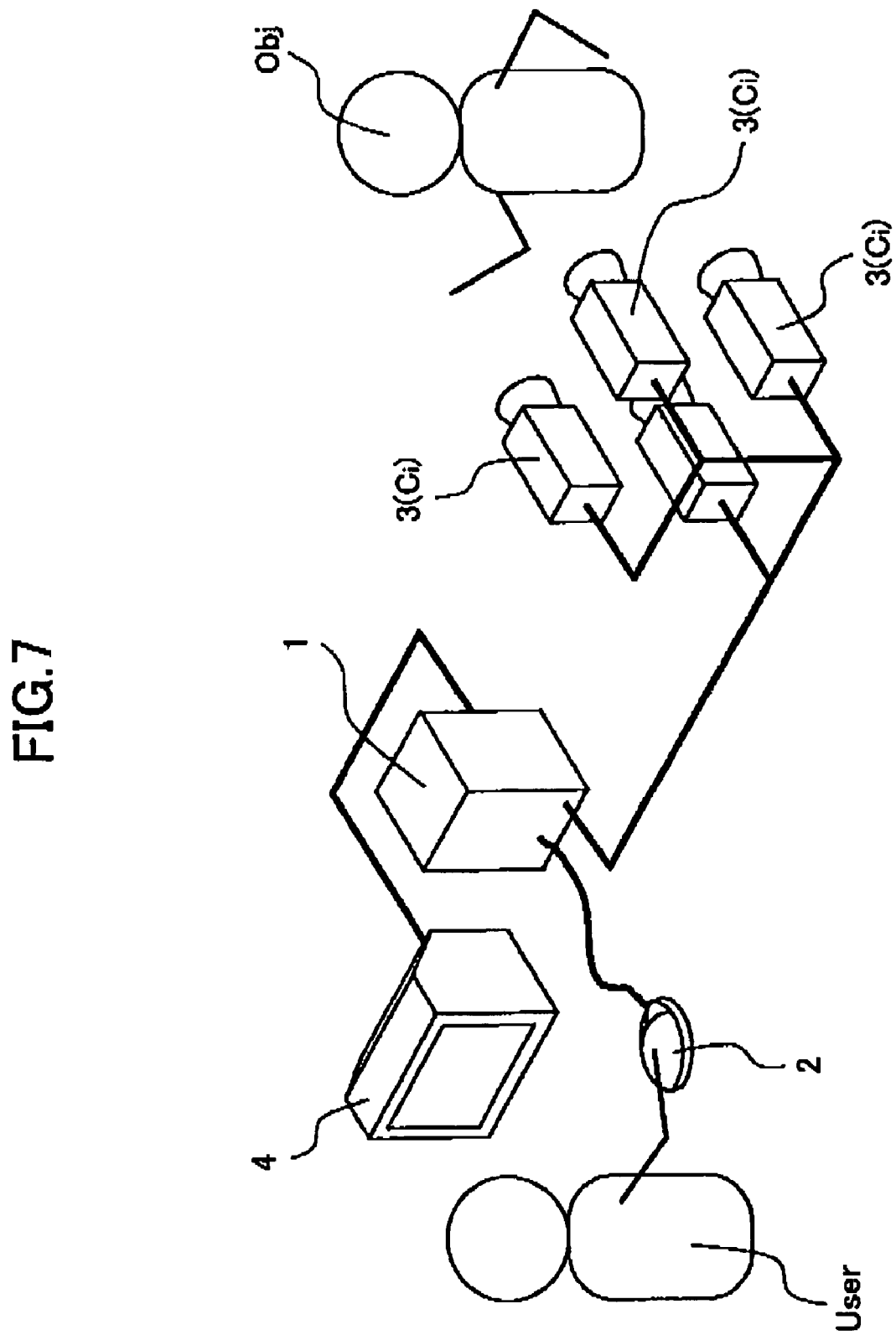
FIG. 7 is a schematic diagram showing an outline configuration of a virtual viewpoint image generation apparatus of an embodiment 1-1, and is a configuration example of a system using the image generation apparatus.

FIGS. 6 and 7 are a schematic diagram showing an outline configuration of a virtual viewpoint image generation apparatus of the embodiment 1-1 of the present invention. FIG. 6 is a block diagram showing a configuration of the inside of an image generation apparatus, and FIG. 7 is a configuration example of a system using the image generation apparatus.

In FIG. 6, 1 indicates a virtual viewpoint image generation apparatus, 101 indicates a virtual viewpoint determination means, 102 indicates an object image obtaining means, 103 indicates an image generation means, 103a indicates a projection plane determination means, 103b indicates a reference viewpoint determination means, 103c indicates a texture array keeping means, 103d indicates a corresponding point matching processing means, 103e indicates a color information determination means, 103f indicates an existence probability information determination means, 103g indicates a rendering means, 104 indicates a generated image output means, 2 indicates a viewpoint position input means, 3 indicates an object taking means, 4 indicates an image display means. In addition, in FIG. 7, "User" indicates a user of the virtual viewpoint image generation apparatus, and "Obj" indicates an object.

As shown in FIGS. 6 and 7, the virtual viewpoint image generation apparatus 1 of the embodiment 1-1 includes the virtual viewpoint determination means 101 for determining parameters of a viewpoint (virtual viewpoint) input by using the viewpoint position input means 2 by the user "User", the object image obtaining means 102 for obtaining images of the object Obj taken by the object taking means (camera) 3, an image generation means 103 for generating, based on the obtained images of the object Obj, an image (virtual viewpoint image) of the object Obj viewed from the virtual viewpoint, and the generated image output means 104 for displaying the virtual viewpoint image generated by the image generation means 103 on the image display means 4.

The virtual viewpoint determination means 101 determines position, direction and angle of view, for example, as the parameters of the virtual viewpoint. The viewpoint position input means 2 may be a device such as a mouse for performing selection based on operation of the user User, for example as shown in FIG. 7, or a device such as a keyboard by which the user User directly inputs numerals, or may be a position/posture detection sensor mounted by the user User. In addition, the means may be provided by other program or a program provided via a network.

The object image obtaining means 102 can successively obtain the position/posture of the object that changes every moment at predetermined intervals, for example, at 30 Hz, and also can obtain a still image of the object at any time, and also can obtain the image by reading out the object image taken beforehand from a recording apparatus. By the way, it is desirable that the object images viewed from the plural viewpoint positions are taken at the same time by synchronizing all cameras. But, this condition is not necessary if changes of the position and the posture of the object are sufficiently slow so that the object can be regarded as a still object.

As shown in FIG. 6, the image generation means 103 includes projection plane determination means 103a for determining positions and shapes of the projection planes used for image generation, the reference viewpoint determination means 103b for determining the position of the reference viewpoint, the texture array keeping means 103c for assigning an array of texture images, to be mapped to the projection planes, to the memory, the corresponding point matching processing means 103d for associating, with each other, parts where the same region of the object appears in the images of the object obtained by the object image obtaining means 102 of plural viewpoint positions, the color information determination means 103e for determining color information in the texture array kept by the texture array keeping means 103c by performing mixing processing on color information of the obtained plural images of the object, the existence probability information determination means 103f for determining degrees (existence probability information) of probability that the object exists on the projection planes in the texture array kept by the texture array keeping means 103c based on the result of the corresponding point matching processing means 103d, and the rendering means 103g for rendering the projection planes viewed from the virtual viewpoint based on the color information determined by the color information determining means 103e and the existence probability information determined by the existence probability information determining means 103f.

The array kept in the texture array keeping means 103c includes color information and existence probability information of each pixel, in which three primary colors of red (R), green (G) and blue (B), and the existence probability information are represented by 8 bits respectively, for example. However, the present invention is not dependent on such particular data representing format.

The image display means 4 is a display apparatus such as CRT (Cathode Ray Tube), LCD (Liquid Crystal Display) and PDP (Plasma Display Panel) connected to the generated image output means 104. The image display means 4 may be a display apparatus of a two-dimensional plane shape, or may be a display apparatus having a curved surface surrounding the user User. When a display apparatus that can display a three-dimensional shape is used as the image display means 4, the virtual viewpoint determination means 101 determines two virtual viewpoints corresponding to the user's right and left eyes and the image generation means 103 generates virtual viewpoint images viewed from the two virtual viewpoints so that independent images can be provided to the right and left eyes of the user. In addition, by generating images viewed from more than two virtual viewpoints and using a three-dimensional display that can display images having more than two parallaxes, the three-dimensional image can be provided to equal to or more than one users.

In addition, the system using the virtual viewpoint image generation apparatus 1 has a configuration shown in FIG. 7, for example. When the user User specifies desired viewpoint position/direction/image angle to the virtual viewpoint image generation apparatus 1 via the virtual position input means 2, the virtual viewpoint image generation apparatus 1 photographs the object Obj with the object taking means (cameras) 3 so as to obtain the images. After that, the virtual viewpoint image generation apparatus 1 generates an image (virtual viewpoint image) from the specified viewpoint based on the obtained images of the object, The obtained virtual viewpoint image is presented to the user User using the image display means 4.

The system configuration shown in FIG. 7 shows an implementation example of the image generation apparatus in the present invention. The claims of the present invention are not limited to such configuration, and positions, shapes and implementation of each apparatus can be freely determined within the scope of the present invention.

In the following, before describing concrete processing procedure of the image generation processing by the image generation means 103, a mathematical principle model on which the processing is based is described.

Figure 8:
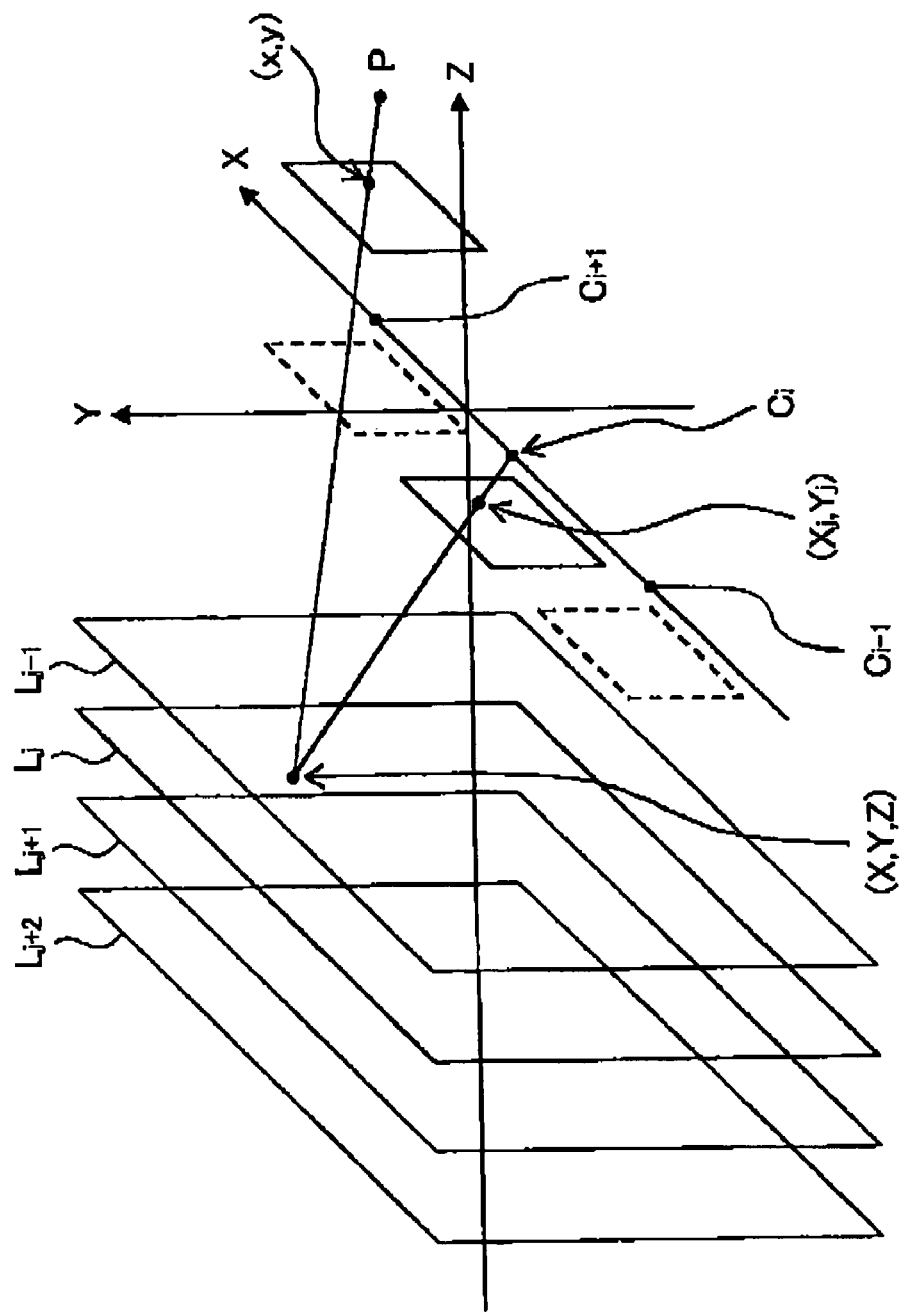
FIG. 8 is a schematic diagram for explaining the mathematical principle model of the virtual viewpoint image generation method using the virtual viewpoint image generation apparatus of the embodiment 1-1, and is a diagram showing an example of projection conversion.

FIGS. 8 and 9 are schematic diagrams for explaining the mathematical principle model of the virtual viewpoint image generation method using the virtual viewpoint image generation apparatus of this embodiment 1-1. FIG. 8 shows an example of projection conversion, and FIGS. 9 show an example of coordinates conversion.

In the image generation processing using the virtual viewpoint image generation apparatus of this embodiment 1-1, as shown in FIG. 8, for example, center positions $C_i(i=1,2,\ldots,N)$ of the cameras 3, a virtual viewpoint P and projection planes $L_j(j=1,2,\ldots,M)$ are set. In the following, it is assumed that the center position $C_i$ of the camera indicates the camera itself in order to identify the plural cameras 3, and that, in the same way, P indicates the virtual viewpoint itself and indicates the center position of the virtual viewpoint.

Although the cameras $C_i$ are placed in a lateral line in FIG. 8, the present invention is not limited to such placement. For example, various placements such as two-dimensional lattice, arc-shape and the like can be applied. In addition, the placement of the projection planes $L_j$ are not necessarily parallel. Curved planes can be used as described later in the embodiment 1-3. However, in the descriptions of this embodiment 1-1, the projection planes $L_j$ are plane.

In the virtual viewpoint image generation method of the present embodiment, in order to generate an image of the virtual viewpoint P at which the camera is not placed actually based on the images of the object Obj obtained at the points at which the cameras are actually placed, a procedure is basically adopted in which a part of the image of the object taken by the camera $C_i$ is texture-mapped on the projection plane $L_j$ that is assumed to exist in the virtual viewpoint image generation apparatus 1 such as a computer, then, an image obtained by viewing the texture-mapped projection planes from the virtual viewpoint P is generated by coordinate calculation processing.

When performing such processing, each of three-dimensional points of the virtual viewpoint P and the cameras $C_i$ is projected to a two-dimensional point of each image plane.

Generally, a matrix for projecting a point (X,Y,Z) in a three-dimensional space to a point (x,y) in an image plane is a matrix having three rows and four columns, and can be represented by the following equation 14 and the equation 15.

$$s \begin{bmatrix} x \\ y \\ 1 \end{bmatrix} = \Phi \begin{bmatrix} X \\ Y \\ Z \\ 1 \end{bmatrix} \qquad \text{[Equation 14]}$$

$$\Phi = \begin{bmatrix} \phi_{11} & \phi_{12} & \phi_{13} & \phi_{14} \\ \phi_{21} & \phi_{22} & \phi_{23} & \phi_{24} \\ \phi_{31} & \phi_{32} & \phi_{33} & \phi_{34} \end{bmatrix} \quad \text{[Equation 15]}$$

In this case, for example, a matrix $\Phi_0$ representing perspective projection conversion of focal length f in which the original point is the center is as shown in the following equation 16.

$$\Phi_0 = \begin{bmatrix} f & 0 & 0 & 0 \\ 0 & f & 0 & 0 \\ 0 & 0 & 1 & 0 \end{bmatrix} \quad \text{[Equation 16]}$$

An image dealt by the computer is a so-called digital image, and is represented by a two-dimensional array in a memory. The coordinate system (u,v) representing the positions of the array is called a digital image coordinate system.

At this time, for example, one point on a digital image having a size of 640 pixels×480 pixels can be represented by a variable u that takes one of integers from 0 to 639 and a variable v that takes one of integers from 0 to 479, and color information at the point is represented by data obtained by quantizing red (K), green (G) and blue (B) information at the address with 8 bits, for example.

Figure 9A:
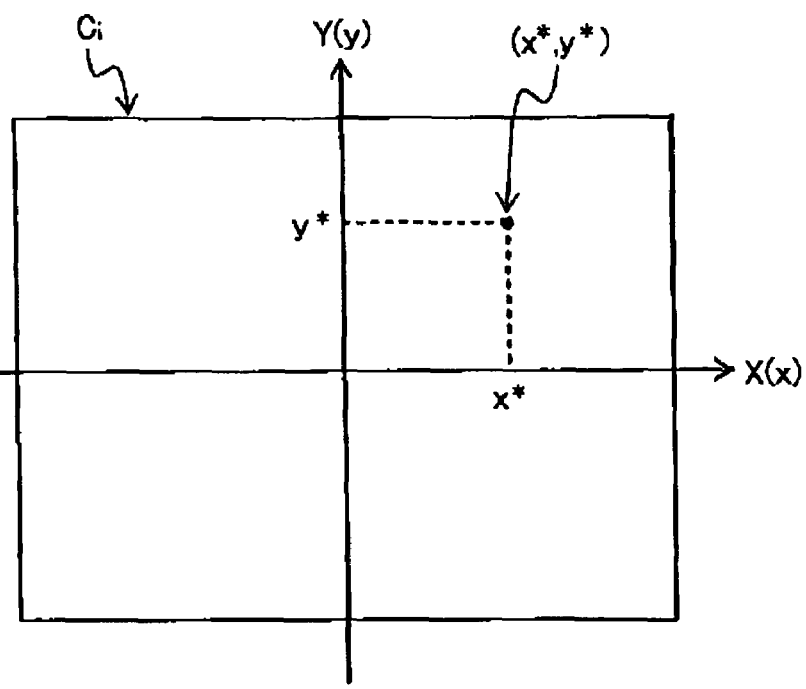
FIG. 9 is a schematic diagram for explaining the mathematical principle model of the virtual viewpoint image generation method using the virtual viewpoint image generation apparatus of the embodiment 1-1, and is a diagram showing an example of coordinates conversion.
Figure 9B:
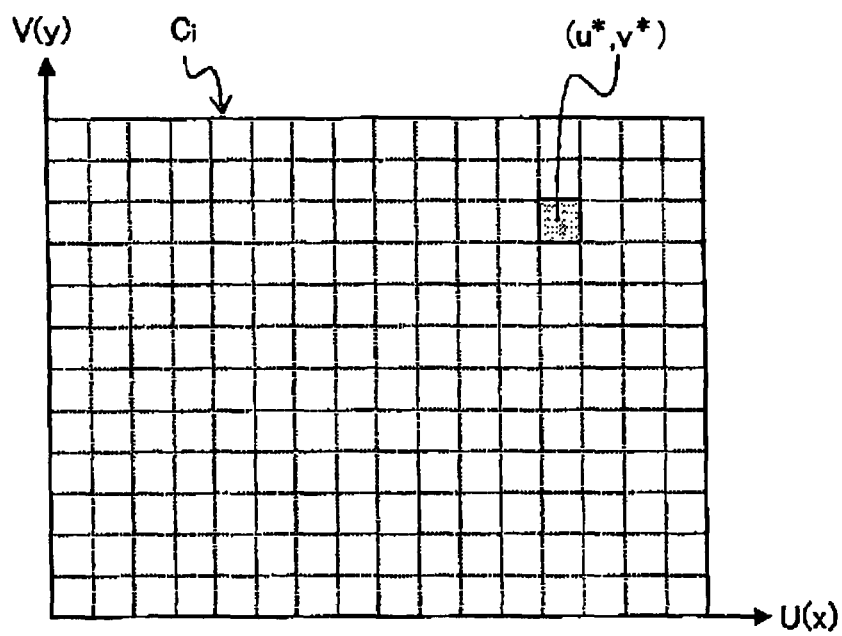

In addition, at this time, the image coordinates (x,y) shown in FIG. 9A are associated with the digital image coordinates (u,v) shown in FIG. 9B in an one-to-one correspondence manner, and they have the following relationship shows in the equation 17.

$$\begin{bmatrix} u \\ v \\ 1 \end{bmatrix} = \begin{bmatrix} k_u & -k_u \cot\theta & u_0 \\ 0 & k_v/\sin\theta & v_0 \\ 0 & 0 & 1 \end{bmatrix} \begin{bmatrix} x \\ y \\ 1 \end{bmatrix} \quad \text{[Equation 17]}$$

The x axis shown in FIG. 9A is parallel to the u axis shown in FIG. 9B, and it is assumed that unit lengths for the u axis and the v axis are $k_u$ and $k_v$ respectively, and an angle between the u axis and the v axis is $\theta$.

Although the digital image coordinates (u, v) take discrete values when writing into or reading out the two-dimensional array, it is assumed that the coordinates take continuous values unless otherwise specified in the following descriptions, and that proper discretization processing is performed when accessing the array.

In addition to the coordinate conversion shown in the relationship of the equation 17, conversion for correcting distortion by aberration of the lens can be performed.

In the following, a concrete procedure for generating the virtual viewpoint image is described using the mathematical principle model.

Figure 10:
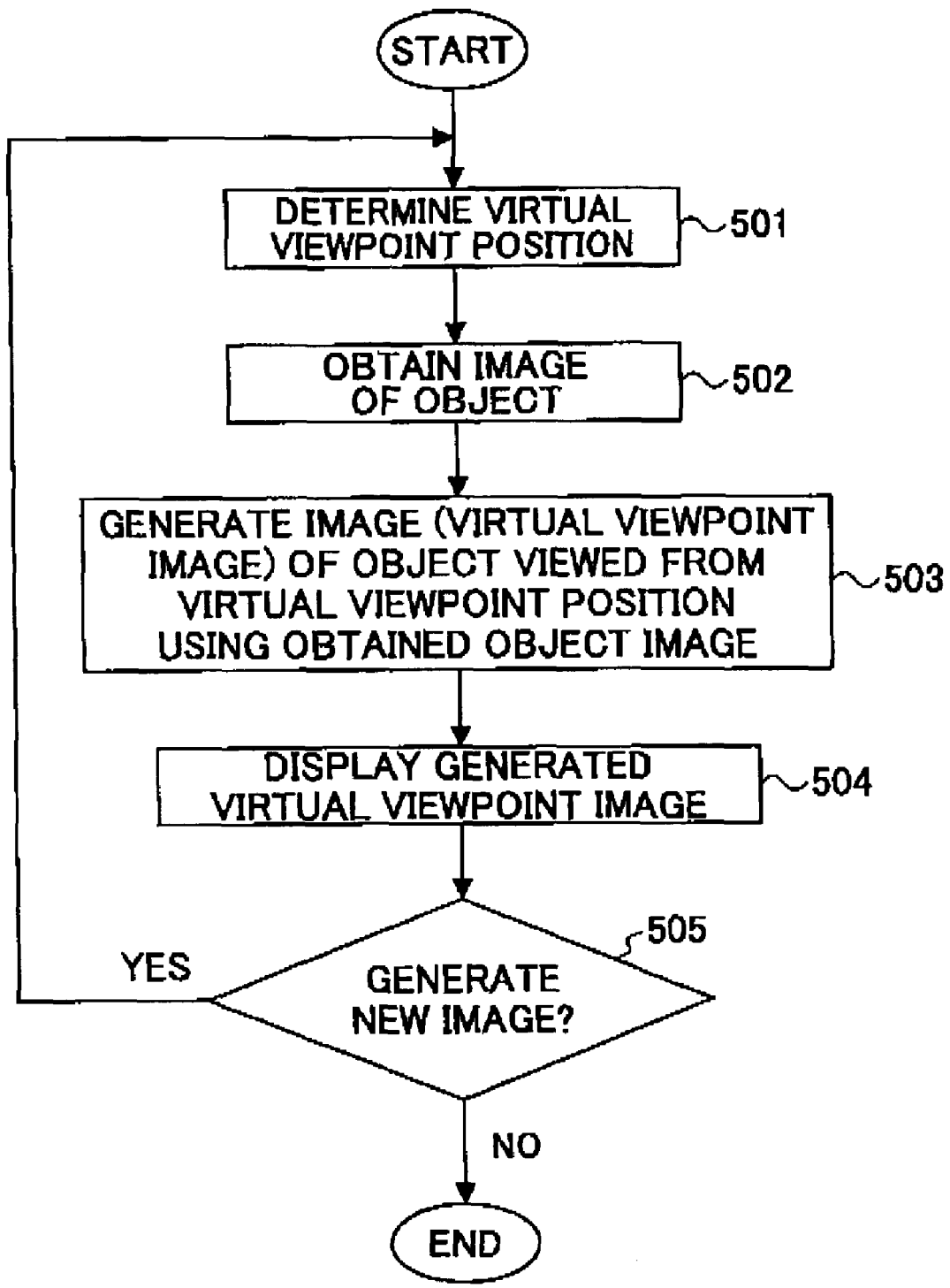
FIG. 10 is a schematic diagram for explaining the generation processing procedure for the virtual viewpoint image of the embodiment 1-1, and is a flow diagram showing the whole generation processing.
Figure 11:
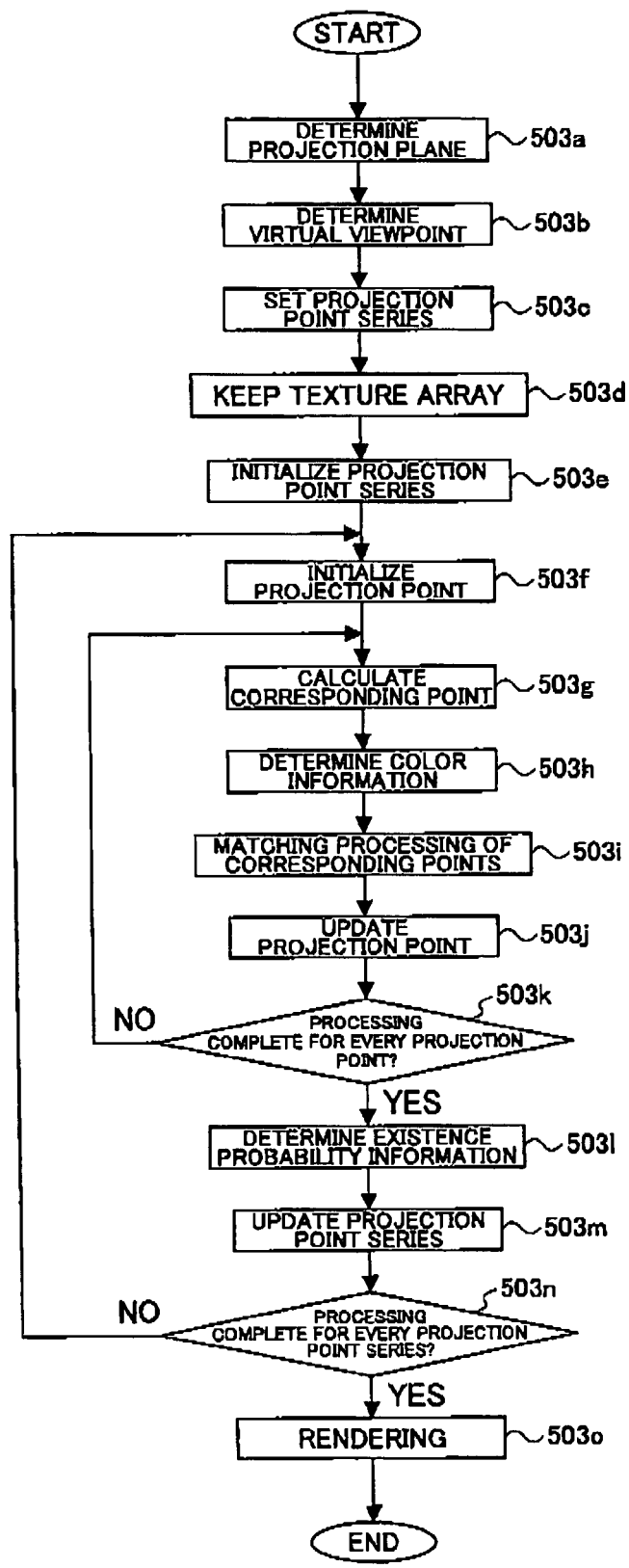
FIG. 11 is a schematic diagram for explaining the generation processing procedure for the virtual viewpoint image of the embodiment 1-1, and is a concrete flow diagram showing steps for generating the virtual viewpoint image.
Figure 12:
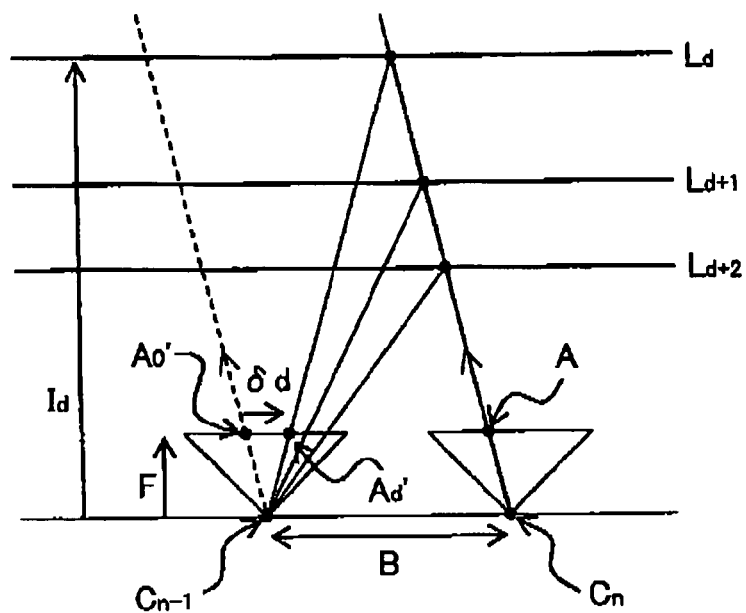
FIG. 12 is a schematic diagram for explaining the generation processing procedure for the virtual viewpoint image of the embodiment 1-1, and is a diagram showing an example of a setting method of the projection plane.
Figure 13:
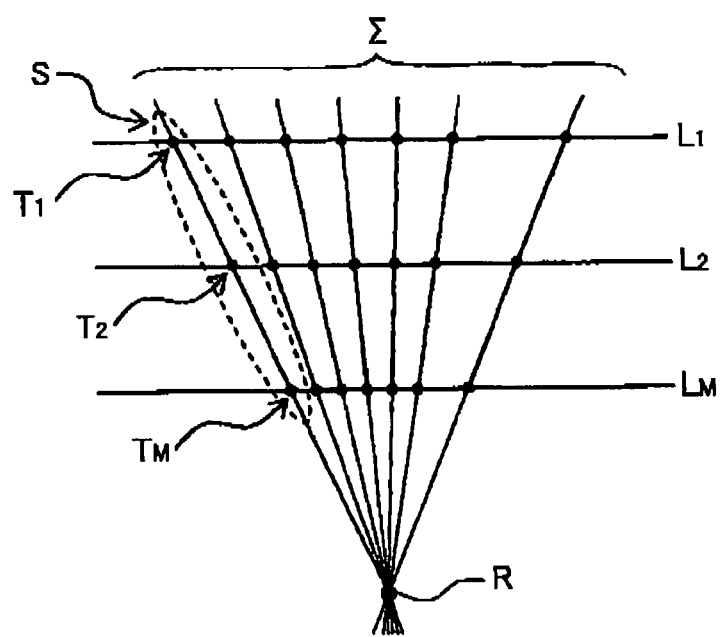
FIG. 13 is a schematic diagram for explaining the generation processing procedure for the virtual viewpoint image of the embodiment 1-1, and is a diagram showing examples-of projection points, projection point series and a set of projection point series.
Figure 14:
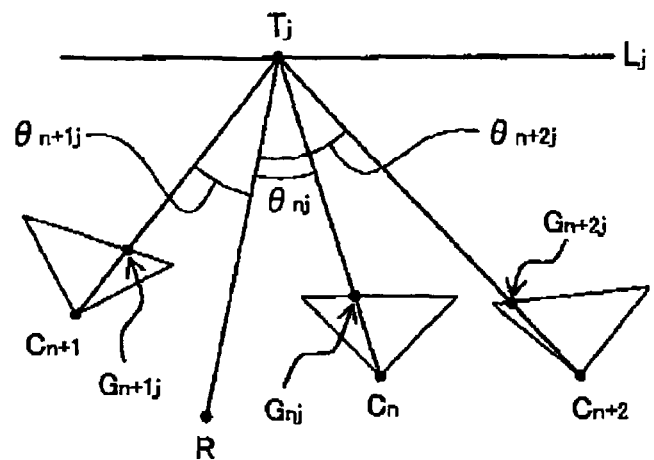
FIG. 14 is a schematic diagram for explaining the generation processing procedure for the virtual viewpoint image of the embodiment 1-1, and is a diagram showing examples of a reference viewpoint, projection points and angles based on various camera positions for explaining mixing processing of color information.
Figure 15:
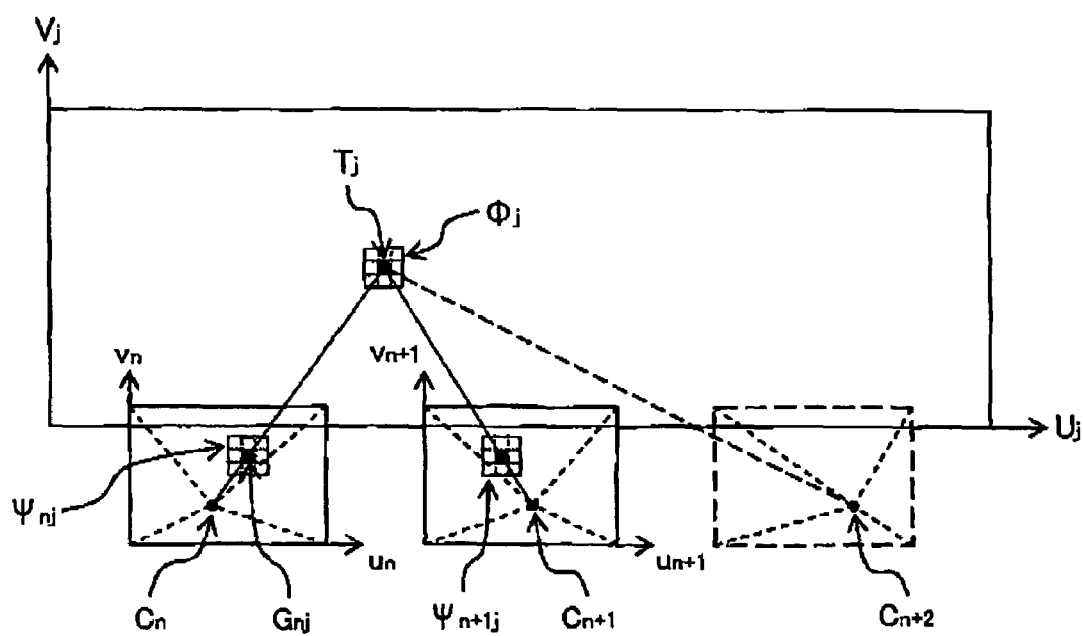
FIG. 15 is a schematic diagram for explaining the generation processing procedure for the virtual viewpoint image of the embodiment 1-1, and is a diagram showing an example of corresponding point matching processing.
Figure 16:
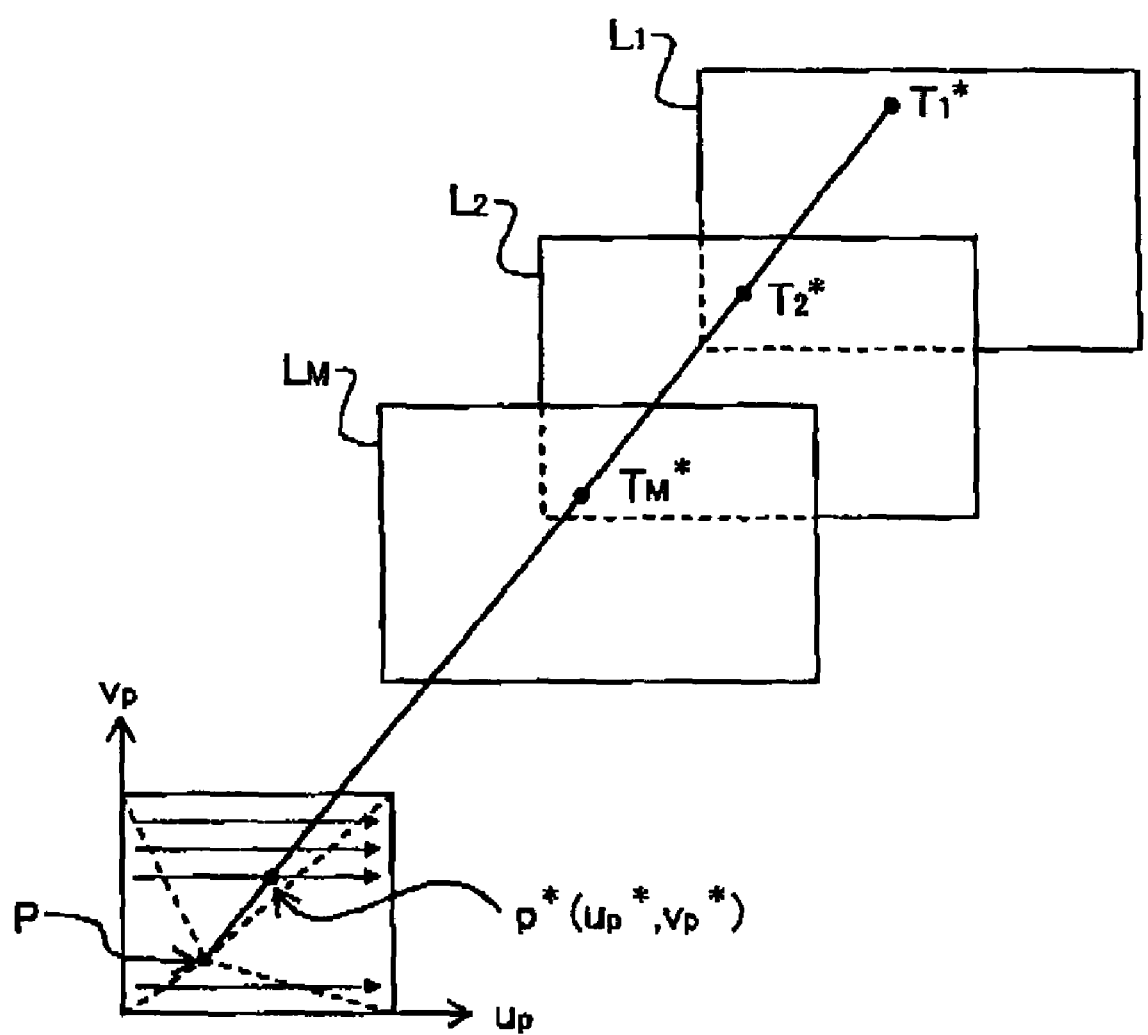
FIG. 16 is a schematic diagram for explaining the generation processing procedure for the virtual viewpoint image of the embodiment 1-1, and is a diagram for explaining rendering processing.
Figure 17:
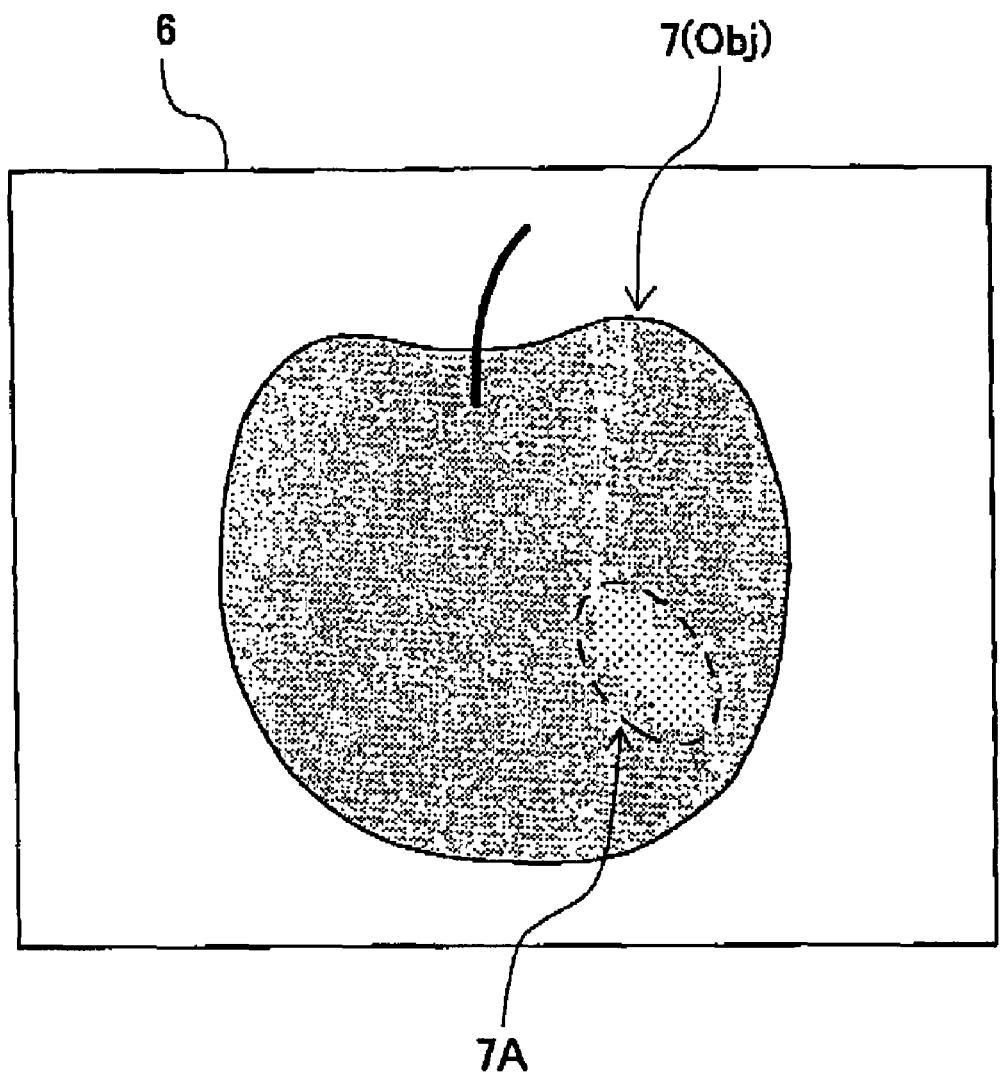
FIG. 17 is a schematic diagram for explaining the generation processing procedure for the virtual viewpoint image of the embodiment 1-1, and is a diagram showing an example of a generated virtual viewpoint image.

FIGS. 10-17 are schematic diagrams for explaining the generation processing procedure for the virtual viewpoint image of this embodiment 1-1. FIG. 10 is a flow diagram showing the whole generation processing. FIG. 11 shows a concrete flow diagram showing steps for generating the virtual viewpoint image. FIG. 12 shows an example of a setting method of the projection planes. FIG. 13 shows examples of projection points, projection point series and a set of projection point series. FIG. 14 shows examples of a reference viewpoint, projection points and angles based on various camera positions for explaining mixing processing of color information. FIG. 15 shows an example of corresponding point matching processing. FIG. 16 is a figure for explaining rendering processing. FIG. 17 shows an example of a generated virtual viewpoint image.

As shown in FIG. 10, when generating the virtual viewpoint image using the virtual viewpoint image generation apparatus 1, first, the virtual viewpoint determination means determines the parameters of the virtual viewpoint P based on a request from the user User (step 501). In the step 501, the position, the direction and image angle and the like are determined, for example.

Next, image of the object obj taken by the cameras 3 ($C_i$) are obtained by the object image obtaining means 102 (step 502).

Next, based on images of the object obtained by the object image obtaining means 102, an image (virtual viewpoint image) of the object Obj viewed from the virtual viewpoint P is generated (step 503).

In the step 503, for example, processing of each step shown in FIG. 11 is performed so that the virtual viewpoint image is generated.

In the processing in step 503, the projection plane determination means 103a determines the position and the shape of the projection planes $L_j (j \in J, J \equiv \{1, 2, \ldots, M\})$ of multiple-layered structure used for generating the virtual viewpoint image (step 503a). When setting the projection planes $L_j$ in the step 503a, projection planes having plane shape are placed in parallel at the same intervals as shown in FIG. 8, for example.

When the cameras $C_i$ are arranged at the same intervals, the planes (projection planes) can be arranged at a series $l_d (d=1, 2, 3, \ldots)$ of distances obtained by the following equation 18, wherein the placement interval of the camera is B, focal length of the camera is F, and the size of one pixel on the image is $\delta$.

$$l_d = \frac{BF}{\delta d} \quad (d = 1, 2, 3, \cdots) \quad \text{[Equation 18]}$$

In this case, depth resolution of corresponding point matching among cameras is the same as the placement interval of the projection planes. That is, as shown in FIG. 12, assuming that cameras $C_n$ and $C_{n-1}$ are placed at an interval B, a point of the camera $C_n$ on the image plane is A, a point corresponding to the point A in $C_n$ on the image plane of the camera $C_{n-1}$ is $A_0'$, and that a point of d-th pixels from $A_0'$ is $A_d'$, corresponding points of the point A is a series of $\{A_0' | d=1, 2, \ldots\}$ and series of distances calculated in this case are provided by the equation 18.

The setting example of the projection planes $L_j$ is one example, and it is basically sufficient to set more than one different projection planes in the image generation method of the present invention. The present invention is not limited to such particular setting method of the projection planes.

When the processing in step 503a ends, next, the reference viewpoint determination means 103b determines a reference point (reference viewpoint) R used for calculating the degree (existence probability information) of probability of existence of the object on the projection point (step 503b). The position of the reference viewpoint R may be the same as the position of the virtual viewpoint P, or, when there are plural virtual viewpoints, the position of the reference viewpoint R may be a barycenter position of the plural virtual viewpoints.

But, the present invention does not provide a method dependent on how to decide a particular reference viewpoint.

After performing the processing of the step 503b, next, many projection points are set on the projection planes (step 503c). At this time, the projection points are set such that the projection points exist on plural lines that pass through the reference viewpoint R, so that projection points existing on the same line are dealt with together as a projection point series. For example, as shown in FIG. 13, focusing attention on a line that passes through the reference viewpoint R, and assuming that a projection point of a projection plane $L_j$ is $T_j$ and that a projection point series of the projection points is S, S can be represented as $S=\{T_j|j\in J\}$. In addition, assuming that a set of projection point series is $\Sigma$, $S\in\Sigma$ holds true.

After completing the processing of the step 503, next, the texture array keeping means 103c keeps, on the memory of the image generation apparatus, the array (texture array) for storing the images that are to be texture-mapped on the projection planes (step 503d). At this time, the array to be kept includes color information and existence probability information by 8 bits for each pixel as texture information corresponding to the position of the projection point.

In the step 503d, correspondence between the two-dimensional digital coordinates $(U_j, V_j)$ of the pixel of the texture array and the three-dimensional coordinates $(X_j, Y_j, Z_j)$ of the projection point $T_j$ is also set. At this time, for example, values of $(X_j, Y_j, Z_j)$ for every $(U_j, V_j)$ may be set as a table. Or, only some values of $(X_j, Y_j, Z_j)$ of representative $(U_j, V_j)$ may be set and other correspondences are obtained by interpolation processing (linear interpolation, for example).

After completing the processing of the step 503d, color information and existence probability information for each pixel corresponding to each projection point kept in the step 503d are determined based on the images of the object obtained in the step 502. At that time, the projection point series S are scanned successively within a limit of $S\in\Sigma$. Further, projection points $T_j$ are scanned successively within a limit of $T_j\in S$, so that double loop processing is performed.

In the loop processing, the projection point series S to be operated is initialized to a start position (step 503e). Then, next, the projection point $T_j$ is initialized to a start position in the projection point series S, for example, initialized to j=1 (step 503f).

After finishing the step 503e and the step 503f, coordinates $(X_j^*, Y_j^*, Z_j^*)$ of the projection point $T_j$ is obtained, and each position on each image plane corresponding to the point at the position $(X_j^*, Y_j^*, Z_j^*)$, when taking the point at the position $(X_j^*, Y_j^*, Z_j^*)$ by each camera, is calculated using relationships from the equation 14 to the equation 17 (step 503g). At this time, a set of cameras for which the corresponding points are calculated is represented as $\Xi=\{C_i|i\in I\}$. The set $\Xi$ of the cameras may be all cameras, or may be one or plural cameras selected from the cameras according to positions of the virtual viewpoint P, the reference viewpoint R and projection points $T_j$.

Assuming that corresponding points of each camera obtained here are $G_{ij}$ ($i\in I$), and that the digital coordinates are represented by $(u_{ij}^*, v_{ij}^*)$ ($i\in I$).

After completing the processing in step 503g, next, the color information determination means 103e determines color information on a pixel $(U_j^*, V_j^*)$ on the texture array corresponding to the projection point $T_j$ by mixing color information in $(u_{ij}, v_{ij}^*)$ ($i\in I$) (step 503h). The mixing processing is to calculate an average of pieces of color information of corresponding points of each camera, for example.

In addition, in the mixing processing, it is possible to assign weights according to an angle $\theta_{ij}$ formed by the camera $C_i$, the projection point $T_j$ and the reference viewpoint R. For example, as shown in FIG. 14, assuming that the set of camera is $\Xi=\{C_n, C_{n+1}, C_{n+2}\}$ ($I=\{n, n+1, n+2\}$). In this case, assuming that vectors representing color information (R,G,B) at the projection point $T_j$ and the corresponding point $G_{ij}$ are expressed by $K_j$ and $K_{ij}$ respectively. When $K_j$ is determined by the following equation 19, for example, the smaller the angle between the line from the reference viewpoint R to the projection point $T_j$ and the line of sight of the camera is, the greater the degree contributing to the mixing processing is.

$$K_j = \frac{\sum_{i \in I} \cos\theta_{ij} \cdot K_{ij}}{\sum_{i \in I} \cos\theta_{ij}} \qquad \text{[Equation 19]}$$

After completing the processing in step 503h, the corresponding point matching processing means 103d calculates the degree $Q_j$ of correlation of the corresponding points $G_{ij}$ ($i\in I$) of each camera with respect to the projection point $T_j$ (step 503i). When using the following equation 20, the degree $Q_j$ of correlation becomes a positive value, and the higher the correlation of the corresponding points, the smaller the $Qj$ is.

$$Q_j = \sum_{i \in I} (K_j - K_{ij})^2 \qquad \text{[Equation 20]}$$

In the equation 20, although color information of the projection point and color information of the corresponding point are compared at only one point, comparison of color information may be performed between plural points near the projection point and plural points near the corresponding point. At this time, for example, as shown in FIG. 14, when defining a region $\Phi_j$ near the projection plane $T_j$ and a corresponding region $\Psi_{ij}$ at the camera $C_i$, degree $Q_j$ of correlation of the regions can be calculated by the following equation 21, for example.

$$Q_j = \sum_{i \in I} \sum_{\substack{(U_j, V_j) \in \Phi_j \\ (u_{ij}, v_{ij}) \in \Psi_{ij}}} \{K(U_j, V_j) - K(u_{ij}, v_{ij})\}^2 \qquad \text{[Equation 21]}$$

wherein $K(U_j, V_j)$ indicates an estimated value of color information at the coordinates $(U_j, V_j)$ in the texture array and $K(u_{ij}, v_{ij})$ indicates color information at coordinates $(u_j, v_j)$ in a photographed image by the camera $C_i$.

The method for calculating the degree of correlation is not limited to the above-mentioned one, and the present invention is not dependent on a particular calculation method. For example, in the example shown in FIG. 15, the region $\Phi_j$ is formed by 8 pixels including the pixel of the projection point $T_j$ and surrounding pixels, and the corresponding region $\Psi_{ij}$ is formed by 8 pixels including the pixel of the corresponding point and surrounding pixels. However, the defining method for the near region $\Phi_j$ and the corresponding region $\Psi_{ij}$ is not limited to this example.

After completing the processing of the step 503i, the projection point $T_j$ is updated (step 503j), and it is determined whether every projection point $T_j\in S$ is scanned (step 503k). If all points are scanned, the step proceeds to the step 503*l*. If all points are not scanned, the step returns to the step 503*g*.

When it is determined that all points have been scanned in step 503*k*, next, the existence probability information determination means 103*f* determines, based on the degree $Q_j$ of correlation calculated in step 503*i*, degree (existence probability information) $\beta_j$ of probability of existence of the object on the projection point with respect to every projection point $T_j$ (j∈J) on the line that passes through the reference viewpoint R (step 503*l*). In the determination, the existence probability information $\beta_j$ needs to satisfy the conditions of the equation 22 and the equation 23.

$$0 \leq \beta_j \leq 1 \qquad \text{[Equation 22]}$$

$$\sum_{j=1}^{M} \beta_j = 1 \qquad \text{[Equation 23]}$$

Further, the higher the probability of existence of the object at the projection point $T_j$ is, the nearer to 1 the probability is. Therefore, the existence probability information $\beta_j$ (j∈J) is obtained by performing conversion processing represented by the following equation 24 and the equation 25 on the degree $Q_j$ of correlation between the projection point and the corresponding points calculated in the step 503*i*, for example.

$$\tilde{\beta}_j = \frac{1}{Q_j} \qquad \text{[Equation 24]}$$

$$\beta_j = \frac{\tilde{\beta}_j}{\sum_{j=1}^{M} \tilde{\beta}_j} \qquad \text{[Equation 25]}$$

However, since the existence probability information $\beta_j$ only needs to satisfy the conditions of the equation 22 and the equation 23, the conversion processing is not necessarily limited to the method represented by the equation 24 and the equation 25.

After completing the processing of the step 503*l*, next, the projection point series S is updated (step 503*m*), and it is determined whether all projection point series S∈Σ are scanned (step 503*n*). If all projection point series are scanned, the step proceeds to the next step 503*o*. If all projection point series are not scanned, the step returns back to step 503*f*.

If it is determined that all projection point series are scanned in step 503*n*, next, the rendering means 103*g* renders and generates an image obtained by viewing the projection planes $L_j$(j=1, 2, ..., M) having multi-layered structure from the virtual viewpoint P according to the existence probability information $\beta_j$ (step 503*o*). For example, as shown in FIG. 16, assuming that coordinates of the virtual viewpoint P on the image are represented as $(u_p, v_p)$. At this time, color information $K_p^*$ of a pixel p $(u_p^*, v_p^*)$ on the image is determined by multiplying color information $\{K_j | j \in J\}$ of projection point series $\{T_j^* | j \in J\}$ on the line connecting p and p* with existence probability information $\{\beta_j^* | j \in J\}$ and by adding the multiplied color information, so that the color information $K_p^*$ is represented by the following equation 26.

$$K_p^* = \sum_{j=1}^{M} \beta_j^* K_j^* \qquad \text{[Equation 26]}$$

By determining color information for every pixel on the image plane, the image for the virtual viewpoint P is obtained.

In addition, instead of using the equation 26, by calculating $K_p^*$ using the following equation 27, it is guaranteed that $K_p^*$ is within an effective color space even when the reference viewpoint R and the virtual viewpoint P are different.

$$K_p^* = \frac{\sum_{j=1}^{M} \beta_j^* K_j^*}{\sum_{j=1}^{M} \beta_j^*} \qquad \text{[Equation 27]}$$

Although a procedure in which color information is determined by scanning the pixels on the image plane is shown, it is not limited to the procedure. For example, rendering processing can be relied on general graphic library such as OpenGL, DirectX and the like by passing data such as configuration of projection planes, texture array and setting of viewpoint P and the like to the graphic library.

Then, generation processing (step 503) of the virtual viewpoint image ends, so that the generated virtual viewpoint image is displayed on the image display means 4 (step 504). As shown in FIG. 17, for example, in the virtual viewpoint image 6 displayed on the image display means 4, a portion 7A in which the degree $Q_j$ of the correlation calculated in step 503*l* is low, that is, in which reliability of estimation value is low, is rendered obscurely and appears blurred in the image 7 of the object. Therefore, for example, a part does not appear to lack like the conventional virtual viewpoint image 6 as shown in FIG. 1, and deterioration is not annoying in the eyes of the user.

After that, it is determined that process continues or stops in step 505. If the process is continued, the process is repeated from the first step 501. If the process should be ends, the process ends.

As mentioned above, the virtual viewpoint image generation method using the virtual viewpoint image generation apparatus of this embodiment 1-1 does not intend to obtain the accurate geometrical model of the object for every case and for every portion like the conventional measure. In contrast, the virtual viewpoint image generation method assumes that estimation values having enough reliability cannot be obtained in distance estimation according to photographing conditions and portions of the object. Thus, a portion in which an estimation value having low reliability is obtained is rendered vaguely so that the portion contributes little to image generation to prevent extreme image deterioration. On the other hand, a portion in which distance data having high reliability is obtained is rendered clearly so that the portion highly contributes image generation. Therefore, deterioration of image of the portion having low estimation reliability can be inconspicuous so that the virtual viewpoint image having small deterioration can be obtained in the eyes of the user.

In addition, the virtual viewpoint image generation apparatus 1 of this embodiment 1-1, since the virtual viewpoint image can be generated using texture mapping, workload of the apparatus in the image generation processing can be decreased and the virtual viewpoint image can be generated at high speed.

In addition, the virtual viewpoint image generation apparatus 1 does not need to be a specific apparatus. For example, the virtual viewpoint image generation apparatus 1 can be realized by a computer including a CPU and a storing device such as a memory and a hard disk and the like, and a program, for example. In such a case, by generating a program that can cause the computer to execute each step shown in FIG. 11 and by executing the program on the computer, the virtual viewpoint image having small image deterioration can be easily generated at high speed even though the computer is a general personal computer. In this case, data for the processing is held in the storing apparatus and read as necessary so as to be processed by the CPU.

The program can be provided by storing in a recording medium such as a floppy disk or CD-ROM, and can be provided via a network.

The configuration of the virtual viewpoint image generation apparatus, the generation method and the processing procedure of the virtual viewpoint image described in this embodiment 1-1 are merely examples. The principal object of the present invention is to determine transparency information of the multi-layered projection planes according to reliability of corresponding regions among images obtained by taking the object from plural different viewpoints. Thus, within a limit that does not largely differ from the scope, the present invention is not dependent on a particular processing method or implementation.

In addition, systems using the virtual viewpoint image generation apparatus 1 are not limited to the system of one direction shown in FIG. 7. The present invention can be applied to a bi-directional system.

Figure 18:
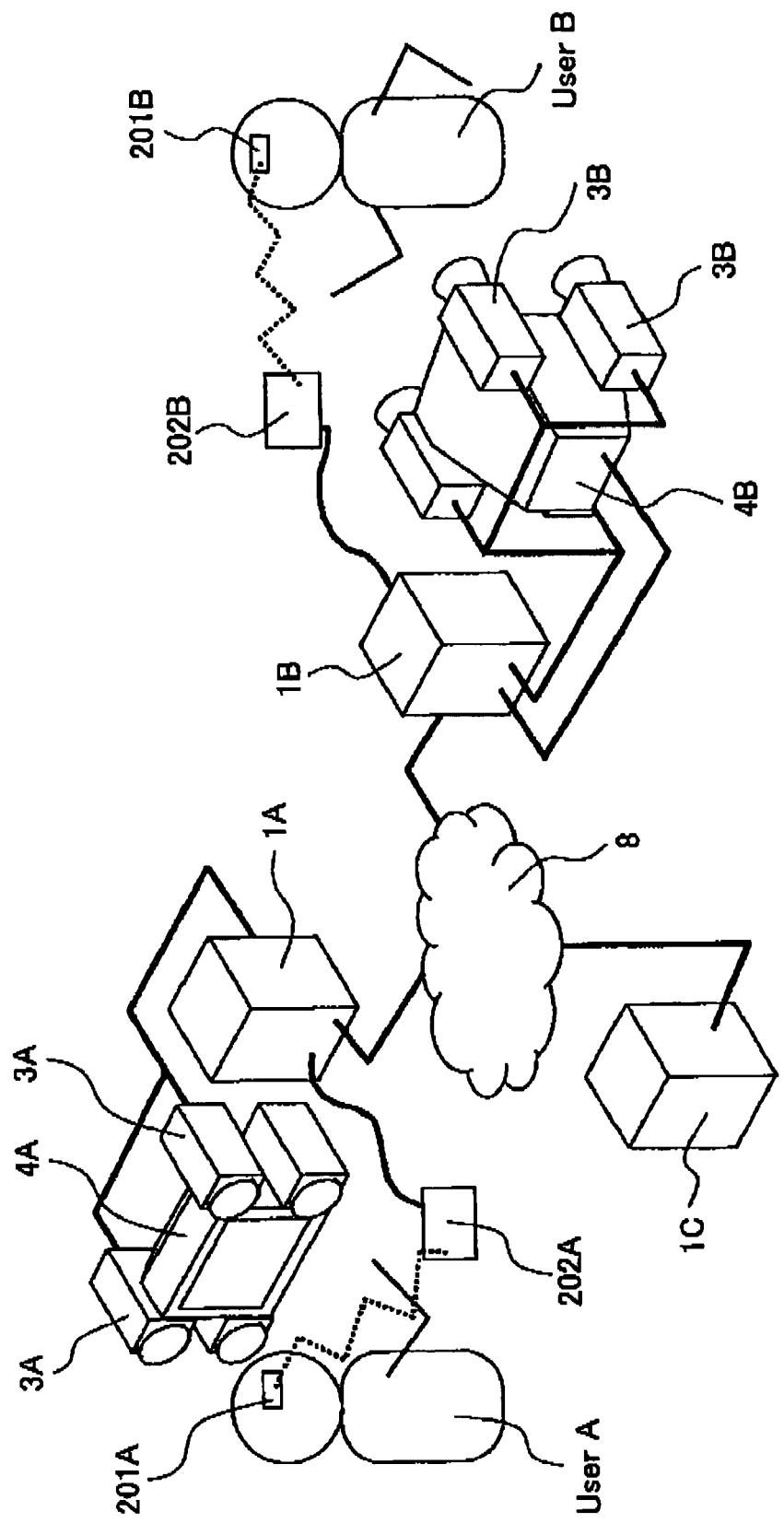
FIG. 18 is a schematic diagram showing an application example of a system to which the virtual viewpoint image generation apparatus of the embodiment 1-1 is applied.

FIG. 18 is a schematic diagram showing an application example of a system to which the virtual viewpoint image generation apparatus 1 of this embodiment 1-1 is applied.

The virtual viewpoint image generation apparatus 1 of the embodiment 1-1 is applicable for a system, such as TV phone, TV conference and the like, for example. For example, as shown in FIG. 18, the virtual viewpoint image generation apparatus 1 can be applied to a system for supporting visual communications in which a user A and a user B remotely existing via a communication network present an image with each other while both users regard the other party as a user and an object. In the system, assuming that an image of the user B viewed from a viewpoint desired by the user A is Img[A→B], Img[A→B] is generated based on an image of the user B photographed by the object taking means (camera) 3B in the user B side, so that the image is provided to the image display means 4A in the side of the user A. Assuming that an image of the user A viewed from a viewpoint desired by the user B is Img[B→A], Img[B→A] is generated based on an image of the user A photographed by the object taking means (camera) 3A in the user A side, so that the image is provided to the image display means 4B in the side of the user B.

In the system shown in FIG. 18, an example is shown in which the viewpoint position input means of each User is configured by a data transmission means 201A, 201B and a data receiving means 202A, 202B in a position/posture sensor mounted on a head of the user, and the viewpoint position input means automatically follows movement of the head of the user so as to calculate a desired virtual viewpoint. However, the viewpoint position input means does not necessarily adopt such configuration. The same function can be realized by estimating the position/posture of the head based on the image of the user photographed by the object taking means 3A, 3B.

In the system, Img[A→B] can be generated in any of the virtual viewpoint image generation apparatus 1A in the user A side and the virtual viewpoint image generation apparatus 1B in the user B side. In the former case, the image of the user B taken by the camera 3B is transmitted to the virtual viewpoint image generation apparatus 1A in the user A side via the network 8, and the Img[A→B] is generated by the virtual viewpoint image generation apparatus 1A based on the image and is presented by the image display means 4A. In the latter case, the image of the user B taken by the camera 3B in the user B side is generated by the virtual viewpoint image generation apparatus 1B in the user B side. After that, the virtual viewpoint image Img[A→B] is transmitted to the virtual viewpoint image generation apparatus 1A in the user A side and is presented by the image display means 4A. In addition, although not described in detail, similar procedure can be adopted for Img[B→A].

In addition, each means forming the image generation means 103 in FIG. 6 can be provided in any one of the virtual viewpoint image generation apparatus 1A in the user A side and the virtual viewpoint image generation apparatus in the user B side. For example, for generating the Img[A→B], the projection plane determination means 103a, the reference viewpoint determination means 103b and the corresponding point matching means 103d are provided in the image generation apparatus 1A in the user A side, and the texture array keeping means 103c, the color information determination means 103e, the existence probability information determination means 103f and the rendering means 103g can be provided in the image generation apparatus 1B in the user B side. Although detailed description is not provided, similar configuration can be adopted for Img[B→A].

In addition, in any place on the network 8, an image generation apparatus 1C can be provided separately from the virtual viewpoint image generation apparatuses 1A and 1B, so that all or a part of image generation means can be provided in the image generation apparatus 1C.

Although communications between two users of user A and user B are described, the number of users are not limited to two. The present invention can be applied to more users. In the case, assuming a virtual space used for communication separately from the actual space in which users actually exist, by providing an image of other user according to position relationship with each other, the system can provide users with feeling as if to share virtual space (cyber space) on the network.

(Embodiment 1-2)

Figure 19A:
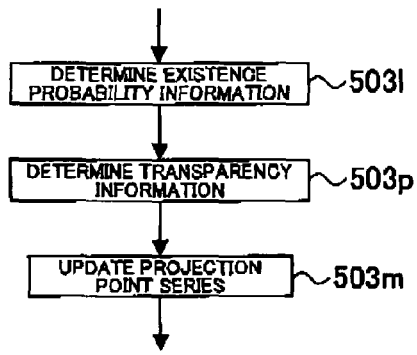
FIG. 19A is a flow diagram indicating processing that is a feature of the embodiment 1-2.
Figure 19B:
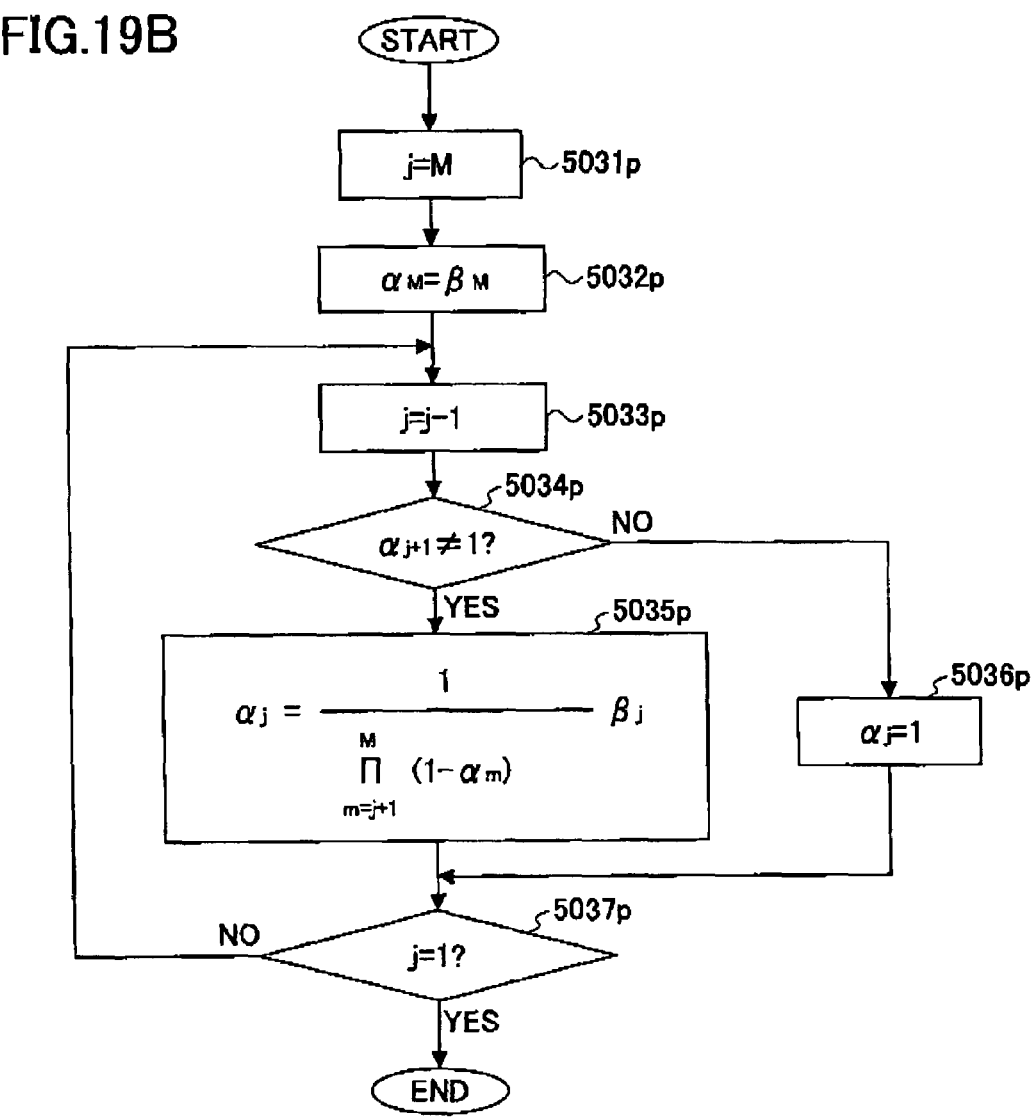
FIG. 19B is a flow diagram showing an example of concrete processing procedure of steps for determining transparency information.

FIGS. 19A and 19B are schematic diagrams for explaining a virtual viewpoint image generation method of the embodiment 1-2. FIG. 19A is a flow diagram indicating processing that is a feature of this embodiment 1-2. FIG. 19B is a flow diagram showing an example of concrete processing procedure of steps for determining transparency information.

In the embodiment 1-2, an example is described in which image generation is performed by converting the existence probability information into transparency information instead of using the existence probability information of the projection point calculated in the step 503*l* in generation processing for virtual viewpoint image described in the embodiment 1-1.

In this example, as to the configuration of the virtual viewpoint image generation apparatus 1 and the general processing procedure, forms similar to examples described in the embodiment 1-1 can be adopted. Thus, only parts having differences with respect to the embodiment 1-1 are described in the following.

In the embodiment 1-1, in step 503 for generating the image, the virtual viewpoint image is generated using the existence probability information $\beta_j$ determined in step 503*l* as shown in FIG. 11. On the other hand, in this embodiment 1-2, as shown in FIG. 19A, a step 503*p* is added for determining transparency by converting the existence probability information after the step 503*l*.

Therefore, although the array for storing color information and the existence probability information is kept in the step 503*d* for keeping texture array in the embodiment 1-1, the array is kept for storing color information and the transparency information in the step 503*d* in this embodiment 1-2.

The transparency information $\alpha_j$ is calculated based on the existence probability information $\beta_j$. In the same way as the step 501*l* of the embodiment 1-1, also in this embodiment 1-2, the existence probability information is calculated once in the step 503*l* and the transparency information is calculated in the next step 503*p*.

In step 503*c* for performing rendering processing in this embodiment 1-2, $D_j$ is successively calculated according to equations from the equation 2 to the equation 4 instead of using the equation 26 and the equation 27 described in the embodiment 1-1. Therefore, color information $K_j^*$ of the pixel $p^*$ $(u_p^*, v_p^*)$ on the image plane is calculated using the following equation 28.

$$K_P^* = D_M \qquad \text{[Equation 28]}$$
$$= \alpha_M K_M + (1 - \alpha_M)\alpha_{M-1} K_{M-1} + \cdots +$$
$$(1 - \alpha_M)(1 - \alpha_{M-1}) \cdots (1 - \alpha_2)\alpha_1 K_1$$

The image generation method in this embodiment is described so far. An example of a method for calculating the transparency information $\alpha_j$ based on the existence probability information $\beta_j$ is described as follows.

First, by comparing the equation 26 and the equation 28, the following equation 29 is obtained.

$$\begin{cases} \beta_M = \alpha_M \\ \beta_j = \left\{ \prod_{m=j+1}^{M} (1 - \alpha_m) \right\} \alpha_j (j \in J) \end{cases} \qquad \text{[Equation 29]}$$

Based on this relationship, a procedure for obtaining $\alpha_j$ in an order of $j=M, M-1, \ldots, 1$ is as follows.

First, as shown in FIG. 19B, M is assigned to j (j=M) as an initial value of j (step 5031*p*). Next, $\alpha_M$ is determined as $\alpha_M = \beta_M$ from the equation 29 (step 5032*p*). Next, the value of j is updated to $j = j-1$ (step 5033*p*).

Next, it is determined whether $\alpha_{j+1}$ is 1 (step 5034*p*). At this time, if $\alpha_{j+1} \neq 1$, $\alpha_j$ is determined by the following equation 30 from the relationship of the equation 29 (step 5035*p*).

$$\alpha_j = \frac{1}{\prod_{m=j+1}^{M}(1-\alpha_m)} \beta_j \qquad \text{[Equation 30]}$$

On the other hand, if $\alpha_{j+1}=1$, $\alpha_j$ is determined by the following equation 31 (step 5036*p*)

$$\alpha_j = 1 \qquad \text{[Equation 31]}$$

The reason is described as follows. First, when $\alpha_{j+1}=1$, the following equation holds true. Thus, the equation 30 cannot be calculated since the denominator is 0.

$$\prod_{m=j+1}^{M}(1-\alpha_m) = 0 \qquad \text{[Equation 32]}$$

Thus, the following equation 33 is obtained by expanding the equation 32. Then, the equation 34 is obtained by substituting the equation 29.

$$\alpha_M + (1 - \alpha_M)\alpha_{M-1} + \cdots + \qquad \text{[Equation 33]}$$
$$(1 - \alpha_M)(1 - \alpha_{M-1}) \cdots (1 - \alpha_{j+2})\alpha_{j+1} = 1$$

$$\beta_M + \beta_{M-1} + \cdots + \beta_{j+1} = 1 \qquad \text{[Equation 34]}$$

The following equation 35 is obtained from the equation 34, the equation 22 and the equation 23.

$$\beta_j = 0 \qquad \text{[Equation 35]}$$

By substituting the equation 32 and the equation 35 into the lower side of the equation 29, $0 = 0 \times \alpha_j$ is obtained, so that it can be understood that $\alpha_j$ can take any value. Therefore, in this embodiment 1-2, $\alpha_j$ is set as 1 ($\alpha_j=1$), for example.

However, as mentioned above, $\alpha_j$ can be set as any value, and the present invention is not dependent on a particular determining method of $\alpha_j$.

Next, it is determined whether processing completes up to j=1 (step 5037*p*). When every processing completes, the procedure ends, when every processing does not end yet, the procedure returns to the step 5033*p*.

As described above, according to the virtual viewpoint image generation method of the embodiment 1-2, like the embodiment 1-1, the virtual viewpoint image in which partial image deterioration is inconspicuous can be generate easily and at high speed.

As described in the embodiment 1-1, in image generation using the existence probability information as it is, there may be a case in which brightness increases near the blocking area of the object when the reference viewpoint and the virtual viewpoint are different. On the other hand, as described in the embodiment 1-2, in the image generation for converting the existence probability information to transparency, there is an effect to prevent the phenomenon. Therefore, a virtual viewpoint image having small image deterioration and more similar to the actual object can be obtained.

In addition, as described in the embodiment 1-1, in the image generation using the existence probability information as it is, there is no guarantee that color information calculated by an equation described later falls within an effective limit when the reference viewpoint and the virtual viewpoint are different, so that correction processing is required, for example. On the other hand, according to the image generation for converting the existence probability information to transparency like the embodiment 1-2, such correction is not necessary. Therefore, the image generation processing can be simplified.

In addition, in image generation for converting the existence probability information to the transparency like the virtual viewpoint image generation method of this embodiment 1-2, a semitransparent object can be efficiently represented, so that there is an effect that the present invention can be applied to more objects in the actual world.

The virtual viewpoint image generation method described in this embodiment 1-2 is an example, and the principal object of the present embodiment is to generate the virtual viewpoint image by converting the existence probability information to the transparency. Therefore, the present invention is not dependent on particular calculation method or processing procedure within a limit largely exceeding the object.

The color information corresponds to brightness information for black and white images, and the same procedure can be applied.

(Embodiment 1-3)

Figure 20:
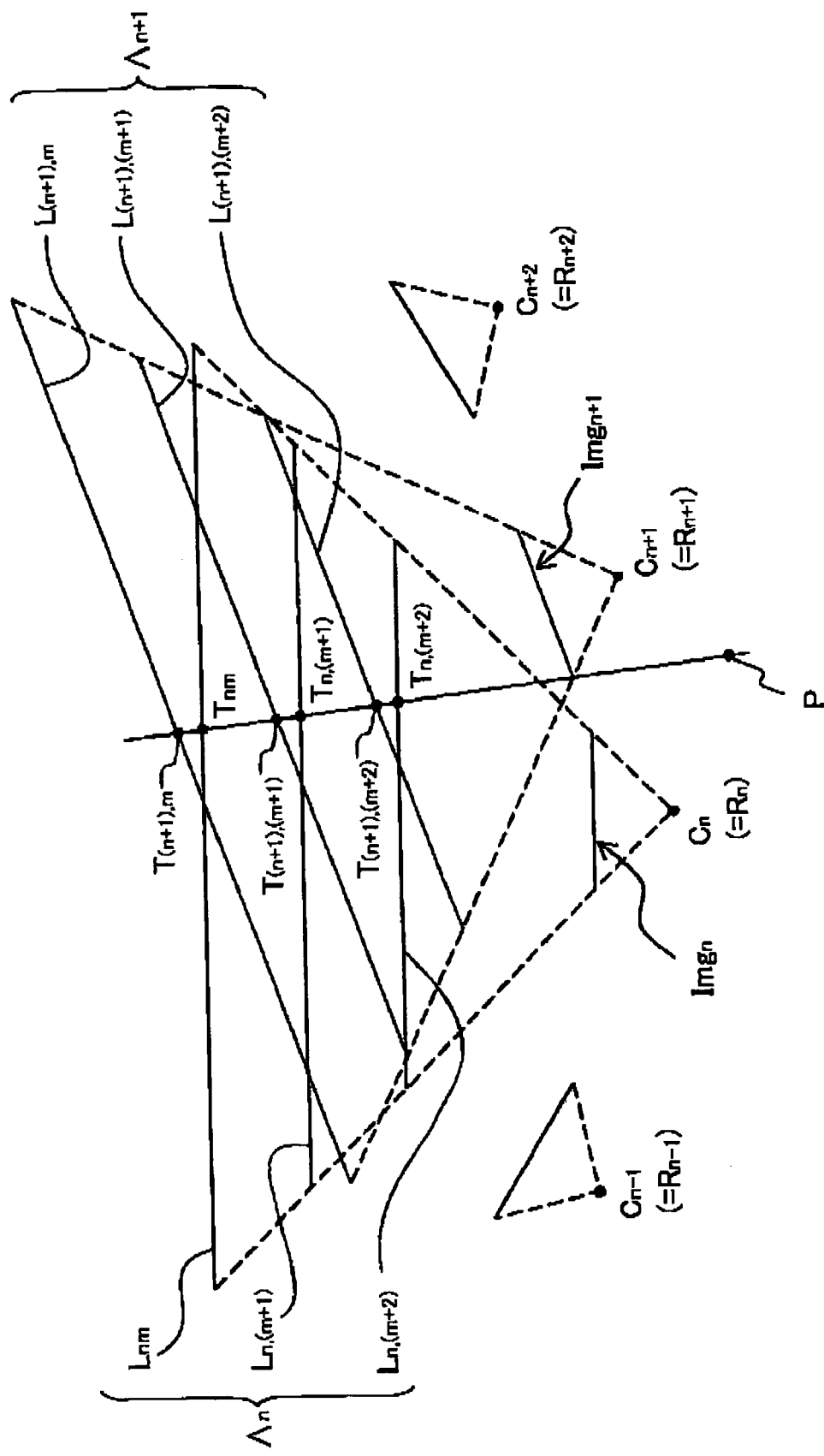
FIG. 20 is a schematic diagram for explaining the virtual viewpoint image generation method of the embodiment 1-3, and is a diagram showing examples of projection plane group, reference viewpoint, virtual viewpoint and projection points.

FIG. 20 is a schematic diagram for explaining the virtual viewpoint image generation method of the embodiment 1-3. The figure shows examples of projection plane group, reference viewpoint, virtual viewpoint and projection points.

In the embodiment 1-3, a method for image generation is described in which the projection plane $L_j$ common for plural cameras is not used but projection planes specific for each camera $C_j$ are set. Since the configuration of the virtual viewpoint image generation apparatus 1 and general processing procedure for image generation in this embodiment are the same as those described in the embodiment 1-1, detailed descriptions are not provided.

First, as described in the embodiment 1-1, the virtual viewpoint is determined in the step 501, and the images of the object is obtained in the next step 502.

In the image generation method of this embodiment 1-3, projection plane groups specific for each camera are set in the next step 503 in generation of the virtual viewpoint image.

At this time, as shown in FIG. 20, for example, the projection plane groups are set as projection plane groups $\lambda_i = \{L_{ij} | j \in J\}$ each parallel to the image surface $Img_i (i \in I)$ specific to each camera $C_i (i \in I, I=\{n-1,n,n+1,n+2\})$.

After setting the projection plane groups, next, in processing for determining the reference viewpoint in the step 503b, each reference viewpoint $R_i$ specific to the projection plane group $\lambda_i$ is set in a position the same as the viewpoint $C_i$ of the camera.

Next, after completing the step 503b, processing of the 503c is performed according to the procedure described in the embodiment 1-1. Then, in the next step 503d, each pixel of the digital image taken by the camera is reverse-projected on the projection planes so that the pixel of the digital image is associated with each pixel of the texture array of the projection planes.

Conversion from the point (u,v) of the digital image to the point (x,y) on the image plane is represented by the equation 17, for example. Reverse-projection from (x,y) to the point (X,Y,Z) on the projection plane in the three-dimensional space can be mathematically expressed as follows, for example.

Generally, when a two-dimensional point (x,y) is given, there are an infinite number of three-dimensional points that satisfy the equation 14 and the equation 15. In the points, points (X,Y,Z) existing on the projection plane are the reverse-projection image.

An equation of the projection plane is generally expressed as aX+bY+cZ+d=0. A following equation 36 is obtained by rewriting this equation by vector representation.

$$[a \quad b \quad c \quad d]\begin{bmatrix} X \\ Y \\ Z \\ 1 \end{bmatrix} = 0 \quad \text{[Equation 36]}$$

By integrating the equation 14, the equation 15 and the equation 36, the following equation 37 can be obtained.

$$s\begin{bmatrix} x \\ y \\ 1 \\ 0 \end{bmatrix} = \begin{bmatrix} \phi_{11} & \phi_{12} & \phi_{13} & \phi_{14} \\ \phi_{21} & \phi_{22} & \phi_{23} & \phi_{24} \\ \phi_{31} & \phi_{32} & \phi_{33} & \phi_{34} \\ a & b & c & d \end{bmatrix}\begin{bmatrix} X \\ Y \\ Z \\ 1 \end{bmatrix} \quad \text{[Equation 37]}$$

The reverse-projection image from (x,y) to (X,Y,Z) can be obtained by solving the equation 37 with respect to (X,Y,Z). When the matrix of 4 rows and 4 columns in the equation 37 has an inverse matrix, by substituting S' for 1/s, the reverse-projection image can be obtained by the following equation 38.

$$s'\begin{bmatrix} X \\ Y \\ Z \\ 1 \end{bmatrix} = \begin{bmatrix} \phi_{11} & \phi_{12} & \phi_{13} & \phi_{14} \\ \phi_{21} & \phi_{22} & \phi_{23} & \phi_{24} \\ \phi_{31} & \phi_{32} & \phi_{33} & \phi_{34} \\ a & b & c & d \end{bmatrix}^{-1}\begin{bmatrix} x \\ y \\ 1 \\ 0 \end{bmatrix} \quad \text{[Equation 38]}$$

The above-mentioned example is an example to the utmost. Calibration for correcting aberration of a lens (distortion, for example) can be performed, and the point (X,Y,Z) on the projection plane corresponding to the point (u,v) of the digital image can be held as a table.

After that, processing from the step 503e to the step 503g is performed according to the procedure described in the embodiment 1-1. Then, in the processing for determining the color information in the next step 503h, color information of the projection points on the projection plane group $\lambda_i$ are determined only by using the color information of the image taken by the camera $C_i$.

By performing the procedures of the step 503d and the step 503h described in this embodiment 1-3, the digital image taken by the camera can be used as the color information of the texture array of the projection plane as it is.

After that, again, the procedure from the step 503i to the step 503h is performed in the same way as the embodiment 1-1. Then, next, in the rendering means in the step 503o, mixing processing for color information is performed with respect to projection points overlapping when viewed from the virtual viewpoint P. At this time, for example, in the example shown in FIG. 20, mixing processing for color information is performed on a line passing through the virtual viewpoint P for projection points on the projection plane groups $\lambda_n$ and $\lambda_{n+1}$.

Assuming that a projection point in the projection plane $L_{ij}$ is $T_{ij}$, color information at $T_{ij}$ is $K_{ij}$, and that existence probability information is $\beta_{ij}$, color information of the image plane of the virtual viewpoint P represented as the equation 27 in the embodiment 1-1 is determined in the following way, for example.

That is, the color information $K_p^*$ of a pixel p* ($u_p^*$, $v_p^*$) on the image plane is determined as an weighted average value of color information calculated by using weight coefficients of existence probability information $\{\beta_{ij}*|i\in I, j\in J\}$ corresponding to color information $\{K_{ij}*|i\in I, j\in J\}$ of projection point series $\{T_{ij}*|i\in I, j\in J\}$ on a line connecting between P and p* as shown in the following equation 39.

$$K_P^* = \frac{\sum_{i\in I}\sum_{j=1}^{M} \beta_{ij} K_j^*}{\sum_{j=1}^{M} \beta_{ij}}$$ [Equation 39]

As described above, according to the virtual viewpoint image generation method of this embodiment 1-3, the virtual viewpoint image in which partial image deterioration is inconspicuous can be generated easily and at high speed like the embodiment 1-1.

In addition, by setting the projection plane groups specific to each camera irrespective of position relationship among cameras like this embodiment 1-3, even if the placement of the cameras are complicated and irregular, processing of setting the projection plane groups is not affected so that image generation can be performed by the consistent processing method.

The virtual viewpoint image generation method described in this embodiment 1-3 is an example, and the principal object of the present embodiment is to generate the virtual viewpoint image by converting the existence probability information to the transparency. Therefore, the present invention is not dependent on particular calculation method or processing procedure within a limit largely exceeds the object.

The color information corresponds to brightness information in the case using black and white images, and same procedure can be applied.

(Effects of First Embodiment)

The method described in the first embodiment does not intend to obtain a geometrical object model accurate for every case and every portions like the conventional method. But, under the assumption that an estimated value having adequate reliability cannot be obtained in the distance estimation depending on picture-taking conditions and portions, a portion by which an estimated value of low reliability is obtained is drawn vaguely so as to provide the portion with low contribution to image generation for avoiding extreme image deterioration, and a portion, by which distance data of high reliability is obtained, is drawn clearly so as to provide the portion with high contribution to image generation. Therefore, image deterioration of the poison of low estimation reliability can be inconspicuous.

In addition, the problem that the brightness increases near the blocking area when the reference viewpoint and the virtual viewpoint are different can be solved. When the reference viewpoint and the virtual viewpoint are different, there is no guarantee that calculated color information falls within an effective limit of color information. Thus, correction processing may be necessary. On the other hand, according to the method described in this embodiment, such correction is unnecessary. In addition, a semitransparent object can be efficiently represented, so that there is an effect that the present invention can be applied more widely to more objects in the actual world. In addition, since the groups of the projection planes specific to each camera are set irrespective of position relationship among cameras, even if placement of the cameras is complicated or at random, processing for setting the groups of the projection planes is not affected so that image generation can be performed by consistent processing method.

Further, when setting the projection plane groups specific to each camera, it is not necessary to perform mixing processing among images taken by corresponding cameras as to color information of the projection planes. Therefore, parallel processing can be performed when performing processing by a computer, so that speed of the image generation can be increased.

In addition, since color information of a projection plane group associated with the same camera are the same, the texture memory for storing the color information can be shared. Therefore, the memory is not so consumed even when the number of projection planes increases, so that workload of the apparatus used for image generation can be decreased. In addition, since a camera corresponding to a projection plane is uniquely determined, calibration such as correction of distortion of a lens can be performed easily and quickly by setting correspondence of coordinates of them beforehand.

In addition, processing time for performing the processing by the apparatus for generating the virtual viewpoint image based on the images of the object can be decreased, or the workload of the apparatus can be decreased, so that even a general personal computer can generate an image having small partial deterioration in a short time.

Second Embodiment

In the following, the second embodiment of the present invention is described. The second embodiment mainly corresponds to the claims 12-21. Although the basic mechanism of the second embodiment is the same as that of the first embodiment, the second embodiment is characterized in that plural groups of camera sets are provided and the existence probability is calculated based on correlation degree obtained for each camera set. In figures for explaining the second embodiment, the same reference signs are assigned for the same functions.

The image generation method of the second embodiment is a method for obtaining, from plural images of different viewpoints, a three-dimensional shape of an object appearing in the images, and generating an image for providing the three-dimensional image of the object or generating an image of the object viewed from arbitrary viewpoints. The three-dimensional shape of the object is obtained by estimating distance from the observer's viewpoint to each point of the surface of the object by setting multi-layered projection planes using the texture mapping method. When estimating the distance to the surface of the object, correlation degree between the projection point and each corresponding point of the image (to be referred as corresponding point hereinafter) is obtained for each of points (to be referred to as projection point hereinafter), on the projection planes, overlapping when viewed from the observer's viewpoint. Then, an projection point near which the surface of the object exists is estimated among the overlapping projection points according to the correlation degree of the projection points overlapping when viewed from the observer's viewpoint. In the image generation method of this embodiment, it is not considered that the surface of the object exists at a neighborhood of projection point among plural projection points overlapping when viewed from the observer's viewpoint. But, it is considered that the surface of the object exists in a neighborhood of each projection point in a ratio according to the correlation degree of each projection point. In the image generation method of this invention, a probability (to be referred to as existence probability) that the surface of the object exists at the projection point or the neighborhood is determined according to the correlation degree of each projection point. Then, when the image is generated based on the three-dimensional shape of the object, the color information of the projection point is assigned to the color information of each point of the image to be generated according to the value of the existence probability. Accordingly, from the viewpoint of the observer who observes the projection planes, a portion at which estimation of the distance to the object surface is difficult is rendered vaguely, so that discontinuous noise and the like becomes inconspicuous.

In addition, with respect to the plural projection points overlapping when viewed from the observer's viewpoint or from the reference viewpoint for obtaining the three-dimensional shape of the object, if probability density distribution of the existence probability of the object surface can be estimated to some extent, the existence probability can be obtained using a parameter function p(1) to which the probability density distribution is reflected. In such a case, variation of the correlation degree due to noise of the taken images can be decreased so that deterioration of reliability of the existence probability can be prevented.

In addition, instead of obtaining the correlation degree for a projection point using corresponding points of all images, by obtaining it using corresponding points of images taken from some predetermined viewpoints, reliability of the correlation degree improves so that reliability of the existence probability improves by removing each image in which the object does not appear due to occlusion even though the surface of the object exists on the projection point.

Figure 21:
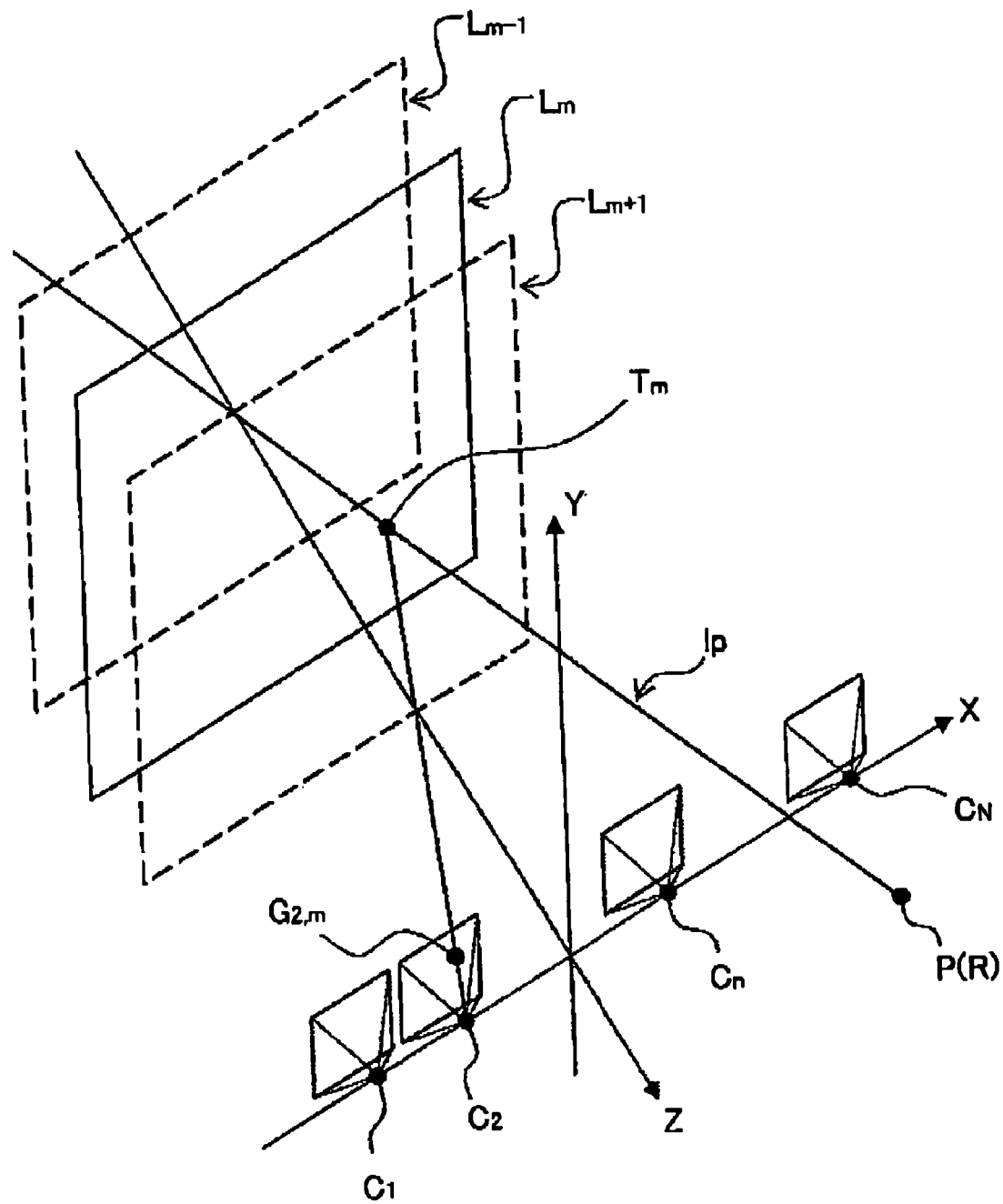
FIG. 21 is a schematic diagrams for explaining the principle of the image generation method of the second embodiment, and is a diagram for explaining a concept of a method for generating the image to be displayed.
Figure 22:
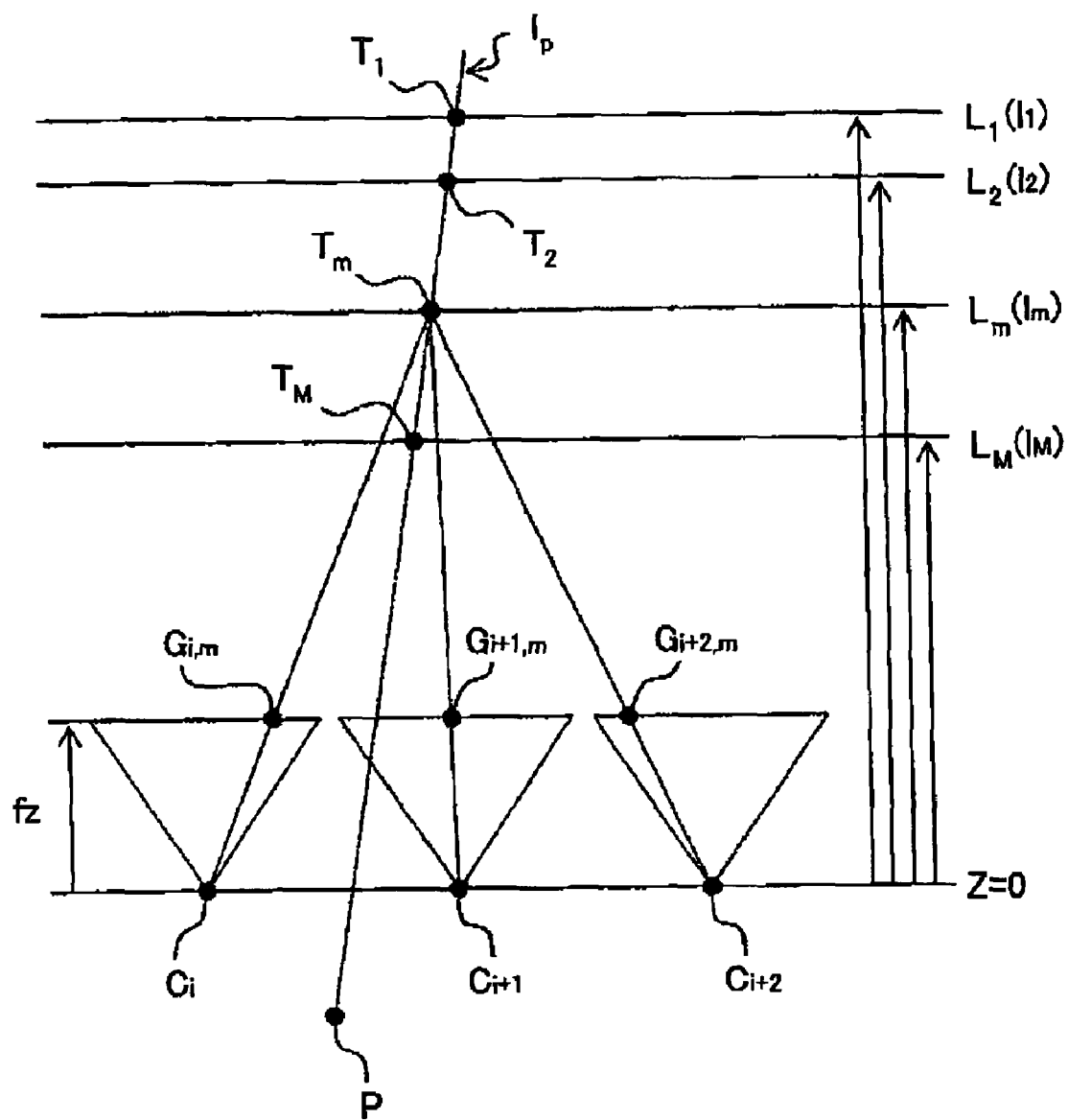
FIG. 22 is a schematic diagram for explaining the principle of the image generation method of the second embodiment, and is a diagram representing FIG. 21 in two-dimensional.
Figure 24A:
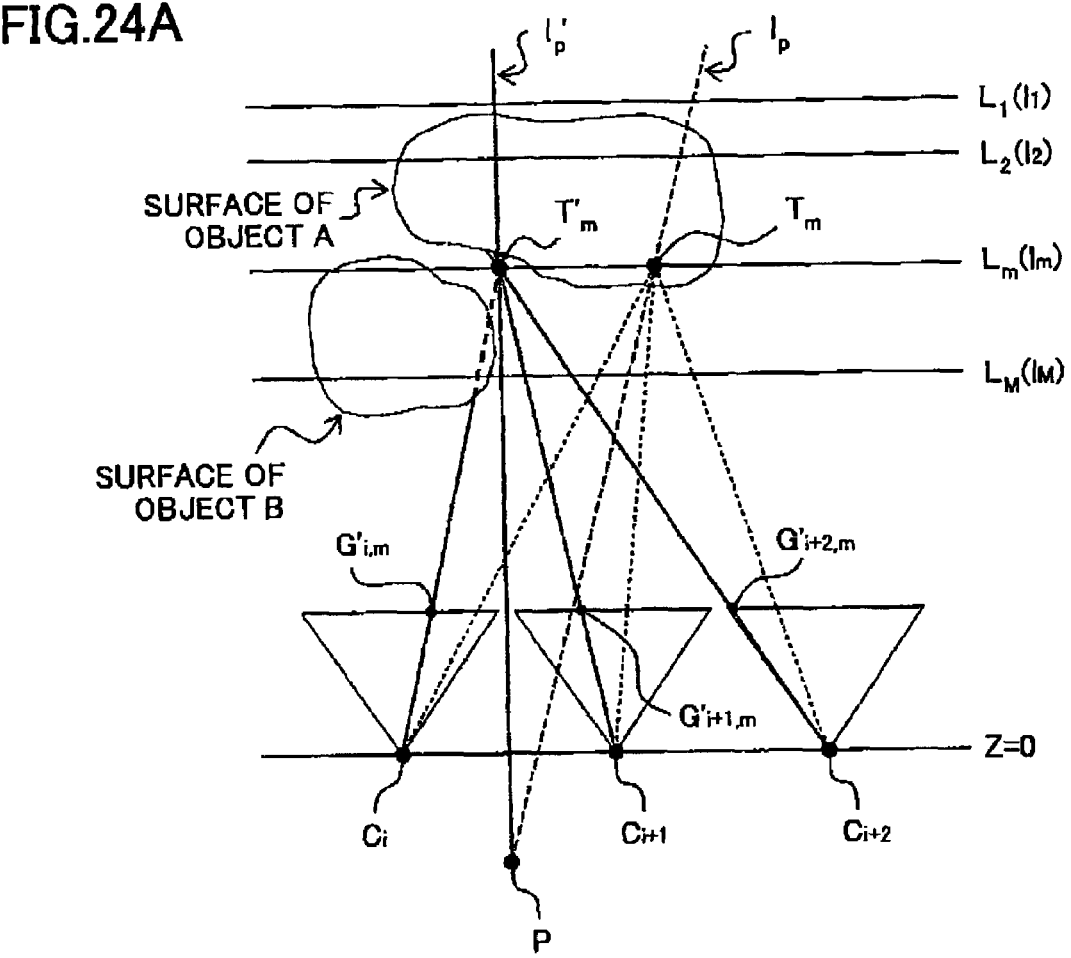
FIG. 24A and FIG. 24B are diagrams for explaining a problem when obtaining the correlation degree of the corresponding points.
Figure 24B:
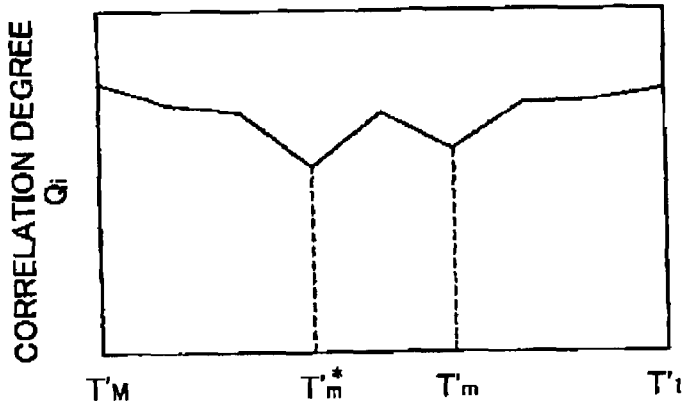
Figure 25:
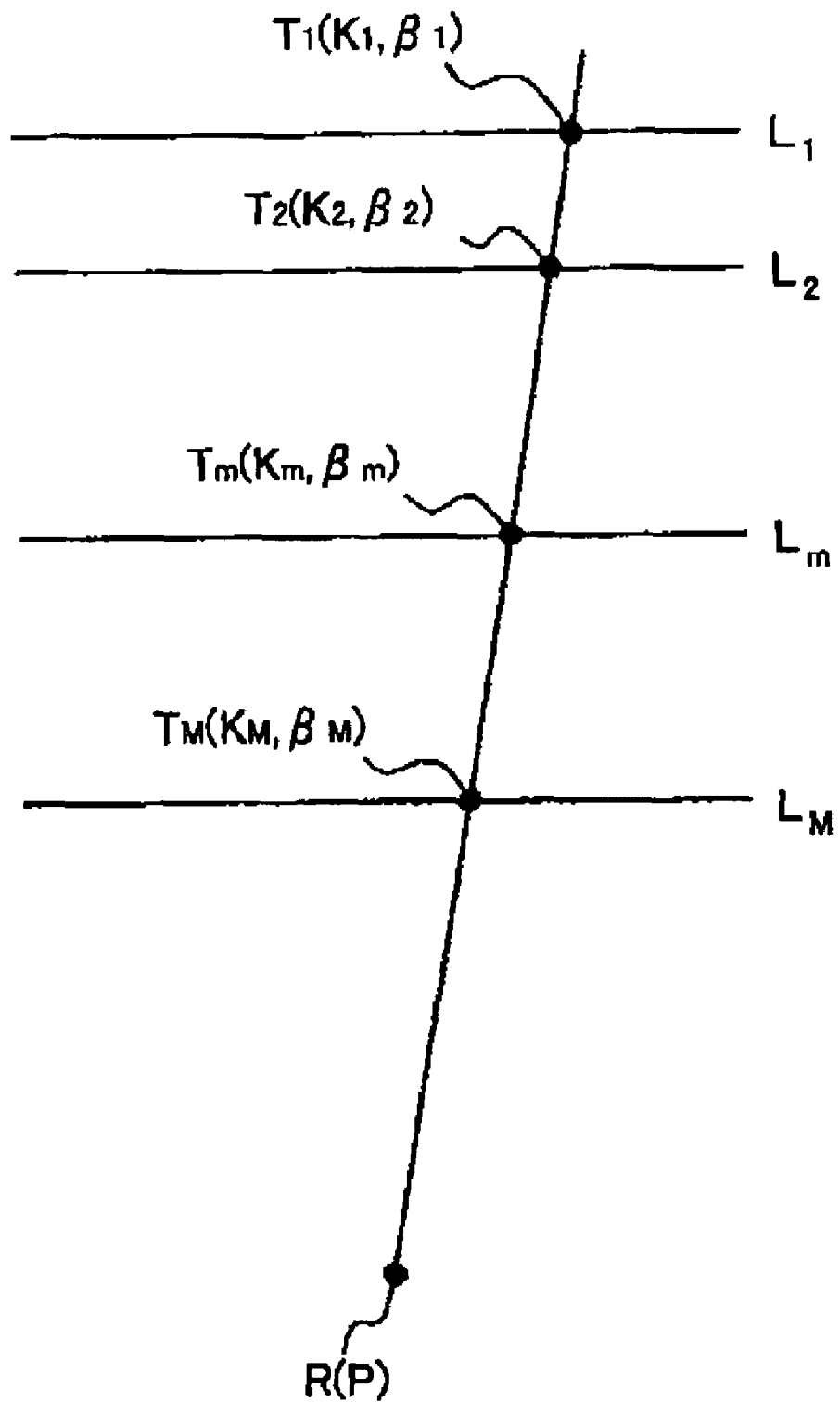
FIG. 25 is a schematic diagram for explaining the principle of the image generation method of the second embodiment, and is a diagram for explaining a method for solving the problem when obtaining the correlation degree.
Figure 26A:
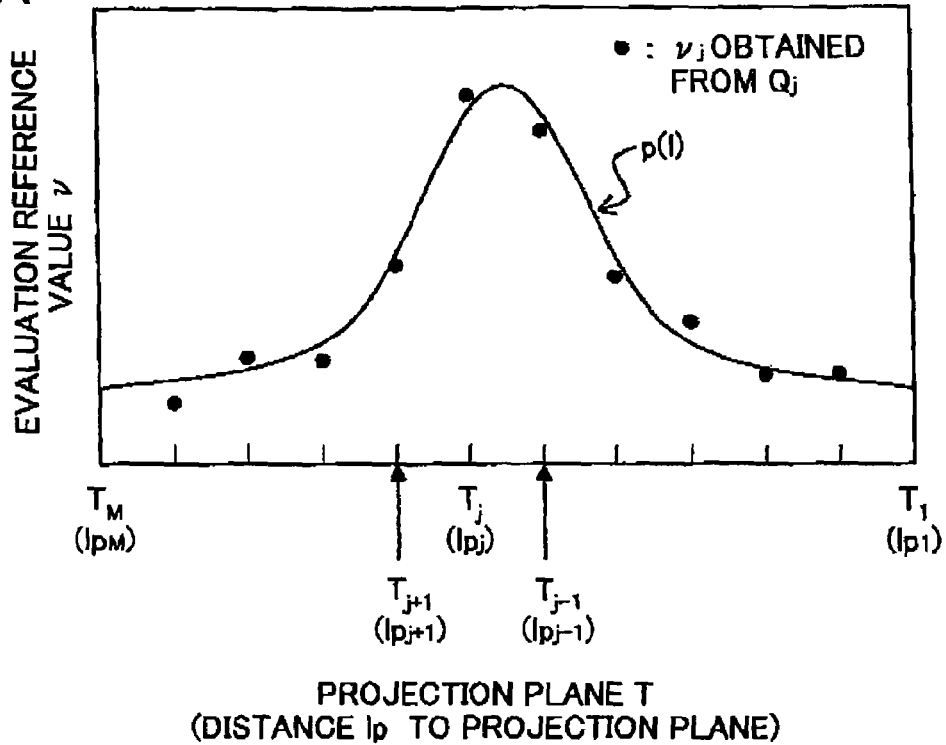
FIG. 26A and FIG. 26B are diagrams for explaining an example of a method for improving accuracy of the existence probability
Figure 26B:
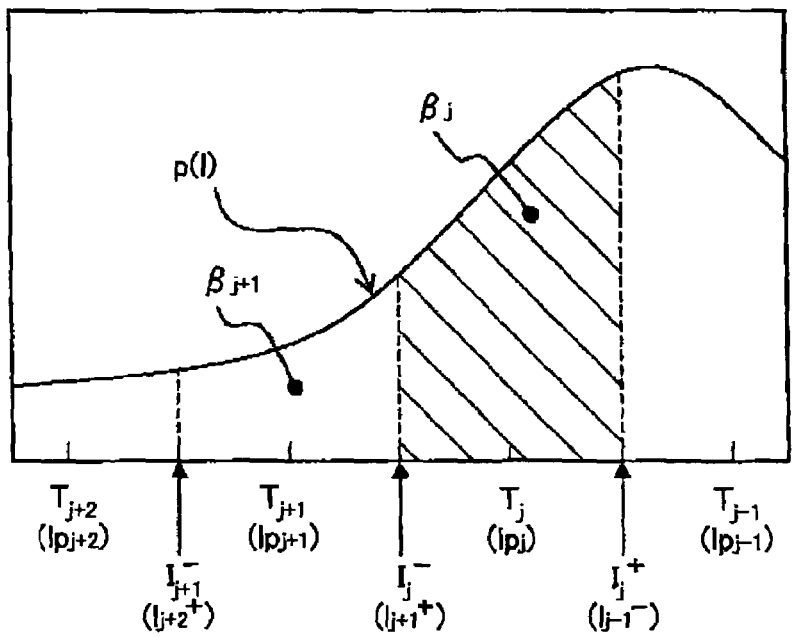
Figure 27A:
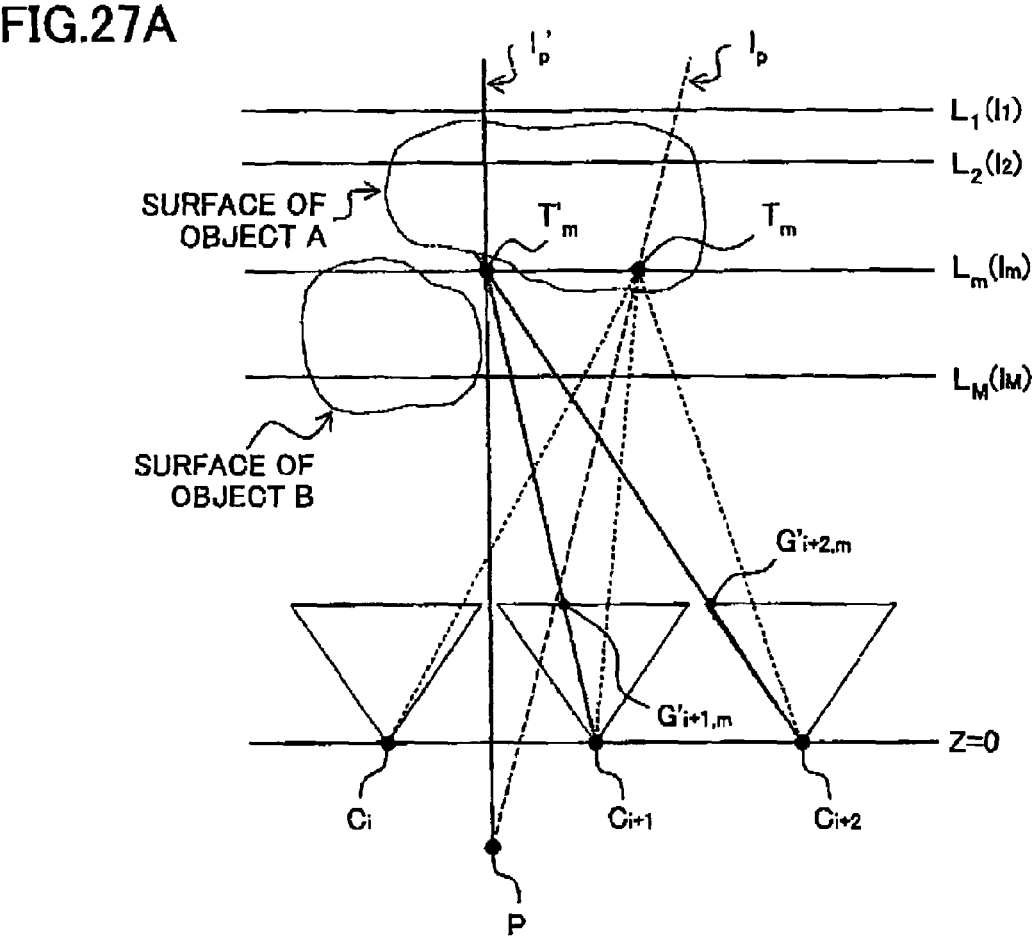
FIG. 27 is a schematic diagram for explaining the principle of the image generation method of the second embodiment.
Figure 27B:
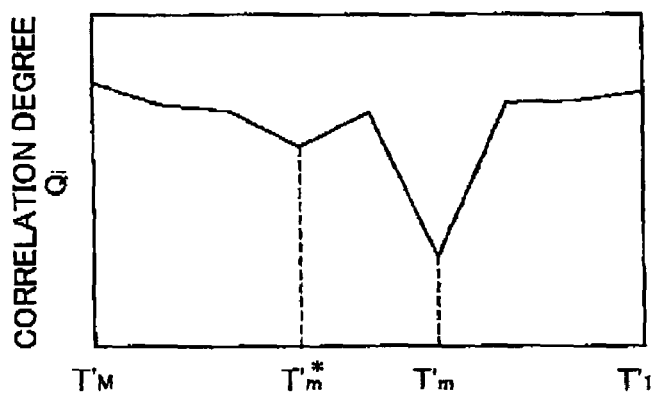
Figure 28:
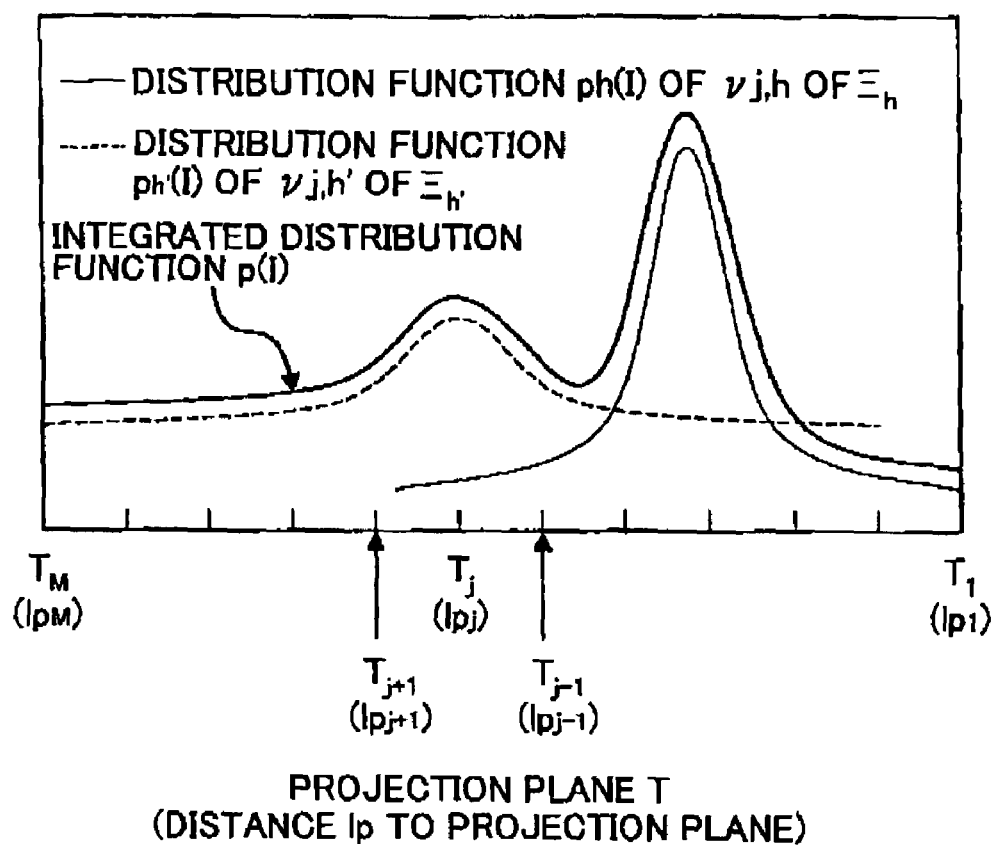
FIG. 28 is a schematic diagram for explaining the principle of the image generation method of the second embodiment.

FIGS. 21-28 are schematic diagrams for explaining the principle of the image display method in this embodiment. FIG. 21 is a diagram for explaining a concept of a method for generating the image to be displayed. FIG. 22 is a diagram representing FIG. 21 in two-dimensional. FIG. 23A and FIG. 23B are diagrams for explaining a method for obtaining the correlation degree of the corresponding point. FIG. 24A and FIG. 24B are diagrams for explaining a problem when obtaining the correlation degree of the corresponding point. FIG. 25 is a diagram for explaining a method for solving the problem when obtaining the correlation degree. FIG. 26A and FIG. 26B are diagrams for explaining an example of a method for improving accuracy of the existence probability. FIG. 27A, FIG. 27B and FIG. 28 are diagrams for explaining characteristics of this embodiment.

In the image display method of this embodiment, when generating the image to be displayed, first, a virtual three-dimensional space is set in the image generation apparatus such as a computer. Then, on the three-dimensional space, viewpoints $C_i$ (i=1,2,...,N) of cameras that take the images of the object and projection planes $L_j$(j=1,2,...,M) having a multi-layered structure for estimating the three-dimensional shape of the object are set. At this time, when the cameras are arranged on a line, the viewpoints $C_i$ are set on the X axis (z=0) as shown in FIGS. 21 and 22, for example. As the projection planes $L_j$, planes parallel to the XY plane Z=$l_j$ (<0) are set as shown in FIGS. 21 and 22, for example.

As shown in FIGS. 21 and 22, if there is the surface of the object at an intersection point $T_m$ between a line 1p extending from the observer's viewpoint p and a projection plane $L_m$, the point should be taken on a point (corresponding point) $G_{i,m}$ on the image photographed by the camera placed at the viewpoint $C_i$. In the same way, when the surface of the object exists at the projection point $T_m$, the point should appear at each of corresponding points $G_{i+1,m}$ and $G_{i+2,m}$ on images taken by the cameras placed at the viewpoints $C_{i+1}$ and $C_{i+2}$ respectively. Therefore, if the correlation degrees (similarity) of the corresponding points $G_{i,m}$, $G_{i+1,m}$ and $G_{i+2,m}$ on each image for the projection point $T_m$ are obtained, it can be estimated whether the surface of the object exists at the projection point $T_m$ or the neighborhood. By performing the estimation for each projection point $T_j$ on the line 1p extending from the observer's viewpoint P, a neighborhood of a projection point $T_j$ (projection plane $L_j$) at which the surface of the object exists can be estimated on the line 1p extending from the observer's viewpoint p.

When estimating a neighborhood of a projection point $T_j$ (projection plane $L_j$), on the line 1p extending from the observer's viewpoint p, where the surface of the object exists, correlation degree $Q_j$ of each corresponding point $G_{i,j}$ corresponding to the projection point $T_j$ is used. The correlation degree $Q_j$ is obtained using the following equation 40 in the same way as the first embodiment.

$$Q_j = \sum_{i \in I} (K_j - K_{ij})^2 \quad \text{[Equation 40]}$$

wherein I is a set of viewpoints $C_i$ that can define corresponding points $G_{i,j}$ for the projection point $T_j$ on the image planes in the viewpoints $C_i$ (i=1,2,...,N), $K_{ij}$ is color information of each corresponding point $G_{i,j}$, and $K_j$ is color information of the projection point $T_j$ and is an average value of color information $K_{ij}$ of each corresponding point $G_{i,j}$.

At this time, a case is considered in which the result shown in FIG. 23A is obtained, for example, when superimposing the actual surface shape of the object on the established projection plane $L_j$. At this time, in projection points $T_j$ on the line 1p extending from the observer's viewpoint p, the projection point $T_m$ is the nearest to the object surface that can be viewed from the viewpoints $C_i$, $C_{i+1}$ and $C_{i+2}$ of the cameras. Thus, as shown in FIG. 23A, points of the object surface appearing in the corresponding points $G_{i,m}$, $G_{i+1,m}$ and $G_{i+2,m}$ corresponding to the projection point $T_m$ are very close with each other. On the other hand, for example, the points of the object surface appearing in corresponding points corresponding to the projection point $T_2$ are apart with each other. As a result, when obtaining the correlation degree $Q_j$ of each projection point $T_j$ on the line 1p, only the correlation degree $Q_m$ for the projection point $T_m$ is very small value as shown in FIG. 23B. Therefore, when being viewed from the observer's viewpoint P in the direction of the line 1p, the surface of the object can be estimated to exist at a position of the projection point $T_m$, that is, at a distance $l_m$ at which the projection plane $L_m$ is set.

Thus, by providing lines 1p from the observer's viewpoint P in various directions and repeating similar processing for projection points $T_j$ on each line 1p, the surface shape of the object appearing in the images can be estimated.

However, such estimation method is effective, that is, the reliability of the estimated surface shape of the object is high, only in the case where the actual surface shape of the object is relatively simple as shown in FIG. 23A and 23B. When the, shape of the object is complicated or when plural objects overlap when being viewed from the observer's viewpoint, the reliability of the estimated surface shape of the object is lowered.

As an example in which the reliability of the estimated surface shape is lowered, a case is considered in which the result shown in FIG. 24A is obtained, for example, when two objects overlaps with respect to the observer's viewpoint and when superimposing the projection planes $L_j$ with the surface shapes of the two objects. In this case, it can be considered that the correlation degree $Q_j$ for the projection points $T_j$ on the line $1p$ extending from the observer's viewpoint P as indicated by a dotted line in FIG. 24A provides distribution shown in FIG. 23B, for example. Thus, it can be considered that the reliability of the estimated surface shape of the object A is high near the line $1p$.

However, when obtaining the correlation degree $Q'_m$ for the projection point $T'_m$ on the line $1p'$ extending from the-observer's viewpoint P as shown by the solid line shown in FIG. 24A, the surface of the object B appears at the corresponding point $G'_{i,m}$ of the image taken from the viewpoint $C_i$ and the surface of the object A appears at the corresponding points $G'_{i+1,m}$ and $G'_{i+2,m}$ of the images taken from the viewpoints $C_{i+1,m}$ and $C_{i+2,m}$. In such a case, the correlation degree $Q'_m$ obtained by the equation 40 becomes large. As a result, distribution of the correlation degree $Q'_j$ of the projection points $T'_j$ on the line $1p'$ becomes one shown in FIG. 24B, so that it is difficult to estimate a neighborhood of a projection point $T_j$ at which the surface of the object exists. At this time, when it is estimated that the surface of the object exists near a projection point $T'_j$ having the smallest correlation degree $Q'_j$ like the case having the distribution shown in FIG. 23B, discontinuous noise appear on the image to be displayed if the estimation is not correct.

Thus, according to the image display method in this embodiment, such estimation is not performed in which the surface of the object is estimated to exist at the projection point $T_j$ or the neighborhood at which the correlation degree $Q_j$ is the smallest, but it is considered that the surface of the object exists at each projection point $T_j$ in a probability according to the ratio of the size of the correlation degree $Q_j$. At this time, assuming that the probability (existence probability) that the surface of the object exists at the projection point $T_j$ or the neighborhood is $\beta_j$, the existence probability $\beta_j$ of projection points on the line $1p$ extending from the observer's viewpoint P, that is, projection points $T_j$ overlapping when viewed from the observer's viewpoint P, requires to satisfy conditions as shown in the following equations 41 and 42.

$$0 \leq \beta_j \leq 1 \qquad \text{[Equation 41]}$$

$$\sum_{j=1}^{M} \beta_j = 1 \qquad \text{[Equation 42]}$$

For the existence probability $\beta_j$ to take a value nearer to 1 as the probability of existence of the object surface is higher in projection points $T_j$, the existence probability $\beta_j$ of each projection point $T_j$ is determined by performing conversion processing represented by the following equations 43 and 44 for the correlation degree $Q_j$ of each projection point $T_j$.

$$\tilde{\beta}_j = \frac{1}{Q_j} \qquad \text{[Equation 43]}$$

$$\beta_j = \frac{\tilde{\beta}_j}{\sum_{j=1}^{M} \tilde{\beta}_j} \qquad \text{[Equation 44]}$$

The existence probability $\beta_j$ only needs to satisfy the conditions of the equations 41 and 42. Thus, the existence probability $\beta_j$ can be determined in a method other than the conversion processing represented by the equations 43 and 44.

According to such processing, by determining the probability $\beta_j$ that the surface of the object exists at the projection point $T_j$ or the neighborhood, the color information $K_j$ and the existence probability $\beta_j$ for each projection point $T_j$ on the line $1p$ extending from the observer's viewpoint P can be determined.

When displaying a three-dimensional image of an object on a DFD of brightness modulation type by using the three-dimensional shape of the object estimated in this way, for example, each pixel corresponding to each projection point $T_j$ in plural display planes is displayed with brightness according to the color information $K_j$ and the existence probability $K_j$. Accordingly, as to correlation degrees $Q_j$ of each projection point $T_j$ on the line $1p$, when only a correlation degree $Q_m$ of a projection point $T_m$ is far different from other correlation degrees as shown in FIG. 23B, only the existence probability $\beta_m$ of the projection point $T_m$ takes a large value. Therefore, brightness of only a pixel corresponding to the projection point $T_m$ becomes large so that the pixel looks clear for the observer who observes the projection plane $L_j$ from the observer's viewpoint.

On the other hand, when correlation degrees $Q_j$ of each projection point $T_j$ on the line $1p$ are as shown in FIG. 24B so that it is difficult to estimate a projection point $T_j$ near which the surface of the object exists, plural projection points having similar existence probability appear. Therefore, plural pixels corresponding to the projection points $T_j$ on the projection planes $L_j$ are displayed with similar brightness, so that sense of distance of the pixels becomes vague when viewed from the observer who observes the projection planes $L_j$ from the observer's viewpoint. However, since the surface image of the object is displayed on plural projection points overlapping when viewed from the observer's viewpoint P, discontinuous noise that may appear due to an error of estimation for the distance of the object surface does not appears. Therefore, even though the accurate three-dimensional shape of the object to be displayed is not obtained, a three-dimensional image of the object that looks natural for the observer can be displayed.

In addition, when displaying the two-dimensional image (arbitrary viewpoint image) of the object viewed from an arbitrary viewpoint using the three-dimensional shape of the object estimated by the procedure, color information of a cross point between the line $1p$ and the image plane of the image to be displayed is determined as color information obtained by mixing color information $K_j$ of each projection point $T_j$ on the line $1p$ extending from the observer's viewpoint in a ratio of the existence probability $\beta_j$.

If the probability density distribution of the probability that the surface of the object exists can be estimated to some extent when determining the existence probability $\beta_j$, error of estimation due to noise of the images taken at the viewpoints $C_i$ can be decreased by performing statistical processing, based on the shape distribution of the object, on the existence probability $\beta_j$ of each projection point $T_j$ determined by the equations 43 and 44. To differentiate between the existence probability before performing the statistical processing and the existence probability after performing the statistical processing, it is assumed that the existence probability before performing the statistical processing, that is, the existence probability $\beta_j$ obtained by the equation 43 and the equation 44 is regarded as an evaluation reference value $\upsilon_j$. Then, it is assumed that a value obtained by performing the statistical processing on the evaluation reference value $\upsilon_j$ is the existence probability $\beta_j$.

In the statistical processing performed on the evaluation reference value $v_j$ obtained by the equation 43 and the equation 44, first, as shown in FIG. 26A, for example, a distribution function p(1) of the existence probability is obtained by applying the probability density distribution of the existence probability of the object to the distribution of the evaluation reference value $v_j$. At this time, when the probability density distribution complies with normal distribution (Gaussian distribution), for example, the distribution function p(1) of the existence probability can be represented by the following equation 45.

$$p(l) = \frac{1}{\sqrt{2\pi}\,\sigma} \exp\left\{-\frac{(l-\mu)^2}{2\sigma^2}\right\} \qquad \text{[Equation 45]}$$

In the equation, $\mu$ indicates an average value, and $\sigma$ indicates a parameter indicating dispersion. Using the estimation reference value $v_j$, estimation can be performed as shown in the following equation 46 and the equation 47.

$$\mu = \sum_{j=1}^{M} \beta_j l_j \qquad \text{[Equation 46]}$$

$$\sigma^2 = \sum_{j=1}^{M} (\beta_j l_j - \mu)^2 \qquad \text{[Equation 47]}$$

After the distribution function p(1) of the existence probability is obtained in such a way, the existence probability $\beta_j$ is determined using the equation 48, for example.

$$\beta_j = \int_{l_j^-}^{l_j^+} p(l)\,dl \qquad \text{[Equation 48]}$$

In the equation, $l_j^-$ and $l_j^+$ respectively are an lower limit value and an upper limit value of a distance at which the object surface is regarded to exist on a projection plane $L_j$ at a distance of $l_j$. The values $l_j^-$ and $l_j^+$ can be provided by the following equation 49 and the equation 50, for example.

$$l_j^- = \frac{l_{j-1} + l_j}{2}, \qquad \text{[Equation 49]}$$
$$l_1^- = -\infty$$

$$l_j^+ = \frac{l_j + l_{j+1}}{2}, \qquad \text{[Equation 50]}$$
$$l_M^+ = \infty$$

Based on the existence probability $v_j$ obtained by using the relationships of the equations 45-50, by displaying the three-dimensional image of the object on the DFD or by displaying the two-dimensional image viewed from an arbitrary viewpoint, an image in which noise effect of the original images is reduces can be displayed, wherein the original images are the images obtained by taking the object from the viewpoints $C_i$.

In addition, as shown in FIGS. 24A and 24B, for example, when an object different from one appearing at other corresponding points appears in a corresponding point $G_{i,j}$ corresponding to a projection point $T_j$ due to occlusion of the object, it can be considered that relatively reliable estimation can be performed by obtaining the correlation degree $Q_j$ by excluding the corresponding point. Considering the case shown in FIG. 24A, according to the method described so far, when obtaining the correlation degree $Q'_m$ of the projection point $T'_m$ on the line lp' extending from the observer's viewpoint P, the corresponding point $G_{i,m}$ at which the surface of the object B, not object A, appears is also used. Therefore, the correlation degree $Q'_m$ obtained from the equation 40 becomes large so that it is difficult to estimate a distance at which the surface of the object exists on the line lp'.

Thus, for example, as shown in FIG. 27A, the correlation degree $Q_m$ for the projection point $T_m$ is obtained by excluding the corresponding point $G_{i,m}$ at which the surface of the object B appears. At this time, in the example shown in FIG. 27A, the correlation degree $Q_m$ is obtained using corresponding points $G_{i+1,m}$ and $G_{i+2,m}$ corresponding to the projection point $T_m$. By doing so, since points very close to the surface of the object A appear on the corresponding points $G_{i+1,m}$ and $G_{i+2,m}$, distribution shown in FIG. 27B is obtained when obtaining the correlation degree $Q'_j$ from the equation 40, in which only the correlation degree $Q'_m$ of the projection point $T'_m$ is smaller than correlation degrees of other projection points. Therefore, effects of the occlusion can be decreased so that a three-dimensional shape close to an actual surface shape of the object can be estimated.

In addition, at this time, several groups of sets of $\Xi$ that is a set of corresponding points $G_{i,j}$ (viewpoints $C_i$) are set for obtaining the correlation degree $Q_j$, and the correlation degree $Q_j$ of each projection point $T_j$ on the line $1p$ extending from the observer's viewpoint P is obtained for every set of $\Xi$. Then, the results are integrated so as to obtain a final existence probability. Generally, assuming that a group of corresponding points $G_{i,j}$ (viewpoints $C_i$) is $\Xi_h$(h∈H), distribution function of the existence probability on the line $1p$ obtained by using each group $\Xi_h$ is $\rho_h(1)$, and that the existence probability obtained by each distribution function $\rho_h(1)$ is $\beta_{j,h}$, the integrated existence probability $\beta_j$ can be obtained by the following equation 51.

$$\beta_j = \frac{\sum_{h \in H} \beta_{j,h}}{\sum_{h \in H}} \qquad \text{[Equation 51]}$$

The color information $K_j$ of the projection point $T_j$ can be obtained using the following equation 52, for example, from color information $K_{j,h}$ and existence probability $\beta_{j,h}$ obtained for each group $\Xi_h$.

$$K_j = \frac{\sum_{h \in H} \beta_{j,h} K_{j,h}}{\sum_{h \in H} \beta_{j,h}} \qquad \text{[Equation 52]}$$

Accordingly, as shown in FIG. 28, for example, a distribution function $\rho_h(1)$, obtained by a group $\Xi_h$, by which reliability for estimating the distance to the object surface is high and a clear peak appears is not susceptible to another distribution function $\rho_h(1)$, obtained by another group $\Xi_h$, by which reliability for estimating the distance to the object surface is low.

Therefore, reliability for estimating the distance to each point of the object from the observer's viewpoint improves as a whole.

(Embodiment 2-1)

Figure 29:
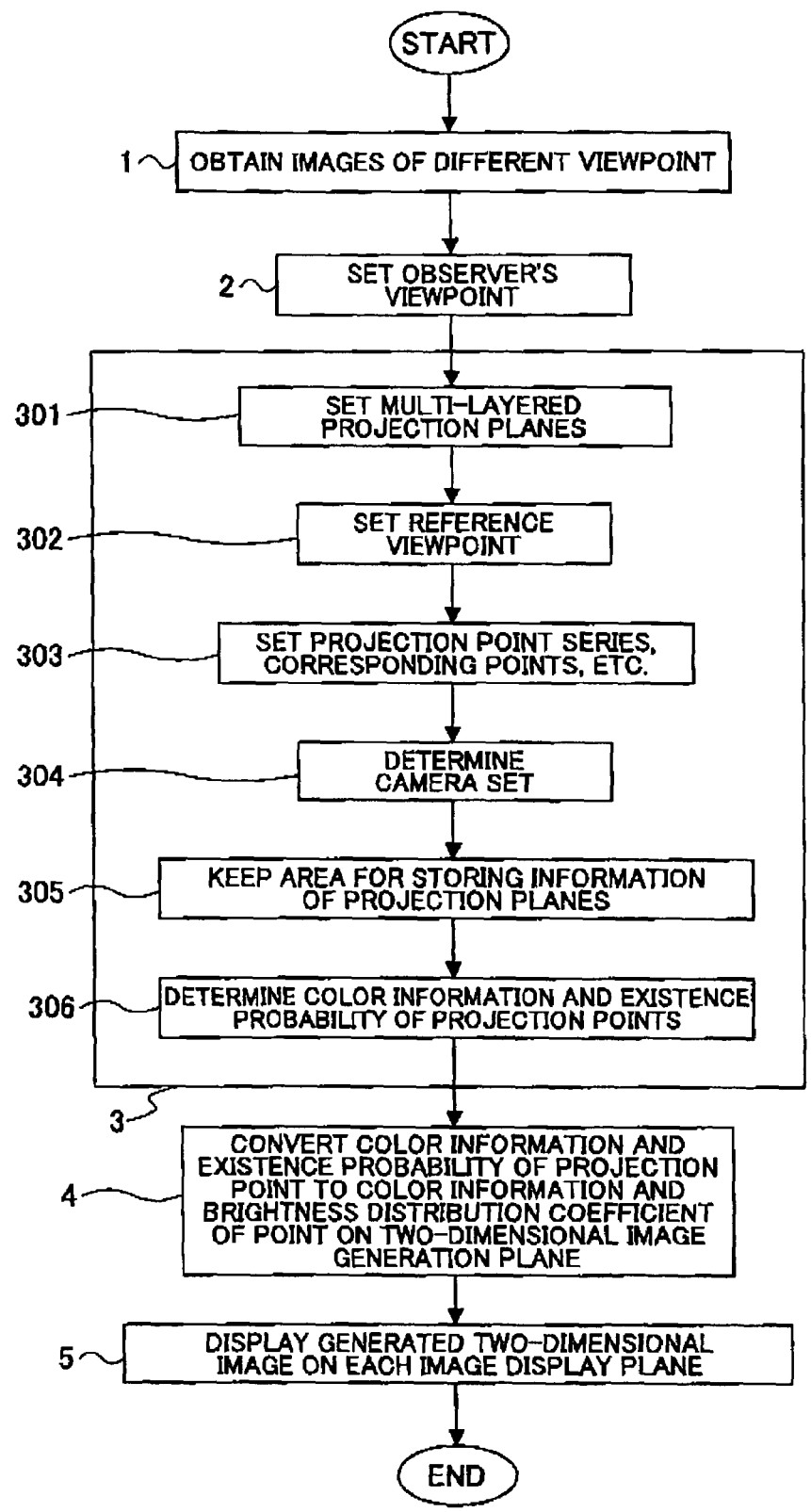
FIG. 29 is a schematic diagram for explaining an image generation method of the embodiment 2-1, and is a flow diagram showing an example of a general processing procedure.
Figure 30:
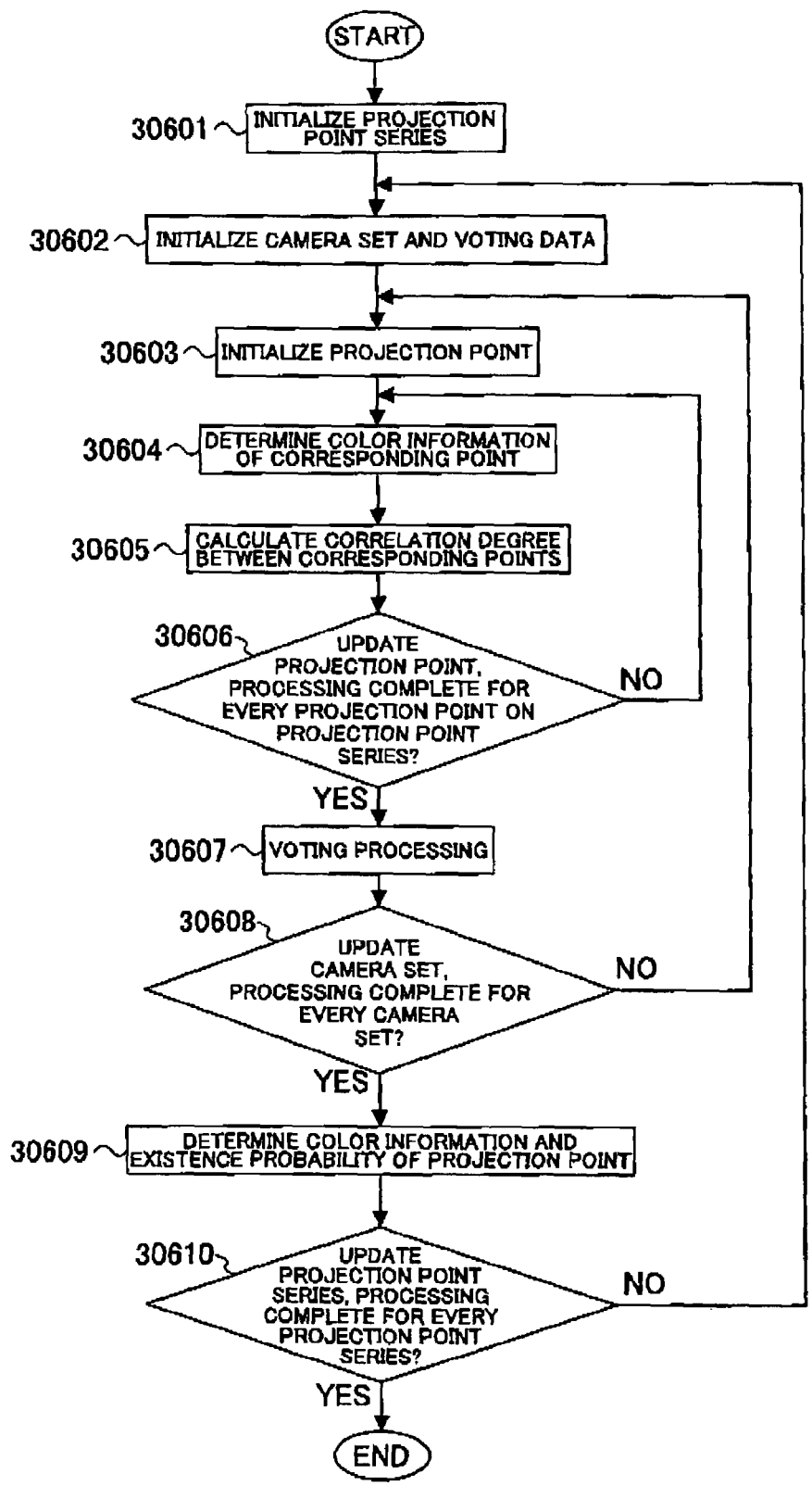
FIG. 30 is a schematic diagram for explaining an image generation method of the embodiment 2-1, and is a flow diagram showing an example of a processing procedure of steps for determining color information and existence probability of projection points in FIG. 29.
Figure 31:
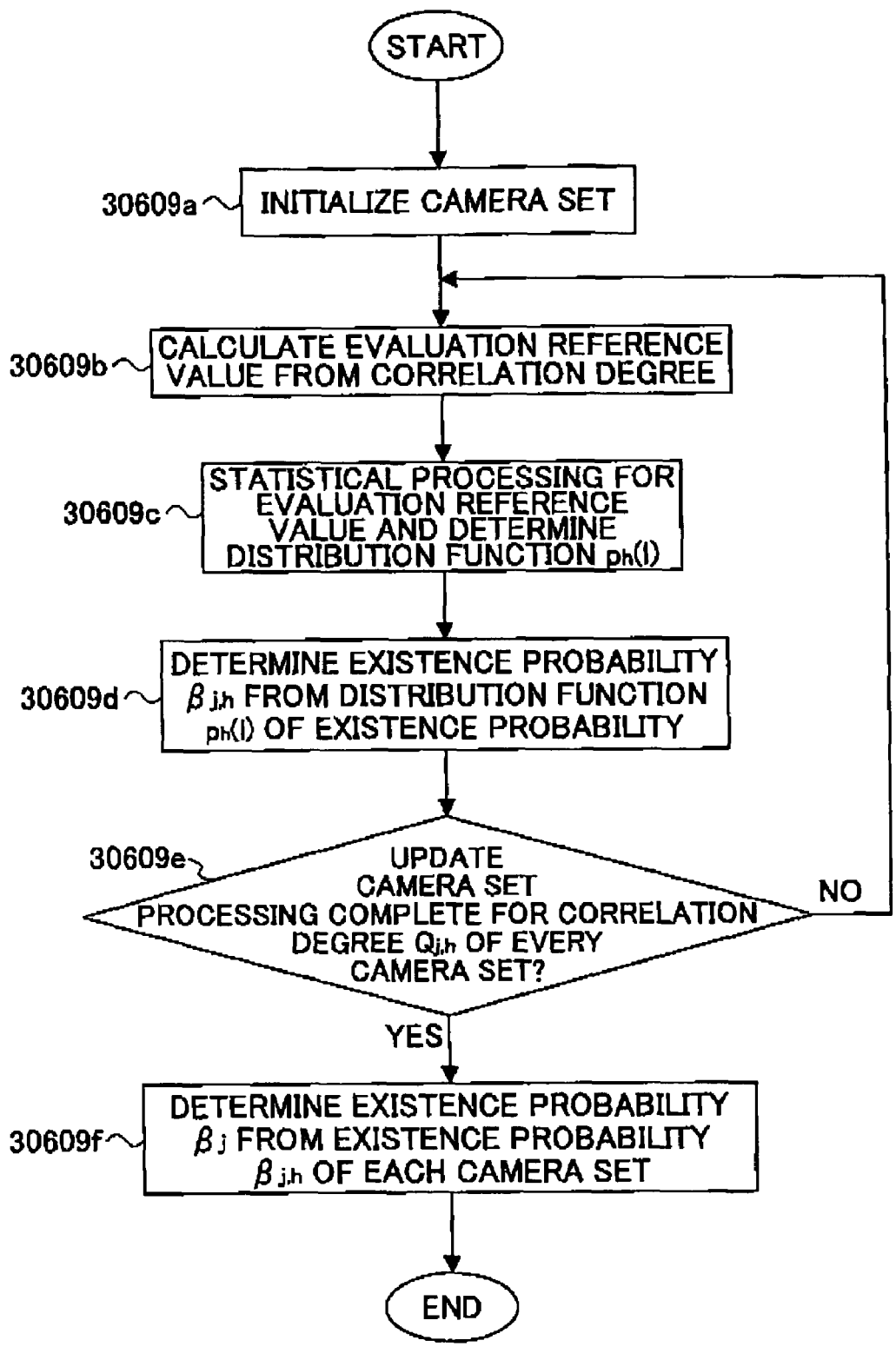
FIG. 31 is a schematic diagram for explaining an image generation method of the embodiment 2-1, and is a flow diagram showing an example of steps for determining the existence probability in FIG. 30.
Figure 33:
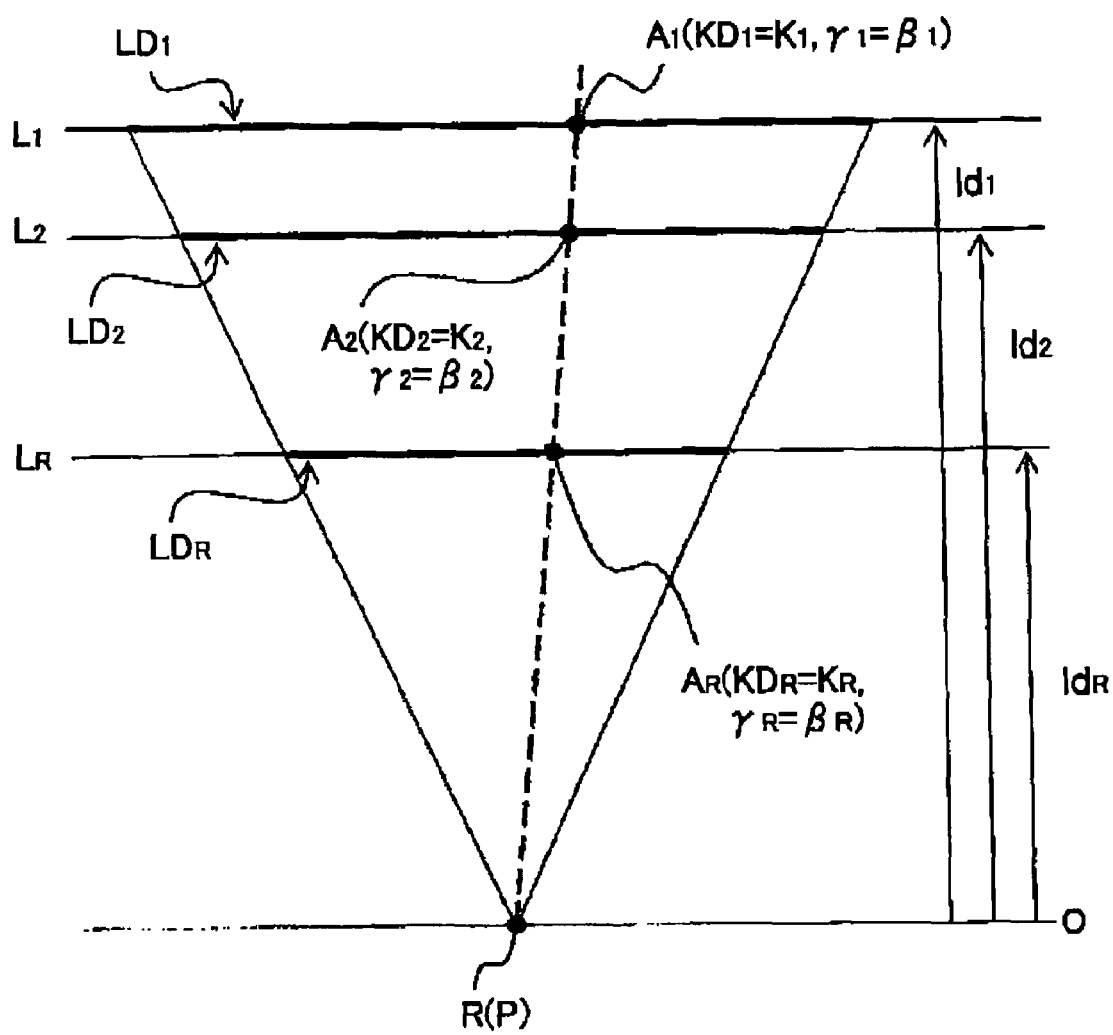
FIG. 33 is a schematic diagram for explaining an image generation method of the embodiment 2-1, and is a diagram for explaining a method for converting information of the projection plane to information of display plane.

FIGS. 29-34 are schematic diagrams for explaining an image generation method of the embodiment 2-1 of the present invention. FIG. 29 is a flow diagram showing an example of a general processing procedure. FIG. 30 is a flow diagram showing an example of a processing procedure of steps for determining color information and existence probability of projection points in FIG. 29. FIG. 31 is a flow diagram showing an example of steps for determining the existence probability in FIG. 30. FIG. 32 is a diagram showing an example foe setting a camera set. FIGS. 33, 34A and 34B are diagrams for explaining a method for converting information of the projection plane to information of display plane.

The image generation method of this embodiment 2-1 is a method in which images taken from plural viewpoints are used, a three-dimensional shape of the object appearing on the images is obtained, and each two-dimensional image to be displayed on each image display plane of the image display means having plural image display planes such as the DFD is generated, for example, based on the obtained three-dimensional shape of the object.

The image generation method includes, as shown in FIG. 29 for example, a step 1 for obtaining the images of the object taken from the viewpoints $C_i$, a step 2 for setting the observer's viewpoint P, a step 3 for obtaining the three-dimensional shape of the object, a step 4 for converting color information and existence probability of each point (projection point) on the projection planes representing the obtained three-dimensional shape to color information and existence probability of each point (display point) on the image display planes so as to generate the two-dimensional images displayed on the image display planes, and a step 5 for displaying the display points on the image display planes with brightness or transparency according to the color information and the existence probability.

The step 3 includes, as shown in FIG. 29 for example, a step 301 for setting projection planes $L_j$ of a multi-layered structure, a step 302 for determining a reference viewpoint for obtaining the three-dimensional shape of the object, a step 303 for setting projection point series each including a group of projection points $T_j$, on the projection planes $L_j$, overlapping when viewed from the reference viewpoint and for setting corresponding points $G_{i,j}$, on each obtained image, corresponding to each projection point $T_j$ of the projection point series, a step 304 for determining a group (to be referred as camera set) $\Xi_h$ of viewpoints $C_i$ for obtaining correlation degrees $Q_j$ of each projection point $T_j$, a step 305 for keeping an array for storing color information and existence probability of the projection points $T_j$, and a step 306 for determining the color information and the existence probability of the projection points $T_j$.

In addition, as shown in FIG. 30 for example, the step 306 includes a step 30601 for initializing the projection point series, a step 30602 for initializing the camera set $\Xi_h$ and voting data, a step 30603 for initializing the projection point $T_j$ on the projection point series, a step 30604 for determining the color information of the projection point $T_j$, a step 30605 for calculating a correlation degree $Q_{j,h}$ using corresponding points $G_{i,j}$ included in the camera set $\Xi_h$ among corresponding points $G_{i,j}$ for the projection point $T_j$, a step 30606 for repeating the step 30604 and the step 30605 for every projection point $T_j$ on the projection point series to be processed, a step 30607 for voting each correlation degree $Q_{j,h}$ obtained for the camera set $\Xi_h$, a step 30608 for updating the camera set $\Xi_h$, and repeating processing from the step 30604 to the step 30607 for every camera set, a step 30609 for determining existence probability of each projection point $T_j$ based on the correlation degree $Q_{j,h}$ voted in the step 30607, and a step 30610 for updating the projection point series and for repeating processing from the step 30602 to the step 30609 for every projection point series.

In addition, as shown in FIG. 31, the step 30609 includes a step 30609a for initializing the camera set $\Xi_h$, a step 30609b for calculating the evaluation reference value $\upsilon_{j,h}$ from the correlation degree $Q_{j,h}$ obtained by using the camera set $\Xi_h$, a step 30609c for determining the distribution function $\rho_h(l)$ of the existence probability by performing statistical processing of the evaluation reference value $\rho_{j,h}$, a step 30609d for determining the existence probability $\beta_{j,h}$ of each projection point $T_j$ from the distribution function of the existence probability, a step 30609e for updating the camera set $\Xi_h$ and repeating processing from the step 30609b to the step 30609d, and a step 30609f for determining the existence probability $\beta_j$ of each projection point $T_j$ by integrating the existence probability $\beta_{j,h}$ obtained for each camera set $\Xi_h$.

When generating the two-dimensional images to be displayed on each image display plane of the DFD, for example, using the image generation method of this embodiment 2-1, images are obtained by taken the object by cameras placed at plural different viewpoints $C_i(i=1,2,...,N)$ (step 1), first. At this time, the viewpoint $C_i$ is a placement position of a camera for taking the image. For example, as shown in FIG. 21, it is assumed that the cameras are arranged one-dimensionally on a line. The arrangement of the viewpoints $C_i$ of the cameras is not limited on the line, but the viewpoints may be arranged on plural lines or on a curve one-dimensionally. In addition, the viewpoints may be arranged like two-dimensional lattice on a plane or a curved surface instead of one-dimensionally. Although color images or black and white images can be obtained as the obtained images, color images in which each point (pixel) on the image is represented by color information using three primary colors of red (R), green (G) and blue (B) are obtained in this embodiment.

Next, the observer's viewpoint P from which the three-dimensional image of the object to be displayed on the DFD is observed is set on a virtual space in an image generation apparatus such as a computer and the like (step 2).

Next, the three-dimensional shape used for generating the image is obtained (step 3). In the step 3, first, projection planes $L_j$ are set in the virtual space for estimating the three-dimensional shape (surface shape) of the object (step 301). At this time, the projection planes $L_j$ are set as planes parallel to the XY plane as shown in FIG. 21, for example. The setting intervals of the projection planes $L_j$ may be or may not be set to be the same as the intervals of the image display planes of the DFD on which the images are displayed.

Next, the reference viewpoint for obtaining the three-dimensional shape of the object is determined (step 302). The reference viewpoint may be the observer's viewpoint, or may be any point on the three-dimensional space other than the observer's viewpoint.

Next, projection point series each being a group of the projection points $T_j$, on each projection plane $L_j$, overlapping when viewed from the observer's viewpoint P or the reference viewpoint, and corresponding points $G_{i,j}$, on the obtained images, corresponding to each projection point $T_j$ are set (step 303).

The projection point $T_j$ is represented as a point $(X_j, Y_j, Z_j)$ on the virtual space (three-dimensional space), and the coordinates of the corresponding point $G_{i,j}$ are represented as $(x_{i,j}, y_{i,j})$ considering a two-dimensional xy coordinate system on the image plane of the image taken from the viewpoint $C_i$. The coordinates $(x_{i,j}, y_{i,j})$ of the corresponding point $G_{i,j}$ are obtained by projecting the projection point $(X_j, Y_j, Z_j)$ to the image plane of the image taken from the viewpoint $C_i$. The general 3 rows and 4 columns conversion matrix described in the first embodiment can be used for the projection.

When using the image generation apparatus like a computer, the image to be processed is a so-called digital image, and is represented by a two-dimensional array in the memory of the apparatus. In the following, the coordinate system representing the position in the array is referred to as digital image coordinate system, and the position is represented as (u,v). For example, considering a digital image of lateral 640 pixels and vertical 480 pixels, a position of each pixel of the digital image can be represented by an argument u that may take any integer from 0 to 639 and an argument v that may take any integer from 0 to 479. The color information of the point can be provided as data obtained by quantizing information of red (R), green (G) and blue (B) at the address into 8 bits, for example.

The coordinates $(x_{i,j}, y_{i,j})$ of the corresponding point $G_{i,j}$ in the three-dimensional virtual space are in a one-to-one correspondence with the digital image coordinate system (u,v). For example, the relationship shown in the equation 53 holds true.

$$\begin{bmatrix} u \\ v \\ 1 \end{bmatrix} = \begin{bmatrix} k_u & -k_u \cot\theta & u_0 \\ 0 & k_v/\sin\theta & v_0 \\ 0 & 0 & 1 \end{bmatrix} \begin{bmatrix} x \\ y \\ 1 \end{bmatrix}$$ [Equation 53]

In the equation 53, the u axis of the digital image coordinate system is set parallel to the x axis. In addition, in the equation 53, $k_u$ and $k_v$ respectively represent unit lengths of the u axis and the v axis of the digital image coordinate system with respect to the (x,y) coordinate system on the virtual space, and θ indicates an angle formed between the u axis and the v axis.

Thus, in the step 303, the coordinates $(X_j, Y_j, Z_j)$ of the projection point $T_j$ are associated with the digital image coordinates $(u_{ij}, v_{ij})$. The establishment of the association may be performed by providing values of $(X_j, Y_j, Z_j)$ in a table for every $(u_{ij}, v_{ij})$, or by setting values of $(X_j, Y_j, Z_j)$ only for representative values of $(u_{ij}, v_{ij})$ so as to obtain other points by performing interpolation processing such as linear interpolation, for example.

In addition, although (u,v) take discrete values in the digital image coordinate system, it is assumed that (u,v) take continuous values unless otherwise specified in the following descriptions, and it is assumed to perform proper discretization processing when accessing the two-dimensional array.

Next, after performing processing of the step 303, groups (camera set) $\Xi_h$ of viewpoints $C_i$ of the cameras used for obtaining the correlation degree $Q_j$ is determined (step 304). When the viewpoints $C_i$, that is, the cameras are placed like a 3×3 lattice as shown in FIG. 32, for example, four camera sets $\Xi_h$ are determined as $\Xi = \{C_1, C_2, C_3, C_5\}$, $\Xi_2 = \{C_3, C_5, C_6, C_9\}$, $\Xi_3 = \{C_5, C_7, C_8, C_9\}$ and $\Xi_4 = \{C_1, C_4, C_5, C_7\}$.

Any method can be adopted as the method for determining the camera sets $\Xi_h$. In the example shown in FIG. 32, the sets are not limited to the four sets $\Xi_1, \Xi_2, \Xi_3$ and $\Xi_4$, so that other camera sets may be provided. In addition, the camera sets $\Xi_h$ may be provided beforehand according to the placement status of the cameras (viewpoints $C_i$), or may be specified by the observer.

Next, after performing the processing of the step 304, an array is kept, in a memory (storing means) of the image generation apparatus, for storing information of the color information $K_j$ of the projection point $T_j$ and the probability $\beta_j$ that the object exists (step 305). As to the array for storing the information, an array is kept such that 8 bits are assigned for each pieces of information $K_j$ and $\beta_j$ at the projection point $T_j$ that are color information of red (R), green (G) and blue (B) and the probability that the object exists.

Next, after performing the processing of the step 305, the color information and the probability that the object exists at each projection point $T_j$ are determined using the obtained plural images (step 306). In the step 306, for a projection point series, processing is performed for obtaining the color information $K_{j,h}$ and the correlation degree $Q_{j,h}$ at each projection point $T_j$ on the projection point series using the specified camera set $\Xi_h$. Then, the processing is repeated for every camera set $\Xi_h$. Then, the repeating processing is repeated for every projection point series. Thus, in the step 306, the projection point series is initialized as shown in FIG. 30, first (step 30601).

Next, the camera set $\Xi_h$ and voting data of correlation degree are initialized (step 30602).

Next, the projection point $T_j$ on the projection point series to be processed is initialized to j=1, for example (step 30603).

Next, the color information $K_{j,h}$ of the projection point $T_j$ is determined based on the color information of the corresponding points $G_{i,j}$ included in the selected camera set $\Xi_h$ (step 30604). At this time, color information $K_{j,h}$ of the projection point $T_j$ is determined as an average of color information $K_{i,j}$ of the corresponding points $G_{i,j}$ included in the camera set $\Xi_h$, for example.

Next, the correlation degree $Q_{j,h}$ of the corresponding points $G_{i,j}$ included in the selected camera set $\Xi_h$ is calculated (30605). At this time, the correlation degree $Q_{j,h}$ is calculated using the equation 40, for example.

Next, the projection point $T_j$ is updated, and it is determined whether processing of the steps 30604 and 30605 is performed for every projection point on the projection point series to be processed (step 30606). When a projection point on which the processing of the steps 30604 and 30605 has not been performed remains, the processing is repeated by returning to the step 30604.

After the processing of the steps 30604 and 30605 is performed for every projection point on the projection point series to be processed, the results, that is, the color information $K_{j,h}$ and the correlation degree $Q_{j,h}$ obtained from the corresponding points $G_{i,j}$ included in the selected camera set $\Xi_h$ are voted (step 30607).

Next, after completing the processing of the step 30607, the camera set $\Xi_h$ is updated, and it is determined whether there is a camera set for which processing of steps 30604-30607 has not been performed for the projection point series to be processed (step 30608). When there is a camera set for which processing of steps 30604-30607 has not been performed, the processing is repeated by returning to the step 30603.

After performing the processing of steps 30604-30607 for every camera set $\Xi_h$ for the projection point series to be processed, the color information $K_j$ and the existence probability $\beta_j$ of the projection points $T_j$ are determined from the color information $K_{j,h}$ and the correlation degree $Q_{j,h}$ that are voted at the step 30607 (step 30609), In the step 30609, the camera set $\Xi_h$ is initialized first as shown in FIG. 31, for example (step 30609a).

Next, the evaluation reference value $\upsilon_{j,h}$ is calculated from the correlation degree $Q_{j,h}$ of each projection point $T_j$ calculated using the camera set $\Xi_h$ (step 30609b). The evaluation reference value $\upsilon_{j,h}$ is obtained by performing conversion processing represented by the equation 43 and the equation 44, for example.

Next, statistical processing for the evaluation reference value $\upsilon_{j,h}$ is performed, so that the distribution function $\rho_h(l)$ of the existence probability when the camera set $\Xi_h$ is used is obtained (step 30609c). The distribution function $\rho_h(l)$ is obtained using the equation 45, the equation 46 and the equation 47, for example.

Next, based on the distribution function $\rho_h(l)$ of the existence probability in the case when the camera set $\Xi_h$ is used, the probability (existence probability) $\beta_{j,h}$ that the surface of the object exits on each projection point $T_j$ is determined (step 30609d). The existence probability $\beta_{j,h}$ is determined using the equation 48, the equation 49 and the equation 50, for example.

Next, the camera set $\Xi_h$ is updated, and it is determined whether there is a camera set $\Xi$ for which processing from the step 30609b to the step 30609d has not been performed (step 30609e). When there is a camera set $\Xi$ for which processing from the step 30609b to the step 30609d has not been performed, the processing is repeated by returning to the step 30609b.

After performing the processing from the step 30609b to the step 30609d for the projection point series to be processed, the processing results are integrated so that the color information $K_j$ and the existence probability $\beta_j$ at the projection point $T_j$ are determined (step 30609f). At this time, the color information $K_j$ is obtained using the equation 52, for example. The existence probability $\beta_j$ is obtained using the equation 51, for example.

After completing the processing of the step 30609f, the processing of the step 30609 completes. Then, next, the projection point series is updated, and it is determined whether there is projection point series for which processing from the step 30602 to the step 30609 has not been performed (step 30610). When there is projection point series for which processing from the step 30602 to the step 30609 has not been performed, the processing is repeated by returning to the step 30602.

After performing processing from the step 30602 to the step 30609 for every projection point series, processing of the step 306 (step 3) completes so that the three-dimensional shape of the object can be obtained.

Next, after the processing of the step 3 completes and the three-dimensional shape of the object is obtained, two-dimensional images to be displayed on each image display plane of the DFD are generated based on the three-dimensional shape of the object. For generating the two-dimensional image, image generation planes $LD_r(r=1,2,\ldots,R)$ for generating the two-dimensional images are set on the virtual space from which the shape of the object is obtained as shown in FIG. 33, for example.

First, a case is considered in which the setting number of the projection planes $L_j$ and the intervals are the same as the number of the image generation planes $LD_r$ and the intervals respectively. In this case, the color information $KD_h$ and the existence probability $\gamma_r$ at a display point $A_r$ on the image generation plane $LD_r$ are determined to be the color information $K_j$ and the existence probability $\beta_j$ at the projection point $T_j$ the same as the display point $A_r$.

Figure 34A:
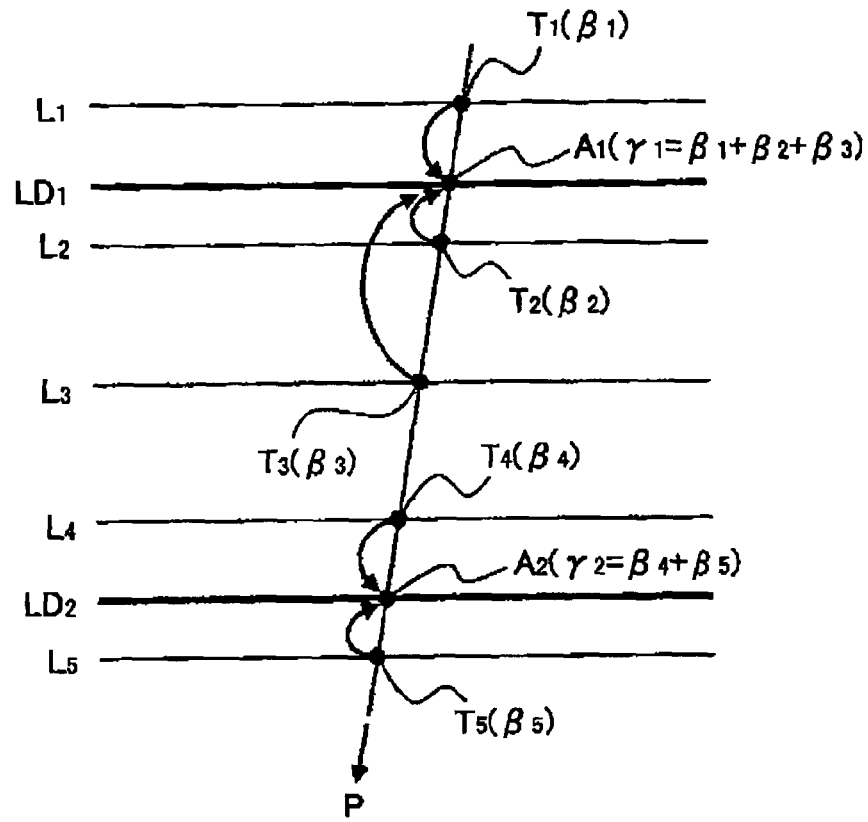
FIGS. 34A and 34B are diagrams for explaining a method for converting information of the projection plane to information of display plane.

The setting intervals of the projection planes $L_j$ are not necessarily the same as the placement intervals of the image generation planes $LD_r$, and the setting number of the projection planes $L_j$ is not necessarily the same as the setting number of the image generation planes $LD_r$. That is, according to the setting method of the projection planes $L_j$, there is a case where the setting intervals of the projection planes $L_j$ are not the same as the placement intervals of the image generation planes $LD_r$ as shown in FIG. 34A, for example. In such a case, the color information $KD_r$ and the existence probability $\gamma_r$ at the cross points (display point) $A_r$ of the line lr extending from the observer's viewpoint P and each image generation surface $LD_r$ are obtained according to the following procedure.

First, the color information $KD_r$ at each display point $A_r$ is determined to be an average value of color information K of projection points T, that is the projection points $T_j$ on the line lp, for which the display point $A_r$ (image generation plane $LD_r$) becomes the nearest display point (image generation plane). Instead of the average valuer the color information $KD_r$ at the display point $A_r$ may be determined as color information K of a projection point T nearest to the display point $A_r$.

On the other hand, the existence probability of the display point $A_r$ is determined as a value obtained by adding existence probabilities $\beta$ of projection points T for which the display point $A_r$ (image generation plane $LD_r$) becomes the nearest display point (image generation plane). Assuming that a set of projection planes $L_j$ for which an image generation plane $LD_r$ becomes the nearest image generation plane is $\{L_j | j \in R\}$, the existence probability $\gamma_h$ of the display point $A_r$ on the image generation plane $LD_r$ can be obtained by the following equation 54 using the existence probability $\beta_j$ of the projection points $T_j$ of each projection plane $L_j$.

$$\gamma_h = \sum_{j \in J} \beta_j \qquad \text{[Equation 54]}$$

Considering the case shown in FIG. 34A, the image generation plane $LD_1$ becomes the nearest image generation plane for the projection planes $L_1$, $L_2$ and $L_3$. Therefore, the color information $KD_r$ of the display point $A_r$ is determined to be an average value of the pieces of color information $K_1$, $K_2$ and $K_3$ of the projection points $T_1$, $T_2$ and $T_3$, for example. In addition, the existence probability $\gamma_r$ of the display point $A_r$ is determined to be a sum of the existence probabilities $\beta_1$, $\beta_2$ and $\beta_3$ of the projection points $T_1$, $T_2$ and $T_3$, for example. In the same way, the color information $KD_2$ of the display point $A_2$ on the image generation plane $LD_2$ is determined to be an average value of the pieces of color information $K_4$ and $K_5$ of the projection points $T_4$ and $T_5$, for example. In addition, the existence probability $\gamma_2$ of the display point $A_2$ is determined to be a sum of the existence probabilities $\beta_4$ and $\beta_5$ of the projection points $T_4$ and $T_5$, for example.

Figure 34B:
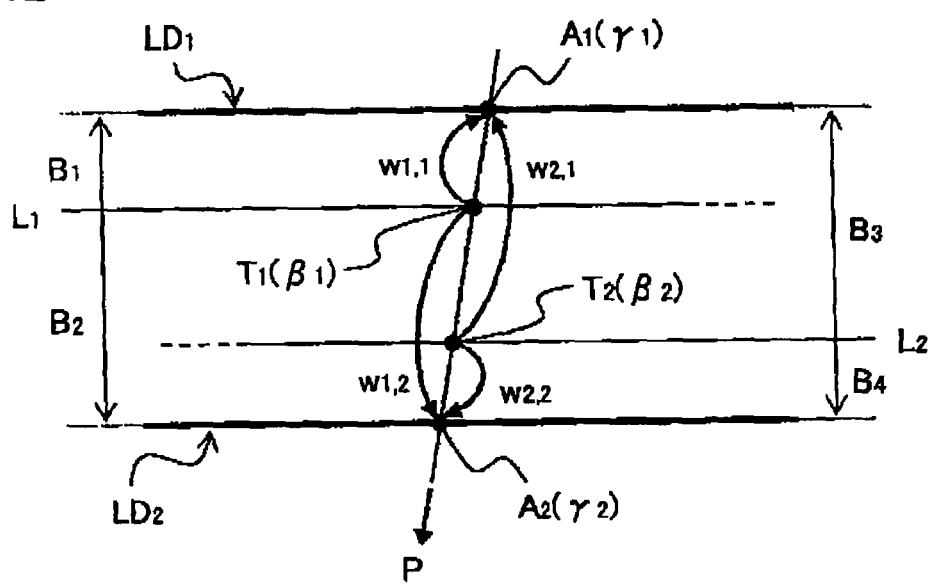

In addition, for example, when the setting intervals of the image generation planes $D_r$ are not the same as the setting intervals of the projection planes $L_j$ so that two projection planes $L_1$ and $L_2$ are set between two successive image generation planes $LD_1$ and $LD_2$ as shown in FIG. 34B, for example, the existence probability $\gamma_1$, $\gamma_2$ of the display point $A_1$, $A_2$ of the image generation plane $LD_1$, $LD_2$ may be obtaining by distributing the existence probability $\beta_j$ of the projection point $T_j$ of the projection plane $L_j$ according to the ratio of distance to each image generation plane $LD_1$, $LD_2$. Generally, assuming that a set of plural projection planes $L_j$ between the image generation planes $LD_1$ and $LD_2$ is $\{L_j | j \in J\}$, the existence probability $\gamma_r$ of the display point $A_r$ on the image generation plane $LD_r$ can be supplied by the following equation 55 using the existence probability $\beta_j$ of each projection point $T_j$.

$$\gamma_h = \sum_{j \in J} w_{j,r} \beta_j \quad \text{[Equation 55]}$$

wherein $w_{j,r}$ indicates a coefficient representing a degree of contribution of the projection plane $L_j$ to the image generation plane $LD_r$.

Here, it is considered that projection planes $L_1$ and $L_2$ are set between the two image generation planes $LD_1$ and $LD_2$ as shown in FIG. 34B. At this time, when the distances from the projection plane $L_1$ to each of the image generation planes $LD_1$, and $LD_2$ are $B_1$, and $B_2$ respectively, the degrees $w_{1,1}$ and $w_{1,2}$ of contribution of the projection plane $L_1$ to the image generation planes $LD_1$, and $LD_2$ are provided respectively by the following equation 56.

$$w_{1,1} = \frac{B_2}{B_1 + B_2}, \quad \text{[Equation 56]}$$
$$w_{1,2} = \frac{B_1}{B_1 + B_2}$$

In the same way, when the distances from the projection plane $L_2$ to each of the image generation planes $LD_1$ and $LD_2$ are $B_3$ and $B_4$ respectively, the degrees $w_{2,1}$ and $W_{2,2}$ of contribution of the projection plane $L_2$ to the image generation surfaces $LD_1$ and $LD_2$ are provided respectively by the following equation 57.

$$w_{2,1} = \frac{B_4}{B_3 + B_4}, \quad \text{[Equation 57]}$$
$$w_{2,2} = \frac{B_3}{B_3 + B_4}$$

As a result, the existence probability $\gamma_1$ of the display point $A_1$ of the image generation plane $LD_1$ and the existence probability $\gamma_2$ of the display point $A_2$ of the image generation plane $LD_2$ can be supplied respectively by the following equation 58.

$$\gamma_1 = w_{1,1}\beta_1 + w_{1,2}\beta_2, \gamma_2 = w_{1,2}\beta_1 + w_{2,2}\beta_2 \quad \text{[Equation 58]}$$

According to the above-mentioned procedure, by performing the processing of the step 4, the two-dimensional images to be displayed on each image display plane of the DFD can be obtained. Then, each point (pixel) on each image display plane of the DFD is displayed with color information A that is assigned to each point on each image generation plane LD (step 5). At this time, when the DFD is the brightness modulation type, color information $KD_r$ of each display point $A_r$ of each image generation plane $LD_r$ is displayed with brightness according to the existence probability $\gamma_r$. When the DFD is the transmission type, transparency of each display point $A_r$ is set to transparency according to the existence probability $\gamma_r$, and it is displayed.

Accordingly, by performing the processing from the step 1 to the step 5 shown in FIG. 29 so as to display the three-dimensional image of the object on the DFD, a three-dimensional image that looks natural for the observer can be displayed without obtaining the accurate three-dimensional shape of the object as described in the principle.

Figure 35:
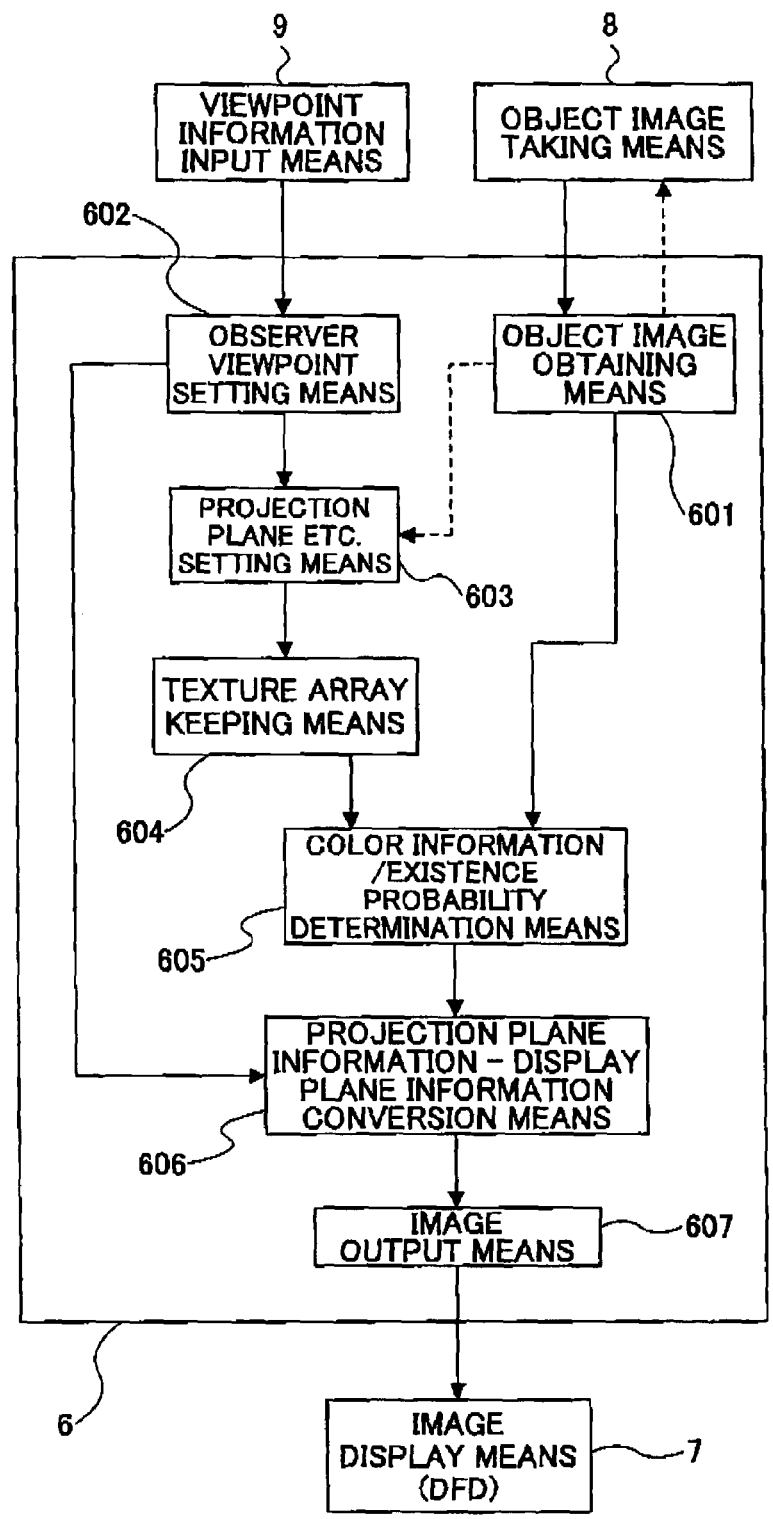
FIG. 35 is a block diagram showing a configuration example of the image generation apparatus to which the image generation method of the embodiment 2-1 is applied.
Figure 36:
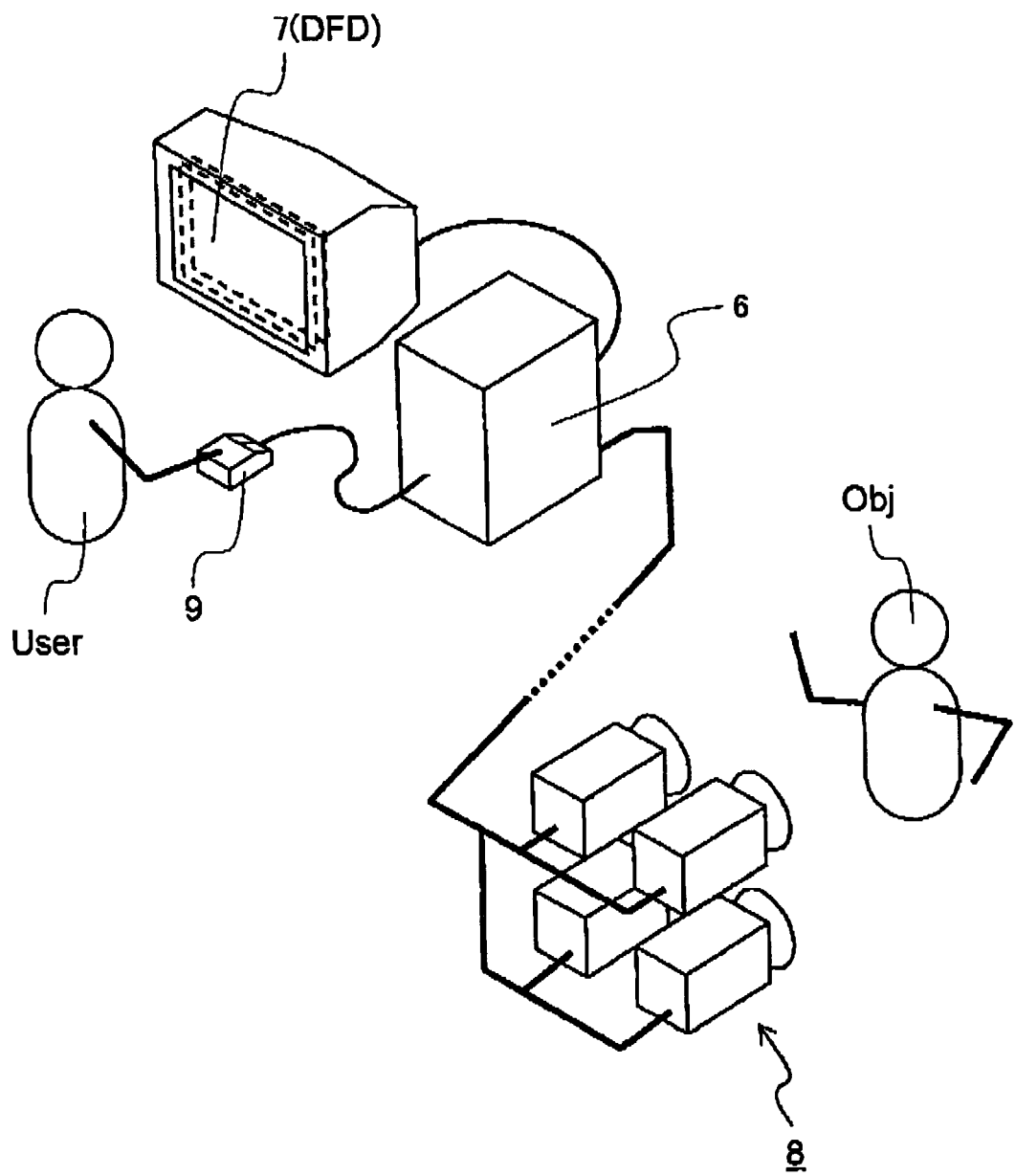
FIG. 36 is a diagram showing a configuration example of an image display system using the image generation apparatus to which the image generation method of the embodiment 2-1 is applied.
Figure 37:
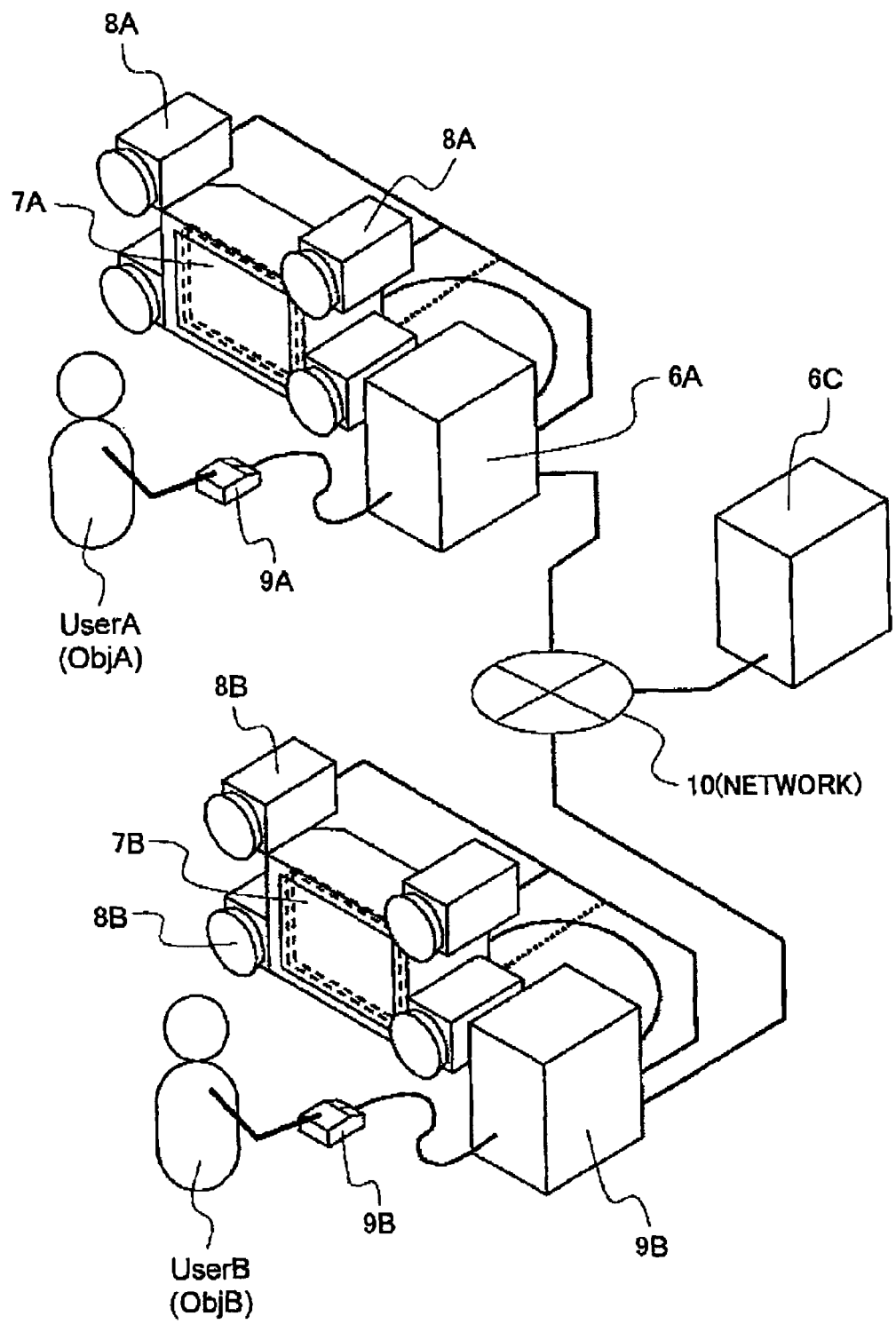
FIG. 37 is a diagram showing another configuration example of an image display system using the image generation apparatus to which the image generation method of the embodiment 2-1 is applied.

FIGS. 35-37 are schematic diagrams showing general configurations of an apparatus and a system to which the image generation method of this embodiment 2-1 is applied. FIG. 35 is a block diagram showing a configuration example of the image generation apparatus. FIG. 36 is a diagram showing a configuration example of an image display system using the image generation apparatus. FIG. 37 is a diagram showing another configuration example of the image display system using the image generation apparatus.

In FIG. 35, 6 indicates the image generation apparatus, 601 indicates an object image obtaining means, 602 indicates a reference viewpoint setting means, 603 indicates a projection plane setting means, 604 indicates a projection plane information storing area keeping means, 605 indicates a color information/existence probability determination means, 606 indicates a projection plane information—display plane information conversion means, 607 indicates an image output means, 7 indicates an image display means (DFD), 8 indicates an object image taking means, and 9 indicates an observer viewpoint input means.

As shown in FIG. 35, for example, the image generation apparatus 6 to which the image generation method of this embodiment 2-1 is applied includes the object image obtaining means 601 for obtaining plural object images taken under different photographing conditions, the reference viewpoint setting means 602 for setting a viewpoint of the observer who observes a generated image, the projection plane setting means 603 for setting projection planes, projection point series, projection points, camera sets and the like for determining the existence probability, the projection plane information storing area keeping means 604 for keeping an area for storing color information and existence probability of points (projection points) on the projection plane, the color information/existence probability determination means 605 for determining the color information of the projection points and the probability (existence probability) that the object exist at the projection points, the projection plane information—display plane information conversion means 606 for converting the color information and the existence probability information of the projection point to color information and existence probability of the display plane, and the image output means 607. An image output from the image output means 607 is displayed by the image display means 7 such as the DFD including plural overlapping display planes.

The object image obtaining means 601 obtains images of the object taken by the object image taking means (camera) 8. The image to be obtained may be one directly obtained from the image taken by the object image taking means 8, or may be indirectly obtained from a recording medium that is magnetic, electrical or optical that stores the image taken by the object image taking means 8.

The observer viewpoint setting means 602 sets relative position relationship between the observer's viewpoint P and the image generation planes $LD_r$ such as distance from the viewpoint P to the image display means 7 and the line of sight based on information that is input by the observer using the image condition input means 9 such as the mouse or a keyboard, for example. The image condition input means 9 may be a means for detecting posture or line of sight of the observer so as to input information according to the posture or the line of sight.

The projection plane etc. setting means 603 sets parallel projection planes $L_j$ in which the distances from the projection planes $L_j$ from the viewpoint (camera) $C_i$ are $l_j$(j=1,2, ..., M). In addition, the projection plane setting means 603 also sets projection point series each being a group of projection points $T_j$ on each projection plane $L_j$ overlapping when viewed from the observer's viewpoint P set by the observer viewpoint setting means 602, and the corresponding points $G_{i,j}$, on each image, corresponding to the projection point $T_j$. In addition, the projection plane setting means 603 may set camera sets $\Xi_h$ based on the condition input by the image condition input means 9.

The projection plane information storing area keeping means 604 keeps the area for the color information $K_j$ and the existence probability $\beta_j$ of each projection point $T_j$ on each projection plane in a memory provided in the apparatus, for example.

The color information/existence probability determination means 605 determines the color information $K_j$ of the projection point $T_j$ from color information of corresponding points $G_{ij}$ on the images corresponding to the projection point $T_j$, and determines the probability $\beta_j$ that the surface of the object exists on the projection point $T_j$ based on the before-mentioned principle.

The projection plane information—display plane information conversion means 606 converts the color information and the existence probability of the projection plane into color information and the brightness distribution ratio of a point on the plane on which the image to be displayed on the display plane of the image display means 7 is generated, that is, converts the color information and the existence probability of the projection plane into color information and the brightness distribution ratio of a point on the image generation plane.

The image generation apparatus 6 performs processing from the step 1 to the step 5 described in this embodiment 2-1 to generate the image to be displayed on the DFD. That is, it is not necessary for the image generation apparatus 6 to perform processing for obtaining an accurate three-dimensional shape of the object as conventionally performed. Therefore, even by an apparatus that does not have high processing ability, the images to be displayed on the DFD can be generated easily and at high speed.

The image generation apparatus 6 can be also realized by a computer and a program executed by the computer, for example. In such as case, a program that describes instructions corresponding to the processing procedure described in this embodiment 2-1 is executed on the computer. In addition, the program can be provided by storing in a recording medium that is magnetic, electrical or optical, or can be provided via a network such as the Internet.

In addition, the image display system using the image generation apparatus 6 can be considered to be configured as shown in FIG. 36, for example. In the configuration, the object image taking means 8 may be placed at a place near the space where the observer User observes the image display means (DFD) 7, or may be placed at a place geographically apart. When the object image taking means 8 is placed at the geographically apart place, the taken images can be transferred to the image generation apparatus 6 using a network such as the Internet.

In addition, as shown in FIG. 36, the image display system using the image generation apparatus 6 can be applied not only to a case where an observer User observes an object Obj but also to a bi-directional communication system such as TV phone and TV conference. In the case, spaces in which the observers UserA and UserB exist are respectively provided with image generation apparatuses 6A and 6B, image display means (DFDs) 7A and 7B, object image taking means 8A and 8B, and reference viewpoint setting means 9A and 9B as shown in FIG. 37, for example. Then, for example, by connecting between the image generation apparatuses placed at the spaces where the observers UserA and UserB exist by the network 10 such as the Internet, the observer UserA can observe, by the image display means 7A, the three-dimensional image of the observer UserB generated from the images taken by the object image taking means 8B. In the same way, the observer UserB can observe, by the image display means 7B, the three-dimensional image of the observer UserA generated from the images taken by the object image taking means 8A.

In addition, for applying the image generation apparatuses to such bi-directional communication system, it is not necessary that both of the image generation apparatuses 6A and 6B are configured as those shown in FIG. 35. Either one of the image generation apparatuses 6A and 6B can be a general communication terminal that does not include the configuration means shown in FIG. 35. In addition, each configuration means shown in FIG. 35 may be distributed to the image generation apparatuses 6A and 6B.

In addition, as shown in FIG. 37, if another image generation apparatus 6C is provided on the network 10, the three-dimensional image of the object to be displayed on the image display means (DFD) 7A and 7B can be obtained using the image generation apparatus 6C on the network 10 even when the image generation apparatuses 6A and 6B are not placed at the spaces where the observers UserA and UserB exists.

In addition, in the image generation system shown in FIG. 37, although the number of the users UserA and UserB are two, the image generation scheme can be applied to a communication system among more observers (users).

In addition, although FIGS. 36 and 37 show that the object image taking means includes four cameras, the number of the cameras may be two or three or more than four. In addition, the cameras may be placed one-dimensionally on a line or a curve, or placed like a two-dimensional lattice on a plane or a curved surface.

As described above, according to the image generation method of this embodiment 2-1, the three-dimensional image that looks natural for the observer can be displayed without obtaining an accurate three-dimensional shape of the object to be displayed.

In addition, in the image generation method of this embodiment 2-1, although processing is performed by setting the camera sets $\Xi_h$ in step 304 beforehand, the processing is not limited to this way. The camera sets may be dynamically set by software processing such that the sets matches conditions specified by the observer while performing processing for generating the images to be displayed, for example. In this case, by inputting the conditions such as distribution or threshold of the correlation degree $Q_j$ from the image condition input means by the observer and by performing processing of the step 306 while searching for camera sets that match the conditions, it can be considered that the three-dimensional image close to an image desired by the observer can be displayed.

In addition, in the image generation method of this embodiment 2-1, although a case is described as an example in which a color image in which the point (pixel) is represented by color information using three primary color of red (R), green (G) and blue (B) is obtained and the three-dimensional shape of the object is generated, the image to be obtained is not limited to the color image. In the image generation method of this embodiment 2-1, a black and white image in which the point (pixel) is represented by brightness (Y) and color-difference (U,V) may be obtained so as to obtain the three-dimensional shape of the object. In the case when the image to be obtained is the black and white image, the three-dimensional shape can be obtained, by the procedure described in this embodiment 2-1, using brightness information (Y) as information corresponding to the color information so that the two-dimensional images can be generated.

(Embodiment 2-2)

Figure 38:
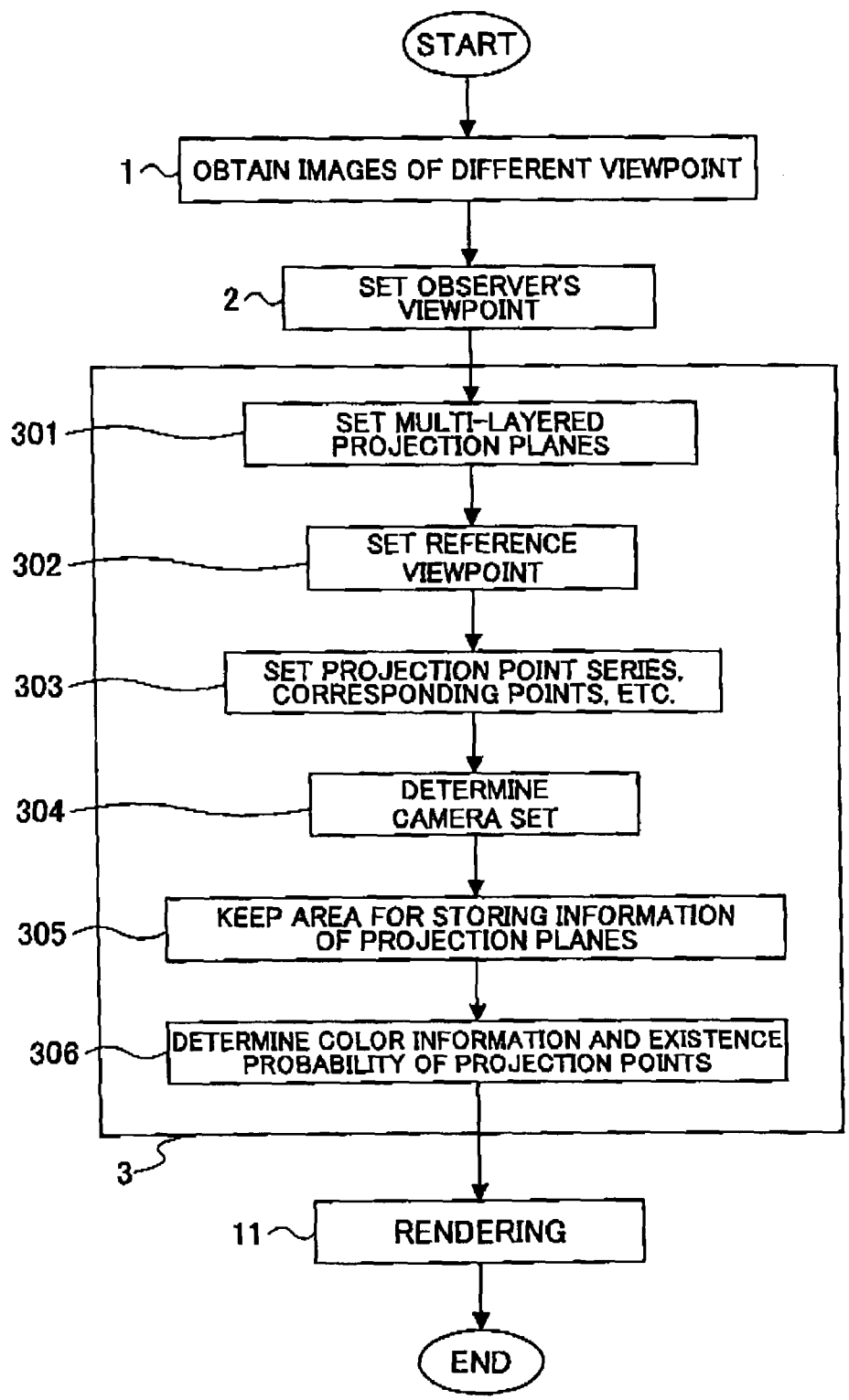
FIG. 38 is a schematic diagram for explaining an image generation method of the embodiment 2-2, and is a flow diagram showing an example of the whole processing procedure.
Figure 39:
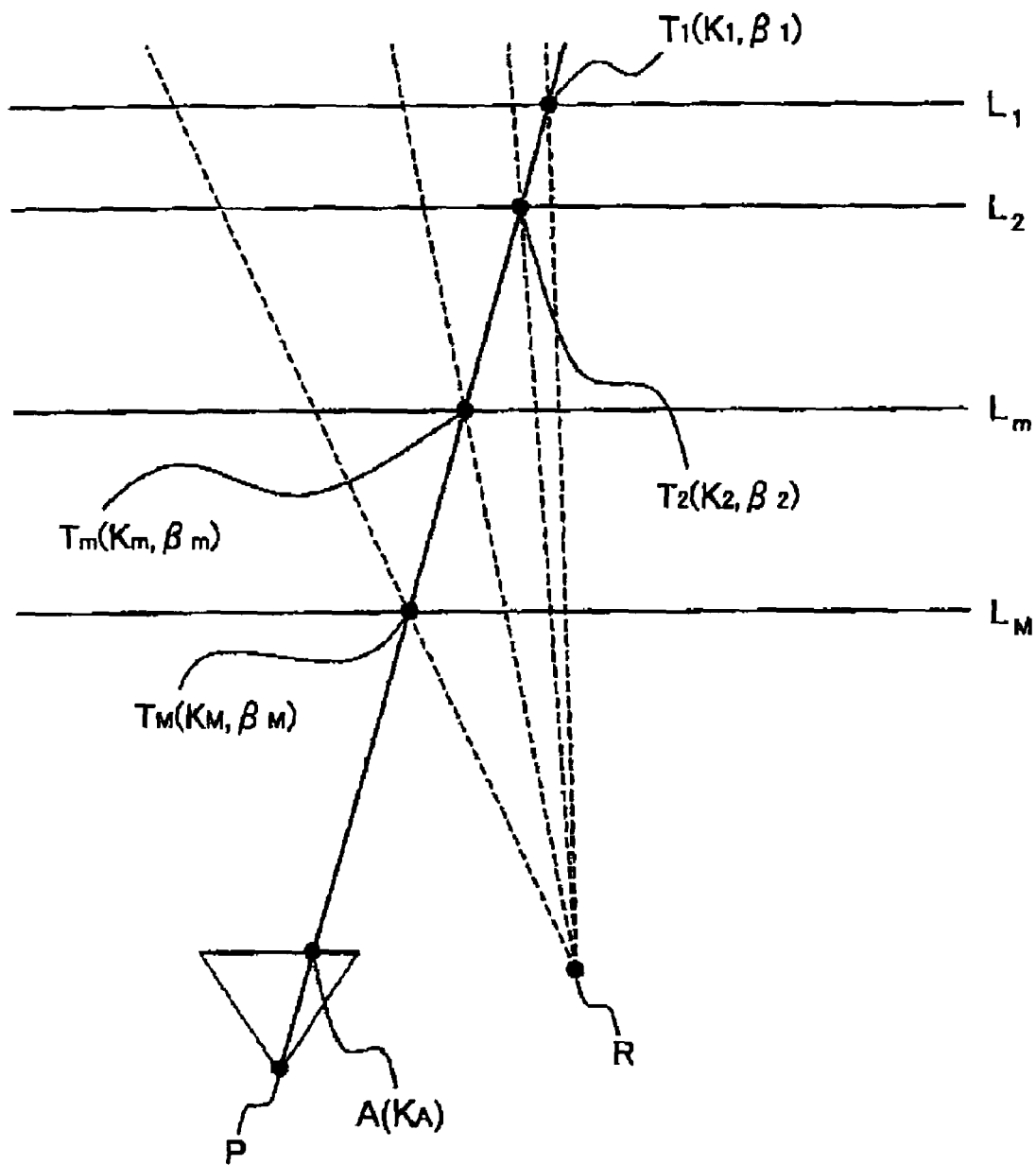
FIG. 39 is a schematic diagram for explaining an image generation method of the embodiment 2-2, and is a diagram for explaining a principle of rendering.
Figure 40:
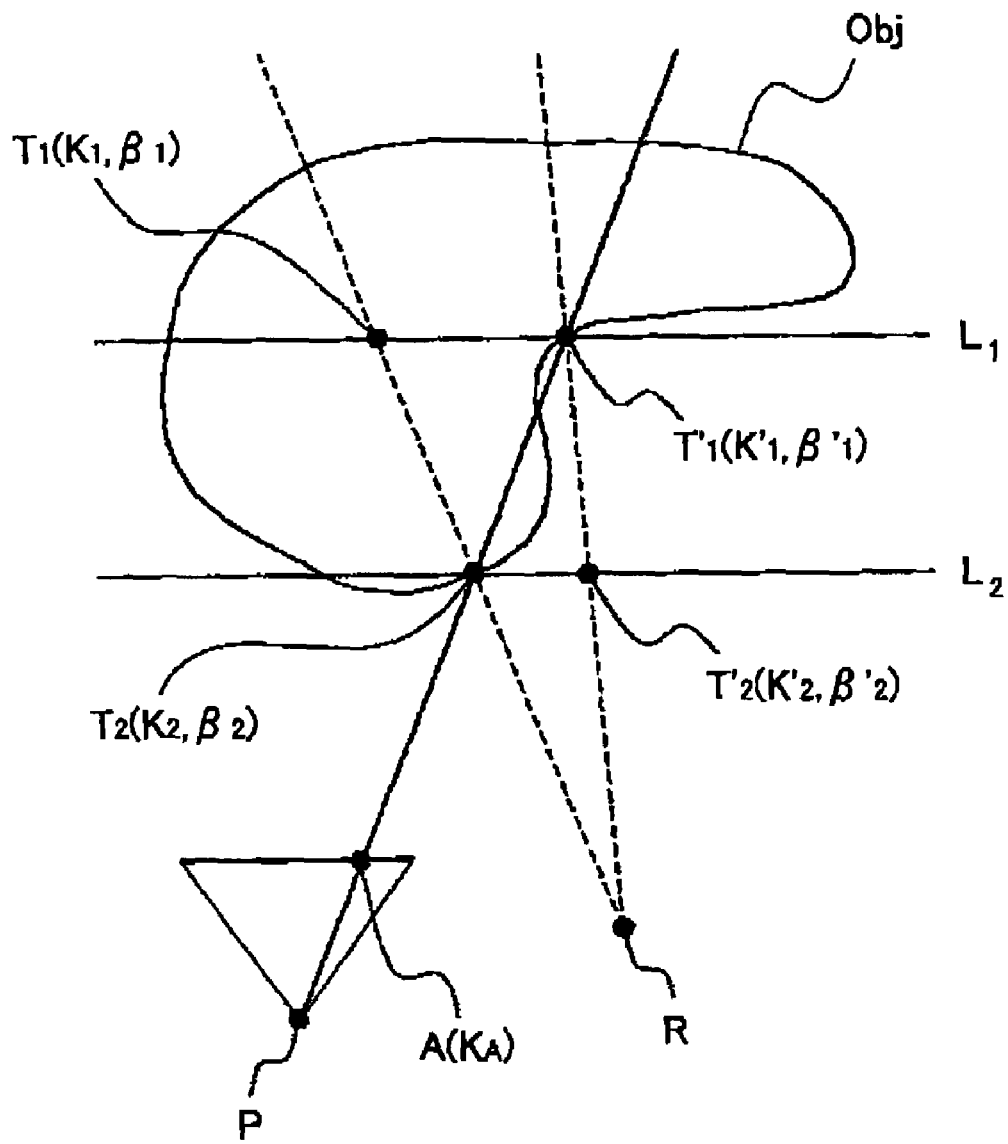
FIG. 40 is a schematic diagram for explaining an image generation method of the embodiment 2-2, and is a diagram for explaining problems that arise in the image generation method in this embodiment.
Figure 41A:
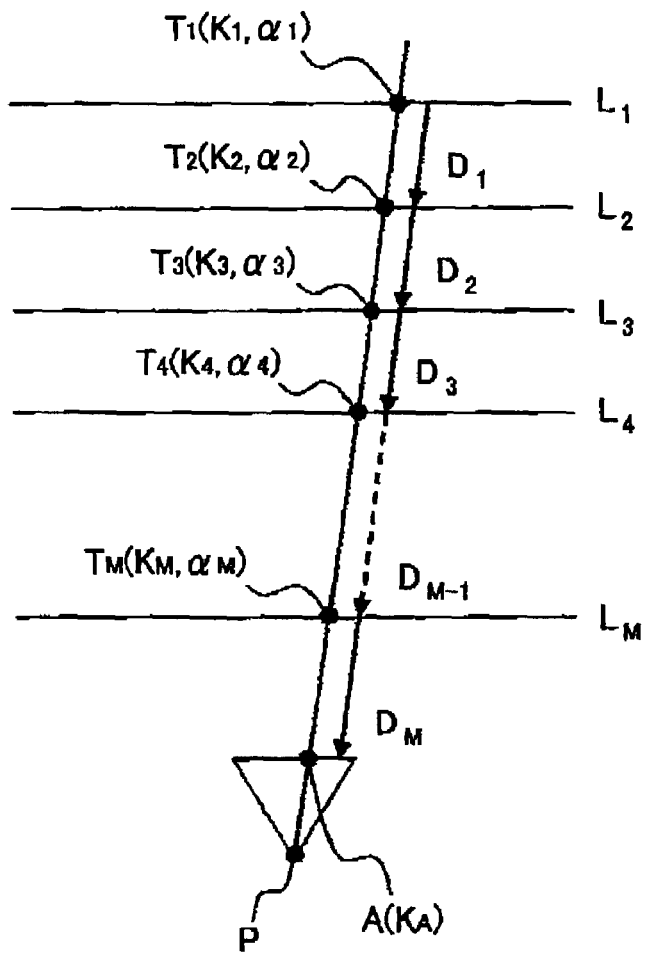
FIGS. 41A and B are schematic diagrams for explaining an image generation method of the embodiment 2-2, and are diagrams for explaining a method for solving the problems that arise in the image generation method in this embodiment.
Figure 41B:
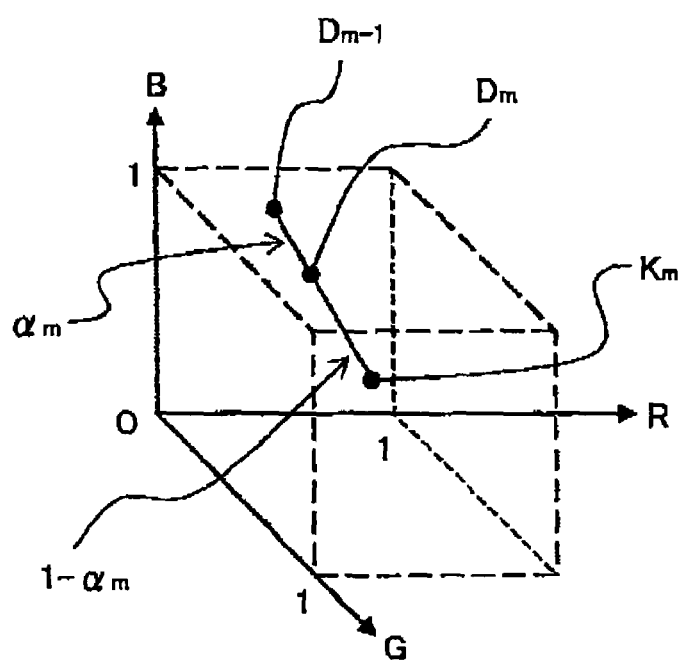
Figure 42:
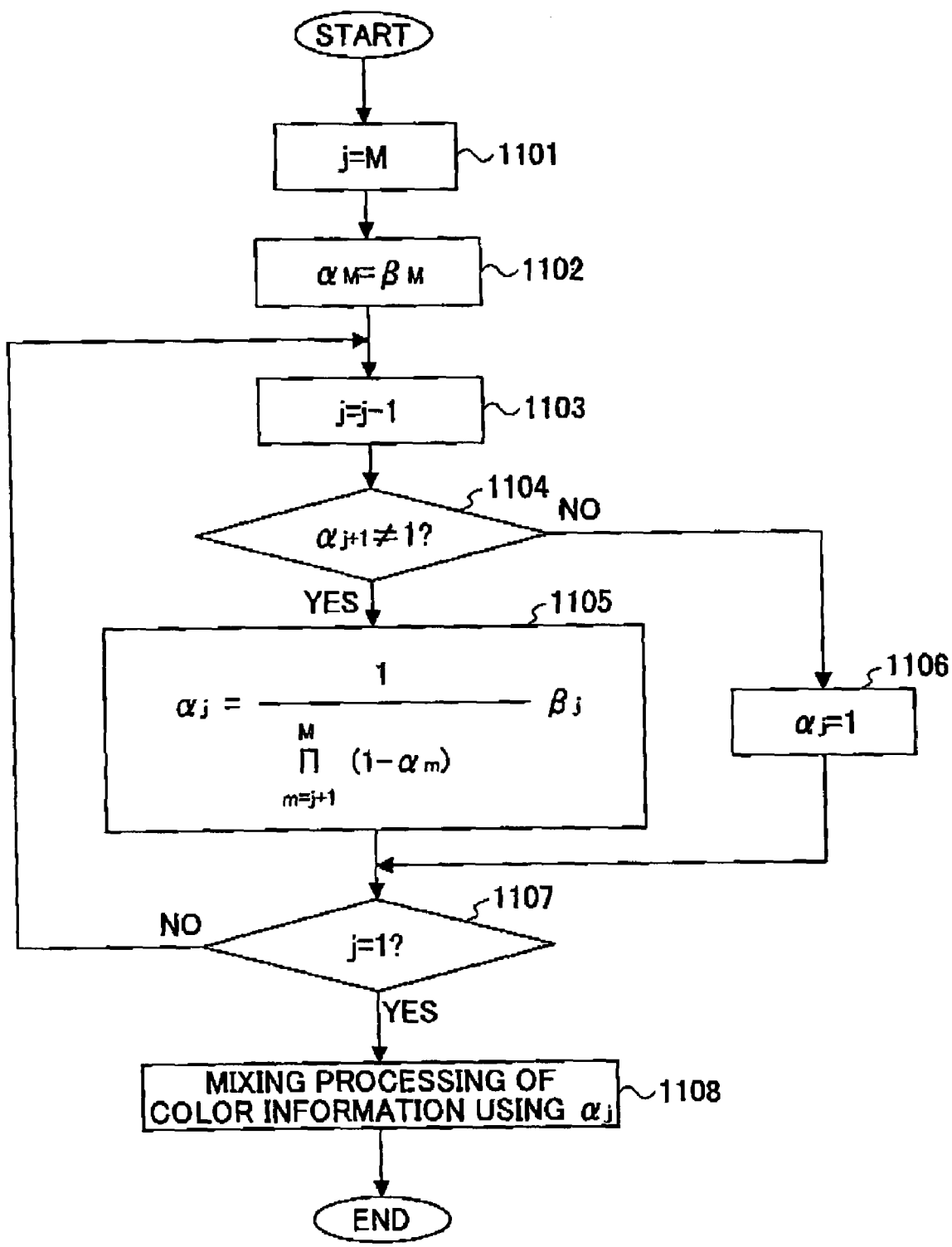
FIG. 42 is a schematic diagram for explaining an image generation method of the embodiment 2-2, and is a flow diagram showing an example of the processing procedure for converting the existence probability to transparency.

FIG. 38-42 are block diagrams for explaining an arbitrary viewpoint image generation method of the embodiment 2-2. FIG. 38 is a flow diagram showing an example of the whole processing procedure. FIG. 39 is a diagram for explaining a principle of rendering. FIG. 40 is a diagram for explaining problems that arise when generating the arbitrary viewpoint image. FIGS. 41A and B are diagrams for explaining a method for solving the problems that arise when generating the arbitrary viewpoint image. FIG. 42 is a flow diagram showing an example of the processing procedure for converting the existence probability to transparency.

In the embodiment 2-1, although a method for generating the two-dimensional images to be displayed on each image display plane of the, apparatus having plural image display planes like the DFD using the three-dimensional shape of the object obtained in the step 3 is taken as an example, the three-dimensional shape of the object is not limited to that, but it can be also used for generating two-dimensional images of the object viewed from arbitrary viewpoints. In this case, the difference compared to the embodiment 2-1 is that rendering is performed after the step 3, that is, processing of step 11 for generating the two-dimensional images of the object viewed from the observer's viewpoint based on the three-dimensional shape. Since the processing from the step 1 to the step 3 in which the three-dimensional shape of the object is obtained is the same as that described in the embodiment 2-1, it is not described in detail.

In the step 11 for rendering in the arbitrary viewpoint image generation method of this embodiment 2-2, the color information of each point (pixel) on the arbitrary viewpoint image to be displayed is determined by performing mixing processing for color information $K_j$ of projection points $T_j$ (j=1, 2, ..., M) overlapping with a point A on the arbitrary viewpoint image as shown in FIG. 39, for example. In the mixing processing, for example, weight that is the existence probability $\beta_j$ is assigned to color information $K_j$ of each projection point $T_j$, and weighted color information $K_j$ are mixed, so that the color information $K_A$ of the point on the image to be generated is calculated by the following equation 59, for example.

$$K_A = \sum_{j=1}^{M} \beta_j K_j \qquad \text{[Equation 59]}$$

However, according to mixing processing using the equation 59, the color information of the point of the image may be far different from the color information of the actual surface of the object or may be not fall within an effective color space depending on the shape of the object or position relationship between the reference viewpoint R and the virtual viewpoint P, for example. Here, a case is considered in which two projection planes $L_1$ and $L_2$, a reference viewpoint R and a virtual viewpoint P are applied for an actual object in position relationship as shown in FIG. 40. In this case, when existence probabilities $\beta_1$ and $\beta_2$ are determined with respect to the projection points $T_1$ and $T_2$ overlapping when viewed from the reference viewpoint R by the method described in the embodiment 2-1, $\beta_1$ becomes almost 0 and $\beta_2$ becomes almost 1. Similarly, when existence probabilities $\beta'_1$ and $\beta'_2$ are determined with respect to the projection points $T'_1$ and $T'_2$ overlapping when viewed from the reference viewpoint R by the method described in the embodiment 2-1, $\beta'_1$ becomes almost 1 and $\beta'_2$ becomes almost 0.

The color information $K_A$ at the point A of the image plane of the virtual viewpoint P is obtained by adding, after assigning weights according to the existence probabilities $\beta'_1$ and $\beta_2$, color information $K'_1$ and $K_2$ of the projection points $T'_1$ and $T_2$ overlapping with the point A on the image plane when viewed from the virtual viewpoint P. By doing so, both of them become almost 1, so that the color information $K_A$ of the point A becomes $K_A = K'_1 + K_2$.

However, when the object Obj is viewed from the virtual viewpoint P, since the projection point $T'_1$ is blocked by the projection point $T_2$, actual color information at the point A on the image plane should be $K_A = K_2$. That is, brightness of each component (R,G,B) of the generated color information $K_A$ at the point A on the image is increased by $K'_1$ compared with the actual color information.

In addition, when each component of the color information $K'_1$ and $K_2$ of the projection points $T'_1$ and $T_2$ has large brightness, the color information $K_A$ of the point A exceeds a limit of an effective color space. Therefore, clipping processing is necessary for the color information to fall within the limit of the effective color space.

To solve the problem, transparency that may take plural gradations from transparent to opaque is provided to each projection point based on the existence probability of the projection point. In this case, the mixing processing is performed successively from a projection point of the generated image far from the viewpoint to a projection point near the viewpoint, in which color information obtained by the mixing processing up to a projection point is obtained by performing interior division between color information at the projection point and color information obtained by mixing processing up to a previous projection point with a ratio according to the transparency. The color information obtained by the mixing processing is interior division between color information at a stage and color information at the next stage.

For explaining the principle of the mixing processing of the color information, assuming a case in which projection planes $L_j$ (j=1, 2, ...,M), projection points $T_j$, and a vector $K_j$ having components of red (R), green (G) and blue (B) and representing color information of the projection point are set in a color space V as shown in FIG. 41A, for example. It is assumed that the color space V is represented by the following equation 60.

$$K_j \in V, V = \{(R,G,B) | 0 \leq R \leq 1, 0 \leq G \leq 1, 0 \leq B \leq 1\} \qquad \text{[Equation 60]}$$

In addition, it is assumed that the transparency $\alpha_j$ of the projection point $T_j$ is set so as to satisfy a condition shown in the following equation 61.

$$0 \leq \alpha_j \leq 1 \qquad \text{[Equation 61]}$$

The color information $D_m$ obtained by mixing processing up to the argument j=m is represented by recurrence formulas shown in equations 62 and 63. Then, color information $D_M$ of the projection plane $L_M$ nearest to the virtual viewpoint P, that is, color information $D_M$ obtained by performing mixing processing up to the argument j=M becomes the color information $K_A$ at the point A on the image plane of the image to be generated.

$$D_m = \alpha_m K_m + (1-\alpha_m) D_{m-1} \qquad \text{[Equation 62]}$$

$$D_1 = \alpha_1 K_1 \qquad \text{[Equation 63]}$$

In addition, as shown by the relationship of the equations 61 and 62, the color information $D_m$ is a internally divided point between the vector $K_m$ and the color information $D_{m-1}$ in the color space V as shown in FIG. 41B. Therefore, as to the color information $D_m$, when $K_m \in V$ and $D_{m-1} \in V$ are satisfied, $D_m \in V$ holds true.

Then, as described in the first embodiment, when the conditions of the equations 60 and 61 are satisfied, $D_M \in V$ is ensured with respect to the color information $D_M$ at the virtual viewpoint P.

That is, by setting the color information $K_j$ and the transparency $\alpha_j$ at the projection point $T_j$ so as to satisfy the equations 60 and 61, the color information $D_M$ of the point A of the image to be generated can always fall within a proper color space V.

As mentioned above, for generating images obtained by viewing the same object from plural virtual viewpoints, by performing the mixing processing of the color information using the transparency $\alpha_j$, all images can be generated within a limit of proper color information even when calculating the color information and the transparency of the projection point from a viewpoint (reference viewpoint) if the color information and the transparency satisfies the equations 60 and 61.

Therefore, according to a generation method of the arbitrary viewpoint image of this embodiment 2-2, processing for converting the existence probability $\beta_j$ to the transparency $\alpha_j$ is performed after the step 30609 shown in FIG. 30 or in the step 11 for performing rendering.

In the processing for converting the existence probability $\beta_j$ to the transparency $\alpha_j$, the projection point $T_j$ is initialized to j=M first as shown in FIG. 42, for example (step 1101). Next, $\beta_M$ is substituted to transparency $\alpha_M$ of the projection point $T_M$ such that $\alpha_M = \beta_M$ (step 1102).

Next, the value of the argument j is updated to j=j−1 (step 1103). Then, it is determined whether the transparency $\alpha_{j+1}$ is 1 (step 1104). If transparency $\alpha_{j+1} \neq 1$, the transparency $\alpha_j$ is obtained from the equation 64, for example (step 1105).

$$\alpha_j = \frac{1}{\prod_{m=j+1}^{M}(1-\alpha_m)} \beta_j \qquad \text{[Equation 64]}$$

If the transparency $\alpha_{j+1}$ is 1, 1 is substituted into $\alpha_j$ ($\alpha_j$=1), for example (step 1106). When obtaining the transparency $\alpha_j$ in the step 1105, the equation is not limited to the equation 64, and other equations can be used. In addition, although detailed descriptions are not provided, since any value can be substituted into the transparency $\alpha_j$ actually in step 1106, a value other than 1 may be substituted into the transparency $\alpha_j$.

Next, it is determined whether processing from the step 1104 to the step 1106 has been performed up to the argument j=1 (step 1107). When the processing has not been performed, the processing is repeated after returning to the step 1103.

After performing the processing from the step 1104 to the step 1106 up to the argument j=1, processing for converting the existence probability $\beta_j$ of the projection point $T_j$ overlapping with the point A, on the image plane, viewed from the observer's viewpoint P into the transparency $\alpha_j$ completes. After that, mixing processing using the equation 62 and the equation 63 is performed. Then, by performing the processing for every point (pixel) on the arbitrary viewpoint image, the arbitrary viewpoint image from the observer's viewpoint P can be obtained.

The basic configuration of the image generation apparatus for generating such arbitrary viewpoint image is the same as that of the image generation apparatus described in the embodiment 2-1. As a means corresponding to the projection plane information—display plane information conversion means 606 shown in FIG. 35, a means for performing beforementioned mixing processing may be provided. Thus, descriptions on the apparatus are not provided.

As described above, according to the image generation method of this embodiment 2-2, the three-dimensional image that looks natural for the observer can be displayed without obtaining an accurate three-dimensional shape of the object to be displayed.

In addition, also in the image generation method of this embodiment 2-2, the camera sets $\Xi_h$ may be dynamically set by programmatic processing such that the sets matche conditions specified by the observer while performing processing for generating the image to be displayed, for example. In this case, by inputting the conditions such as distribution or threshold of the correlation degree $Q_j$ from the image condition input means by the observer and by performing processing of the step 306 while searching for camera sets that matche the condition, it can be considered that the three-dimensional image close to an image desired by the observer can be displayed.

In addition, also in the image generation method of this embodiment 2-2, as to the image to be obtained, either of the color image or the black and white image can be adopted. In the case when the image to be obtained is the black and white image, after the three-dimensional shape is obtained by the procedure described in the embodiment 2-1 using the brightness information (Y) as information corresponding to the color information, the virtual viewpoint image can be generated according to the procedure described in this embodiment 2-2.

(Effects of the Second Embodiment)

As mentioned above, according to the image generation method of the second embodiment, when obtaining the three-dimensional shape of the object, plural projection planes are set, and the probability (existence probability) that the surface of the object exists is provided for the points (projection point) of each projection plane overlapping viewed from the reference viewpoint. That is, the method does not intend to obtain an accurate three-dimensional shape of the object assuming that the surface of the object exists on a projection plane among projection points overlapping viewed from the reference viewpoint, as conventionally performed, but the three-dimensional shape of the object is obtained assuming that the surface of the object exists on each projection point with an existence probability. Accordingly, when estimating a distance of the surface of the object in a direction from the reference viewpoint, a portion in which the estimation reliability is low is rendered vaguely in a ratio according to the existence probability of each projection point. Therefore, when generating the image based on the three-dimensional shape of the object, discontinuous noise that appears when the estimation of the distance of the object surface includes an error, that occurs in a conventional technology, can be made inconspicuous, so that an image that looks natural can be generated.

In addition, as mentioned before, when the object surface near a projection point does not appear from a viewpoint of an area due to an effect of the occlusion when calculating the existence probability based on plural images included in the camera sets from obtained images, existence probability in which the image taken from the viewpoint is excluded can be calculated so that the reliability of the existence probability of each projection point increases.

In addition, when determining the existence probability, if the probability density distribution of the existence probability can be estimated to some extent, the evaluation reference value may be calculated from the correlation degree of each projection point so as to determine the existence probability based on the distribution function obtained by performing statistical processing on the evaluation reference value. Accordingly, by determining the existence probability by performing the statistical processing, deterioration of the reliability due to the noise on the obtained images can be prevented.

Third Embodiment

Next, the third embodiment of the present invention is described. The third embodiment is an embodiment mainly corresponding to claims 22-29. In the third embodiment, based on plural images (multi-focus image) taken by changing focusing distance from one viewpoint, the three-dimensional shape of the object appearing in the images is obtained, so that the image of the object viewed from an arbitrary viewpoint (virtual viewpoint) is generated. That is, compared to the first and second embodiments in which the three-dimensional shape of the object is obtained based on plural images of the object taken from plural viewpoints, this embodiment is characterized by using plural images taken by changing focusing distance from one viewpoint. Also in this embodiment, the three-dimensional shape of the object is represented by the multi-layered planes using the texture mapping method. In figures for explaining the third embodiment, the same reference numerals are assigned to components having the same function.

Figure 43:
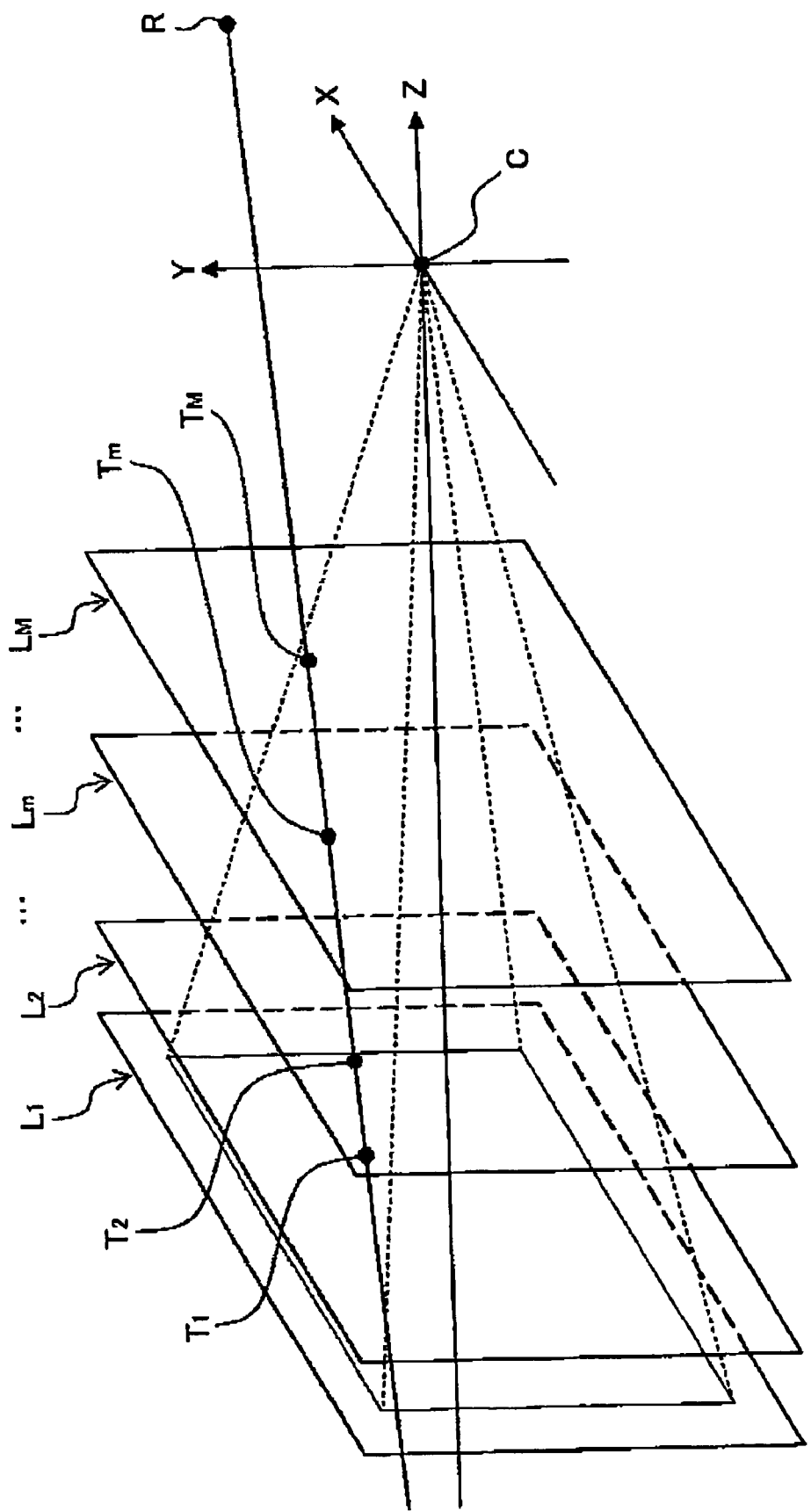
FIG. 43 is a schematic diagram for explaining the principal of the image generation method of the third embodiment, and is a diagram showing a setting example of the projection planes and the reference viewpoint.
Figure 44:
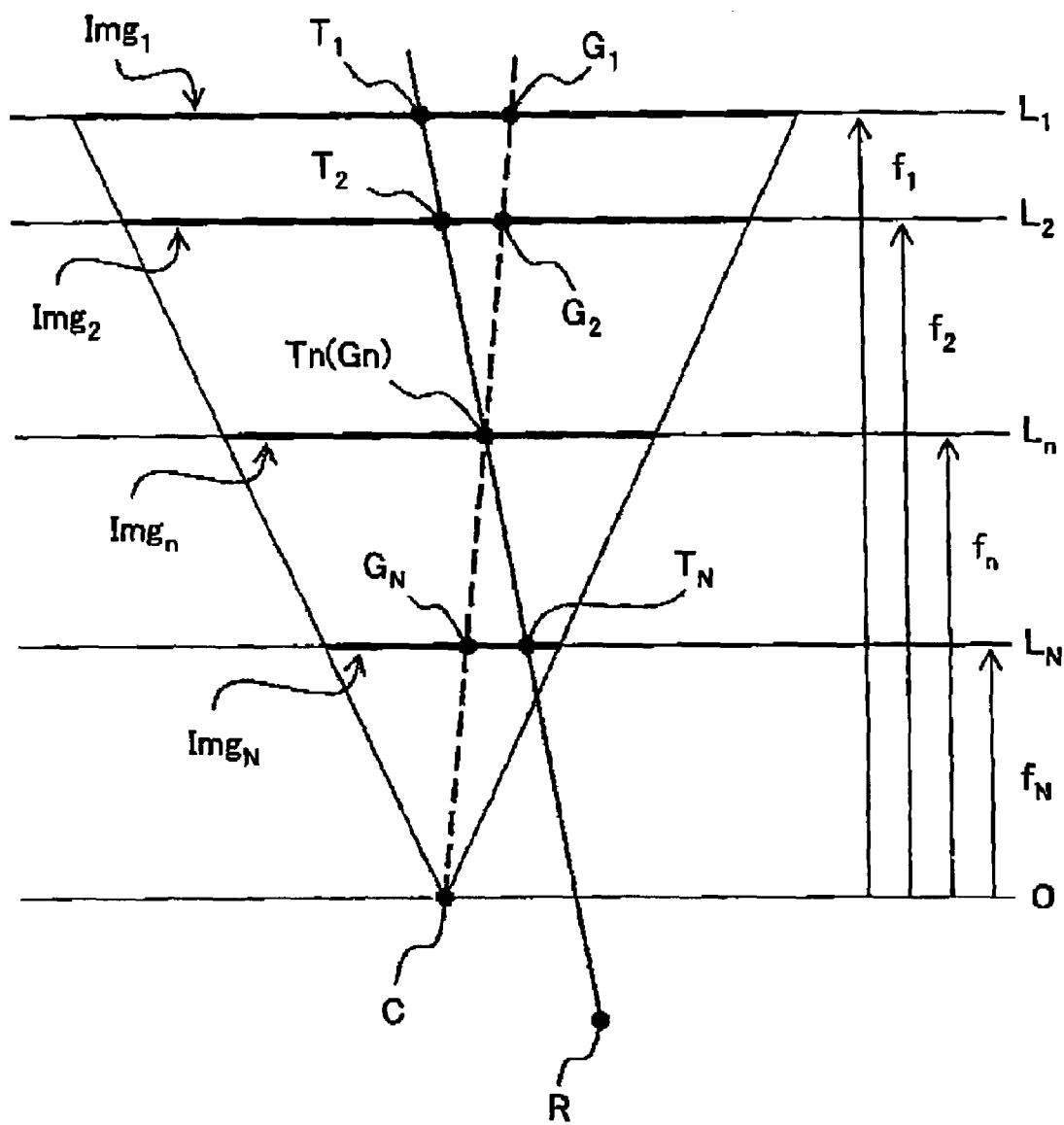
FIG. 44 is a schematic diagram for explaining the principal of the image generation method of the third embodiment, and is a diagram showing a setting example of the projection planes and the reference viewpoint.
Figure 45:
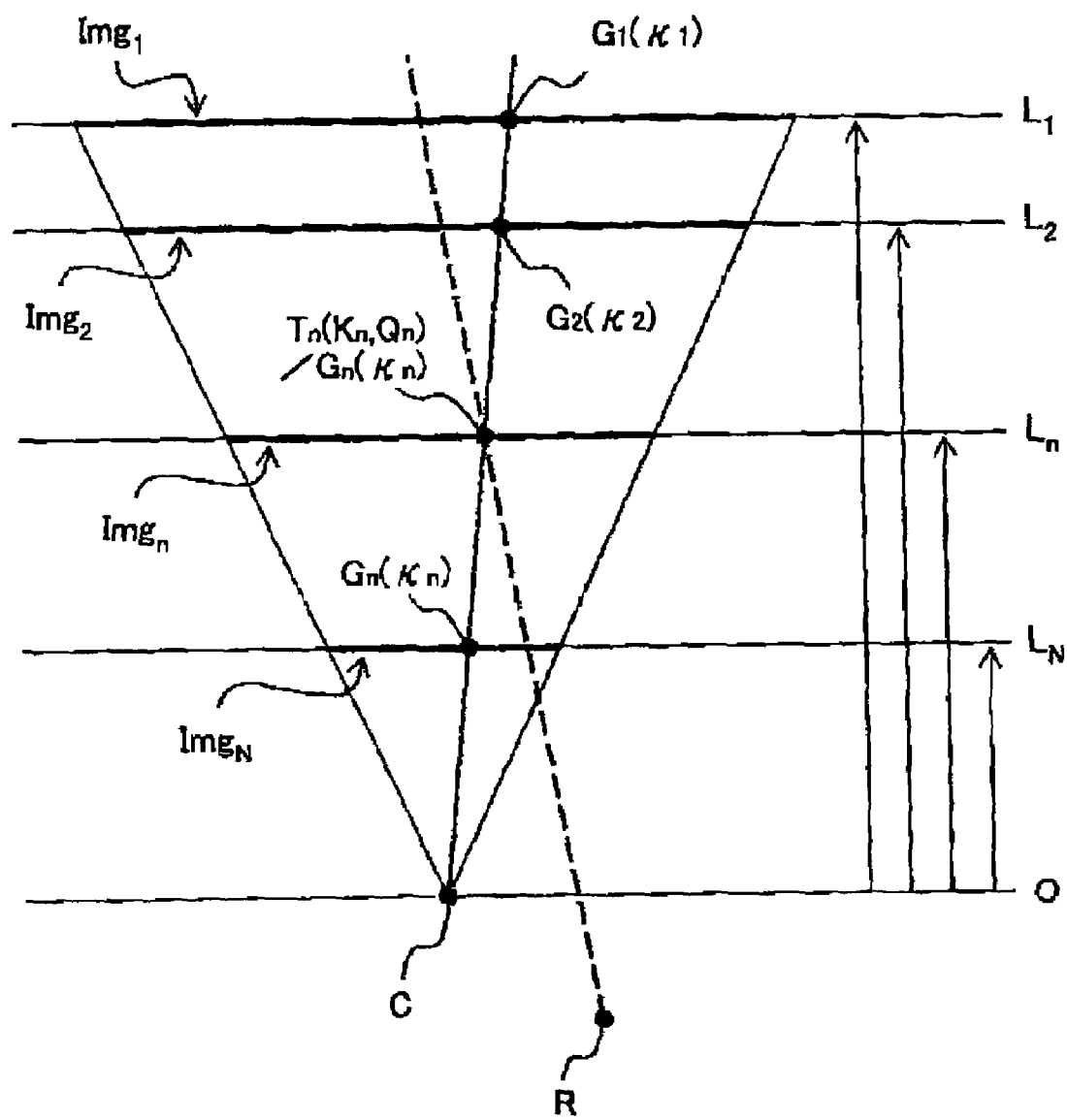
FIG. 45 is a schematic diagram for explaining the principal of the image generation method of the third embodiment, and is a diagram for explaining a method for determining the color information and the focusing degree of the projection point.
Figure 46:
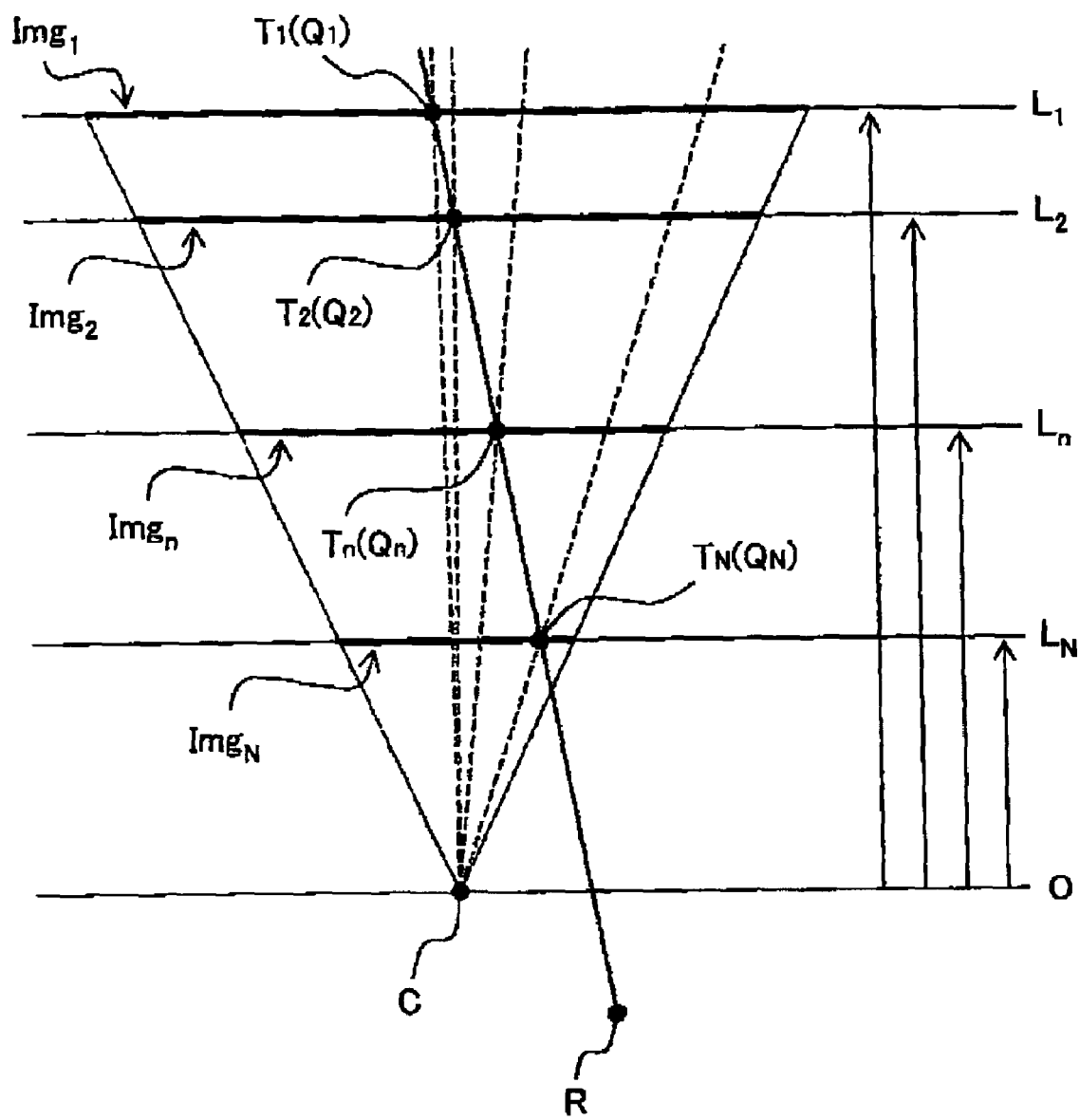
FIG. 46 is a schematic diagram for explaining the principal of the image generation method of the third embodiment, and is a diagram for explaining a method of determining the existence probability of the projection point.
Figure 47A:
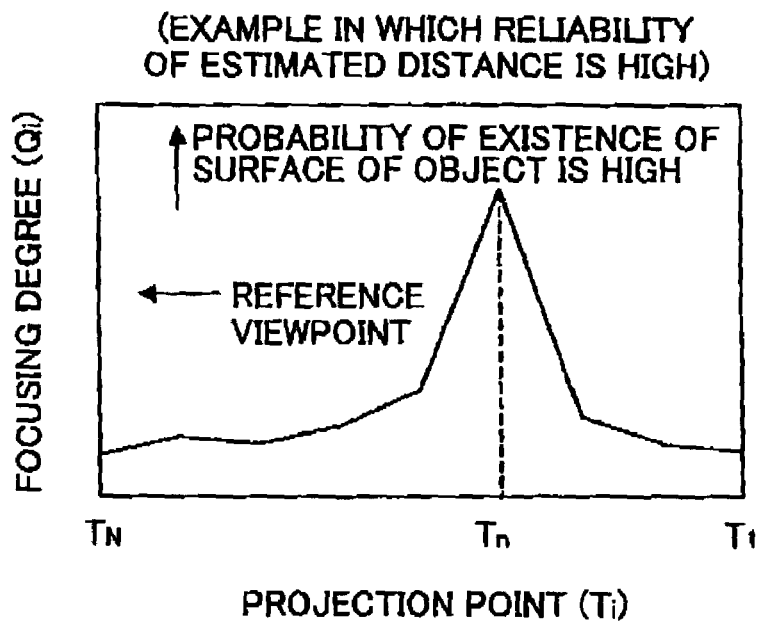
FIG. 47 is a schematic diagram for explaining the principal of the image generation method of the third embodiment, and is a diagram for explaining a method of determining the existence probability of the projection point.
Figure 47B:
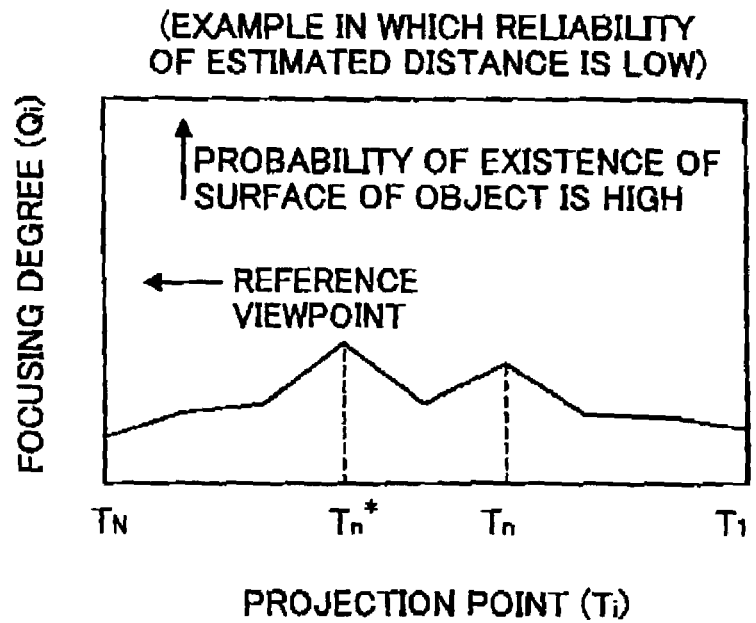
Figure 48:
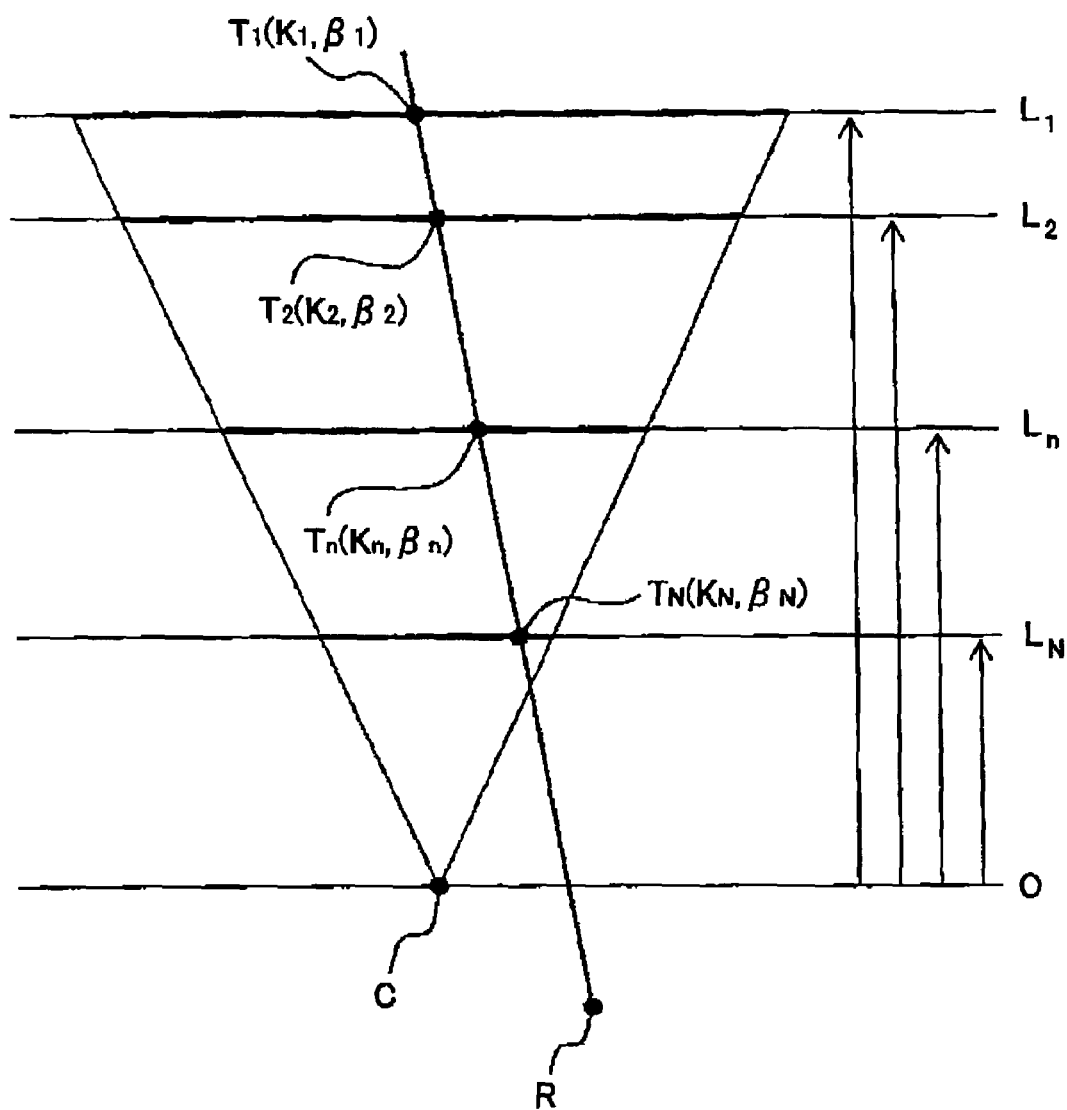
FIG. 48 is a schematic diagram for explaining the principal of the image generation method of the third embodiment, and is a diagram for explaining a method of determining the existence probability of the projection point.
Figure 49:
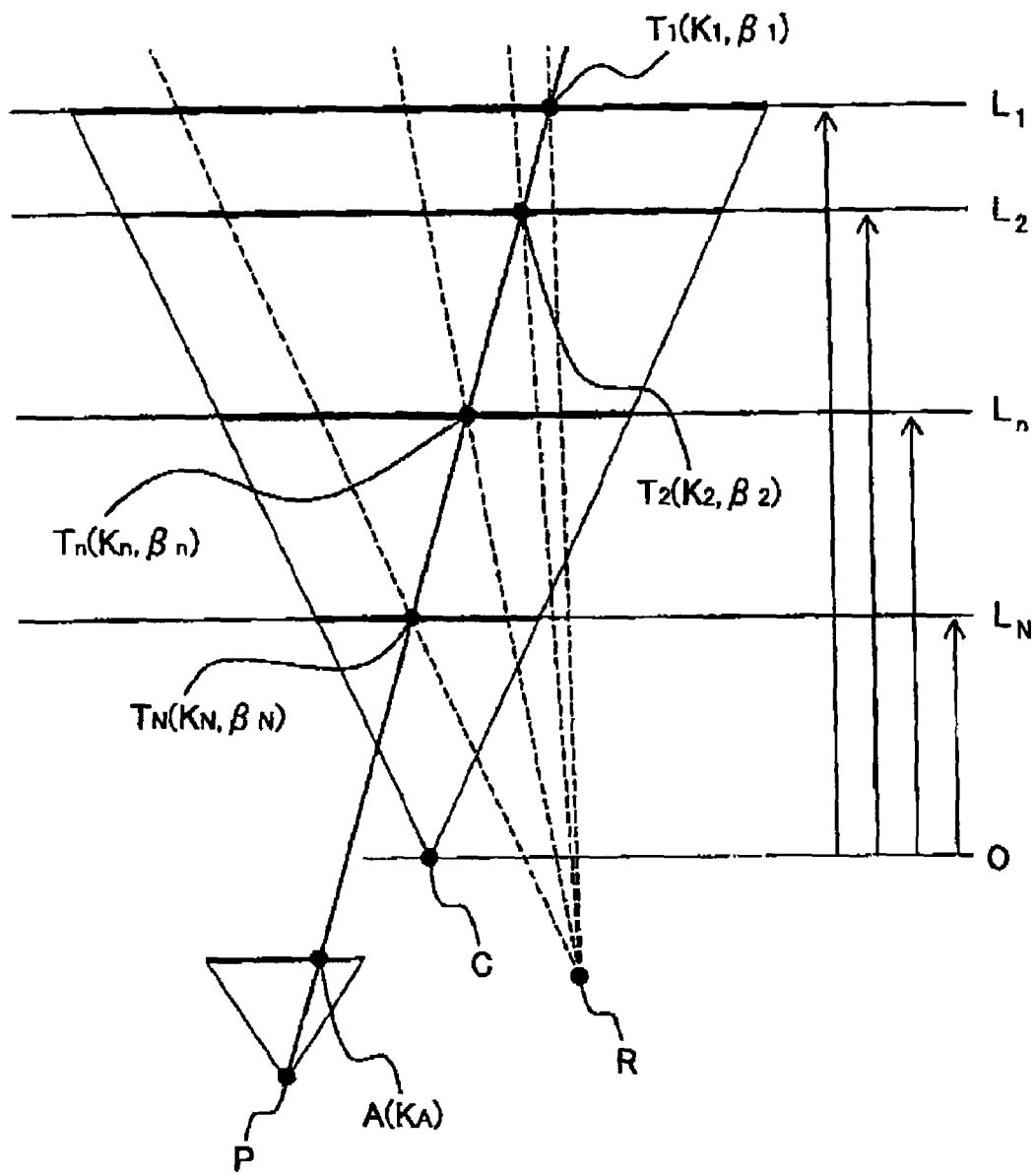
FIG. 49 is a schematic diagram for explaining the principal of the image generation method of the third embodiment, and is a diagram for explaining a method for generating an image viewed from the virtual viewpoint.
Figure 50:
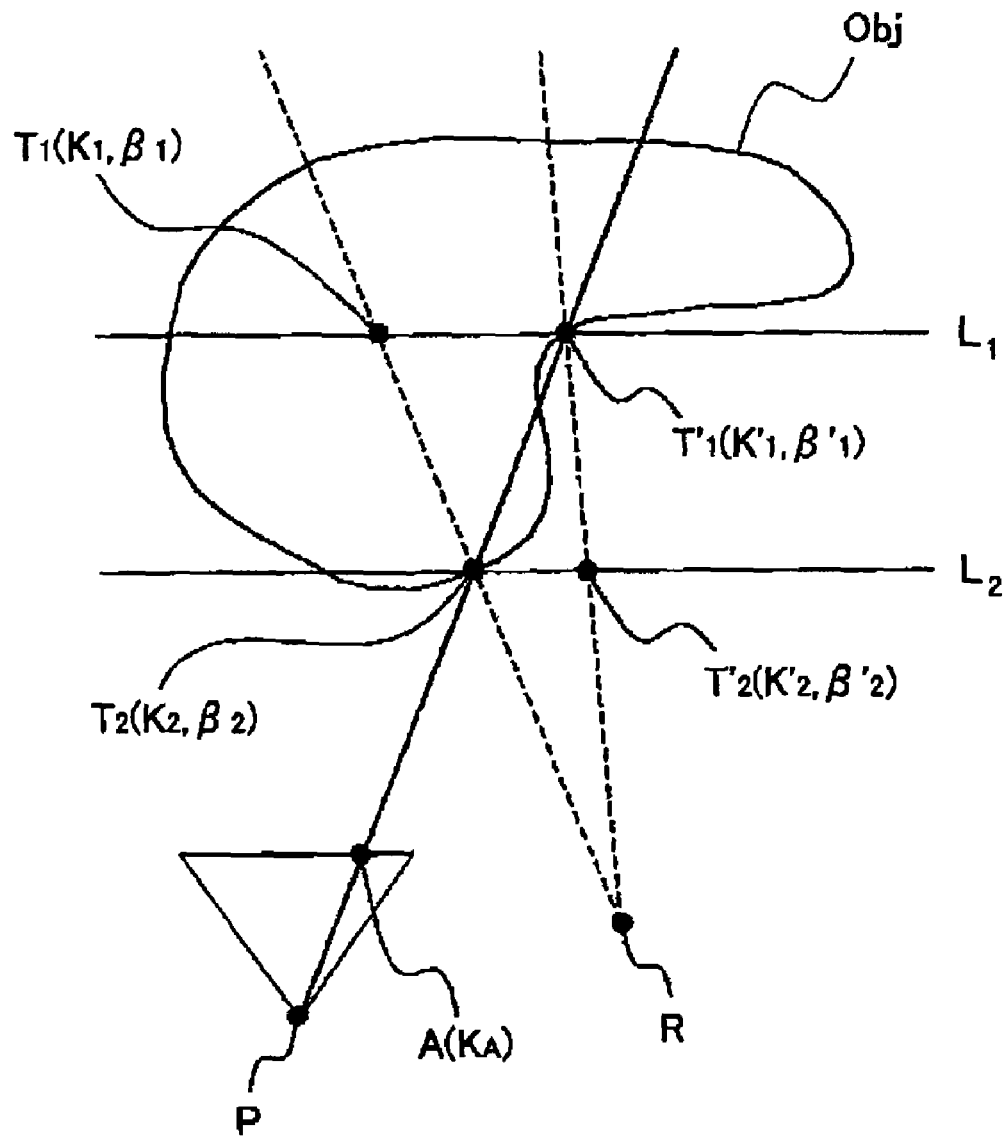
FIG. 50 is a schematic diagram for explaining the principal of the image generation method of the third embodiment, and is a diagram for explaining problems in the image generation method in the present invention.

FIGS. 43-51 are schematic diagrams for explaining the principal of the image generation method of this embodiment. FIGS. 43 and 44 are diagrams showing a setting example of the projection planes and the reference viewpoint. FIG. 45 is a diagram for explaining a method for determining the color information and the focusing degree of the projection point. FIGS. 46-48 are diagrams for explaining a method of determining the existence probability of the projection point. FIG. 49 is a diagram for explaining a method for generating an image viewed from the virtual viewpoint. FIG. 50 is a diagram for explaining problems in the image generation method in this embodiment. FIG. 51 is a diagram for explaining a method for solving the problems in the image generation method in this embodiment.

In the image generation method of this invention, as mentioned before, based on plural images (multi-focus image) taken by changing focusing distance from one viewpoint, the three-dimensional shape of the object appearing in the images is obtained so that an image of the object viewed from an arbitrary viewpoint (virtual viewpoint) is generated. In this method, the three-dimensional shape of the object is represented by multi-layered planes using the texture mapping method.

For representing the three-dimensional shape of the object using the texture mapping method, the viewpoint C of the camera, projection planes $L_j(j=1, 2, \ldots, M)$ of the multi-layered structure and the reference viewpoint R for obtaining the three-dimensional shape of the object are set in a virtual three-dimensional space set in the image generation apparatus such as a computer as shown in FIG. 43, for example. Assuming that the shape of the object is obtained from N images of different focusing distances, the projection planes $L_j$ are set at each distance the same as the focusing distance $f_i$ of each image $Img_i(i=1, 2, \ldots, N)$ as shown in FIG. 44.

As shown in FIG. 44, considering projection points $T_j(j=1, 2, \ldots, N)$ overlapping when viewed from the reference viewpoint R in a direction, the surface of the object is considered to exist at a point in the projection points $T_j$ according to a conventional model obtaining method. The projection point, among the projection points $T_j$, at which the surface of the object exists is determined based on the focusing degree of each of the projection points $T_j$, for example. Then, first, color information $K_j$ and focusing degrees $Q_j$ of each of the projection points $T_j$ overlapping viewed from the reference viewpoint R are determined.

The color information $K_j$ and focusing degrees $Q_j$ of the projection points $T_j$ are determined based on the color information $K_i$ of the point (corresponding point) $G_i$, on each image $Img_i$, corresponding to the projection point $T_j$, and the degree (focusing degree) by which focus is achieved at the corresponding point $G_i$. The color information $K_j$ of the projection point $T_j$ is determined to be an average value of the color information $K_i$ of the corresponding points $G_i$, or determined to be color information $K_{i=j}$ that spatially matches with the corresponding point $G_{i=j}$. The focusing degree of the projection point $T_j$ can be determined according to sharpness or blurriness at a point or a small region on the image. As a calculation method for the focusing degree, there are various methods based on Depth from Focus theory or Depth from Defocus theory. Following documents can be referred to as for the Depth from Focus theory and the Depth from Defocus theory.

Document 8: A. P. Pentland: "A New Sense for Depth of Field," IEEE Trans. On Pattern Analysis and Machine Intelligence, Vol.PAMI-9, No.4, pp.523-531(1987).

Document 9: :Murali Subbarao and gopal Surya: "Depth from Defocus: A Spatial Domain Approach," International Journal of Computer Vision, 13, 3, pp.271-294, Kluwer Academic Publishers.

Document 10: Mitsuhiro Ishihara, Hiromi Sasaki,: "High speed three-dimensional shape measurement by Focusing method", Precision Engineering, Vol.63, No.1, pp.124-128, The Japan Society for Precision Engineering.

Document 11, Koutarou Ooba, Shigeru Yamada: "Real time all focusing microscope camera", O plus E, Vol.22, No.12, pp.1568-1576, 2000, Shin Gijyutu communications.

The focusing degree $Q_j$ can be obtained by comparing sizes of local spatial frequency of each corresponding point $G_i$, for example.

The Depth from Focus theory or the Depth from Defocus theory is a method for analyzing plural images having different focusing distance so as to measure the surface shape of the object. In the method, the surface of the object is estimated to exist at a distance corresponding to a focusing distance of an image having the highest local spatial frequency among the images taken by changing the focusing distance, for example. Thus, the focusing degree $Q_j$ of the projection point $T_j$ is calculated using an evaluation function of the local spatial frequency represented by the following equation 65, for example.

$$Q = \frac{1}{D} \sum_{x=x_i}^{x_f} \sum_{y=y_i}^{y_f} \left\{ \sum_{p=-L_c}^{L_c} \sum_{q=-L_r}^{L_r} |f(x, y) - f(x+p, y+q)| \right\} \quad \text{[Equation 65]}$$

wherein f indicates a gray scale of a pixel, D indicates a constant for normalization that is a number of all pixels, (−Lc, −Lr)−(Lc, Lr) and (xi, yi)−(xf, yf) respectively indicate small regions for performing distribution evaluation and smoothing.

This processing is performed for all projection points $T_j$ overlapping when viewed from the reference viewpoint R. Then, as shown in FIG. 46, after the color information and the focusing degree $Q_j$ are determined for each projection point $T_j$, a distance at which the surface of the object exists is estimated based on the focusing degree $Q_j$ of each projection point $T_j$. As to the focusing degree $Q_j$ of each of projection points $T_j$ overlapping when viewed from the reference viewpoint R, when only a focusing degree $Q_n$ of a projection point $T_n$ is a very high value as shown in FIG. 47A, for example, it can be estimated that the surface of the object exists on the projection point $T_n$, and the reliability is very high.

However, there is a case where there is no projection point T at which the focusing degree Q takes a distinctive large value depending on the condition for taking the images, the shape of the object or the texture of the surface of the object as shown in FIG. 47B, for example. In the example shown in FIG. 47B, for example, since the focusing degrees Q of the projection points $T_n$ and $T_n{}^*$ are high to some extent compared to other focusing degrees Q of other projection points T, it can be considered that the surface of the object exists at either one of the projection points $T_n$ and $T_n{}^*$. However, since any of the focusing degrees Q of the projection points $T_n$ and $T_n{}^*$ is not a distinctive large value, the reliability is low when one of the projection points is selected. In addition, according to circumstances, an erroneous projection point may be selected. Then, if erroneous estimation (selection) is performed for estimating the projection point at which the surface of the object exists, a large noise appears on the generated image.

In such a case, for increasing the reliability of estimation of the distance of the surface of the object, that is, for increasing the reliability of estimation of a projection plane on which the surface of the object exists, some contrivance to estimate the distance of the object surface is necessary in which more images are used by decreasing the intervals of the focusing distances, or not only the peak position but also values before and after the peak position are applied to a known function such as normal distribution function, for example.

However, when more images are used, there are problems that processing time increases, and that it becomes difficult to adjust the focusing distances in the image taking means. In addition, when focusing at a focusing distance, there is a region called depth of field before and after the focus. If a point is within the limit of the depth of field, blurriness does not substantially occur on the image even when the point is not at the focusing distance. Therefore, effects can be obtained by dividing the focusing distances into smaller intervals as long as the interval is decreased up to about the depth of field. Even if the interval is further decreased, the effect is small. In addition, when the spatial frequency of the texture of the object surface is low, that is, when change of the texture is small so that the texture is even, changes are hard to occur on the image even when the focusing distance is changed. In this case, it is difficult to estimate with high reliability in principle.

Therefore, generally, even when the distribution of the focusing degree Q is as shown in FIG. 47B, it is assumed that the surface of the object exists at the projection point $T_j$ where the focusing degree Q is maximum. Therefore, there are many cases where erroneous estimation for the distance of the object surface is performed so that a large noise appears on the generated image.

Thus, according to the image generation method of this invention, the distance of the surface of the object is not specified as one point, that is, the distance of the surface of the object is not specified as one of projection points $T_j$ overlapping when viewed from the reference viewpoint R, but existence probability $\beta_j$ is provided according to the focusing degree $Q_j$ of each projection point $T_j$. In this method, the existence probability $\beta_j$ needs to satisfy the following equation 66 and the equation 67 in a set of the existence probability $\beta_j$ of all projection points $T_j$ overlapping when viewed from the reference viewpoint R.

$$0 \le \beta_j \le 1 \quad \text{[Equation 66]}$$

$$\sum_{j=1}^{M} \beta_j = 1 \quad \text{[Equation 67]}$$

Then, assuming that the number of the projection planes $L_j$ is M and that the number of the projection points $T_j$ overlapping when viewed from the reference viewpoint R is M, the existence probability $\beta_k$ of the projection point $T_k$ on a k-th projection plane $L_k$ is obtained by the following equation 68.

$$\beta_k = \frac{Q_k}{\sum_{j=1}^{M} Q_j} \quad \text{[Equation 68]}$$

Accordingly, by performing processing for determining the existence probability $\beta_j$ of the projection point $T_j$ for every projection point $T_j$ overlapping when viewed from the reference viewpoint R for every direction, the three-dimensional shape of the object can be obtained. When generating the image of the object viewed from the virtual viewpoint P, the virtual viewpoint P is set on a space in which the projection planes $L_j$ are set so as to determine the color information of each point of the image to be generated as shown in FIG. 49, for example. In this method, the color information $K_A$ of a point A on the image to be generated is determined by using the following equation 69, for example, from color information $K_j$ and existence probability $\beta_j$ of projection points $T_j$ overlapping with the point A when viewed from the virtual viewpoint P.

$$K_A = \sum_{j=1}^{M} \beta_j K_j \quad \text{[Equation 69]}$$

By determining the color information for every point on the image to be generated, the image (virtual viewpoint image) of the object viewed from the virtual viewpoint P is obtained. When only a focusing degree $Q_n$ of a projection point $T_n$ has a distinctive large value on the generated virtual viewpoint image as shown in FIG. 47A, only an existence probability $\beta_n$ of the projection point $T_n$ becomes large. Therefore, when performing mixing processing on the color information using the equation 69, contribution ratio of the color information $K_n$ of the projection point $T_n$ to the color information $K_A$ of the point A on the generated image becomes high so that it is rendered clearly. In addition, as shown in FIG. 47B, when it is difficult to estimate the distance of the surface of the object, since the contribution ratio to the color information $K_A$ of the point A on the generated image becomes low so that it is rendered vaguely. As a result, the discontinuous large noise that appears when erroneous estimation of distance is performed can be decreased, so that an image that looks good for the observer can be generated.

In addition, the image generation method of the present invention can be implemented simply by using texture mapping that is a basic method in computer graphics. Therefore, computing workload can be decreased such that processing can be properly performed by three-dimensional graphics hardware mounted on a general personal computer.

However, in the image generation method of this invention, the focusing degree $Q_j$ is calculated for each of the projection points $T_j$ overlapping viewed from a viewpoint such as the reference viewpoint, and the existence probability $\beta_j$ is determined. Therefore, there is a case where the projection points overlapping viewed from the virtual viewpoint P include more than one point at which the existence probability is very high depending on the position relationship of the reference viewpoint and the virtual viewpoint. In such a case, if the color information of each projection point are mixed in a ratio according to the existence probability, there is a case where color information of a point on the image to be generated may exceed a limit of an effective color information.

Thus, in the same way as described in embodiments described so far, a case is considered in which two projection planes $L_1$ and $L_2$, a reference viewpoint R and a virtual viewpoint R are set in a space where the object exists as shown in FIG. 50. In this example, assuming that color information of the projection points $T_1$, $T_2$, $T'_1$ and $T'_2$ are $K_1$, $K_2$, $K'_1$ and $K'_2$, and existence probabilities of the object are $\beta_1$, $\beta_2$, $\beta'_1$ and $\beta'_2$ respectively.

When the existence probabilities of the object $\beta_1$, $\beta_2$, $\beta'_1$ and $\beta'_2$ are determined on a line passing through the reference viewpoint R, the surface of the object Obj exists near the projection points $T'_1$ and $T_2$ in the example shown in FIG. 50. Therefore, the existence probability of each of the projection points $T'_1$ and $T_2$ becomes higher than projection points $T_1$ and $T'_2$. In this case, the existence probabilities $\beta_1$, $\beta_2$, $\beta'_1$ and $\beta'_2$ of the projection points $T_1$, $T_2$, $T'_1$ and $T'_2$ are represented by the following equation 70 and equation 71.

$$\beta_1 \approx 0, \beta_2 \approx 1 \qquad \text{[Equation 70]}$$

$$\beta'_1 \approx 1, \beta'_2 \approx 0 \qquad \text{[Equation 71]}$$

The color information $K_A$ at the point A of the image plane of the virtual viewpoint P is obtained by adding, after assigning weights according to the existence probabilities $\beta'_1$ and $\beta_2$, color information $K'_1$ and $K_2$ of the projection points $T'_1$ and $T_2$ overlapping with the point A on the image plane when viewed from the virtual viewpoint P according to the equation 69, and the color information $K_A$ is represented as shown in the following equation 72.

$$K_A = \beta'_1 K'_1 + \beta_2 K_2 \qquad \text{[Equation 72]}$$

In addition, the equation can be approximated to the following equation 73 according to the equation 70 and the equation 71.

$$K_A \approx K'_1 + K_2 \qquad \text{[Equation 73]}$$

However, when the object Obj is viewed from the virtual viewpoint P, since the projection point $T'_1$ is blocked by the projection point $T_2$, actual color information at the point A on the image surface should be $K_A = K_2$. That is, brightness of each component (R,G,B) of the generated color information $K_A$ at the point A on the image is increased by $K'_1$ compared with the actual color information.

In addition, when each component of the color information $K'_1$ and $K_2$ of the projection points $T'_1$ and $T_2$ has large brightness, the color information $K_A$ of the point A exceeds a limit of an effective color space. Therefore, clipping processing is necessary for the color information to fall within the limit of the effective color space.

Thus, in the image generation method of this invention, transparency that may take plural gradations from transparent to opaque is provided to each projection point based on the existence probability of the projection point. In this case, the mixing processing is performed successively from a projection point of the generated image far from the viewpoint to a projection point near the viewpoint, in which color information obtained by mixing processing up to a projection point is obtained by performing interior division between color information at the projection point and color information obtained by mixing processing up to a previous projection point with a ratio according to the transparency. The color information obtained by the mixing processing is interior division between color information at a stage and color information at the next stage.

Figure 51A:
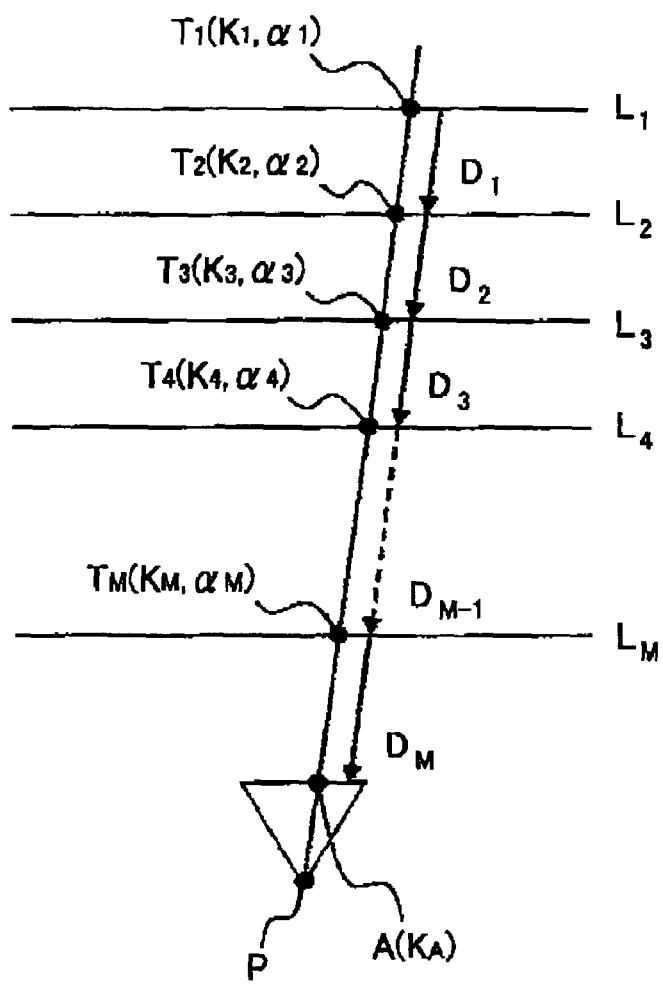
FIG. 51 is a schematic diagram for explaining the principal of the image generation method of the third embodiment, and is a diagram for explaining a method for solving the problems in the image generation method in the present invention.

For explaining the principle of the mixing processing of the color information, assuming a case in which projection planes $L_j (j=1, 2, \ldots, M)$, projection points $T_j$, and a vector $K_j$ having components of red (R), green (G) and blue (B) and representing color information of the projection point are set in a color space V as shown in FIG. 51A, for example. It is assumed that the color information V is represented by the following equation 74.

$$K_j \in V, V \equiv \{(R,G,B) | 0 \leq R \leq 1, 0 \leq G \leq 1, 0 \leq B \leq 1\} \qquad \text{[Equation 74]}$$

In addition, it is assumed that the transparency $\beta_j$ of the projection point $T_j$ is set such that it satisfies a condition shown in the equation 75.

$$0 \leq \alpha_j \leq 1 \qquad \text{[Equation 75]}$$

At this time, the color information $D_m$ obtained by mixing processing up to the argument j=m is represented by recurrence formulas shown in equations 76 and 77. Then, color information $D_M$ of the projection plane $L_M$ nearest to the virtual viewpoint P, that is, color information $D_M$ obtained by performing mixing processing up to the argument j=M becomes the color information $K_A$ at the point A on the image plane of the image to be generated.

$$D_m = \alpha_m K_m + (1-\alpha_m) D_{m-1} \qquad \text{[Equation 76]}$$

$$D_1 = \alpha_1 K_1 \qquad \text{[Equation 77]}$$

Figure 51B:
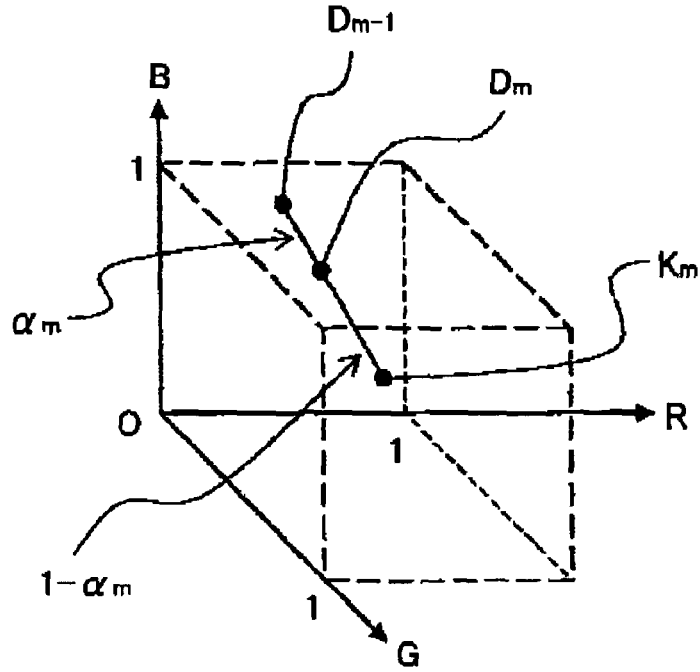

In addition, in this case, as shown by the relationship of the equations 75 and 76, the color information $D_m$ is an internally divided point between the vector $K_m$ and the color information $D_{m-1}$ in the color space V. Therefore, as to the color information $D_m$, when $K_m \in V$ and $D_{m-1} \in V$ are satisfied, $D_m \in V$ holds true as shown in FIG. 51B.

Then, when the conditions of the equations 74 and 75 are satisfied, it is ensured that the following equation 78 holds true with respect to the color information $D_M$ at the virtual viewpoint P.

$$D_M \in V \quad \text{[Equation 78]}$$

That is, by setting the color information $K_j$ and the transparency $\alpha_j$ at the projection point $T_j$ so as to satisfy the equations 74 and 75, the color information $D_M$ of the point A of the image to be generated can always fall within a proper color space V.

As mentioned above, for generating images obtained by viewing the same object from plural virtual viewpoints, by performing the mixing processing of the color information using the transparency $\alpha_j$, all images can be generated within a limit of proper color information even when calculating the color information and the transparency of the projection point from a viewpoint (reference viewpoint) if the color information and the transparency satisfies the equations 74 and 75.

Thus, transparencies $\alpha_1$, $\alpha_2$, $\alpha'_1$ and $a'_2$ than can be provided by the following equations 79 and 80 are provided to the projection points $T_1$, $T_2$, $T'_1$ and $T'_2$ respectively, for example, in the example shown in FIG. 50.

$$\alpha_2 = \beta_2, \alpha_1 = 1 \quad \text{[Equation 79]}$$

$$\alpha'_2 = \beta'_2, \alpha'_1 = 1 \quad \text{[Equation 80]}$$

For obtaining color information of each point of the virtual viewpoint, mixing processing is performed successively from a projection point far from the virtual viewpoint toward a projection point near the projection point, and color information obtained by mixing processing up to a projection point is obtained by performing interior division between color information at the projection point and color information obtained by mixing processing up to a previous projection point at a ratio of transparencies, so that color information $K_A$ of the point A of the image viewed from the virtual viewpoint P is represented by the following equation 81.

$$K_A = \alpha_2 + K_2 + (1 - \alpha_2)\alpha'_1 K'_1 \quad \text{[Equation 81]}$$

The equation 81 can be represented as the following equation 82 according to the equation 70, the equation 71, the equation 79 and the equation 80. The equation 82 represents good approximation of actual color information.

$$K_A \approx K_2 \quad \text{[Equation 82]}$$

As mentioned above, when performing image generation using the existence probability information as it is, there is no problem if the reference viewpoint P and the viewpoint P of the image to be generated are the same. But, when they are different, brightness may increase near blocked region. On the other hand, according to image generation in which the existence probability information is changed to transparency, the above mentioned phenomenon can be prevented.

In addition, when the reference viewpoint R and the virtual viewpoint P are different in the image generation using the existence probability information as it is, there is no guarantee that color information that is calculated using after-mentioned equations falls within an effective color information limit, and correction processing is necessary, for example. On the other hand, according to the image generation in which the existence probability information is converted to the transparency, such correction is not necessary.

In addition, according to the image generation in which the existence probability information $\beta$ is converted to transparency $\alpha$, a semitransparent object can be efficiently represented, so that there is an effect that the present invention can be applied more widely to more objects in the actual world.

Next, an example of a mathematical model used in processing in generating the image using the image generation method of the present invention is describe.

Figure 52:
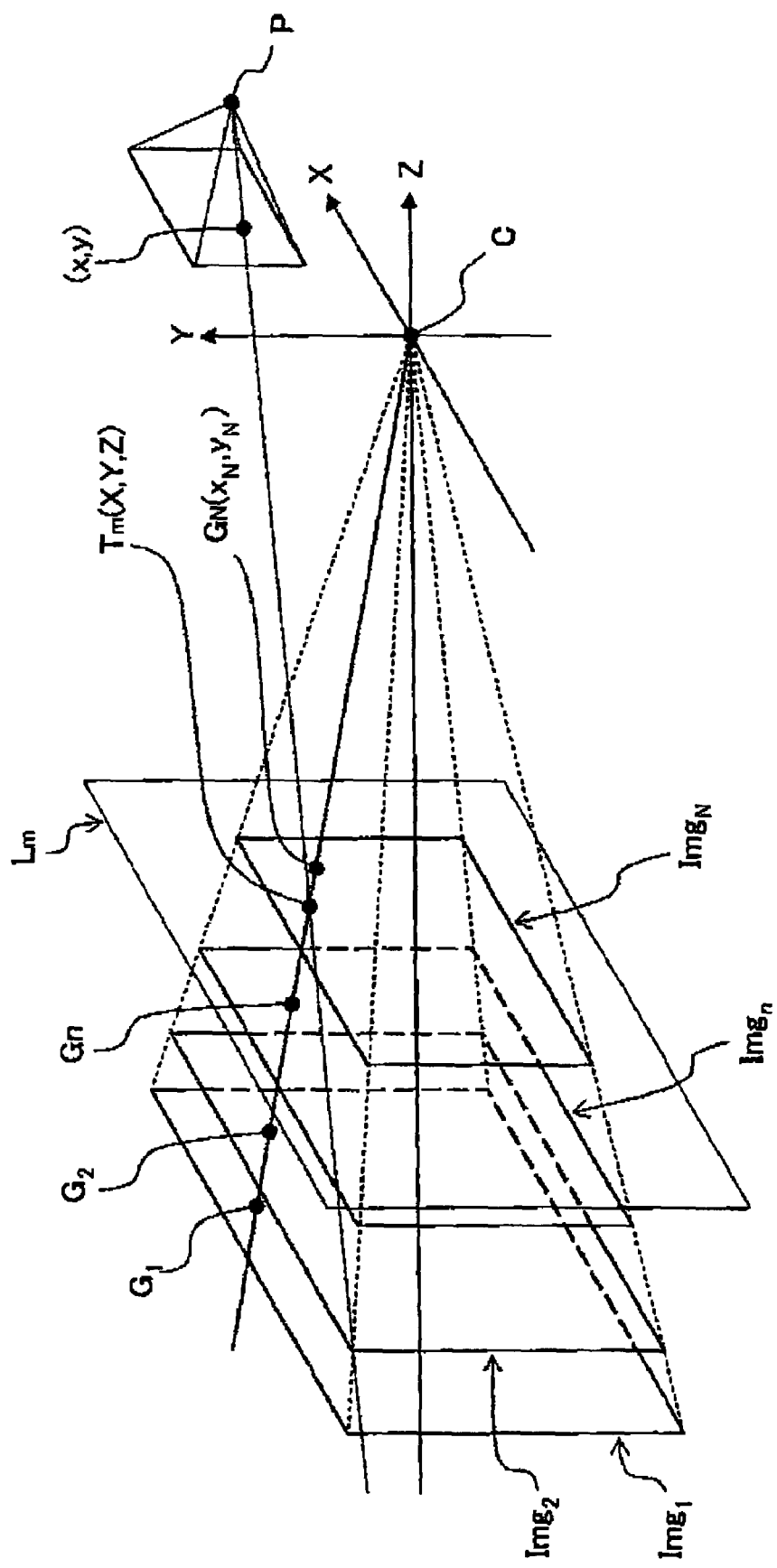
FIG. 52 is a schematic diagram for explaining the mathematical model of the image generation method of the third embodiment, and is a image showing relationship among projection points, corresponding points and points on the image to be generated.

FIGS. 52 and 53 are schematic diagrams for explaining the mathematical model of the image generation method of the present invention. FIG. 52 is a diagram, showing relationship among projection points, corresponding points and points on the image to be generated. FIG. 53 is a diagram for explaining a method for converting points on the space to pixels on the image.

For generating the image viewed from the virtual viewpoint P using the image generation method of this invention, color information or brightness information of a point on the image viewed from the virtual viewpoint using perspective projection conversion, for example. In this example, a case is considered where the viewpoint C of the camera, the projection planes $L_j (j=1, 2, \ldots, M)$ and the virtual viewpoint P are set as shown in FIG. 52, for example.

Generally, a matrix for projecting a projection point $T_m(X, Y, Z)$ on the three-dimensional space to a point $(x,y)$ of an image viewed from the virtual viewpoint P, that is, an image to be generated is provided as a 3 rows and 4 columns matrix. The projection matrix, and the matrix $\Phi_o$ representing the perspective projection conversion of focal length f in which the original point is the center are the same as those described in the first embodiment and the like.

In addition, also relationship between the image coordinates $(x,y)$ and the digital image coordinates $(u,v)$ shown in FIG. 53 is the same as that described in the first embodiment. Although the digital image coordinates $(u, v)$ take discrete values when writing into or reading out the two-dimensional array, it is assumed that the coordinates take continuous values unless otherwise specified, and that proper discretization processing is performed when accessing the array. In addition to the coordinate conversion, conversion for correcting distortion by aberration of the lens can be performed.

(Embodiment 3-1)

Figure 54:
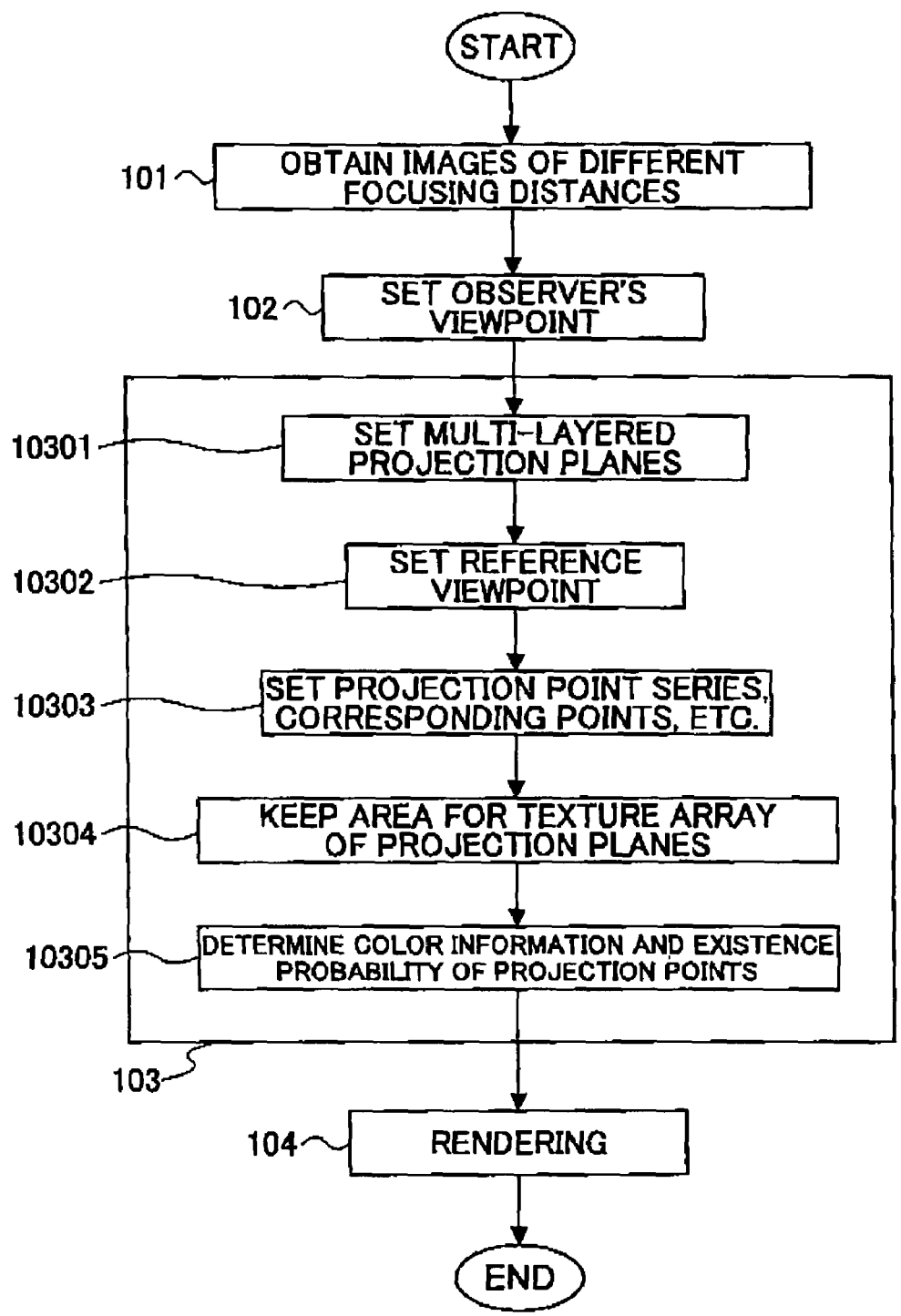
FIG. 54 is a schematic diagram for explaining the image generation method of the embodiment 3-1, and is a flow diagram showing a generation procedure for the image.
Figure 55:
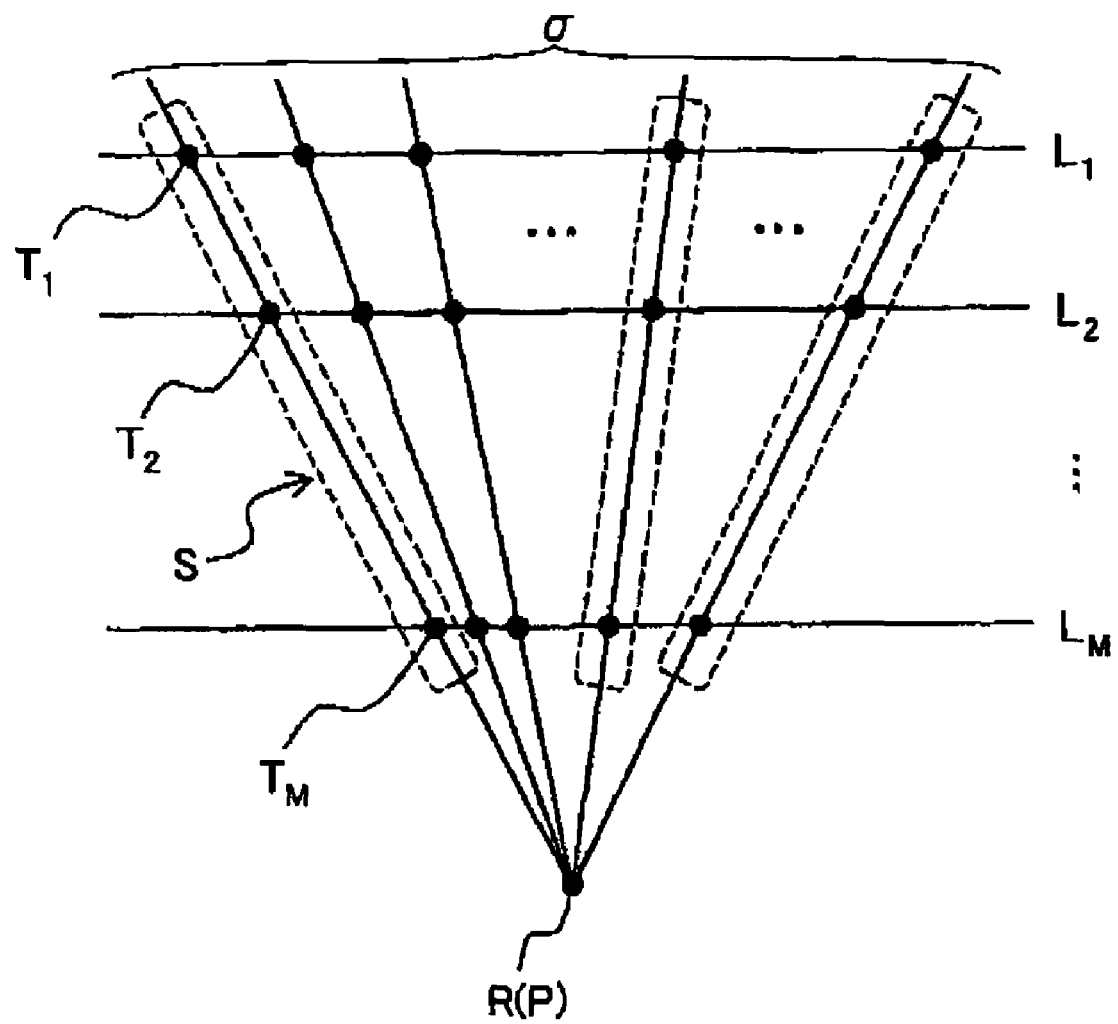
FIG. 55 is a schematic diagram for explaining the image generation method of the embodiment 3-1, and is a diagram for explaining a method for setting the projection point series.
Figure 56:
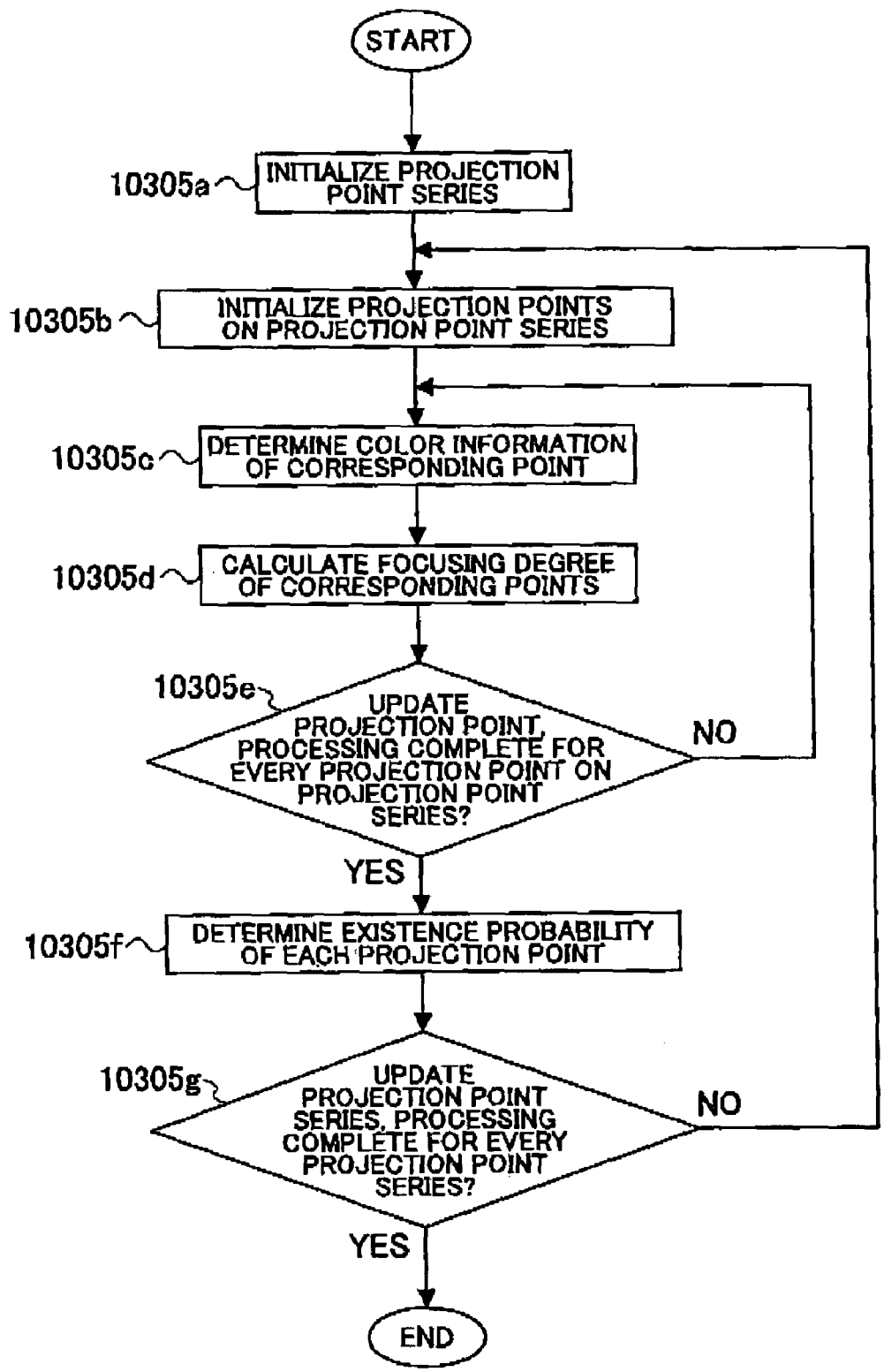
FIG. 56 is a schematic diagram for explaining the image generation method of the embodiment 3-1, and is a flow diagram showing a concrete example of processing of the step 10305 of FIG. 54.
Figure 57:
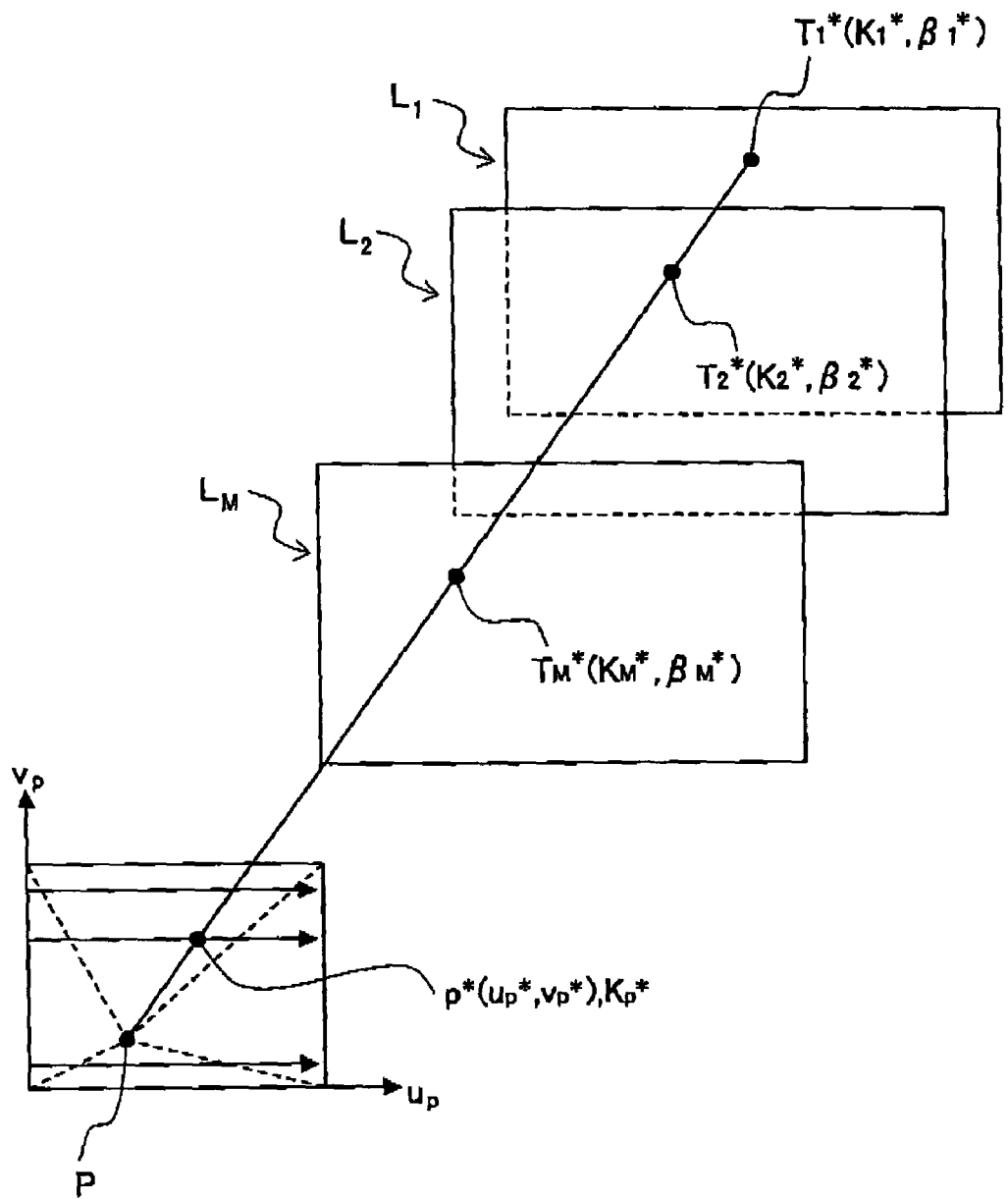
FIG. 57 is a schematic diagram for explaining the image generation method of the embodiment 3-1, and is a diagram for explaining a rendering method.

FIGS. 54-57 are schematic diagrams for explaining the image generation method of the embodiment 3-1 of this invention. FIG. 54 is a flow diagram showing a generation procedure for the image. FIG. 55 is a diagram for explaining a method for setting the projection point series. FIG. 56 is a flow diagram showing a concrete example of processing of the step 10305 of FIG. 54. FIG. 57 is a diagram for explaining a rendering method.

The image generation method of this embodiment 3-1 is a method for generating an image using the principle described before. As shown in FIG. 54, the method includes a step 101 of obtaining plural images having different focusing distances, a step 102 of setting a viewpoint (virtual viewpoint) of the observer, a step 103 of obtaining the three-dimensional shape of the object based on the obtained images, and a step 104 of rendering an image of the three-dimensional shape of the object, obtained in the step 103, when viewed from the virtual viewpoint.

The step 103 includes a step 10301 of setting projection planes of multi-layered structure, a step 10302 of determining the reference viewpoint for obtaining the three-dimensional shape of the object, a step 10303 for setting projection point series, corresponding points and the like, a step 10304 of keeping the texture array, that is, an area for storing the color information and the existence probability of the projection points, and a step 10305 of determining the color information and the existence probability of the projection point.

In the image generation method of this embodiment 3-1, the plural images are obtained by taking the object by changing the focusing distances as shown in FIG. 54, for example (step 101). Although the image to be obtained may be a color image or a black and white image, it is assumed that the color image in which each point (pixel) is represented by color information using three primary colors of red (R), green (G) and blue (B) is obtained in this embodiment 3-1 in the following descriptions.

Next, a position (virtual viewpoint) at which the observer observes the object is set (step 102). Next, the three-dimensional shape of the object is obtained using the obtained images of the object (step 103). Then, after obtaining the three-dimensional shape of the object, the image of the object viewed from the virtual viewpoint is generated (step 104).

In the step 103, first, the projection planes $L_j$($j \in J$, $J \equiv \{1, 2, \ldots, M\}$) of the multi-layered structure are set (step 10301) as shown in FIG. 54, for example. As the projection planes $L_j$, projection planes having plane shape are placed in parallel as shown in FIG. 43, for example. It is desirable that the placement intervals of the projection planes are the same as focusing distances of the images obtained in the step 101 as shown in FIG. 44, for example, but they may not necessarily be the same as the focusing distances.

Next, a viewpoint for obtaining the three-dimensional shape of the object is determined, in other words, a point (reference viewpoint) R that is a reference when obtaining the probability that the surface of the object exists on the projection point is determined (step 10302). The reference viewpoint R may be the same as the virtual viewpoint P or may not be the same. When generating images of the object viewed from plural virtual viewpoints P successively, the reference viewpoint may be determined as a barycenter of the virtual viewpoints.

Next, projection point series that are groups each including projection points on a line that pass through the reference viewpoint R, and points (corresponding points) corresponding to the projection points are set (step 10303). The projection point series are defines as sets of cross points (projection points) $T_j$ between the lines that pass through the reference viewpoint R and the rojection planes $L_j$. The projection point series S can be described as $S=\{T_j|j \in J\}$, and if the set is $\sigma$, $S \in \sigma$ holds true.

Next, an array (texture array) for holding the image to be texture-mapped to each projection point is kept on a memory in an apparatus for generating the image, for example (step 10304). At this time, the array to be kept includes color information and existence probability information by 8 bits for each pixel as texture information corresponding to the position of the projection point.

In the step 10304, correspondence between the two-dimensional digital coordinates $(U_j, V_j)$ of the pixel of the texture array and the three-dimensional coordinates $(X_j, Y_j, Z_j)$ of the projection point $T_j$ is also set. At this time, for example, values of $(X_j, Y_j, Z_j)$ for every $(U_j, V_j)$ may be set as a table. Or, only some values of $(X_j, Y_j, Z_j)$ of representative $(U_j, V_j)$ may be set and other correspondences are obtained by interpolation processing such as linear interpolation, for example.

Next, color information $K_j$ and existence probability $\beta_j$ for pixels corresponding to each projection point $T_j$ kept in the step 10304 are determined based on the images of the object obtained in the step 101 (step 10305). At that time, as to the color information and the existence probability, the projection points $T_j$ on the projection point series S are scanned successively within a limit of $T_j \in S$, and the processing is repeated within a limit of the projection point series $S(\in \sigma)$, so that double loop processing is performed.

In the processing of the step 10305, first, as shown in FIG. 56, the projection point series S to be scanned is initialized to a start position (step 10305a). Then, next, the projection point $T_j$ for scan is initialized to a start position within the projection point series S, for example, initialized to j=1 (step 10305b).

Next, color information $K_j$ of coordinates $(X_j^*, Y_j^*, Z_j^*)$ of the projection point $T_j$ is determined (step 10305c). In the step 10305c, first, a position, in the image plane (image sensor), that corresponds to a point at coordinates $(X_j^*, Y_j^*, Z_j^*)$ when the point is taken is calculated. Then, the color information of a pixel $(U_j^*, V_j^*)$, on the texture array, corresponding to the projection point $T_j$ is determined to be color information at $(u_{ij}^*, v_{ij}^*)$ ($i \in I$), for example.

Next, the focusing degree $Q_j$ of the projection point $T_j$ is determined. The focusing degree $Q_j$ is calculated using the equation 65 based on the local spatial frequency of the corresponding point, for example (step 10305d).

Next, after processing up to the step 10305d has been performed, the projection point $T_j$ is updated, and it is determined whether every projection point $T_j \in S$ has been scanned (step 10305e). When every point has been scanned, the step goes to the next step 10305f. If every point has not been scanned, the step returns to the step 10305c.

When it is determined that every point has been scanned in step 10305e, next, the probability (existence probability) $\beta_j$ that the object exists on the projection point is determined for every projection point $T_j$($j \in J$) on the projection pint series S based on the focusing degree $Q_j$ of each projection point $T_j$ calculated in the step 10305d (step 10305f). The existence probability $\beta_j$ is determined using the equation 68, for example. Since it is only necessary for the existence probability $\beta_j$ to satisfy the equation 66 and the equation 67 basically, equations other than the equation 68 can be used.

Next, the projection point series S is updated and it is determined whether every projection point series $S \in \sigma$ has been scanned (step 10305g). If every projection point series has been scanned, the processing of the step 103, that is, processing for obtaining the three-dimensional shape of the object completes. If every projection point series has not been scanned, the step returns to the step 10305b.

In the step 10305g, when it is determined that every projection point series has been scanned, next, an image of the object, represented by using the projection planes $L_j$(j=1, 2, \ldots, M), viewed from the virtual viewpoint P is generated by rendering according to the existence probability $\beta_j$(step 104). It is assumed that the coordinates of the image plane of the virtual viewpoint P are represented by up and vp as shown in FIG. 57. In this case, the color information $K_p^*$ of a pixel $p^*(u_p^*, v_p^*)$ on the image plane is determined by multiplying color information $\{K_j^*|j \in J\}$, of projection point series $\{T_j^*|j \in J\}$ on a line connecting between the virtual viewpoint P and the pixel p* by corresponding existence probability $\{\beta_j^*|j \in J\}$, and by adding the multiplied color information, so that the color information $K_p^*$ is represented by the following equation 83.

$$K_p^* = \sum_{j=1}^{M} \beta_j^* K_j^* \qquad \text{[Equation 83]}$$

Then, by determining the color information for every pixel on the image plane by using the equation 83, the image of the virtual viewpoint P can be obtained.

By calculating $K_p^*$ using the following equation 84 instead of the equation 83, it can be ensured that $K_p^*$ always falls within a limit of an effective color space even when positions of the reference viewpoint R and the virtual viewpoint P are different.

$$K_p^* = \frac{\sum_{j=1}^{M} \beta_j^* K_j^*}{\sum_{j=1}^{M} \beta_j^*}$$ [Equation 84]

Although color information is determined by scanning pixels on the image plane in this procedure, the procedure is not limited to this. For example, rendering processing can be performed by a general graphic library such as OpenGL, DirectX and the like by passing, to the library, data such as the configuration of the projection planes $L_j$, the texture array, setting of the virtual viewpoint P and the like.

Accordingly, the generation processing of the virtual viewpoint image of this embodiment 3-1 completes, so that the generated image is output to the image display means such as a CRT (Cathode Ray Tube), a liquid crystal display and the like. As to the image displayed on the image display means, in images of the object, color information of a projection point having low focusing degree Q calculated in the step 10305*d* has small contribution to color information of a point on the generated image. Therefore, the projection point at which reliability of distance estimation is low is rendered vaguely. As a result, for example, the image does not appear to lack partial image or to have extremely deteriorated image quality as the image generated by the conventional method, but the deterioration is not annoying for the user.

Figure 58:
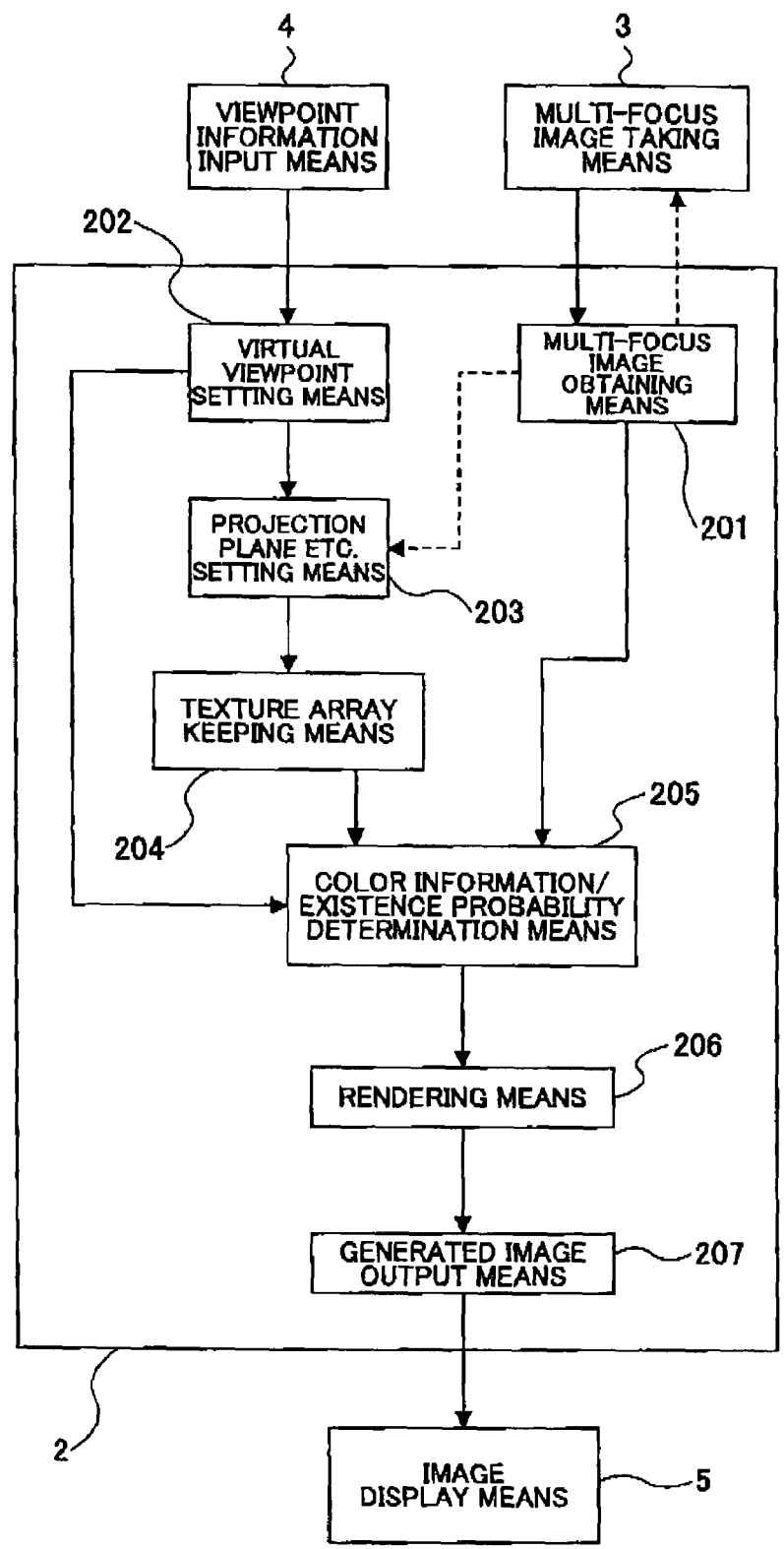
FIG. 58 is a schematic diagram showing a general configuration of the apparatus for generating the image using the image generation method of the embodiment 3-1, and is a block diagram showing the configuration of the apparatus.

FIGS. 58-61 are schematic diagrams showing a general configuration of the apparatus for generating the image using the image generation method of this embodiment 3-1. FIG. 58 is a block diagram showing the configuration of the apparatus. FIGS. 59-61 are diagrams showing a configuration example of the object image taking means.

In FIG. 58, 2 indicates the image generation apparatus, 201 indicates a multiple focus image (object image) obtaining means, 202 indicates a virtual viewpoint setting means, 203 indicates a projection plane etc. setting means, 204 indicates a texture array keeping means, 205 indicates a color information/existence probability determination means, 206 indicates a rendering means, 207 indicates a generated image output means, 3 indicates a multiple focus image (object image) taking means, 4 indicates a viewpoint information input means, 5 indicates an image display means. In FIG. 59, 6 indicates a polarizing binary optical system, 7, 7A and 7B indicates image sensors, 8 indicates a beam splitter, ObjA and ObjB indicate objects. In FIG. 60, 9 indicates a polarizing filter. In FIG. 61, 10 indicates a variable focus lens, 11*a*, 11*b*, 11*c* and 11*d* indicate fixed focus lenses, 12 indicates a lens holder.

As shown in FIG. 58, for example, the image generation apparatus 2 used for generating the image using the image generation method of this embodiment includes the multiple focus image (object image) obtaining means 201 for obtaining plural images of different focusing distance, the virtual viewpoint setting means 202 for setting the viewpoint (virtual viewpoint) of the image to be generated, the projection plane etc. setting means 203 for setting projection planes of the multi-layered structure on the virtual three-dimensional space, the texture array keeping means 204 for assigning, to a memory, the array of the image (texture image) to be mapped to the projection plane, the color information/existence probability determination means 205 for determining the color information and the existence probability on the point (to be referred to as projection point hereinafter) on each projection plane, the rendering means 206 for determining color information of each pixel on the image to be generated, and the generated image output means for outputting the image generated by the rendering means 206.

The object image obtaining means 201 obtains the image of the object taken by the object image taking means 3 including a lens, that changes focusing distance according to polarization component, such as the polarizing binary optical system (refer to document 12: Japanese Laid-Open Patent Application No. 2000-258738, for example). In addition, it is not limited to the polarizing binary optical system, and the image taken by an image taking means including a variable focus lens (refer to document 13: Japanese Patent No. 3303275, for example) can be obtained. In addition to that, by holding lenses, having different focal length, as one, images taken by changing lenses at high speed can be obtained. In this case, the object image obtaining means 201 can successively obtain the position and posture of the object that changes every moment at constant intervals of 30 Hz, for example, or can obtain a still image of the object at a desired time. In addition, an image recorded in a recording medium that is electrical, optical or magnetic after being taken by the object image taking means 3 can be obtained. It is desirable that the images of the object are taken at the same time. However, this is not always so when change of the position and the posture of the object is slow enough so that the object is regarded as a still object.

The virtual viewpoint setting means 202 sets position, direction, image angle and the like, for example, as parameters of the viewpoint (virtual viewpoint) of the image to be generated. The virtual viewpoint may be automatically determined by the virtual viewpoint setting means 202, or may be determined based on information input, by the user, using the viewpoint information input means 4 such as the mouse or the key board and the like. The viewpoint information input means 4 may be a position/posture detection sensor mounted by the user. In addition, the viewpoint information input means 4 may be one provided by other program or one provided via the network.

The projection plane etc. setting means 203 performs processing of the steps 10301, 10302 and 10303 shown in FIG. 54, for example.

The texture array keeping means 204 performs the processing of the step 10304 shown in FIG. 54, and holds information on the color information and the existence probability for each pixel, for example. The texture array keeping means 204 holds a texture array representing each of three-primary color of red (R), green (G) and blue (B) and the existence probability using 8 bits. However, the present invention does not depend on such particular data representation format.

The color information/existence probability determination means 205 performs processing of the step 10305 shown in FIG. 24, and performs processing from the step 10305*a* to the step 10305*g* shown in FIG. 56, for example. The rendering means 206 performs processing of the step 104 shown in FIG. 54 based on the result of the color information/existence probability determination means 205 so as to generate the image of the object viewed from the virtual viewpoint P.

The virtual viewpoint image generated by the rendering means 206 is output from the generated image output means 207, and is displayed by the image display means 5 such as a CRT, a LCD (Liquid Crystal Display) and a PDP(Plasma Display Panel) and the like. The image display means 5 may be a display means like a two-dimensional plane, or may be a display means having a curved surface surrounding the user. By using a display apparatus that can display stereoscopically as the image display means 5, images that are independent for right and left eyes of the user can be presented after determining two viewpoints corresponding to the right and left eyes of the user by the virtual viewpoint setting means 202 and generating a stereoscopic image from the two viewpoints. In addition, by using a three-dimensional display that can generate imgse from more than two virtual viewpoints and can display images having more than two parallaxes, a stereoscopic image can be presented to equal to or more than one user.

The generated image output means 207 may be a means that outputs the generated image not only to the image display means 5 but also to a recording medium that is electrical, magnetic or optical, for example.

In addition, although not shown in the FIG., the image generation apparatus 2 can be provided with a storing means for storing the generated image to store the generated image, and the stored image can be output according to an instruction of the user so as to display the image on the image display means 5.

In addition, by using a camera in which the paralyzing binary optical system is embedded as the taking means 3, the object Obj can be taken using two kinds of focusing distances. The paralyzing binary optical system is an optical system using material presenting optical anisotropy (birefringence). As shown in FIG. 59A, for example, focusing distances $f_1$ and $f_2$ are different between a case where the polarizing component of light passing through the paralyzing binary optical system 6 is p component and a case where the polarizing component is s component. When the image is formed on one image sensor 7 like a general taking means, as to the image obtained from one image sensor 7, an image of p component and an image of s component are overlapped, that is, an image taken with focusing distance $f_1$ and an image taken with focusing distance $f_2$ are overlapped. Therefore, as shown in FIG. 59B, for example, the light passed through the polarizing binary optical system 6 is separated by a beam splitter 8 so that the light of the p component is focused on a first image sensor 7A and the light of the s component is focused on a second image sensor 7B. As a result, the image of focusing distance $f_1$ and the image of focusing distance $f_2$ can be separated and each of them can be obtained.

For example, as shown in FIG. 59B, when the object ObjA exists near the focusing distance $f_1$ and the object ObjB exists near the focusing distance $f_2$, the object ObjA becomes sharp and the object ObjB becomes blurred in the image of the first image sensor 7A, that is, in the image formed by the light of the p component as shown in FIG. 59C. In contrast, the object ObjA becomes blurred and the object ObjB becomes sharp in the image of the second image sensor 7B.

Figure 60A:
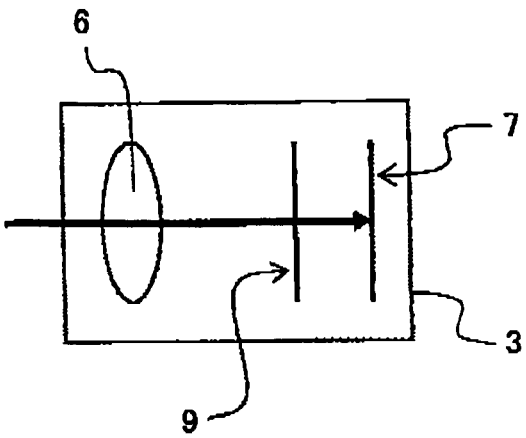
FIG. 60 is a diagram for explaining a configuration example of the object image taking means the embodiment 3-1.
Figure 60B:
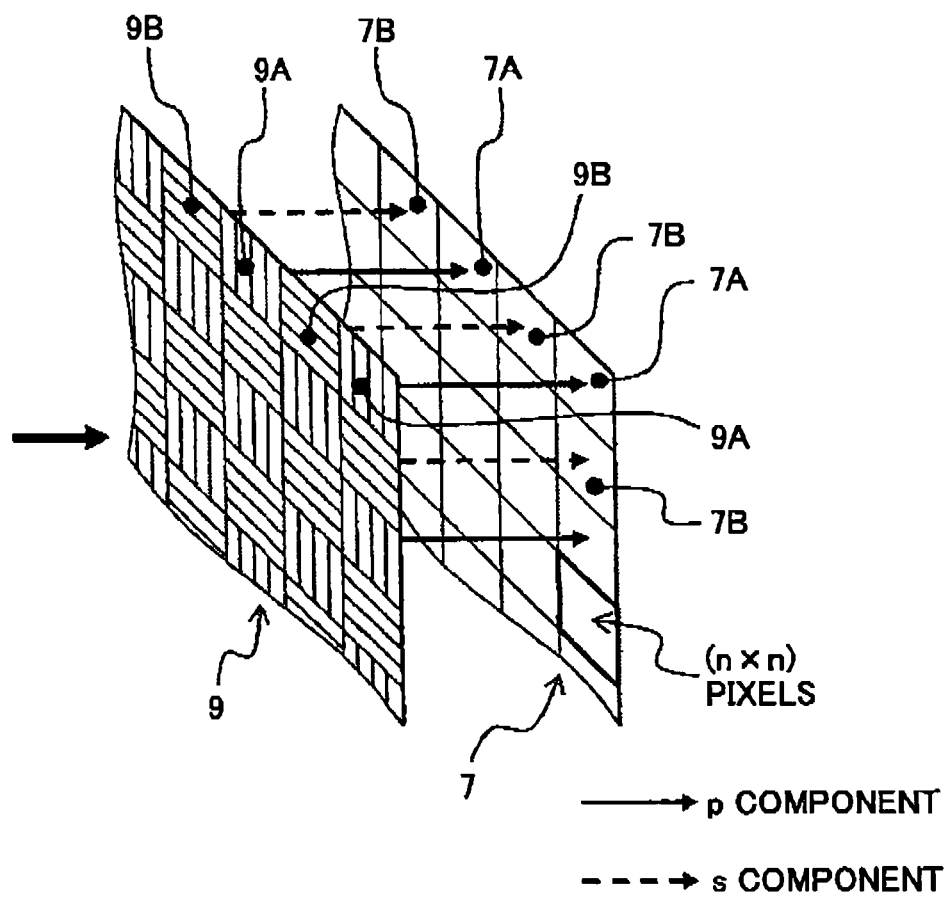

In addition, for dividing the image taken by using the polarizing binary optical system 6, a polarizing filter 9 may be provided between the polarizing binary optical system 6 and the image sensor 7 as shown in FIG. 60A, for example, instead of using the beam splitter 8. In this case, the placed polarizing filter 9 is configured such that a filter 9A for the p component and a filter 9B for the s component are arranged like a checked lattice as shown in FIG. 60B, for example. In this case, when the size of each of the filters 9A and 9B is the same as the size of the pixels of the image sensor 7, or is n×n pixels, two images shown in FIG. 59C can be obtained by subtracting pixels corresponding to p component or s component from the image obtained by the image sensor 7.

Figure 61A:
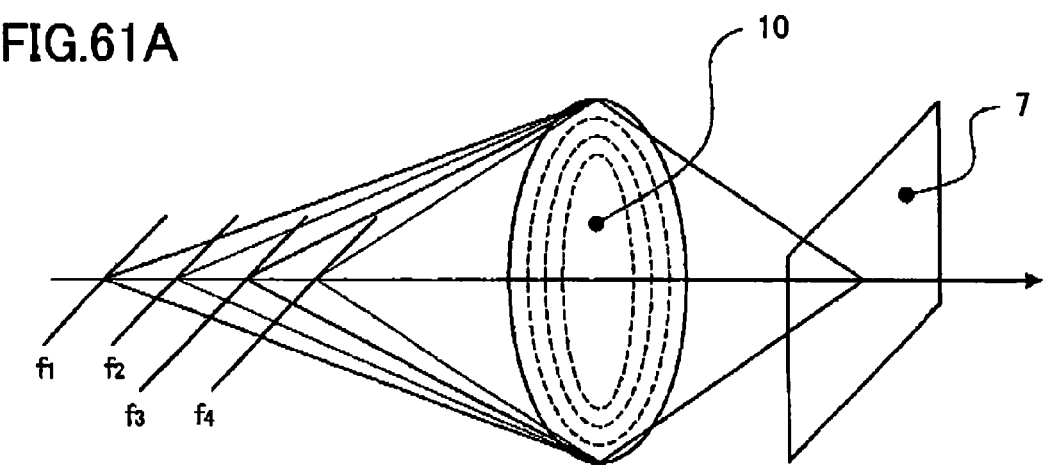
FIG. 61 is a diagram for explaining a configuration example of the object image taking means the embodiment 3-1.

In addition, for taking the plural images having different focusing distances, a variable focus lens 10 may be used as shown in FIG. 61A, for example, instead of using the polarizing binary optical system 6. By using the variable focus lens 10, images of four focus points $f_1$, $f_2$, $f_3$ and $f_4$ can be obtained using one lens as shown in FIG. 61A, for example.

Figure 61B:
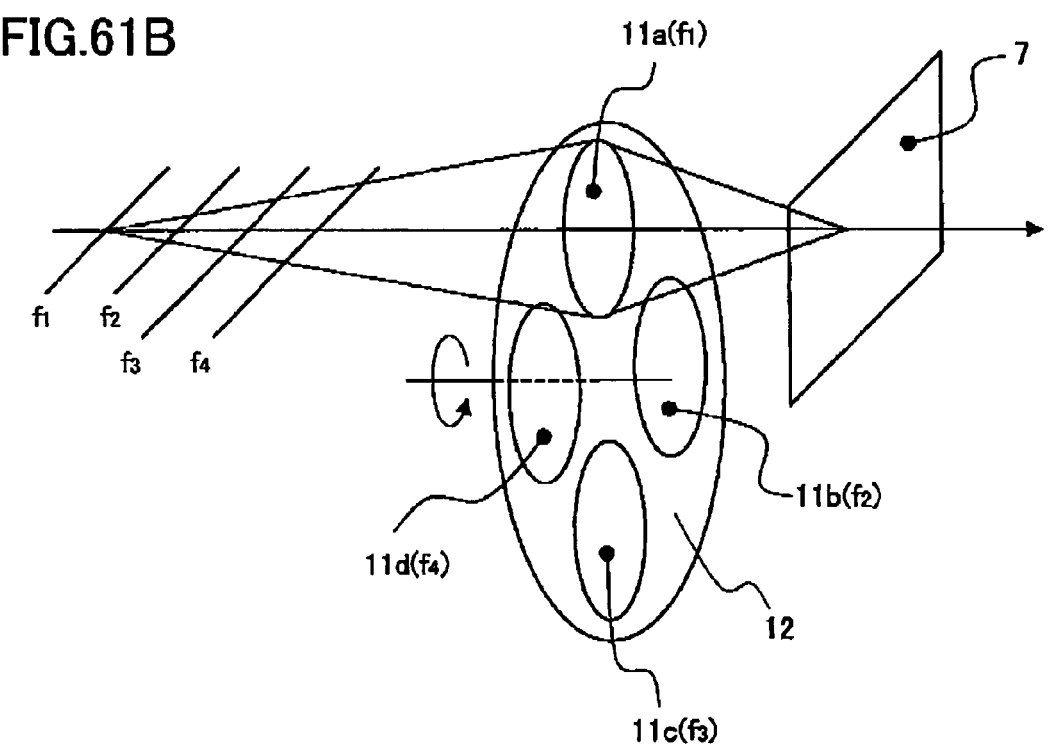

In addition, instead of changing a refractive index of a medium of a lens to change the focus position like the variable focus lens 10 and instead of using the polarizing binary optical system 6, the images can be taken by holding fixed focus lenses 11a, 11b, 11c and 11d, as one with a lens holder 12, each having a fixed focusing distance that is different each other and by rotating the lens holder 12 to switch each lens at high speed as shown in FIG. 61B.

As described above, according to the image generation method of this embodiment 3-1, the method of the present invention does not intend to obtain a geometrical object model accurate for every case and every portions like the conventional method. But, assuming that an estimated value having adequate reliability cannot be obtained in the distance estimation depending on picture-taking conditions and portions, a portion, by which an estimated value of low reliability is obtained, is drawn vaguely so as to provide the portion with low contribution to image generation for avoiding extreme image deterioration, and a portion, by which distance data of high reliability is obtained, is drawn clearly so as to provide the portion with high contribution to image generation. Therefore, deterioration of image of the portion having low estimation reliability can be inconspicuous so that the virtual viewpoint image having small deterioration can be obtained in the eyes of the user.

In addition, according to the image generation method of this embodiment 3-1, since the virtual viewpoint image can be generated using texture mapping, workload of the apparatus in the image generation processing can be decreased and the virtual viewpoint image can be generated at high speed.

In addition, the virtual viewpoint image generation apparatus 2 does not need to be a specific apparatus. For example, the virtual viewpoint image generation apparatus 2 can be realized by a computer a program, for example. In such a case, by generating a program that can cause the computer to execute each step shown in FIGS. 54 and 55 and by executing the program on the computer, the virtual viewpoint image having small image deterioration can be easily generated at high speed even though the computer is a general personal computer. In addition, the program can be provided by recording it into a recording medium that is magnetic, electrical or optical, and also can be provided via a network.

The configuration of the image generation apparatus, the method for generating the image and processing procedures described in this embodiment 3-1 are merely examples, and the principal object of the present invention is to provide the existence probability to the image to be mapped to the projection planes configured by multi-layers and to render a part, at which the reliability of distance estimation is low, vaguely by texture-mapping the part to plural projection planes. Thus, within a limit that does not largely differ from the scope, the present invention is not dependent on a particular processing method or implementation.

In addition, in the image generation method of this embodiment 3-1, although a case is described as an example in which a color image in which the point (pixel) is represented by color information using three primary color of red (R), green (G) and blue (B) is obtained and the three-dimensional shape of the object is generated, the image to be obtained is not limited to the color image. In the image generation method of this embodiment 3-1, a black and white image in which the point (pixel) is represented by brightness (Y) and color-difference (U,V) may be obtained so as to generate the virtual viewpoint image. In the case when the image to be obtained is the black and white image, the virtual viewpoint image can be obtained by the procedure described in this embodiment 3-1 using the brightness information (Y) as information corresponding to the color information.

Figure 62:
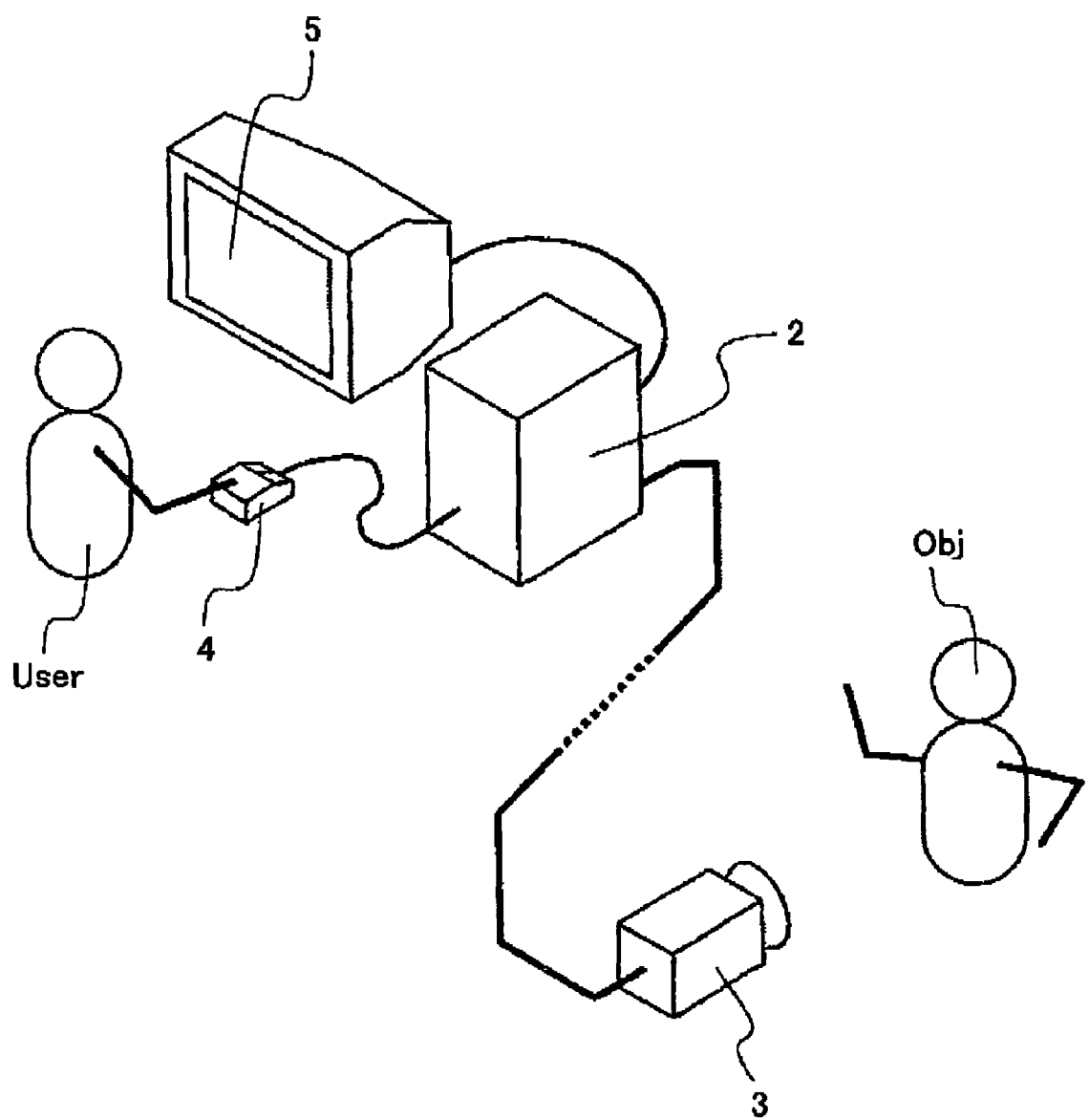
FIG. 62 is a schematic diagram showing a general configuration of the image generation system using the image generation apparatus of the embodiment 3-1, and is a diagram showing a configuration example of the image generation system.
Figure 63:
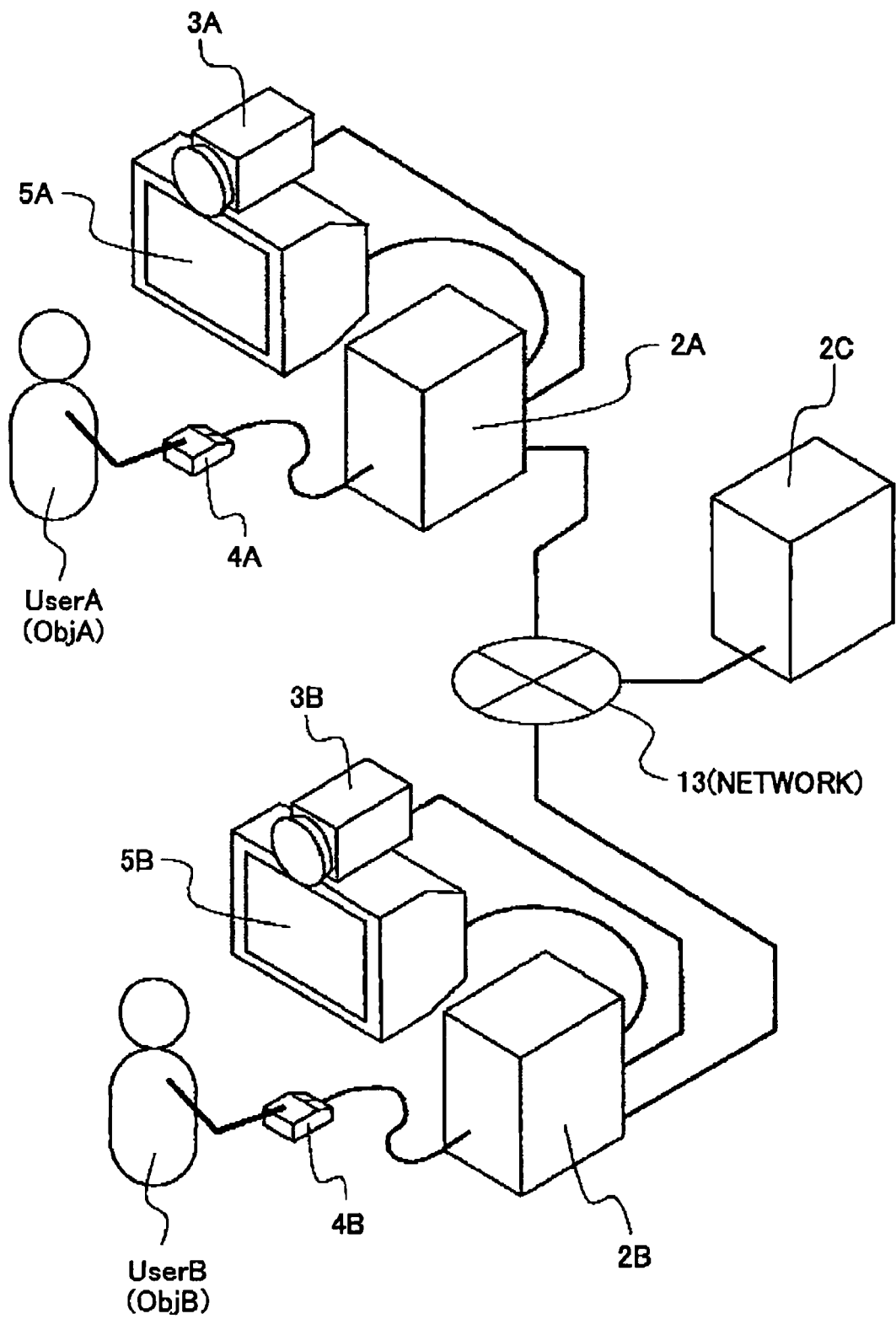
FIG. 63 is a schematic diagram showing a general configuration of the image generation system using the image generation apparatus of the embodiment 3-1, and is a diagram showing another configuration example of the image generation system.

FIGS. 62 and 63 are schematic diagrams showing a general configuration of the image generation system using the image generation apparatus of this embodiment 3-1. FIG. 62 is a diagram showing a configuration example of the image generation system, and FIG. 63 is a diagram showing another configuration example of the image generation system.

The image generation apparatus 1 of this embodiment 3-1 can be applied to the image generation system shown in FIG. 62, for example. In this case, when the user User specifies desired viewpoint position, direction and image angle using the viewpoint information input means 4 such as a mouse, the image generation apparatus 2 obtains the images of the object Obj taken by the taking means 3. The image generation apparatus 1 that obtains the images of the object Obj generates the image of the object Obj viewed from the viewpoint position, direction and image angle specified by the user User according to the procedure described in this embodiment 3-1. Then, the generated image is displayed on the image display means 5 so that the image is presented to the user User.

The taking means 3 may be placed at a place geographically near the place where the user User exists, or may be placed in a place geographically apart.

In addition, the image generation apparatus 1 of this embodiment 3-1 can be applied not only to the unidirectional image generation system in which relationship between the user User and the object Obj is fixed, as shown in FIG. 62, for example, but also to a bi-directional communication system such as TV phone o TV conference.

When applying the image generation apparatus 2 of this embodiment 3-1 to the bi-directional communication system, it is only necessary to provide a taking means 3A for taking the user UserA and a taking means 3B for taking the user UserB as shown in FIG. 63, for example. Accordingly, the user UserA can generate the image of the user UserB viewed from a desired viewpoint using the image of the user UserB taken by the taking means 3B so as to display the image on the image display means 4A. In the same way, the user UserB can generate the image of the user UserA viewed from a desired viewpoint using the image of the user UserA taken by the taking means 3A so as to display the image on the image display means 4B. In this example, the image generation apparatus 2 may be placed at each of the users UserA and UserB, or may be placed at either one of the users UserA and UserB. In addition, by placing the image generation apparatus 2C on the network 13 such as the Internet or the company LAN and the like, the image viewed from the virtual viewpoint can be generated and displayed without placing the image generation apparatus 2 at any of the users UserA and UserB.

Although communications between two users are shown in FIG. 63, among more users, similar image generation can be performed. In the case, assuming a virtual space used for communication separately from the actual space in which users actually exist, by providing an image of other user according to position relationship with each other, the system can provide users with feeling as if to share virtual space (cyber space) on the network.

The configuration of the system shown in FIGS. 62 and 63 shows one application example of the image generation apparatus in this invention, and the present invention is not necessarily limited to such configuration. That is, placement, form, implementation and the like of each apparatus and means can be set as one chooses as long as without exceeding the scope of the present invention.

(Embodiment 3-2)

Figure 64:
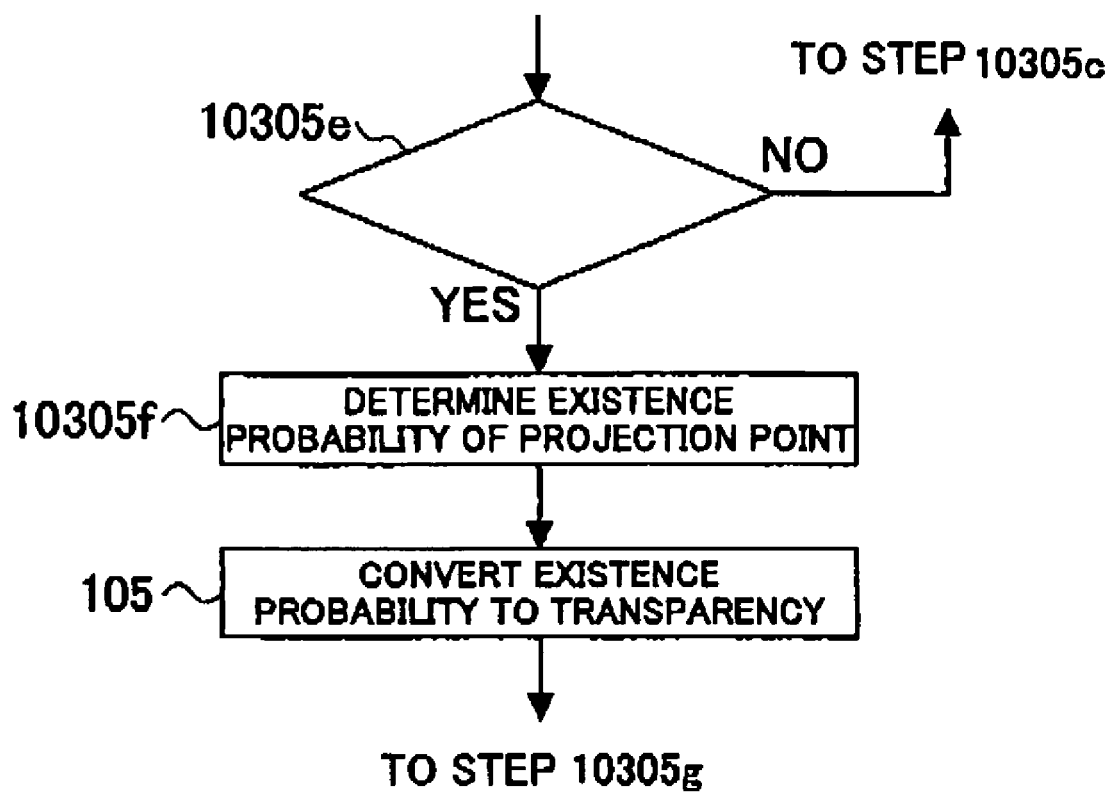
FIG. 64 is a flow diagram showing processing of the virtual viewpoint image generation method of the embodiment 3-2.

FIG. 64 is a flow diagram showing characteristic feature of the embodiment 3-2. In the embodiment 3-2, in the processing for generating the virtual viewpoint image described in the embodiment 3-1, image generation is performed by converting the existence probability to transparency instead of using the existence probability of the projection point determined in the step 10305$f$.

In this case, as to the configuration of the image generation apparatus 1 and the whole processing procedure, forms similar to those described in the embodiment 3-1 can be adopted. Therefore, only different points are described in the following.

In the embodiment 3-1, color information of each point on the image viewed from the virtual viewpoint P is determined using the equation 69 by using the existence probability $\beta_j$ determined in the step 10305$f$ so as to generate the virtual viewpoint image. In that case, as described with FIG. 50, the obtained color information may be largely different from actual color information of the object surface according to the shape of the object or the position relationship between the reference viewpoint and the virtual viewpoint. Thus, in this embodiment 3-2, as a method for solving the problem, a method is described in which the existence probability is converted to transparency so as to mix color information of each projection point in a ratio according to the transparency. In this case, the step of converting the existence probability into the transparency can be performed after the step 10305$f$ in the step 103, or can be performed between the steps 103 and 104. In this embodiment, as shown in FIG. 64, the step 105 of determining the transparency by converting the existence probability is added just after the step 10305$f$ of determining the existence probability.

In this case, although the texture array is kept for keeping the color information and the existence probability in the step 10304 of keeping the texture array in the embodiment 3-1, a texture array for holding the color information and the transparency is kept in the step 10304 in this embodiment 3-2.

The transparency $\alpha_j$ is calculated based on the existence probability $\beta_j$. Then, like the step 10305$f$ in the embodiment 3-1, the existence probability is calculated once in the step 10305$f$, and the transparency $\alpha_j$ is calculated in the next step 105 in this embodiment 3-2.

In addition, in step 104 for performing rendering processing in this embodiment 3-2, $D_j$ is successively calculated according to the equations 11-13 instead of the equation 83 or 84 described in the embodiment 3-1. Therefore, color information $K_j^*$ of a pixel p* ($U_p^*, V_p^*$) on the image plane is calculated by the following equation 85.

$$K_p^* = D_M \quad \text{[Equation 85]}$$
$$= \alpha_M K_M + (1 - \alpha_M)\alpha_{M-1} K_{M-1} + \cdots +$$
$$(1 - \alpha_M)(1 - \alpha_{M-1}) \cdots (1 - \alpha_2)\alpha_1 K_1$$

The image generation method in this embodiment 3-2 is as mentioned above. The method for calculating the transparency $\alpha_j$ based on the existence probability $\beta_j$ is the same as the method described with reference to FIG. 19B in the first embodiment.

According to this embodiment 3-2, like the embodiment 3-1, the virtual viewpoint image in which the partial image deterioration is inconspicuous can be generated easily at high speed.

In addition, as described in the embodiment 3-1, in image generation using the existence probability information as it is, there may be a case in which brightness increases near the blocking area of the object when the reference viewpoint and the virtual viewpoint are different. On the other hand, as described in the embodiment 3-2, in the image generation for converting the existence probability information to transparency, there is an effect to prevent the phenomenon. Therefore, a virtual viewpoint image having small image deterioration and more similar to the actual object can be obtained.

In addition, as described in the embodiment 3-1, in the image generation using the existence probability information as it is, there is no guarantee that mixed color information falls within an effective color information limit when the reference viewpoint and the virtual viewpoint are different, so that correction processing is required, for example. On the other hand, according to the image generation for converting the existence probability information to transparency like the embodiment 3-2, such correction is not necessary. Therefore, the image generation processing can be simplified.

In addition, in image generation for converting the existence probability information to the transparency like the virtual viewpoint image generation method of this embodiment 3-2, a semitransparent object can be efficiently represented, so that there is an effect that the present invention can be applied to more objects in the actual world.

The virtual viewpoint image generation method described in this embodiment 3-2 is an example, and the principal object of the present embodiment is to generate the virtual viewpoint image by converting the existence probability information to the transparency. Therefore, the present invention is not dependent on particular calculation method or processing procedure within a limit largely exceeds the object.

Also in the image generation method of this embodiment 3-2, the image to be obtained may be a color image or black and white image. When the black and white image is obtained, the mixing processing described in this embodiment 3-2 is performed using brightness information (Y) as information corresponding to the color information.

Figure 65:
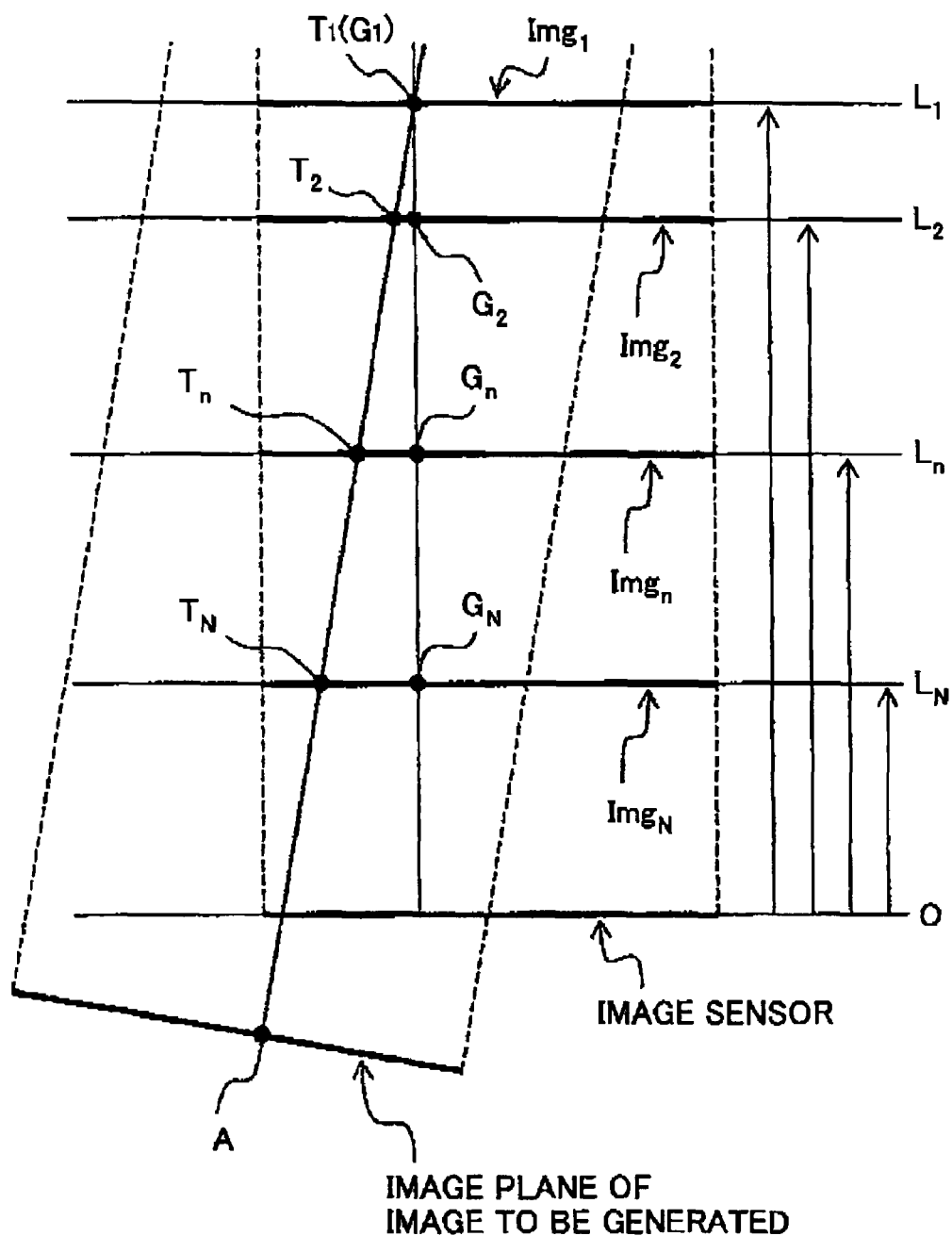
FIG. 65 is a schematic diagram for explaining other generation method in the image generation method in the third embodiment.

FIG. 65 is a schematic diagram for explaining other generation method in the image generation method in this invention.

In the image generation method in the embodiment 3-1 and the embodiment 3-2, it is assumed that a general lens is used for obtaining the plural images having different focusing distances, and approximation based on a pinhole optical system is performed for projection of the color information. However, when the images having different focusing distances are used like the image generation method of this invention, a parallel projecting system can be set as shown in FIG. 65 for performing projection of the color information by obtaining the plural images using a telecentric lens. In this case, assuming that a cross point of a line, passing through the point A on the image to be generated, perpendicular to the image surface and the projection plane $L_j$ is the corresponding point $T_j$, the probability $\beta_j$ that the object exists on the projection point $T_j$ is obtained by the procedure described in the embodiment. In this case, as shown in FIG. 65, the x component and the y component of the corresponding point $G_1$ to be texture-mapped to the projection point $T_1$, become the x component and the y component of the point G on the image sensor. On a generated image $Img_i$, a part the same as the part appearing on the corresponding point $G_1$ is on a line, passing through the point G on the image sensor, perpendicular to the image sensor. Thus, regarding these points as corresponding points $G_i$, the color information $K_1$ and the focusing degree $Q_1$, of the projection point $T_1$, are determined. Then, after performing this processing for each projection point $T_j$ on the same line, the existence probability $\beta_j$ can be obtained from the focusing degree of each projection point.

(Effects of the Third Embodiment)

As mentioned above, the image generation method of the third embodiment provides color information or brightness information and the probability (existence probability) that the surface of the object exists to plural projection points that overlap when viewed from the reference viewpoint for obtaining the three-dimensional shape of the object. That is, the method of this embodiment does not assume that the surface of the object exists on a projection point among the plural projection points overlapping viewed from the reference viewpoint like conventional methods for obtaining the three-dimensional shape, but assumes that the surface of the object exists on each projection point with the existence probability. By doing so, even when the reliability in distance estimation is low, the surface of the object exists with a probability on the projection point at which the surface of the object actually exists. In this case, when the image of the object viewed from the virtual viewpoint is generated, a pixel, among points (pixels) of the generated image, having color information or brightness information obtained by mixing color information of projection point at which the existence probability is low is rendered vaguely, that is, a point on the object at which the reliability in distance estimation is low is rendered vaguely. As a result, discontinuous noise that may occur when erroneous distance estimation is performed can be made inconspicuous.

In this method, plural images having different focusing degree are used for obtaining the three-dimensional shape of the object. The existence probability of each of the projection points overlapping when viewed from the reference viewpoint is determined based on the focusing degree of points (corresponding points) on each image corresponding to the projection points. Therefore, there may be a case where more than one projection points at which the existence probability is very high are included in the plural projection points overlapping when viewed from the virtual viewpoint depending on the shape of the object or the position relationship between the reference viewpoint and the virtual viewpoint. In such a case, for example, there is a fear that color information on a point of the generated image exceeds a limit of an effective color space when color information or brightness information of each projection point are mixed in a ratio according to the existence probability. Therefore, the transparency may be set at the projection point based on the existence probability so that the mixing processing of the color information can be performed based on a ratio according to the transparency. By doing so, when more than one projection points at which the existence probability is high are included in the plural projection points overlapping when viewed from the virtual viewpoint, contribution of color information of a projection point far from the virtual viewpoint to color information of a point on the generated image can be decreased, wherein the projection point far from the virtual viewpoint is a projection point that is not visible from the virtual viewpoint, for example.

This method does not perform processing for obtaining an accurate geometrical model for every shape of the object and for every point of the object as performed in conventional generation methods. Therefore, workload on the apparatus (computer) that generates the image can be decreased. By decreasing the workload on the apparatus that generates the image, the image can be generated at high speed even by an apparatus having low processing performance like a generally used personal computer.

In addition, when obtaining the three-dimensional shape of the object, by using the images taken from one viewpoint by changing the focusing distance, the taking apparatus used for taking the images can be downsized compared to a conventional apparatus that takes the images from plural viewpoints, so that the apparatus configuration can be simplified. In this case, for example, by taking the object using the polarizing binary optical system including a material by which the focusing distance changes according to the polarization planes, two images having different focusing distances can be taken from one viewpoint. In addition, for example, by providing plural lenses of difference focusing distances so as to take the images while changing each lens at high speed, more than two images having different focusing distances can be taken from one viewpoint.

Fourth Embodiment

Next, the fourth embodiment of the present invention is described. The fourth embodiment mainly corresponds to claims 30-43. The fourth embodiment is characterized in that the existence probability is obtained based on statistical processing (parameter fitting) for the evaluation reference value $v_j$. In figures for explaining the fourth embodiment, the same signs are assigned to components having the same function.

In the three-dimensional image display method of the fourth embodiment, the three-dimensional shape of the object is obtained from plural images obtained by taking the object under different taking conditions each other. Then, based on the three-dimensional shape of the object, a three-dimensional image of the object is displayed on a display having plural display planes like the DFD. When obtaining the three-dimensional shape of the object, projection planes of the multi-layered structure are set in a virtual three-dimensional space, and for points (projection points), on plural projection planes, that overlaps when viewed from the observer's viewpoint, color information or brightness information of each projection point, and probability (existence probability) that the surface of the object exists on the projection point is determined. Then, when generating two-dimensional images to be displayed on the plural display planes based on the three-dimensional shape of the object, the color information or brightness information and the existence probability are assigned to each point of the two-dimensional images. When displaying the image on the image display plane, each point of the two-dimensional image is displayed with brightness according to the existence probability. By doing so, a part at which the reliability of estimation on distance of the surface of the object is low is displayed vaguely, so that a three-dimensional image that looks natural for the observer can be provided.

(Embodiment 4-1)

Figure 66:
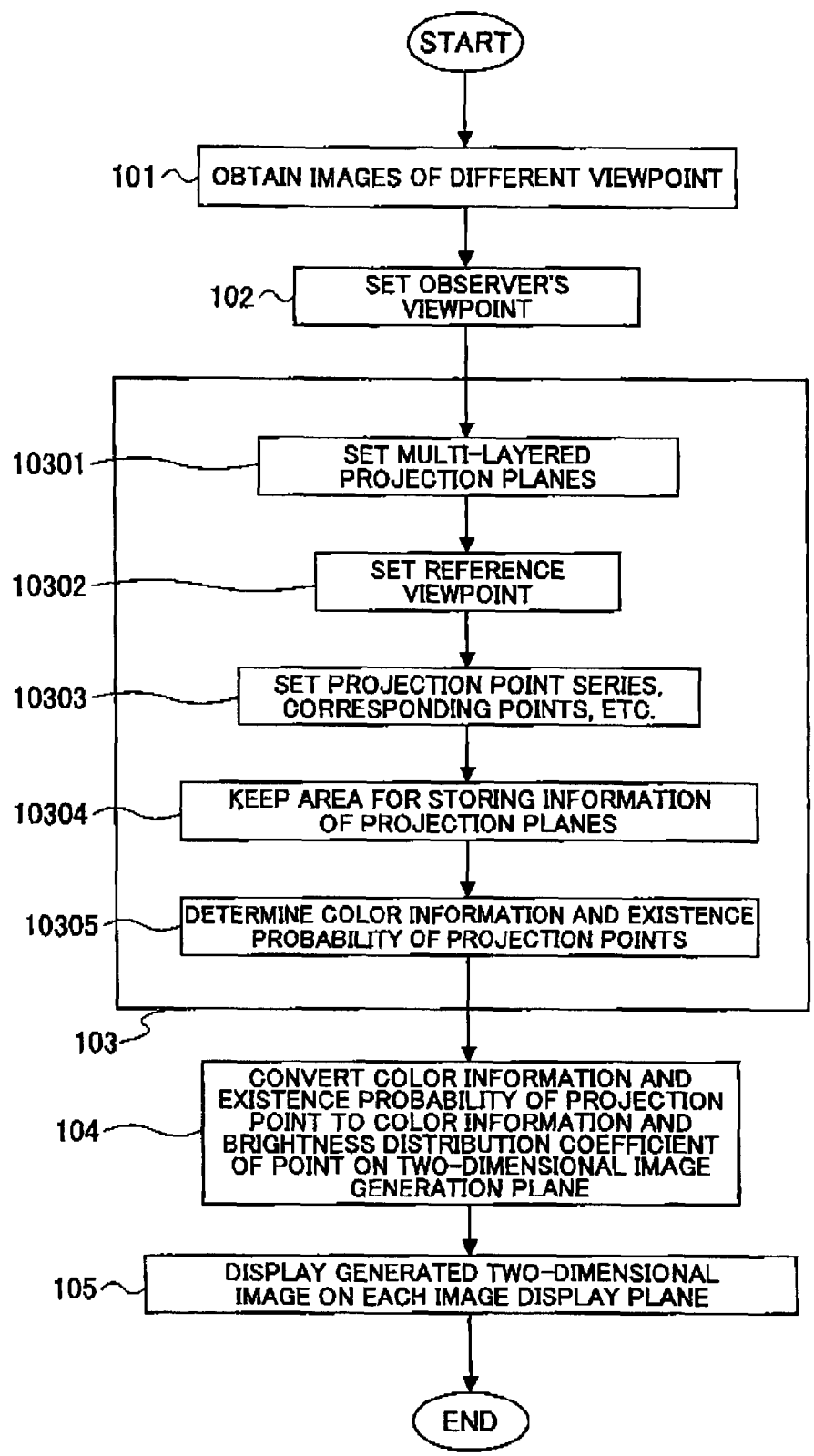
FIG. 66 is a schematic diagram for explaining the image generation method of the embodiment 4-1, and is a flow diagram showing an example of the whole processing procedure.
Figure 67:
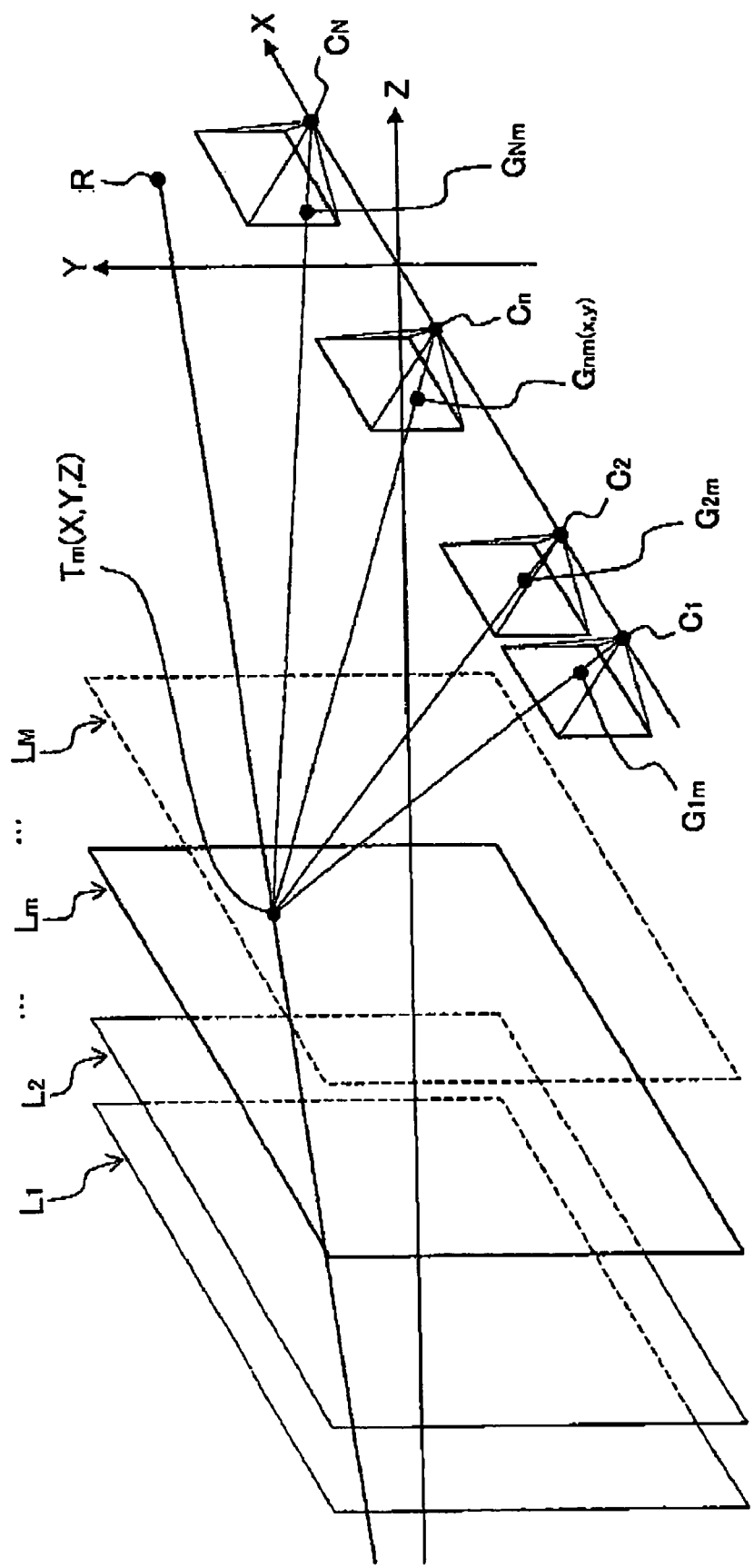
FIG. 67 is a schematic diagram for explaining the image generation method of the embodiment 4-1, and is a diagram showing an example of a method for setting the projection plane.
Figure 68:
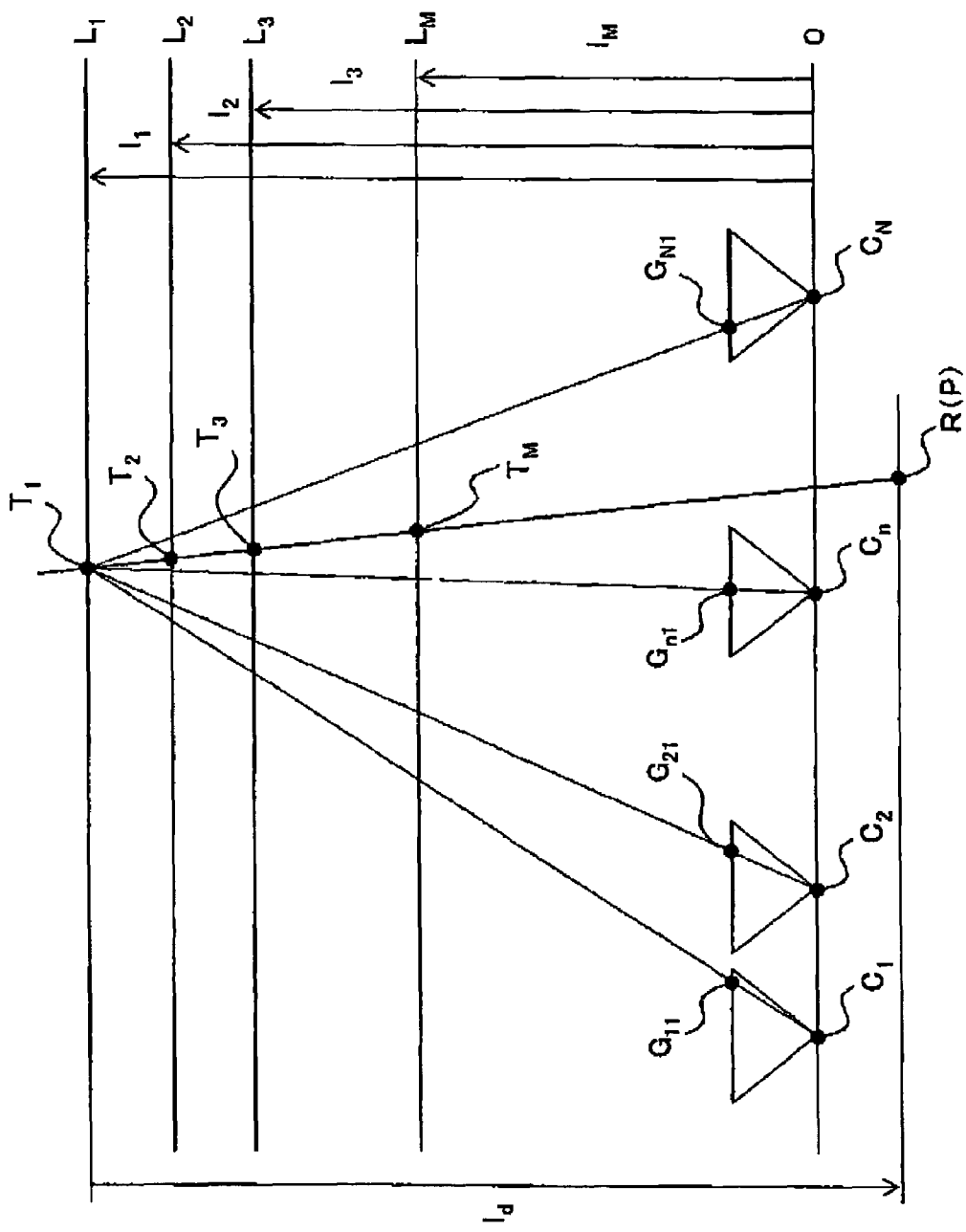
FIG. 68 is a schematic diagram for explaining the image generation method of the embodiment 4-1, and is a diagram showing an example of a method for setting the projection plane.
Figure 69:
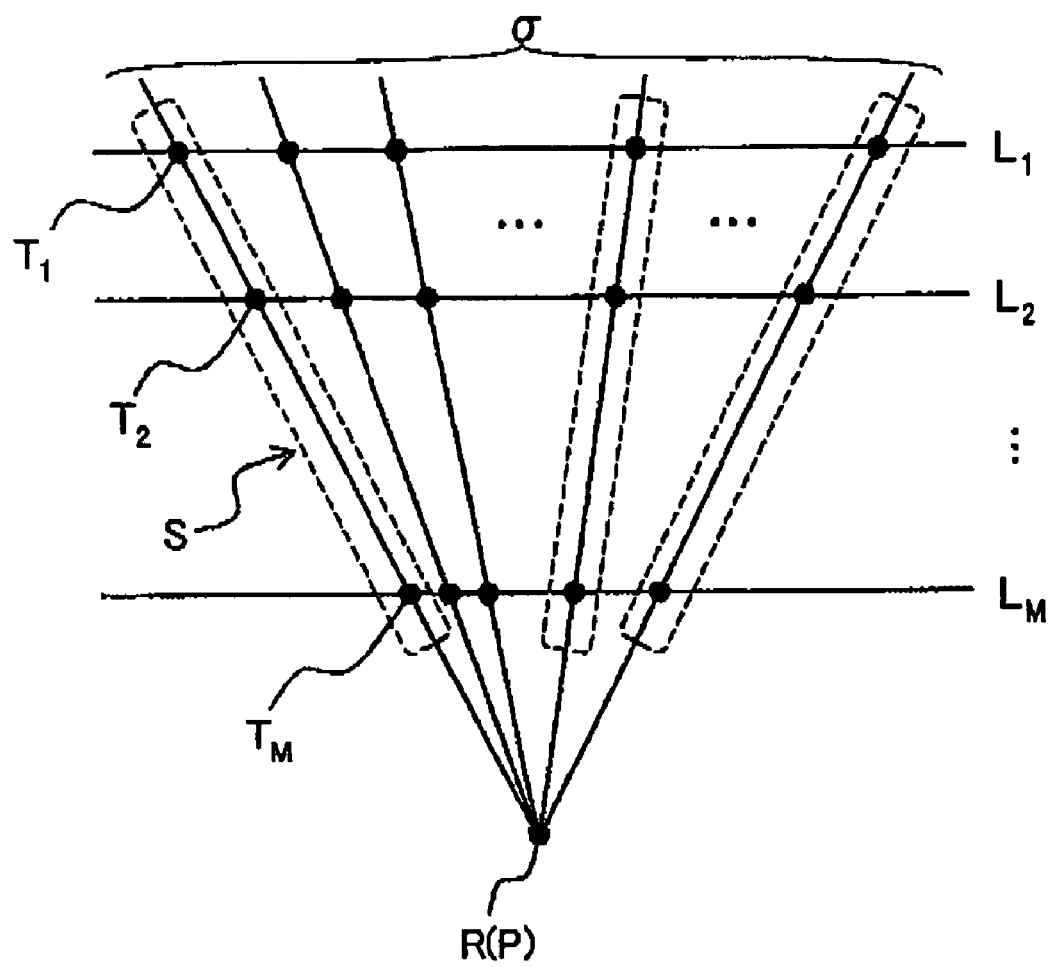
FIG. 69 is a schematic diagram for explaining the image generation method of the embodiment 4-1, and is a diagram for explaining a method for setting projection point series.
Figure 70:
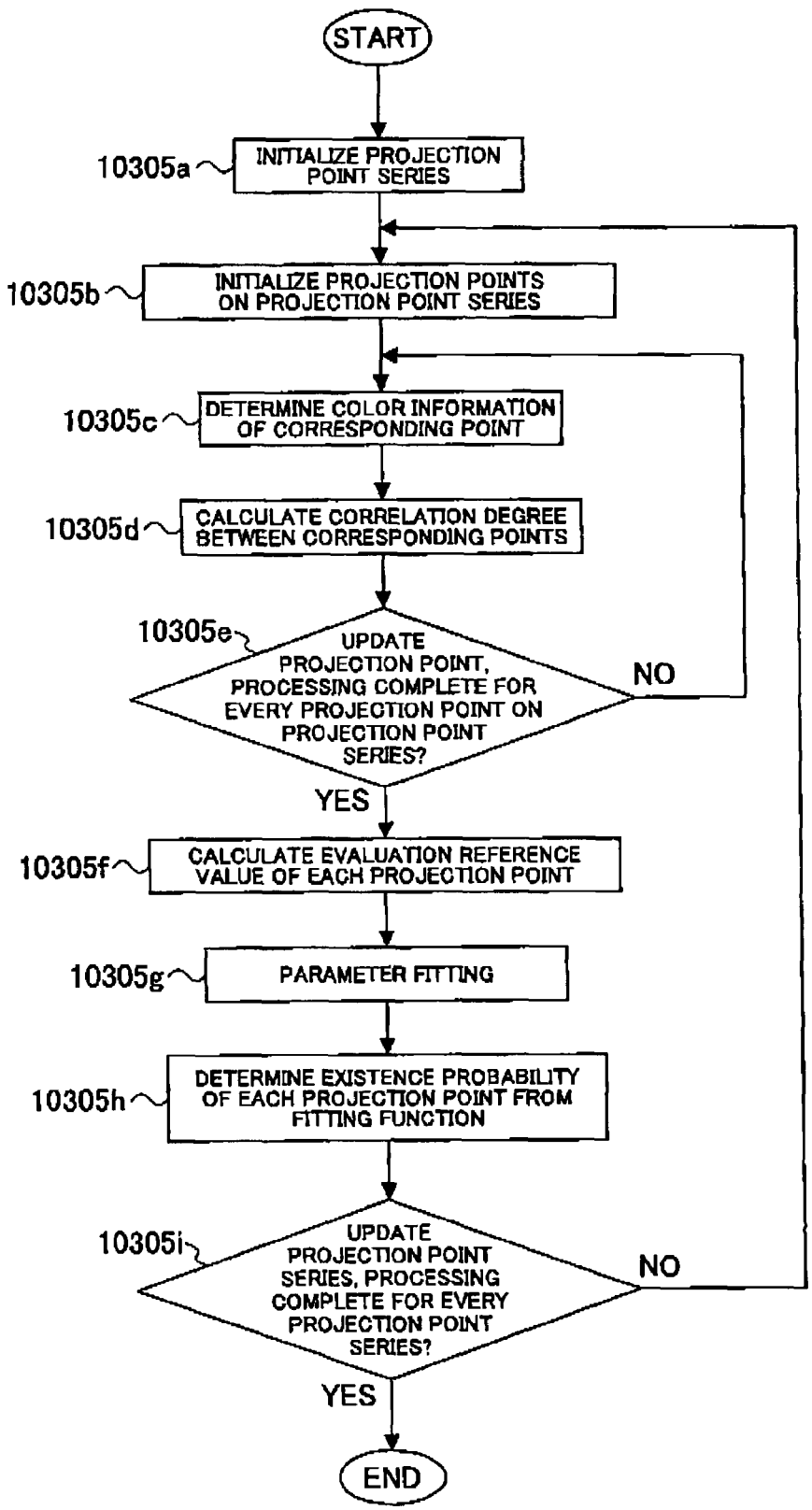
FIG. 70 is a schematic diagram for explaining the image generation method of the embodiment 4-1, and is a flow diagram showing an example of processing procedure of steps for determining the color information and the existence probability of the projection point.
Figure 73A:
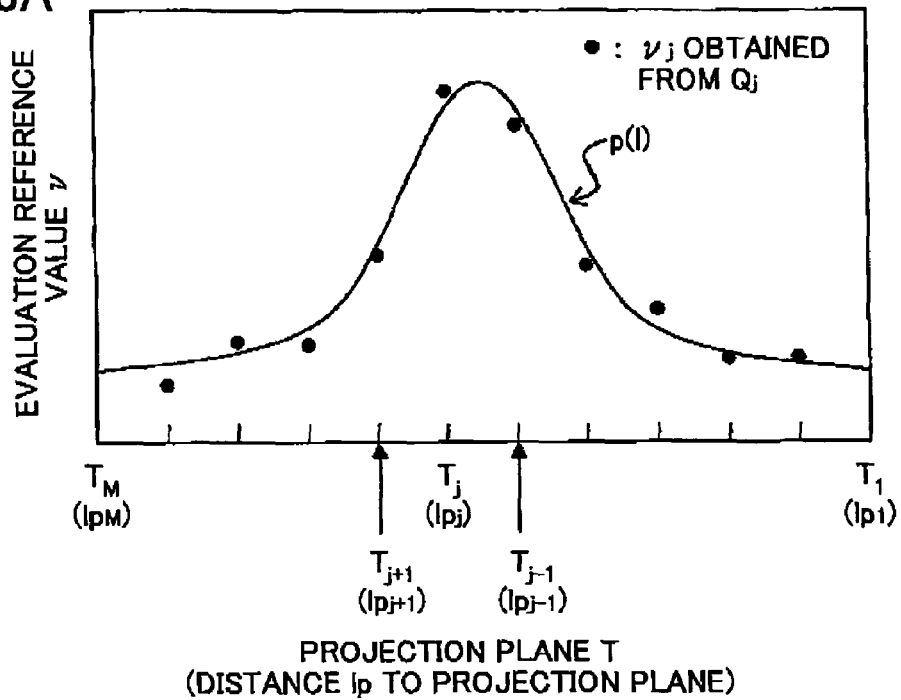
FIG. 73 is a schematic diagram for explaining the image generation method of the embodiment 4-1, and is a diagram for explaining a method for determining the existence probability.
Figure 73B:
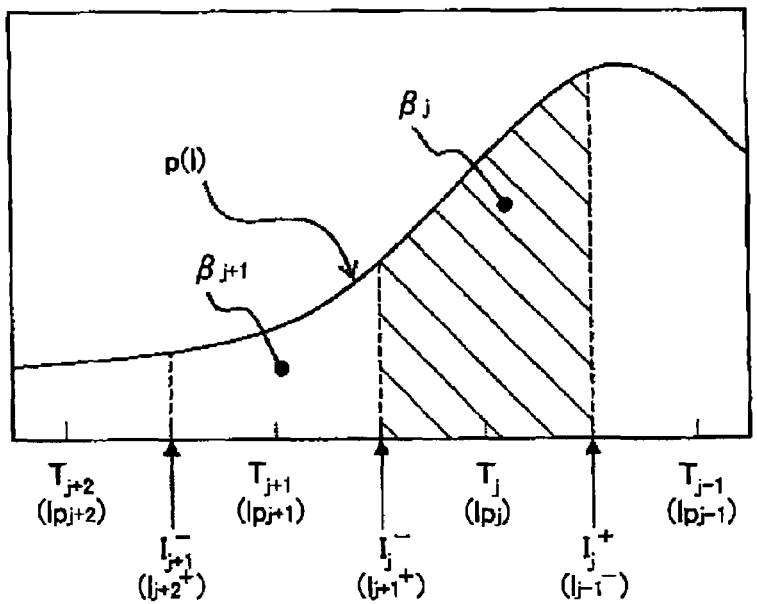
Figure 74:
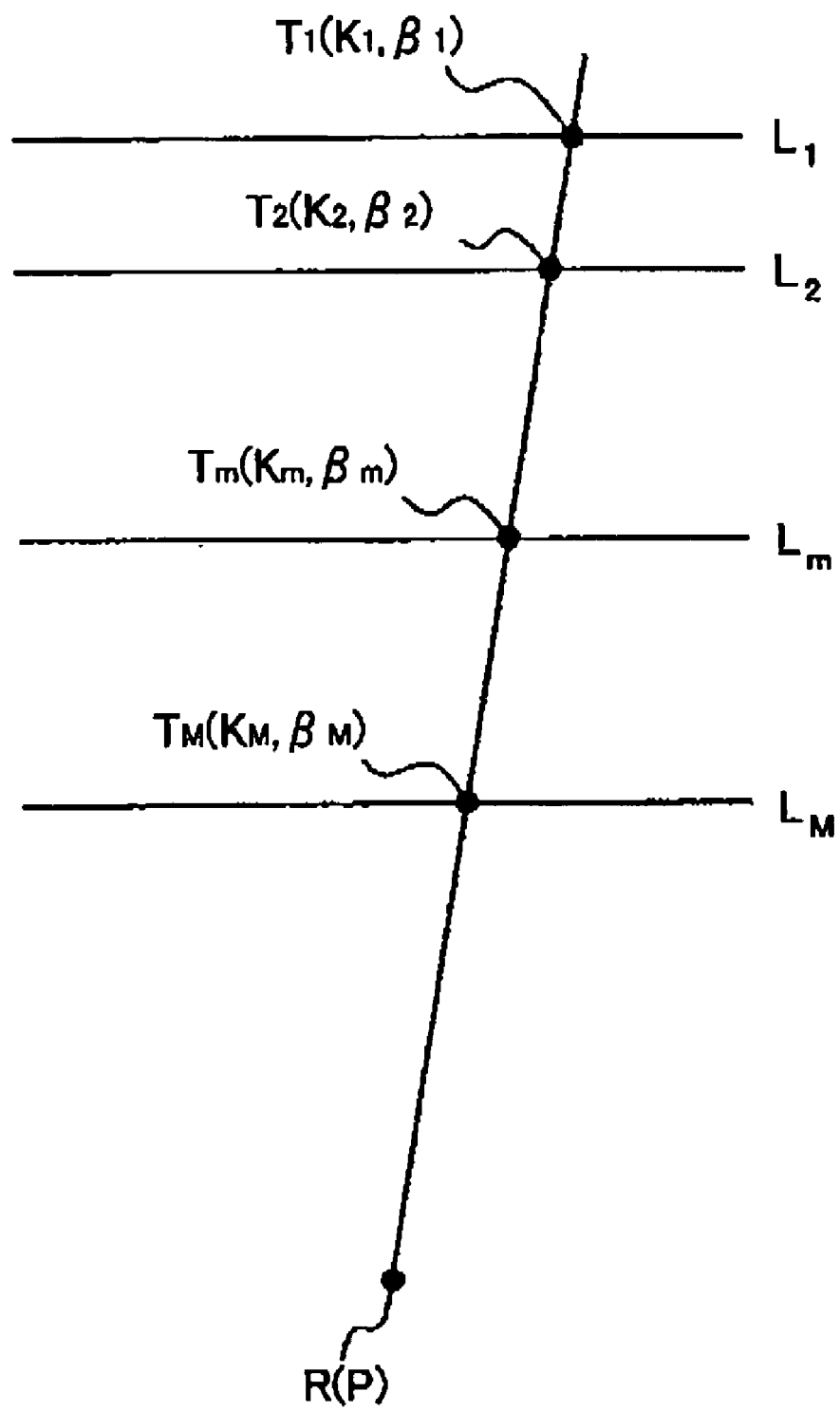
FIG. 74 is a schematic diagram for explaining the image generation method of the embodiment 4-1, and is a diagram for explaining a method for determining the existence probability.
Figure 75:
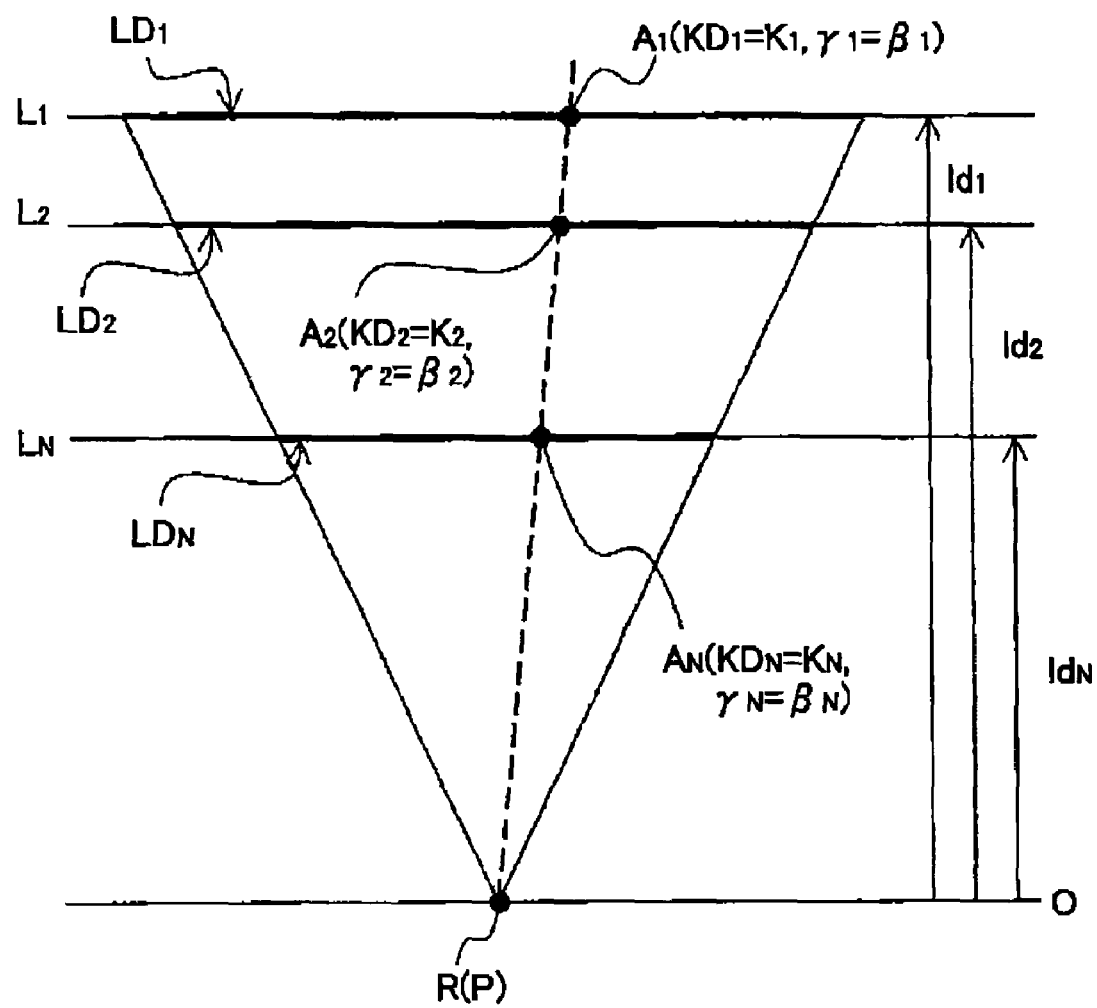
FIG. 75 is a schematic diagram for explaining the image generation method of the embodiment 4-1, and is a diagram for explaining a method for generating the two-dimensional images to be displayed on each image display plane.
Figure 76:
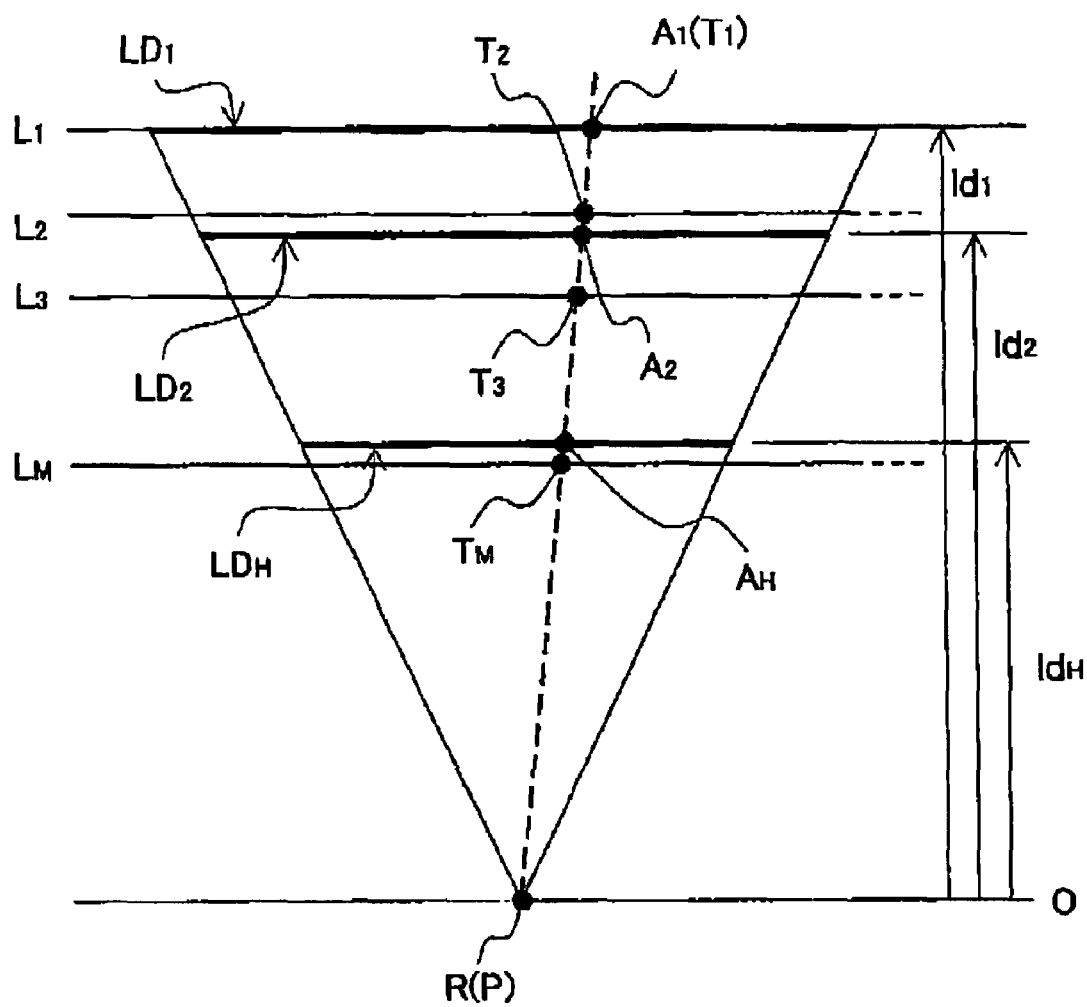
FIG. 76 is a schematic diagram for explaining the image generation method of the embodiment 4-1, and is a diagram for explaining a method for generating the two-dimensional images to be displayed on each image display plane.

FIGS. 66-77 are schematic diagrams for explaining the image generation method of the embodiment 4-1. FIG. 66 is a flow diagram showing an example of the whole processing procedure. FIGS. 67 and 68 are diagrams showing an example of a method for setting the projection planes. FIG. 69 is a diagram for explaining a method for setting projection point series. FIG. 70 is a flow diagram showing an example of processing procedure of steps for determining the color information and the existence probability of the projection point. FIGS. 71-74 are diagrams for explaining a method for determining the existence probability. FIGS. 75-77 are diagrams for explaining a method for generating the two-dimensional images to be displayed on each image display plane.

The image generation method of this embodiment 4-1 is a method for generating images to be displayed on an image display means, like a DFD, for example, including plural image display planes overlapping in the depth direction from the viewpoint of the observer. As shown in FIG. 66, the method includes a step 101 of obtaining plural images by taking the object from different viewpoints, a step 102 of setting a viewpoint (reference viewpoint) of the observer who observes the three-dimensional image, a step of 103 for obtaining the three-dimensional shape of the object from plural images, a step 104 of generating two-dimensional images to be displayed on each image display plane based on the three-dimensional shape of the object obtained in the step 103, and a step 105 for providing the three-dimensional image of the object by displaying the two-dimensional images generated in the step 104 on each image display plane.

For generating images for displaying the tree-dimensional image of the object by the DFD, for example, using the image generation method of this embodiment 4-1, images are obtained by taking the object from different viewpoints (step 101). In this step, the viewpoints from which the images are taken may be arranged in a line or may be arranged like an arc or on any curved line, or may be arranged two-dimensionally on a plane or a curved surface. In addition, although the obtained image may be a color image or a clack and white image, the color image in which each pixel on the image is represented by color information using three-primary colors of red (R), green (G) and blue (B) is obtained in this embodiment 4-1.

Next, after obtaining the images in the step 1, the viewpoint of the observer who observes the object to be displayed on the DFD is set (step 102). In this step, as to the viewpoint of the observer, relative position relationship between the viewpoint of the observer and a reference image display plane in the plural image display planes, such as a distance from the image display surface, and direction of line of sight and the like are set.

Next, after setting the viewpoint of the observer in step 2, the three-dimensional shape of the object appearing in the images are obtained from the plural images obtained in the step 1 (step 103). In the step 3, first, projection planes $L_j$(j=1, 2, . . . ,M) of the multi-layered structure are set (step 10301). Then, next, the reference viewpoint R for obtained the three-dimensional shape of the object is set (step 10302). As the projection planes $L_j$, plural planes parallel to the xy plane on the virtual three-dimensional space are set as shown in FIGS. 67 and 68, for example. In addition, each projection plane $L_j$ is set at each distance $l_j$ from z=0 in a minus direction in the three-dimensional space as shown in FIGS. 67 and 68. The reference viewpoint R is a viewpoint for obtaining the three-dimensional shape of the object, and can be set as any point in the three-dimensional space. Therefore, the reference viewpoint R is determined to be the viewpoint of the observer set in the step 2. In addition, for example, a projection plane $L_1$, farthest from z=0 is regarded as an image display plane existing in the deepest place from the observer of the DFD, and the reference viewpoint R is set such that the distance from the projection plane $L_1$, becomes the distance $1d$ from the observer's viewpoint to the image display plane deepest in the DFD as shown in FIG. 68.

Next, after setting the projection planes $L_j$ and the reference viewpoint R in the step 10301 and the step 10302, projection points on the projection planes, and points (corresponding points), on the obtained images, corresponding to each projection point are set (step 10303). In this step, as shown in FIG. 69, lines are drawn to plural directions from the reference viewpoint R, and the projection points are set as each cross point of each line and each projection plane $L_j$. When estimating the distance of the surface of the object, since projection points at which the surface exists are estimated from the plural projection points $T_j$ on the same line, projection points $T_j$ on the same line are dealt, as one, as projection point series s.

The corresponding point is a point $G_{ij}$, on the image plane of each camera, overlapping with the viewpoint of the camera when viewing the viewpoint $C_i$ of the camera from the projection point $T_j$, as shown in FIGS. 67 and 68. As shown in FIG. 67, when setting a two-dimensional coordinate system (xy coordinate system) on each image, two-dimensional coordinates $(x_{ij}, y_{ij})$ of the corresponding point $G_{ij}$ corresponding to the projection point $T_j(x_j, Y_{ij})$ can be obtained by projecting the projection point $T_j$ on a two-dimensional point of each image plane. This projection can be performed by using a 3 rows and 4 columns projection matrix for projecting a point (X,Y,Z) in a three-dimensional space to a point (x,y) in a two-dimensional plane. The relationship between the coordinates $(x_{ij}, y_{ij})$ of the corresponding point $G_{ij}$ in the virtual three-dimensional space and the digital image coordinates (u,v) is as described so far.

In the step 10303, the three-dimensional space coordinates $(X_j, Y_j, Z_j)$ of the projection point $T_j$ are associated with the digital image coordinates $(u_{ij}, v_{ij})$ of the corresponding point $G_{ij}$. The establishment of the association may be performed by providing values of $(X_j, Y_j, Z_j)$ in a table for every $(u_{ij}, v_{ij})$, or by setting values of $(X_j, Y_j, Z_j)$ only for representative values of $(u_{ij}, v_{ij})$ so as to obtain other points by performing interpolation processing such as linear interpolation, for example.

In addition, although (u,v) take discrete values in the digital image coordinate system, it is assumed that (u,v) take continuous values unless otherwise specified in the following descriptions, and it is assumed to perform proper discretization processing when accessing the two-dimensional array.

After completing determining the projection point series, corresponding points and the like in the step 10303, next, the array (texture array) for storing, information of the projection planes $L_j$, that is, the image that is to be texture-mapped on the projection planes $L_j$ is kept(step 10304). At this time, the array to be kept includes color information and existence probability for each pixel as texture information, corresponding to the position of the projection point $T_j$, by 8 bits, for example.

Next, after keeping the array for storing information of the projection planes in the step 10304, color information and existence probability of each projection point $T_j$ is determined (step 10305). In the step 10305, as shown in FIG. 70, for example, double loop processing is performed in which processing for determining color information and the existence probability of each projection point $T_j$ of projection point series is repeated for every projection point series that are set. Then, first, the projection point series is initialized (step 10305a). Next, the projection point $T_j$ on the projection point series is initialized to j=1, for example (step 10305b).

Next, the color information of the projection point $T_j$ is determined (step 10305c). In the step 10305c, color information $K_j$ of the projection point $T_j$ is determined as an average value of color information $K_i$ of corresponding points $G_i$ set in the step 10303, for example.

Next, the correlation degree $Q_j$ of each point on the object that is appearing at each corresponding point $G_{ij}(i \in I)$ corresponding to the projection point $T_j$ is obtained (step 10305d). Assuming that a vector for representing the color information of the projection point $T_j$ is $K_j$, and that a vector repressing the color information of the corresponding point $G_{ij}$ is $K_{ij}$, the correlation degree $Q_j$ can be obtained by the following equation 86.

$$Q_j = \sum_{i \in I}(K_j - K_{ij})^2 \qquad \text{[Equation 86]}$$

By obtaining the correlation degree $Q_j$ using the equation 86, the correlation degree $Q_j$ always becomes a positive value, and, the higher the correlation, the smaller the value is.

The equation 86 is an example method for obtaining the correlation degree $Q_j$, and the correlation degree $Q_j$ can be obtained using equations other than the equation 86. In addition, for obtaining the correlation degree $Q_j$, not only each one point of the projection point $T_j$ and the corresponding point $G_{ij}$ is considered, but also a small region including plural points near the projection point $T_j$ and the corresponding point $G_{ij}$ can be considered.

After obtaining the correlation degree $Q_j$ at the step 10305d, the projection point $T_j$ is updated, and it is checked whether processing of the step 10305c and the step 10305d has been performed for every projection point on the projection point series that is a subject of processing (step 10305e). If there is any projection point for which the processing of the step 10305c and the step 10305d has not been performed, the step returns to the step 10305c to obtain the color information $K_j$ and the correlation degree $Q_j$.

Figure 71:
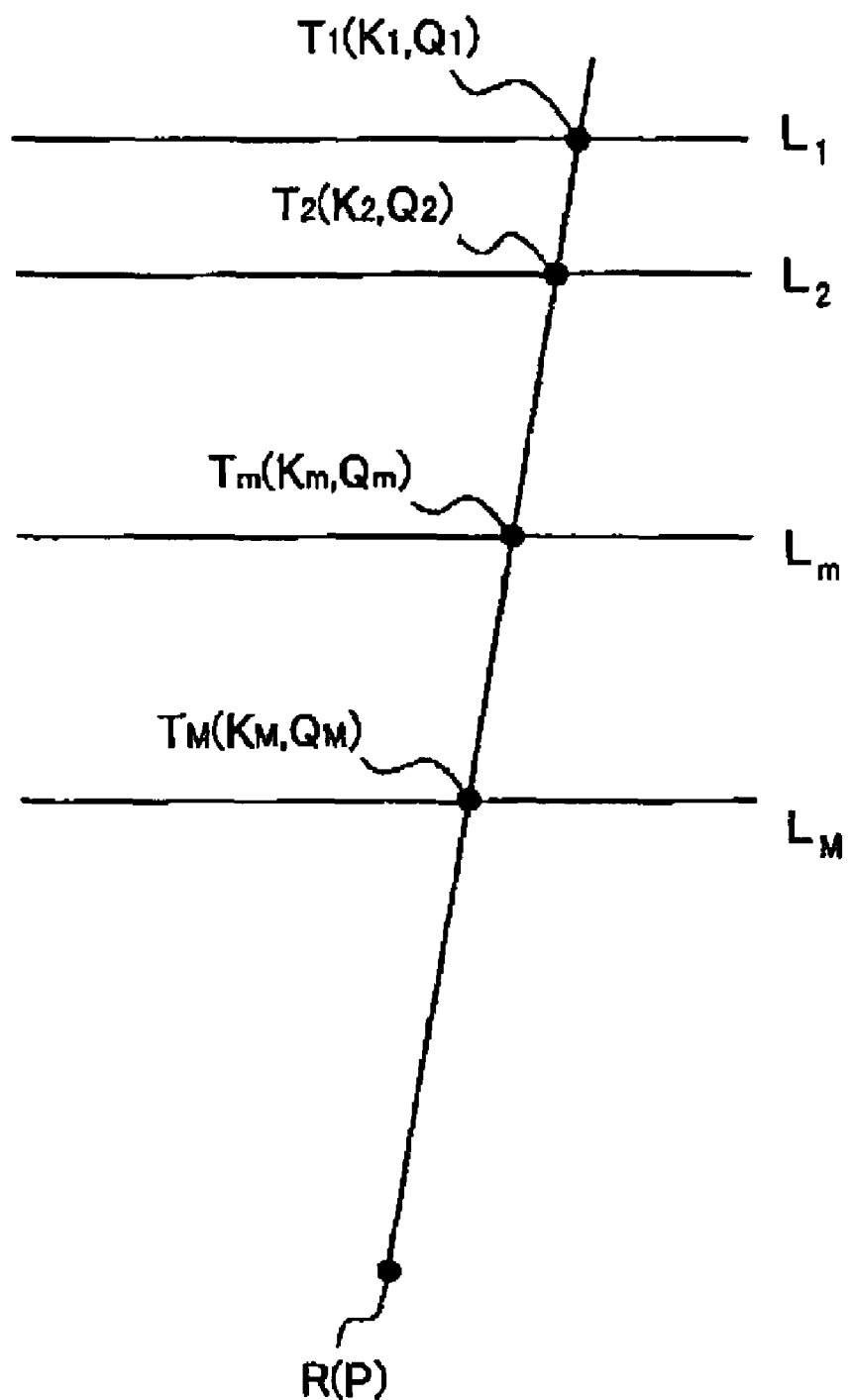
FIG. 71 is a schematic diagram for explaining the image generation method of the embodiment 4-1, and is a diagram for explaining a method for determining the existence probability.
Figure 72A:
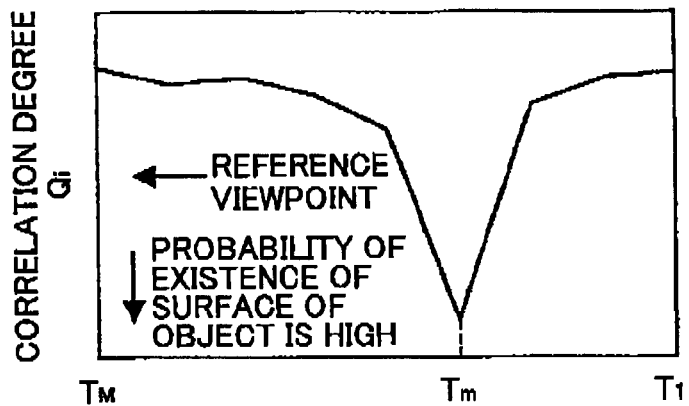
FIG. 72 is a schematic diagram for explaining the image generation method of the embodiment 4-1, and is a diagram for explaining a method for determining the existence probability.

After obtaining the color information and the correlation degree $Q_j$ for every projection point on the projection point series that is a subject of processing, the color information $K_j$ and the correlation degree $Q_j$ are provided to each projection point $T_j$ on the projection point series as shown in FIG. 71. When correlation degrees $Q_j$ of the projection points $T_j$ are compared with each other, only a correlation degree $Q_m$ of a projection point $T_m$, takes a distinctive small value, generally, as shown in FIG. 72A. In this case, it can be estimated that the surface of the object exists on the projection point $T_m$ on the subject projection point series, and the reliability is high.

Figure 72B:
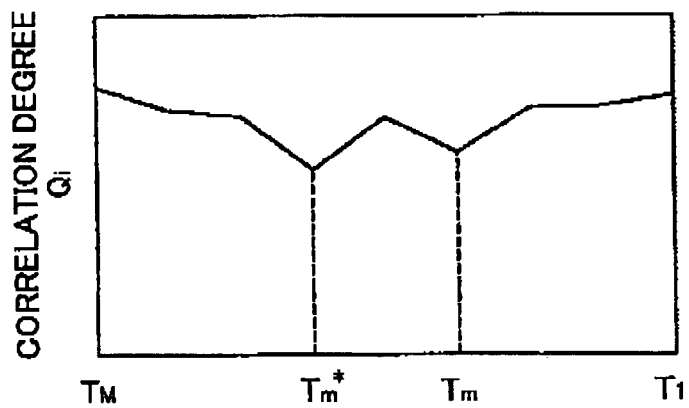

However, there my be a case where there is no projection point at which the correlation degree has the distinctive small value, as shown in FIG. 72B when the correlation degrees $Q_j$ of each projection point $T_j$ on the projection point series are compared depending on the shape of the object, the texture of the surface, photographing conditions and the like. In this case, even if the surface of the object is estimated to exist at a projection point, the reliability is low and there is a case the estimation is erroneous. When the estimation is erroneous, the effect appears as a large noise on the generated image.

Thus, a probability (existence probability) $\beta_j$ that the surface of the object exists on the projection point $T_j$ on the projection point series is determined based on the correlation degree $Q_j$ of the projection point $T_j$. Although the existence probability $\beta_j$ can be directly obtained from the correlation degree $Q_j$, when there is noise on the obtained images so that the reliability of the correlation degree $Q_j$ is low, the existence probability $\beta_j$ is affected so that its reliability is lowered. Thus, according to the image generation method of this embodiment 4-1, an evaluation reference value $v_j$ used as a reference value of the existence probability $\beta_j$ is obtained (step 10305f). It is necessary that the evaluation reference value $V_j$ satisfies the following equations 87 and 88.

$$0 \leq \beta_j \leq 1 \quad \text{[Equation 87]}$$

$$\sum_{j=1}^{M} \beta_j = 1 \quad \text{[Equation 88]}$$

In addition, for defining the evaluation reference value $v_j$ such that the higher the probability that the surface of the object exists at the projection point $T_j$ is, the closer to 1 the evaluation reference $V_j$ becomes, the evaluation reference value $v_j(j \in J)$ can be calculated after performing conversion processing represented by the following equations 89 and 90, for example, for the correlation degrees $Q_j$ obtained for each projection point $T_j$ on the projection point series.

$$\tilde{\beta}_j = \frac{1}{Q_j} \quad \text{[Equation 89]}$$

$$\beta_j = \frac{\tilde{\beta}_j}{\sum_{j=1}^{M} \tilde{\beta}_j} \quad \text{[Equation 90]}$$

Basically, the evaluation reference value $v_j$ only needs to satisfy the equation 87 and the equation 88. Therefore, for the conversion processing, equations other than the equation 89 and the equation 90 can be used.

The evaluation reference value $v_j$ of each projection point $T_j$ calculated using the equations 89 and 90 can be used as the probability (existence probability) that the surface of the object exists, as mentioned before. But, due to influences of noise on the obtained image, there is a case where reliability as the existence probability is not sufficiently high. Therefore, next, statistical processing (parameter fitting) for the evaluation reference value $v_j$ is performed by assuming a probability distribution model of the object so as to obtain a fitting function $p(l)$ as shown in FIG. 73A, for example (step 10305g).

When it is assumed that the probability density distribution of the probability that the object exists complies with normal distribution (Gaussian distribution) for the distance 1, the fitting function $p(l)$ of the evaluation reference value $v_j$ can be represented as the following equation 91.

$$p(l) = \frac{1}{\sqrt{2\pi}\,\sigma} \exp\left\{-\frac{(l-\mu)^2}{2\sigma^2}\right\} \quad \text{[Equation 91]}$$

wherein $\mu$ is an average value of the existence probability distribution, $\sigma$ is dispersion of existence probability distribution, and they are represented as the following equation 92 and equation 93 respectively.

$$\mu = \sum_{j=1}^{M} \beta_j l_j \quad \text{[Equation 92]}$$

$$\sigma^2 = \sum_{j=1}^{M} (\beta_j l_j - \mu)^2 \quad \text{[Equation 93]}$$

After obtaining the fitting function $p(l)$, the probability $\beta_j$ that the object exists at a distance $lp_j$ of each projection plane $LP_1$, that is, at each corresponding point $T_j$ is determined based on the function $p(l)$ (step 10305h). The existence probability $\beta_j$ is determined using the following equation 94, for example.

$$\gamma_j = \int_{l_j^-}^{l_j^+} p(l)\,dl \quad \text{[Equation 94]}$$

wherein $l_j^-$ and $l_j^+$ respectively are a lower limit and an upper limit of a distance that contributes to the projection plane $L_j$ as shown in FIG. 73B, and can be calculated in the following equation 95 and equation 96.

$$l_j^- = \frac{l_{j-1} + l_j}{2}, \quad \text{[Equation 95]}$$
$$l_1^- = -\infty$$

$$l_j^+ = \frac{l_j + l_{j+1}}{2}, \quad \text{[Equation 96]}$$
$$l_M^+ = \infty$$

By performing the processing from the step 10305c to the step 10305h, the color information $K_j$ and the existence probability $\beta_j$ on each projection point $T_j$ on the projection point series are determined as shown in FIG. 74. The values are stored in the area kept in the step 10304.

As mentioned above, when the probability density distribution that the object surface exists on the projection point series can be assumed, by obtaining the existence probability $\beta_j$ based on the fitting function $p(l)$ of the evaluation reference value $v_j$, the effect of the noise on the taken image can be decreased.

The equation 91 is an example of the fitting function. The parameter fitting can be also performed using various functions according to shape distribution of then object. For example, the parameter fitting can be performed using a Laplacian distribution function.

After storing the color information $K_j$ and the existence probability $\beta_j$ of each projection point $T_j$, the projection point series is updated and it is checked whether processing from the step 10305c to the step 10305h has been performed for every projection point series determined in the step 10303 (step 10305i). When there is any projection point series for which processing from the step 10305c to the step 10305h has not been performed, the step returns to the step 10305b so that the processing from the step 10305c to the step 10305h is repeated.

Accordingly, after the processing from the step 10305c to the step 10305h are performed for every projection point series determined in the step 10303, the processing of the step 10305 (step 103) completes, so that the three-dimensional shape of the object can be obtained.

By performing the processing of the step 103, as shown in FIG. 74, for example, the texture array of each projection point $T_j(j=1,2,\ldots,M)$ on the projection point series stores the color information $K_j$ and the existence probability $\beta_j$. That is, as to the three-dimensional shape of the object obtained by the three-dimensional image display method of the present invention, the surface of the object exits not only on one projection point on the projection point series as is in the conventional method, but the surface of the object exits on each projection point.

In the image generation method of this embodiment 4-1, image of object viewed from the observer is generated based on the obtained three-dimensional shape of the object. In this embodiment 4-1, the generated images are displayed on each image display plane of a display, such as the DFD, having plural image display planes. The method for generating the two-dimensional images is described in this embodiment 4-1. In this case, after completing the processing of the step 103, as shown in FIG. 66, the color information and the existence probability of each projection point are converted to color information and brightness distribution coefficient of each point on the two-dimensional image generation plane (step 104).

When generating the two-dimensional images to be displayed on each image display plane in step 104, the viewpoint of the observer, plural two-dimensional image generation planes, and the three-dimensional shape of the object obtained in the step 103 are set, first. In this step, the two-dimensional image generation planes $LD_n (n=1,\ldots,N)$ are set such that they overlap with each other in the depth direction from the viewpoint P of the observer as shown in FIG. 75, for example. In addition, the distance $ld_n$ from the viewpoint P of the observer to the two-dimensional image generation plane $LD_n$ is set such that it becomes the distance set in the step 102. At this time, if the number of projection planes $L_j$ representing the three-dimensional shape of the object and the placement intervals are the same as the number of the two-dimensional image generation planes $LD_n$ and the placement intervals, the three-dimensional shape of the object is set such that the projection planes $L_j$ becomes the same as the two-dimensional image generation planes $LD_n$, as shown in FIG. 75, for example. In this case, when the two-dimensional image generation planes $LD_n$ are planes for generating the images displayed on the image display planes of the brightness modulation type DFD, it is necessary to determine the color information $KD_n$ and the brightness distribution coefficient $\gamma_n$ for each point (display point) $A_n$, on the two-dimensional image generation planes $LD_n$, that overlap when viewed from the viewpoint P of the observer. As shown in FIG. 75, when the projection planes $L_j$ representing the three-dimensional shape of the object are the same as the two-dimensional image generation planes $LD_n$, the color information $KD_n$, of each display point $A_n$ is determined to be the color information $K_j$ of the projection point $T_j$ on the projection plane $L_j$ that is overlapping the two-dimensional image generation plane $LD_n$ on which the display point $A_n$ exists. In addition, the brightness distribution ratio $\gamma_n$ of the display point $A_n$ is determined to be the existence probability $\beta_j$ of the projection point $T_j$ on the projection plane $L_j$ that is overlapping the two-dimensional image generation plane $LD_n$. After the color information KD and the brightness distribution coefficient $\gamma$ are determined for each display point A on the two-dimensional image generation surfaces $LD_n$, the images generated on the two-dimensional image generation planes $LD_n$, are output and are displayed on the image display planes of the actual DFD (step 105).

However, it is not necessary that the number and placement intervals of the projection planes $L_j$ for representing the three-dimensional shape of the object are the same as the number and placement intervals of the two-dimensional image generation planes $LD_n$. Therefore, next, another method for generating the two-dimensional images are described in a case where the number and placement intervals of the projection planes $L_j$ for representing the three-dimensional shape of the object are not the same as the number and placement intervals of the two-dimensional image generation planes $LD_n$.

In this case, when the distance from a projection plane closest to the viewpoint P of the observer to a projection plane farthest from the a viewpoint P is almost the same as the distance from a two-dimensional image generation plane closest to the viewpoint P to a two-dimensional image generation plane farthest from the viewpoint P, the projection planes $L_j$ representing the three-dimensional shape of the object are set such that the projection plane $L_1$ farthest from the viewpoint P of the observer and the two-dimensional image generation plane $LD_1$ overlap. By doing so, color information and brightness distribution coefficient $\gamma$ of each display point A on the two-dimensional image generation plane $LD_1$ farthest from the viewpoint P of the observer become the color information K and the existence probability $\beta$ of each projection point T on the projection plane $L_1$ farthest from the viewpoint P of the observer.

Color information KD and brightness distribution coefficients $\gamma$ of each display point A on the two-dimensional image generation planes LD each of which does not overlap any projection plane are determined in the following method.

As to the color information KD and brightness distribution coefficients $\gamma$ of each display point A on the two-dimensional image generation planes LD each of which does not overlap any projection plane, color information K and existence probability $\beta$ of each of projection points T, on the projection planes L, overlapping with the display point when viewed from the viewpoint P of the observer are assigned to a projection point A on the two-dimensional image generation plane LD closest with respect to the projection plane L. In this case, the color information KD of the display point A is determined to be an average value of assigned color information K of projection points T, or to be color information L of the projection point T, on the projection plane L, closest to the two-dimensional image generation plane LD. The brightness distribution coefficient $\gamma$ is determined to be a sum of pieces of assigned existence probabilities $\beta$ of each projection point T. In this case, assuming that a set of projection planes $L_j$ to which the two-dimensional image generation plane $LD_n$ is the closest is $\{L_j | j \in \Gamma_n\}$, the brightness distribution ratio $\gamma_n$ of the display point $A_n$ on the two-dimensional image generation plane $LD_n$ is provided by the following equation 97 using the existence probability $\gamma_j$ of the projection point $T_j$ of the projection plane $L_j$.

$$\gamma_h = \sum_{j \in \Gamma_n}^{M} \beta_j \qquad \text{[Equation 97]}$$

Figure 77A:
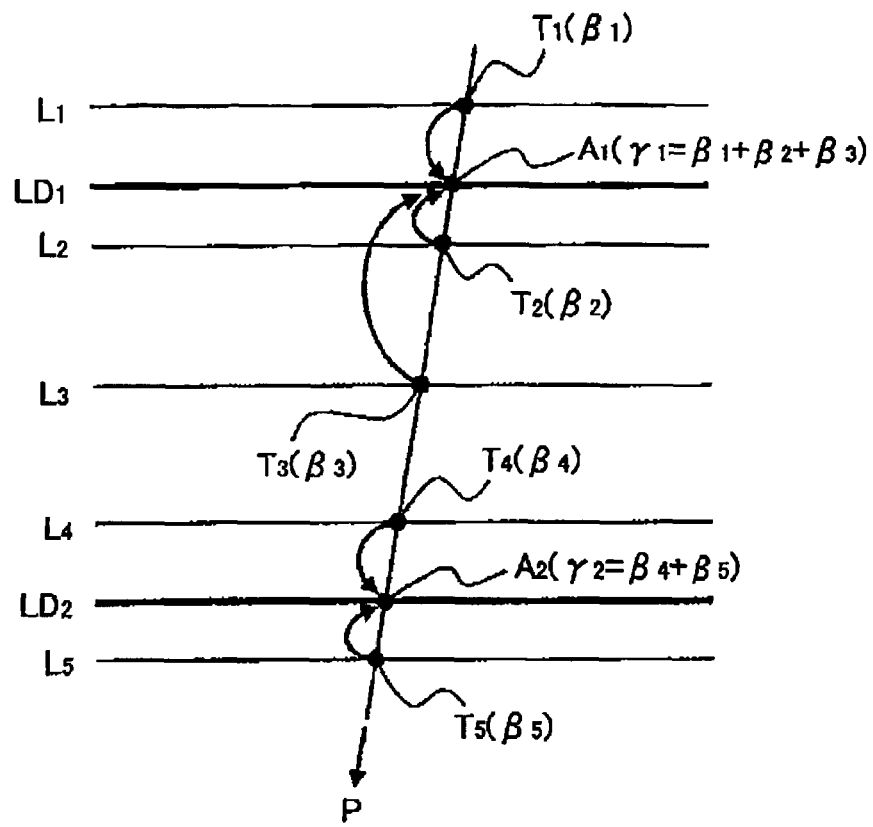
FIG. 77 is a schematic diagram for explaining the image generation method of the embodiment 4-1, and is a diagram for explaining a method for generating the two-dimensional images to be displayed on each image display plane.

In the following, a case where position relationship between the projection planes $L_j$ and the two-dimensional image generation surfaces $LD_n$ is as shown in FIG. 77A is considered. Assuming that color information $K_j$ and each existence probability $\beta_j$ of each of projection points $T_j (j=1,2,3,4,5)$ overlapping with the display points $A_1$ and $A_2$ when viewed from the viewpoint P of the observer are assigned to a display point A on a two-dimensional image generation surface that is closest from the projection plane, color information and existence probabilities of the projection points $T_1, T_2$ and $T_3$ are assigned to the display point $A_1$. In this case, the color information of the display point $A_1$ may be an average value of the color information $K_1, K_2$ and $K_3$ of the projection points $T_1, T_2$ and $T_3$, for example, or may be the color information $K_2$ of the projection point $T_2$ closest from the viewpoint of the display point $A_1$. The brightness distribution coefficient $\gamma_1$ of the display point $A_1$ is determined to be a sum of the existence probabilities $\beta_1$, $\beta_2$ and $\beta_3$ of the projection points $T_1$, $T_2$ and $T_3$ using the equation 91.

In the same way, color information and existence probabilities of the projection points $T_4$ and $T_5$ are assigned to the two-dimensional image generation surface $LD_2$. In this case, the color information $KD_2$ of the display point $A_2$ may be an average value of the color information $K_4$ and $K_5$ of the projection points $T_4$ and $T_5$, or may be the color information $K_5$ of the projection point $T_5$. The brightness distribution coefficient $\gamma_2$ is determined to be a sum of the existence probabilities $\beta_4$ and $\beta_5$ of the projection points $T_4$ and $T_5$ using the equation 91.

When the placement intervals of the two-dimensional image generation planes $LD_n$ and the placement intervals of the projection planes $L_j$ are different, color information and existence probability of the projection point on a projection plane $L_j$ existing between two successive two-dimensional image generation planes $LD_n$ and $LD_{n+1}$ can be distributed in a ratio of the distances of the two two-dimensional image generation planes $LD_n$ and $LD_{n+1}$. In this case, assuming that a set of the projection planes $L_j$ between the two-dimensional image generation planes $LD_n$ and $LD_{n+1}$ is $\{L_{j|j \in \Gamma n}\}$, the brightness distribution ratio $\gamma_n$ of the display point $A_n$ on the two-dimensional image generation plane $LD_n$ can be calculated by the following equation 98 using the existence probability $\beta_j$ of each projection points $T_j$.

$$\gamma_h = \sum_{j \in \Gamma_n} w_{j,h} \beta_j \qquad \text{[Equation 98]}$$

In the equation 98, $w_{j,n}$ is a coefficient indicating a degree of contribution of the projection plane $L_j$ to the two-dimensional image generation plane $LD_n$.

Figure 77B:
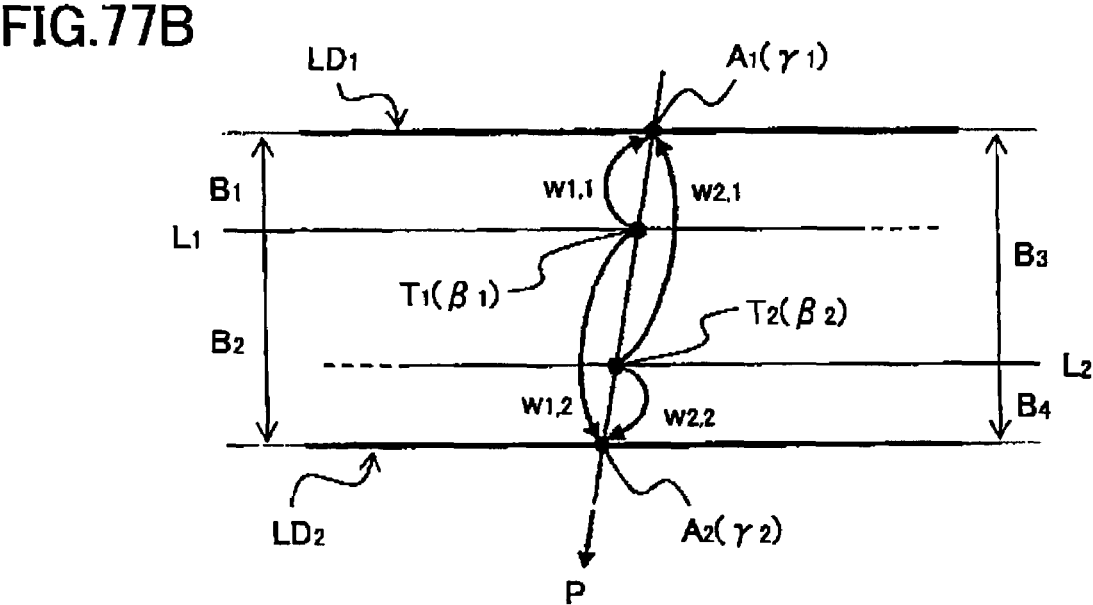

A case where projection planes $L_1$ and $L_2$ are set between the two-dimensional image generation planes $LD_1$ and $LD_2$ is considered as shown in FIG. 77B, for example. In this case, assuming that distances from the projection plane $L_1$ to the display planes $LD_1$ and $LD_2$ are $B_1$ and $B_2$ respectively, the degrees $w_{1,1}$ and $w_{1,2}$ of contribution of the projection plane $L_1$ to the two-dimensional image generation planes $LD_1$ and $LD_2$ can be provided by the following equation 99.

$$w_{1,1} = \frac{B_2}{B_1 + B_2}, \qquad \text{[Equation 99]}$$
$$w_{1,2} = \frac{B_1}{B_1 + B_2}$$

In the same way, when distances from the projection plane $L_2$ to the display planes $LD_1$ and $LD_2$ are $B_3$ and $B_4$ respectively, the degrees $w_{2,1}$ and $w_{2,2}$ of contribution of the projection plane $L_2$ to the two-dimensional image generation planes $LD_1$ and $LD_2$ can be provided by the following equation 100.

$$w_{2,1} = \frac{B_4}{B_3 + B_4}, \qquad \text{[Equation 100]}$$
$$w_{2,2} = \frac{B_3}{B_3 + B_4}$$

As a result, each of the brightness distribution ratio $\gamma_1$ of the display point $A_1$ of the two-dimensional image generation plane $LD_1$ and the brightness distribution ratio $\gamma_2$ of the display point $A_2$ of the two-dimensional image generation plane $LD_2$ is shown in the following equation 101.

$$\gamma_1 = w_{1,1}\beta_1 + w_{2,1}\beta_2, \; \gamma_2 = w_{1,2}\beta_1 + w_{2,2}\beta_2 \qquad \text{[Equation 101]}$$

As mentioned above, when obtaining the three-dimensional shape of the object, a shape is obtained in which the probability (existence probability) $\beta_j$ that the surface of the object exists on each projection point $T_j$ is provided from the correlation degree $Q_j$ of the projection point $T_j$ on the projection point series. Then, the brightness distribution coefficient of the display point A on the two-dimensional image generation plane LD is provided as the existence probability $\beta_j$. Accordingly, when there is no projection point having the correlation degree $Q_j$ of a distinctive value in the projection points $T_j$ on the projection point series, so that reliability for estimation of the distance of the surface of the object is low, the surface of the object is represented vaguely on plural projection planes on the projection point series. Then, the brightness distribution coefficient $\gamma$ of points on the two-dimensional image generation plane LD is determined from the existence probability $\beta$ of each projection point $T_j$. Accordingly, when the two-dimensional images generated on the two-dimensional image generation planes are displayed on the actual image display planes so as to present the three-dimensional image of the object, the surface of the object is displayed vaguely on the projection point series in which reliability for distance estimation is low and the existence probability $\beta$ is dispersed to plural projection points. Therefore, a noise on the three-dimensional image displayed on the DFD becomes inconspicuous so that an image that looks natural for the observer can be displayed.

As described above, according to the image generation method of this embodiment 4-1, the three-dimensional image that looks natural for the observer can be displayed without obtaining the accurate three-dimensional shape of the object to be displayed.

In addition, by obtaining the existence probability $\beta_j$ by assuming probability density distribution of the probability that the surface of the object exists on the projection point series and by performing statistical processing for the evaluation reference value $v_j$ calculated from the correlation degree $Q_j$, deterioration of the reliability of the existence probability $\beta_j$ due to noise on the obtained images can be decreased.

In addition, in the image generation method of this embodiment 4-1, although a case is described by taking an example in which a color image in which the point (pixel) is represented by color information using three primary color of red (R), green (G) and blue (B) is obtained and the three-dimensional shape of the object is generated, the image to be obtained is not limited to the color image. In the image generation method of this embodiment 4-1, a black and white image in which the point (pixel) is represented by brightness (Y) and color-difference (U,V) may be obtained to obtain the three-dimensional shape of the object. In the case when the image to be obtained is the black and white image, the three-dimensional shape can be obtained by the procedure described in this embodiment 4-1 using the brightness information (Y) as information corresponding to the color information so that the two-dimensional images can be generated.

(Embodiment 4-2)

Figure 78:
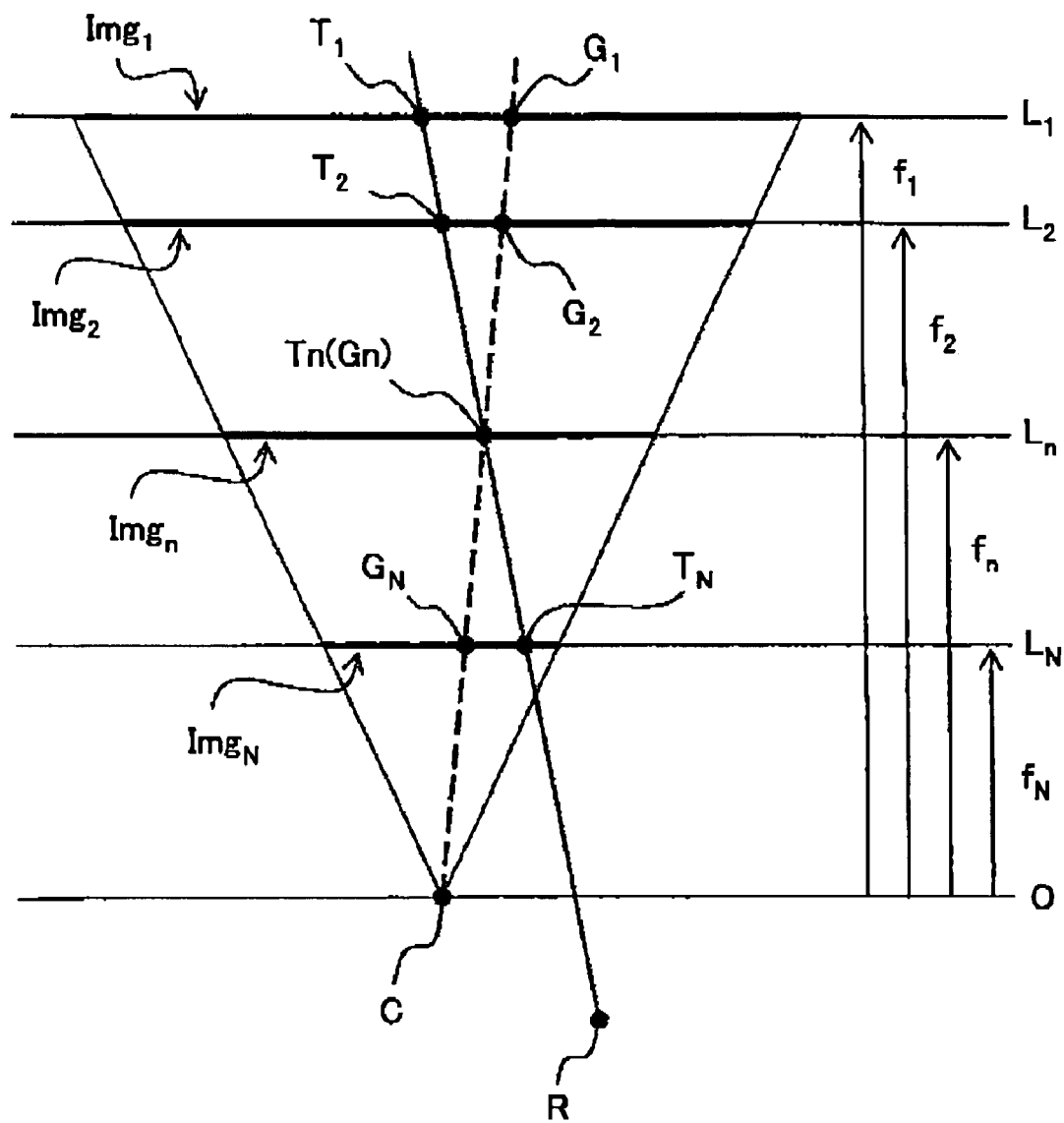
FIG. 78 is a schematic diagram for explaining the image generation method of the embodiment 4-2, and is a diagram showing relationship between the projection point and the corresponding point.
Figure 79:
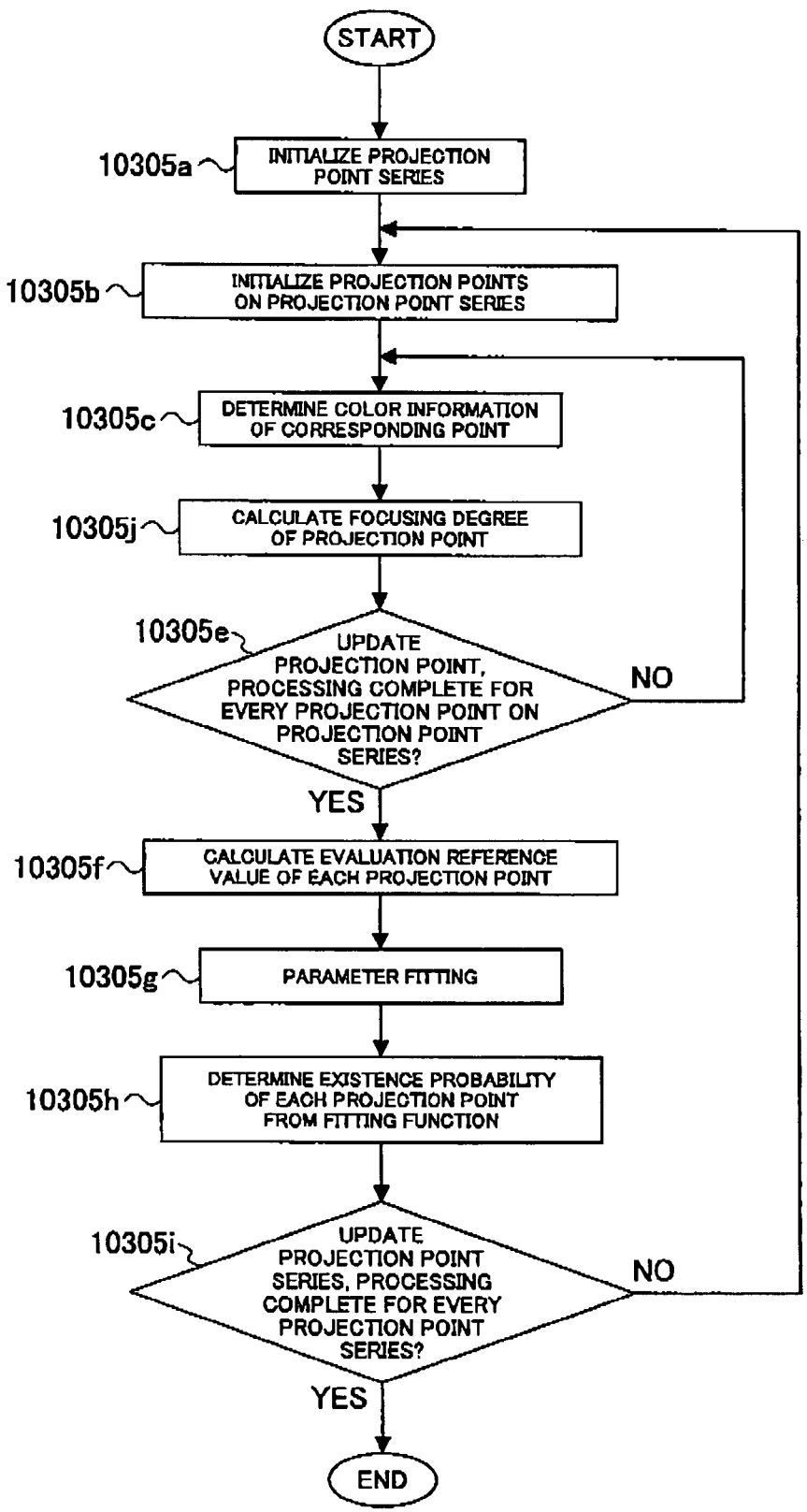
FIG. 79 is a schematic diagram for explaining the image generation method of the embodiment 4-2, and is a flow diagram showing an example of steps for determining the color information and the existence probability of the projection point.
Figure 80:
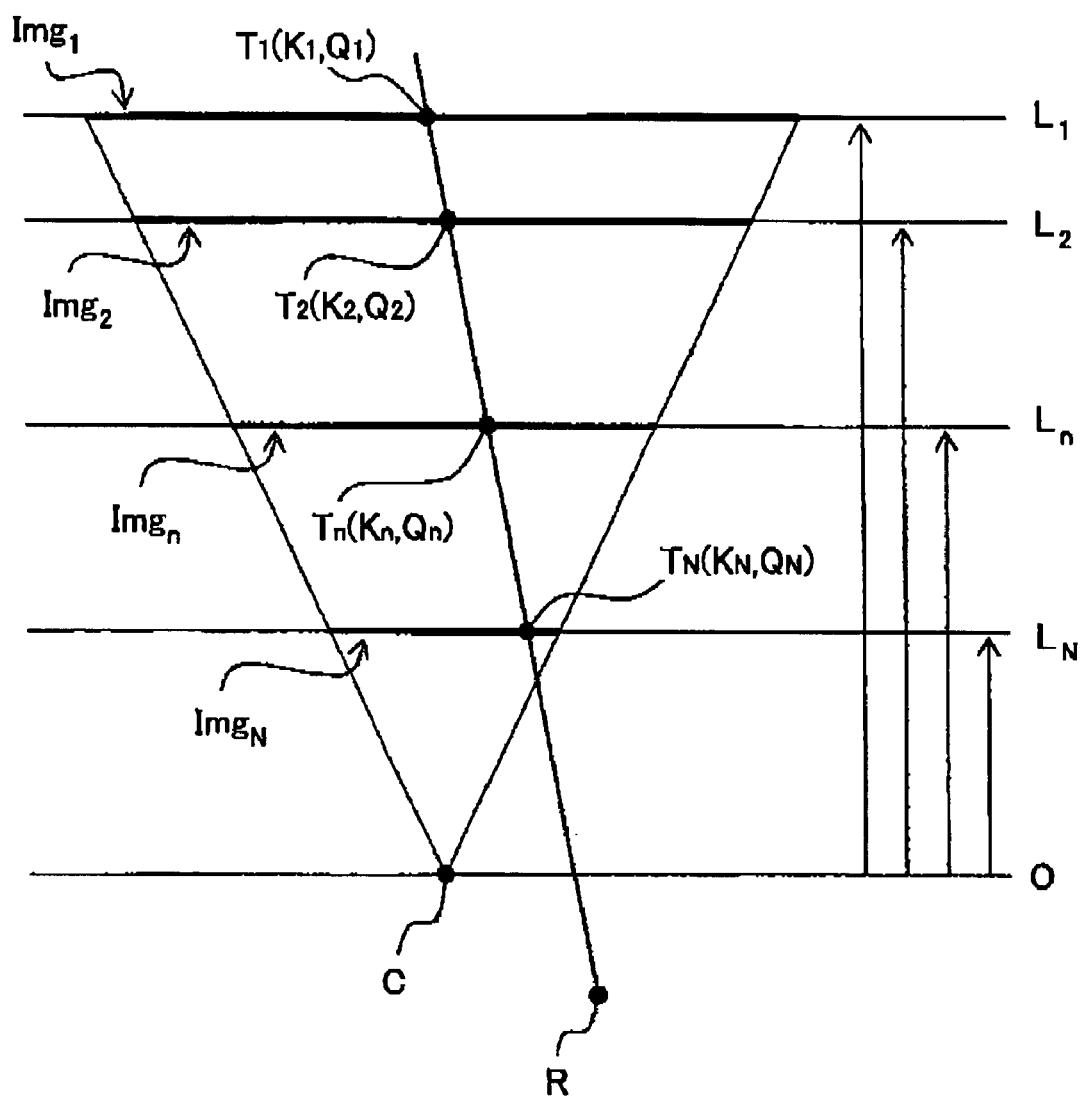
FIG. 80 is a schematic diagram for explaining the image generation method of the embodiment 4-2, and is a diagram for explaining a method for obtaining the existence probability.
Figure 81:
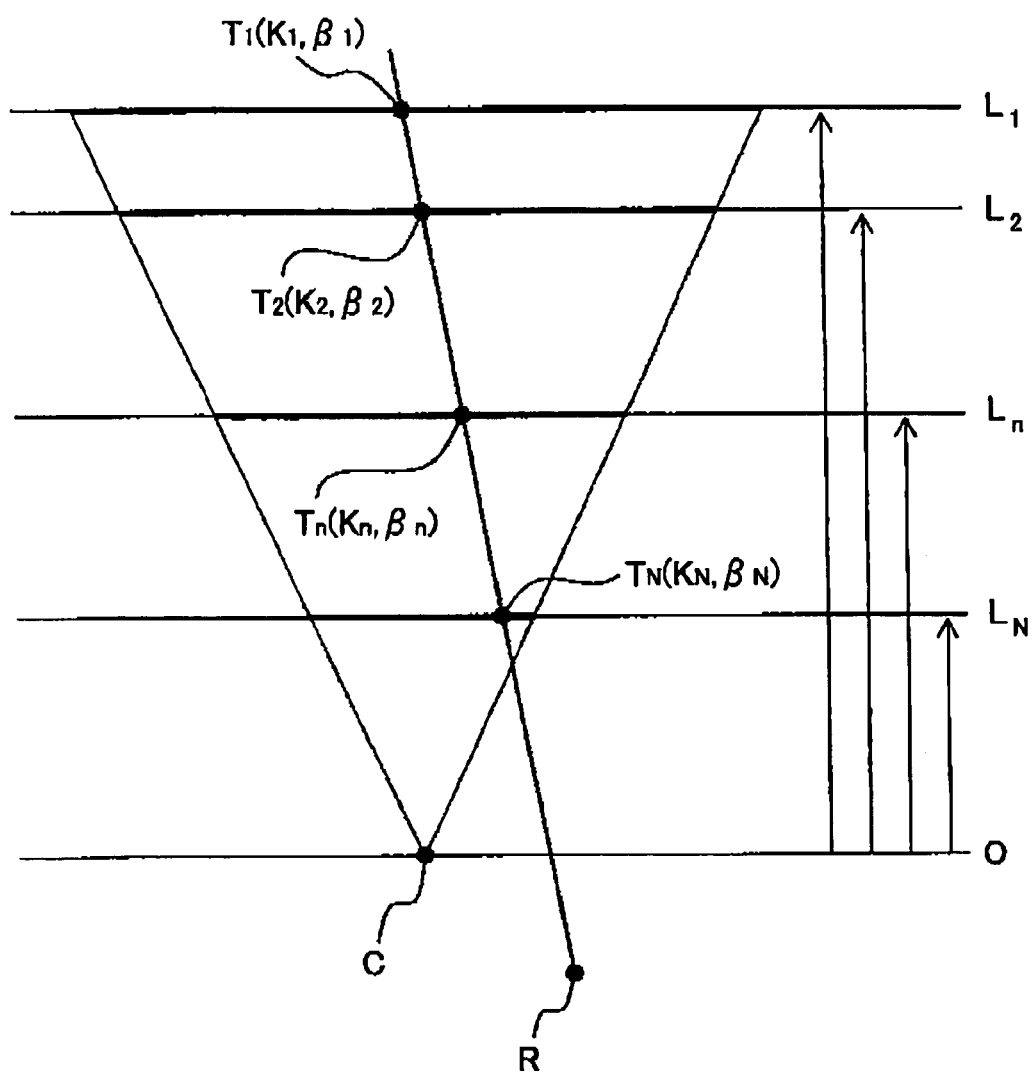
FIG. 81 is a schematic diagram for explaining the image generation method of the embodiment 4-2, and is a diagram for explaining a method for obtaining the existence probability.

FIGS. 78-81 are schematic diagrams for explaining the image generation method of the embodiment 4-2. FIG. 78 is a diagram showing relationship between the projection point and the corresponding point. FIG. 79 is a flow diagram showing an example of steps for determining the color information and the existence probability of the projection point. FIGS. 80 and 81 are diagrams for explaining a method for obtaining the existence probability.

The basic procedure of the image generation method of this embodiment 4-2 is the same as the image generation method of the embodiment 4-1. When generating the plural two-dimensional images to be displayed on the DFD, processing from the step 101 to the step 105 shown in FIG. 66 are performed. The different point of the image generation method of this embodiment 4-2 compared to the image generation method of the embodiment 4-1 is that plural images of different focusing distances are obtained instead of the plural images of different viewpoints in step 101, and the three-dimensional shape of the object is obtained using the images having different focusing distances in the step 103.

For generating the plural two-dimensional images for displaying the three-dimensional image of the object on the DFD using the image generation method of the embodiment 4-2, plural images are taken from a viewpoint while changing the focusing distance, first. At this time, the plural images are taken using the polarizing binary optical system, a variable focus lens and the like, for example. The image to be obtained may be a color image in the same way as the embodiment 4-1 or may be a black and white image. Next, as described in the embodiment 4-1, after setting the viewpoint of the observer (step 102), processing of the step 103 for obtaining the three-dimensional shape of the object is performed.

In the processing of the step 103, as described in the embodiment 4-1, projection planes $L_j (j=1,2,\ldots,M)$ and the reference viewpoint R are set first (step 10301, step 10302). Then, next, the projection point series and the corresponding points are set, and the array (area) for storing the information of the projection plane is kept (step 10303, step 10304).

In the three-dimensional image display method of this embodiment 4-2 in which the three-dimensional image of the object is displayed using plural images having different focusing distances, when setting the projection planes $L_j$ in step 10301, the planes are set such that the distances from the viewpoint c of the camera are the same as the focusing distances $f_i (i=1,2,\ldots,N)$ of the images taken by the camera as shown in FIG. 78, for example. Then, in the step 10303, the corresponding points $G_i$ corresponding to the projection point $T_j$ is determined to be points, on images $Img_i$, overlapping with the projection point $T_j$ when viewing the projection point $T_j$ from the viewpoint C of the camera. Methods for setting the projection point series, and for associating the coordinates of the projection point $T_j$ with the digital image coordinates of the corresponding point $G_i$ are the same as the methods described in the embodiment 4-1. Thus, detailed descriptions are not provided here.

In addition, the processing for keeping the area for storing the information of the projection planes in the step 10304 is also the same as that described in the embodiment 4-1. Thus, detailed descriptions are not provided here.

Next, the color information and the existence probability information of each projection point $T_j$ are determined using the obtained plural images (step 10305). Also in the three-dimensional image display method of this embodiment 4-2, in the step 10305, double loop processing is performed in which processing for determining the color information and the existence probability of each projection point $T_j$ on the projection point series is repeated for every projection point series. Thus, first, the projection point series is initialized (step 10305*a*). Then, next, the projection point $T_j$ on the projection point series is initialized to j=1, for example (step 10305*b*).

Next, the color information of the projection point $T_j$ is determined (step 10305*c*). In the step 10305*c*, an average value of color information of the corresponding points $G_i$ set in the step 10303 is determined to be the color information $K_j$ of the projection point $T_j$.

Next, the focusing degree $Q_j$ of the projection point $T_j$ is obtained based on degree (focusing degree) by which focus is achieved for a point, of the object, appearing on each corresponding point $G_i$ corresponding to the projection point $T_j$ (step 10305*j*). The focusing degree of the projection point $T_j$ can be determined according to sharpness or blurriness at a point or a small region on the image. As a calculation method for the focusing degree, there are various methods based on Depth from Focus theory or Depth from Defocus theory. The focusing degree $Q_j$ can be obtained by comparing sizes of local spatial frequency of each corresponding point $G_i$, for example.

The Depth from Focus theory or the Depth from Defocus theory is a method for analyzing plural images having different focusing distance to measure the surface shape of the object. In the method, the surface of the object is estimated to exist at a distance corresponding to a focusing distance of an image having the highest local spatial frequency among the images taken by changing the focusing distance, for example. Thus, the focusing degree $Q_j$ of the projection point $T_j$ is calculated using an evaluation function of the local spatial frequency represented by the following equation 102, for example.

$$Q = \frac{1}{D} \sum_{x=x_i}^{x_f} \sum_{y=y_i}^{y_f} \left\{ \sum_{p=-L_c}^{L_c} \sum_{q=-L_r}^{L_r} |f(x,y) - f(x+p, y+q)| \right\} \quad \text{[Equation 102]}$$

wherein f indicates a gray scale of a pixel, D indicates a constant for normalization that is a number of all pixels, (−Lc, −Lr)−(Lc, Lr) and (xi, yi)−(xf, yf) indicate small regions for performing distribution evaluation and smoothing respectively.

The equation 102 is one example for a method for obtaining the focusing degree $Q_j$, and the focusing degree $Q_j$ can be obtained by using equations other than the equation 102.

After obtaining the focusing degree $Q_j$ by the step 10305*j*, the projection point $T_j$ is updated, and it is checked whether processing of the steps 10305*c* and 10305*j* are performed for every projection point on the projection point series that is a subject for processing (step 10305*e*). When there is any projection point for which the processing of the steps 10305*c* and 10305*j* has not been performed, the step returns to the step 10305*c* so that the color information $K_j$ and the focusing degree $Q_j$ are obtained.

When the color information and the focusing degree $Q_j$ are obtained for every projection point on the projection point series that is a subject of processing, color information $K_j$ and the focusing degree $Q_j$ are provided for each projection point $T_j$ on the projection point series as shown in FIG. 80. The focusing degree $Q_j$ of the projection point $T_j$ is a degree corresponding to the correlation degree used for determining the existence probability β in the embodiment 4-1. There my be a case where there is no projection point at which the focusing degree has the distinctive small value when the focusing degrees $Q_j$ of each projection point $T_j$ on the projection point series are compared depending on the shape of the object, the texture of the surface, photographing conditions and the like. In this case, even if the surface of the object is estimated to exist at a projection point, the reliability is low and there is a case the estimation is erroneous. When the estimation is erroneous, the effect appears as a large noise on the generated image.

Thus, according to the three-dimensional image display method of this invention, next, as shown in FIG. 81, the probability (existence probability) $\beta_j$ that the surface of the object exists on each projection point $T_j$ on the projection point series is determined. In this case, as described in the embodiment 4-1, the existence probability $\beta_j$ is determined after performing statistical processing for the evaluation reference value $v_j$ to prevent deterioration of the reliability due to the noise of the obtained images (step 10305*f*). For calculating the evaluation reference value $v_j$ in the step 10305*f*, it is necessary that the evaluation reference value $v_j$ satisfies the equations 87 and 88. Thus, in this embodiment 4-2, the evaluation reference value $v_j$ of the projection point $T_k$ is determined using the equation 103, for example.

$$\beta_k = \frac{Q_k}{\sum_{j=1}^{M} Q_j} \qquad \text{[Equation 103]}$$

It is only necessary that the evaluation reference value $v_j$ satisfies the conditions of the equations 87 and 88. Therefore, the evaluation reference value $v_j$ can be determined using equations other than the equation 97.

After calculating the evaluation reference value $v_j$ in step 10305*f*, next, parameter fitting is performed according to the before-mentioned procedure, so that the existence probability $\beta_j$ of each projection point $T_j$ is determined as shown in FIG. 81 (steps 10305*g* and 10305*h*)

After determining the existence probability $\beta_j$ of each projection point $T_j$ in the step 10305*h*, the color information $K_j$ and the existence probability $\beta_j$ of each projection point $T_j$ are stored in the area kept in the step 10304.

After storing the color information $K_j$ and the existence probability $\beta_j$ of each projection point $T_j$, the projection point series is updated and it is checked whether processing from the step 10305*c* to the step 10305*h* has been performed for every projection point series determined in the step 10303 (step 10305*i*). When there is any projection point series for which processing from the step 10305*c* to the step 10305*h* has not been performed, the step returns to the step 10305*b* so that the processing from the step 10305*c* to the step 10305*h* is repeated.

Accordingly, after the processing from the step 10305*c* to the step 10305*h* are performed for every projection point series determined in the step 10303, the processing of the step 10305 completes, so that the three-dimensional shape of the object can be obtained. Then, after obtaining the three-dimensional shape of the object by the processing of the step 103, color information and the brightness distribution coefficient γ of the display point A on the two-dimensional image generation plane LD are determined based on the three-dimensional shape of the object, so as to generate the two-dimensional images to be displayed on the plural overlapping image display planes such as the DFD according to the same procedure as the embodiment 4-1 (step 104). Then, by displaying the generated images on actual image display planes (step 105), the three-dimensional image of the object can be presented.

Also in the three-dimensional image display method of this embodiment 4-2, like the three-dimensional image display method of this embodiment 4-1, when there is no projection point having the focusing degree $Q_j$ of a distinctive value in the projection points $T_j$ on the projection point series, so that reliability for estimation of the distance of the surface of the object is low, the surface of the object is represented vaguely on plural projection planes on the projection point series. Then, the brightness distribution coefficient γ of points on the two-dimensional image generation plane LD is determined from the existence probability β of each projection point $T_j$. Accordingly, when the two-dimensional images generated on the two-dimensional image generation planes are displayed on the actual image display planes so as to present the three-dimensional image of the object, the surface of the object is displayed vaguely on the projection point series in which reliability for distance estimation is low and the existence probability β is dispersed to plural projection points. Therefore, a noise on the three-dimensional image displayed on the DFD becomes inconspicuous so that an image that looks natural for the observer can be displayed.

As described above, according to the image generation method of this embodiment 4-1, the three-dimensional image that looks natural for the observer can be displayed without obtaining the accurate three-dimensional shape of the object to be displayed.

In addition, also in the case of the image generation method of this embodiment 4-2, the image to be obtained may be either of the color image or a black and white image. When using the black and white image, processing described in this embodiment 4-2 is performed using the brightness information (Y) as the information corresponding to the color information.

(Embodiment 4-3)

Figure 82:
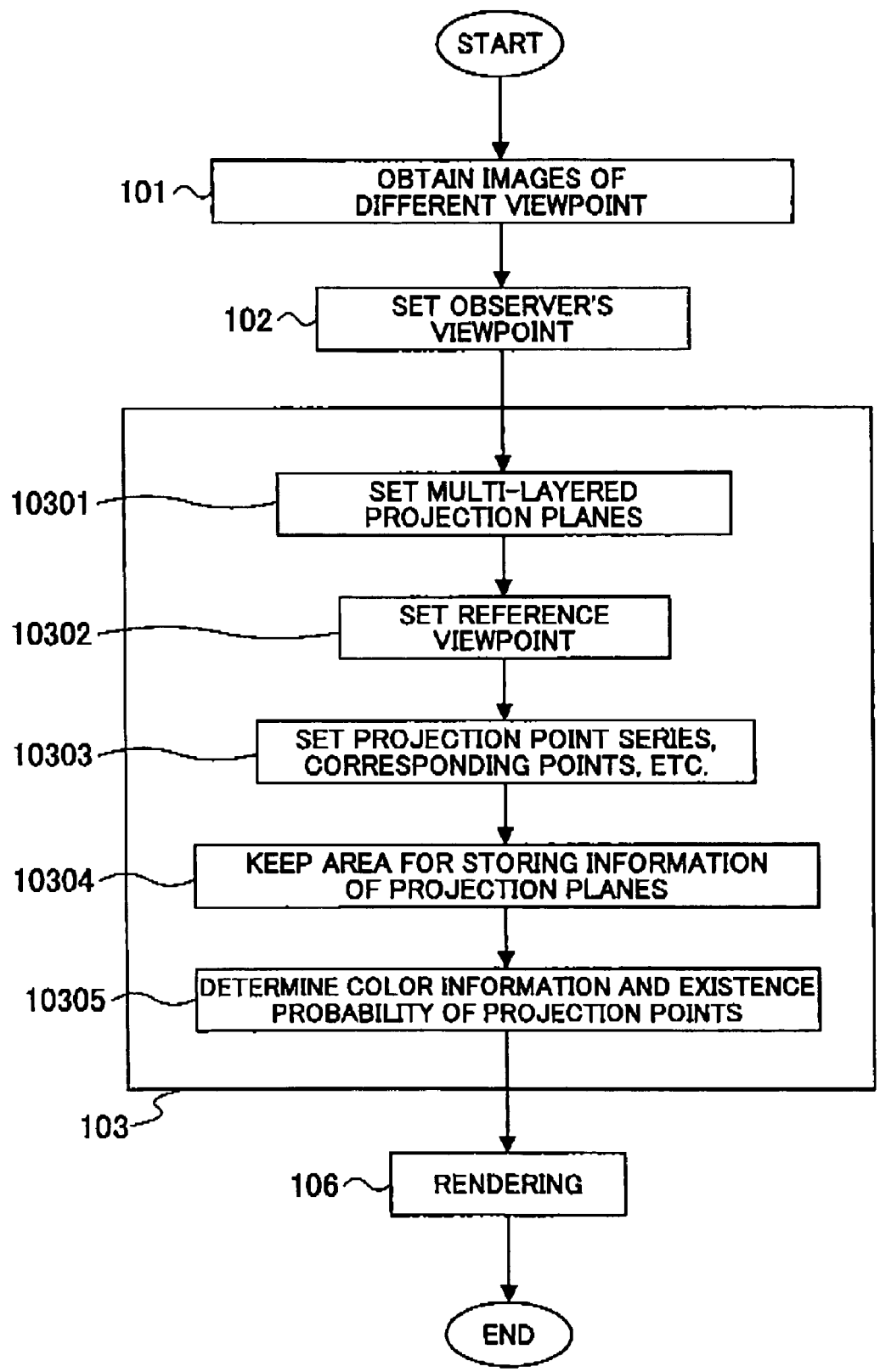
FIG. 82 is a schematic diagram for explaining an arbitrary viewpoint image generation method of the embodiment 4-3, and is a flow diagram showing an example of the whole processing procedure.
Figure 83:
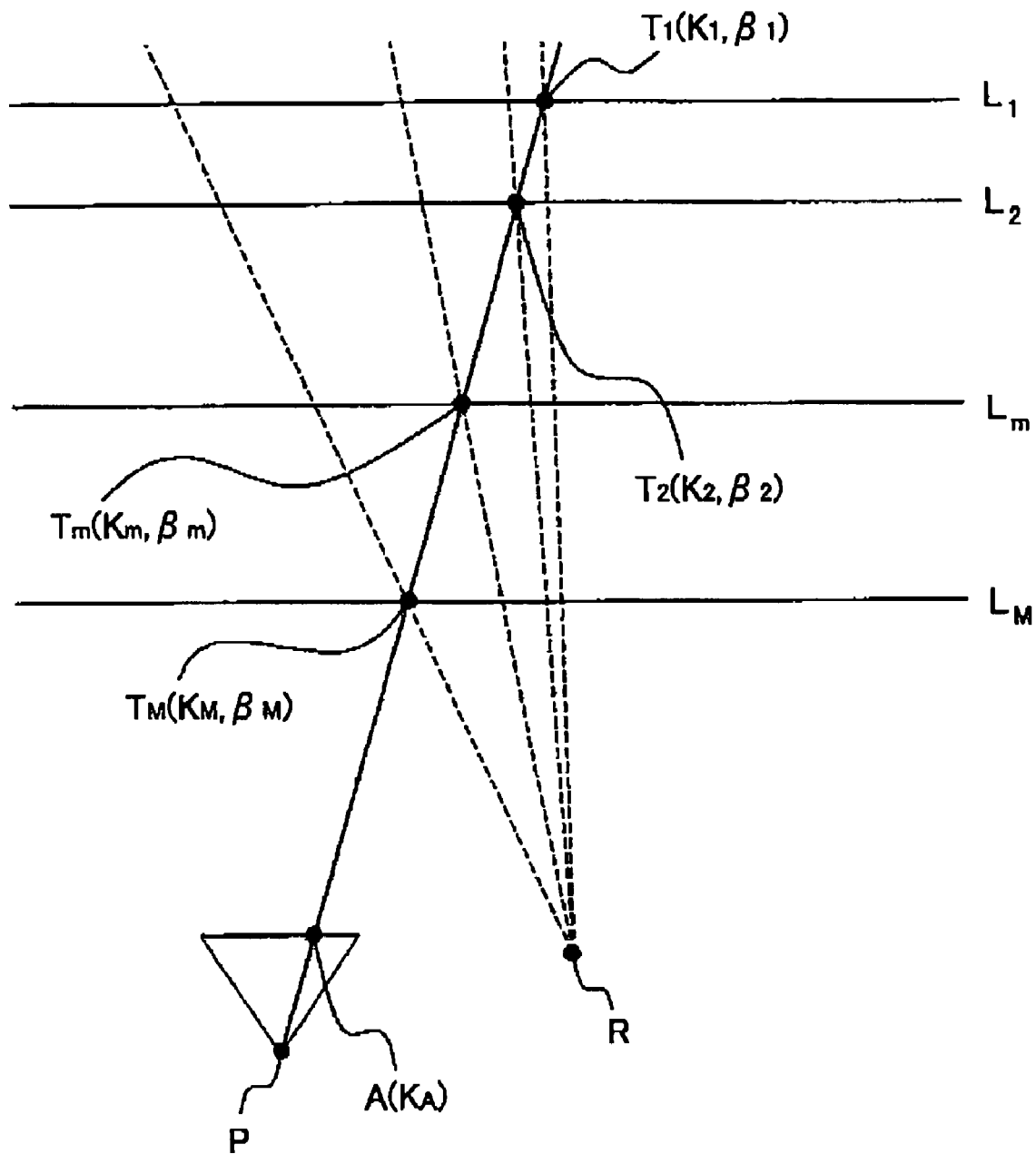
FIG. 83 is a schematic diagram for explaining an arbitrary viewpoint image generation method of the embodiment 4-3, and is a diagram for explaining the principle of rendering.
Figure 84A:
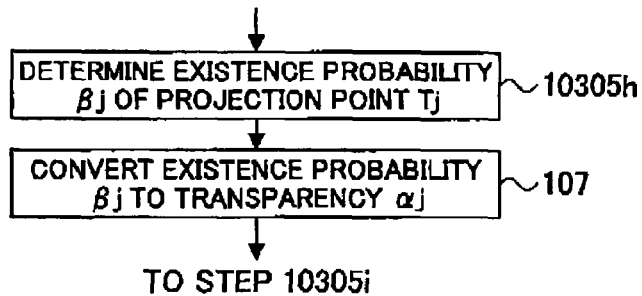
FIGS. 84A and 84B are flow diagrams showing processing procedure for converting the existence probability to the transparency
Figure 84B:
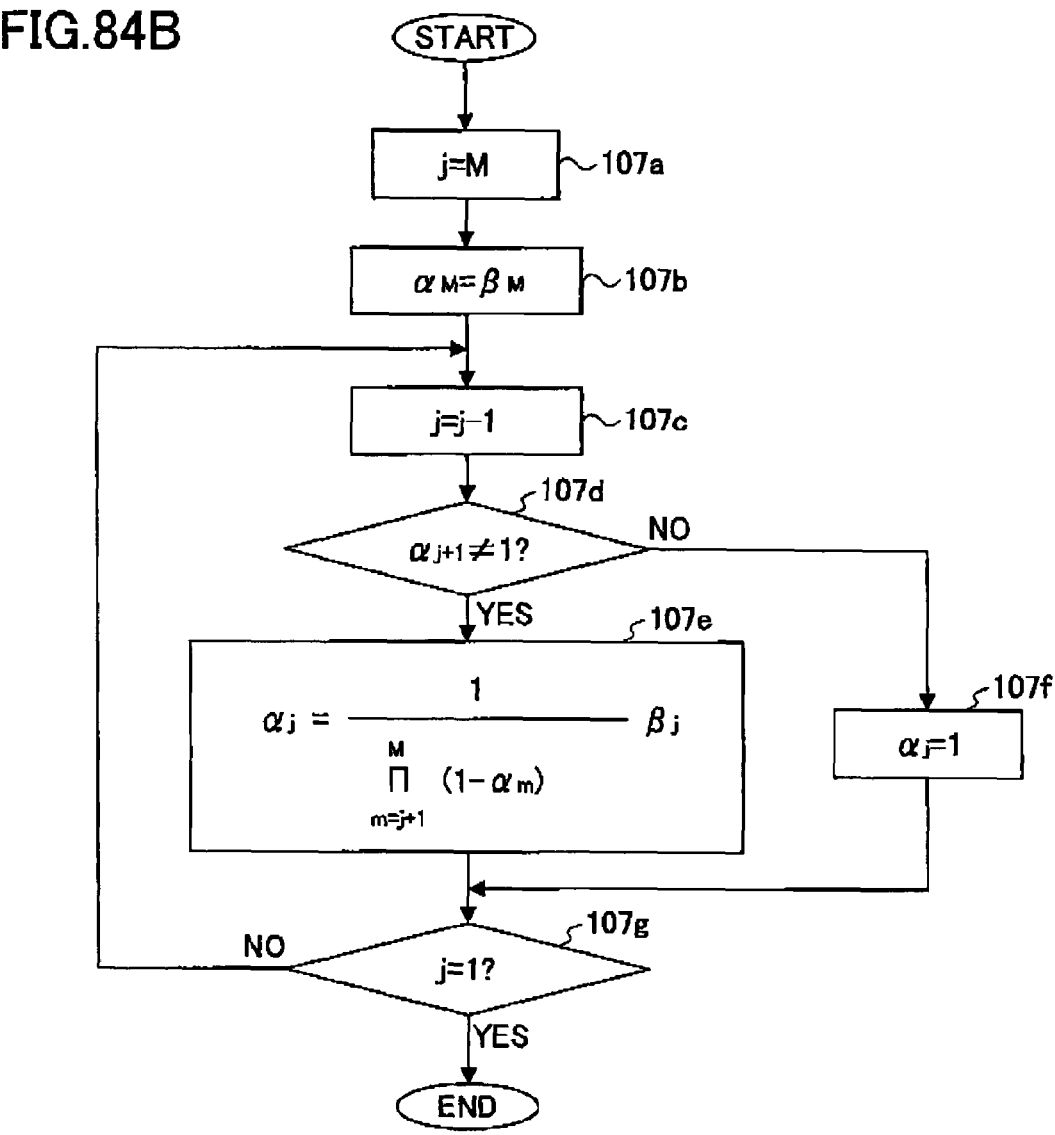

FIGS. 82-84 are schematic diagrams for explaining an arbitrary viewpoint image generation method of the embodiment 4-3 according to the present invention. FIG. 82 is a flow diagram showing an example of the whole processing procedure. FIG. 83 is a diagram for explaining the principle of rendering. FIGS. 84A and 84B are flow diagrams showing processing procedure for converting the existence probability to the transparency.

In the embodiments 4-1 and 4-2, although a method for generating the two-dimensional images to be displayed on each image display plane of the apparatus having plural image display planes like the DFD using the three-dimensional shape of the object obtained in the step 103 is taken as an example, use of the three-dimensional shape of the object is not limited to that, but it can be also used for generating two-dimensional images of the object viewed from arbitrary viewpoints. In this case, the difference compared to the embodiments 4-1 and 4-2 is that rendering is performed after the step 103, that is, processing of step 106 for generating the two-dimensional image of the object viewed from the observer's viewpoint from the three-dimensional shape. Since the processing from the step 101 to step 103 in which the three-dimensional shape of the object is obtained is as described in the embodiments 4-1 and 4-2, it is not described in detail.

In the step 11 for rendering in the arbitrary viewpoint image generation method of this embodiment 4-3, the color information of each point (pixel) on the arbitrary viewpoint image to be displayed is determined by performing mixing processing for color information $K_j$ of projection points $T_j (j=1,2,\ldots,M)$ overlapping with a point A on the arbitrary viewpoint image as shown in FIG. 83, for example. Mixing processing for color information using the transparency $\alpha_j$ is performed as described in the embodiment 2-2 and the like in the second embodiment.

Also in the method for generating the arbitrary viewpoint image of this embodiment 4-3, after performing the step 10305h for determining the existence probability $\beta_j$, processing for converting the existence probability $v_j$ to the transparency $\alpha_j$ is performed as shown in FIG. 84A, for example (step 107).

In the processing for converting the existence probability $v_j$ to the transparency $\alpha_j$, the projection point $T_j$ is initialized to j=M first as shown in FIG. 84B, for example (step 107a). Next, $\beta_m$ is substituted to transparency $\alpha_m$ of the projection point $T_m$ such that $\alpha_m = \beta_m$ (step 107b).

Next, the value of the argument j is updated to j=j−1 (step 107c). Then, it is determined whether the transparency $\alpha_{j+1}$ is 1 (step 107d). When transparency $\alpha_{j+1} \neq 1$, the transparency $\alpha_j$ is obtained from the equation 104, for example (step 107e).

$$\alpha_j = \frac{1}{\prod_{m=j+1}^{M}(1-\alpha_m)} \beta_j \quad \text{[Equation 104]}$$

When the transparency $\alpha_{j+1}$ is 1, 1 is substituted into $\alpha_j$ ($\alpha_{j}=1$), for example (step 107f). When obtaining the transparency $\alpha_j$ in the step 107e, the equation is not limited to the equation 104, and other equations can be used. In addition, although detailed descriptions are not provided, since any value can be substituted into the transparency $\alpha_j$ actually in step 107e, a value other than 1 may be substituted into the transparency $\alpha_j$.

Next, it is determined whether processing from the step 107d to the step 107f has been performed up to the argument j=1 (step 107g). When the processing has not been performed, the processing is repeated after returning to the step 107c.

After performing the processing from the step 107d to the step 107f up to the argument j=1, processing for converting the existence probability $v_j$ of the projection point $T_j$ overlapping with the point A on the image surface viewed from the observer's viewpoint P to the transparency $\alpha_j$ completes. After that, mixing processing using the equation 62 and the equation 63 is performed in the rendering step 104 to obtain the color information $D_m$ on the point A of the arbitrary viewpoint image. Then, by performing the processing for every point (pixel) on the arbitrary viewpoint image, the arbitrary viewpoint image from the observer's viewpoint can be obtained.

In addition, also in the case of the image generation method of this embodiment 4-3, the image to be obtained may be either of the color image or a black and white image. When using the black and white image, after obtaining the three-dimensional shape of the object by performing processing described in the embodiment 4-1 using the brightness information (Y) as the information corresponding to the color information, the virtual viewpoint image can be generated according to the procedure described in this embodiment 4-3.

(Embodiment 4-4)

Figure 85:
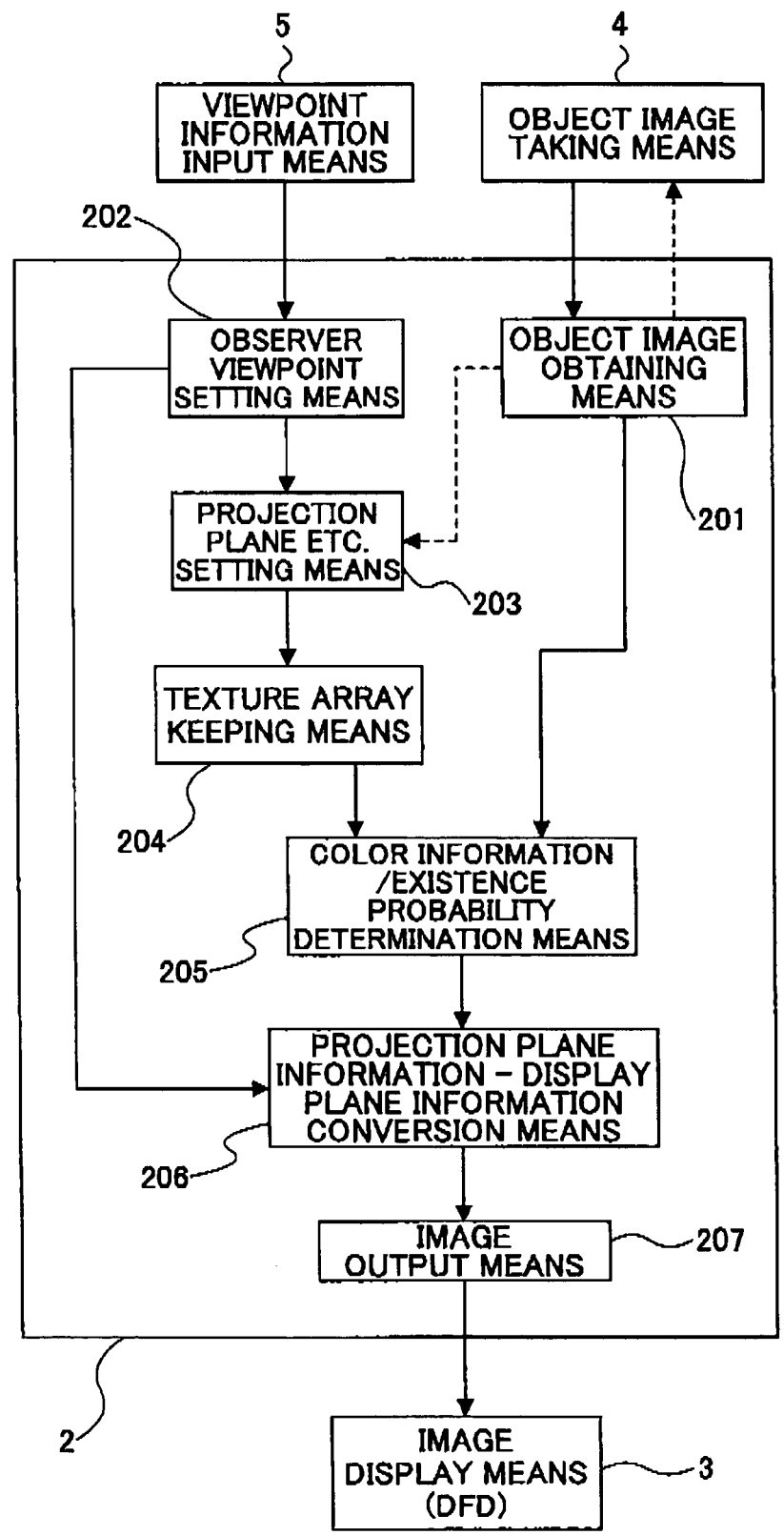
FIG. 85 is a schematic diagram showing a general configuration of the image generation apparatus of the embodiment 4-4.
Figure 86:
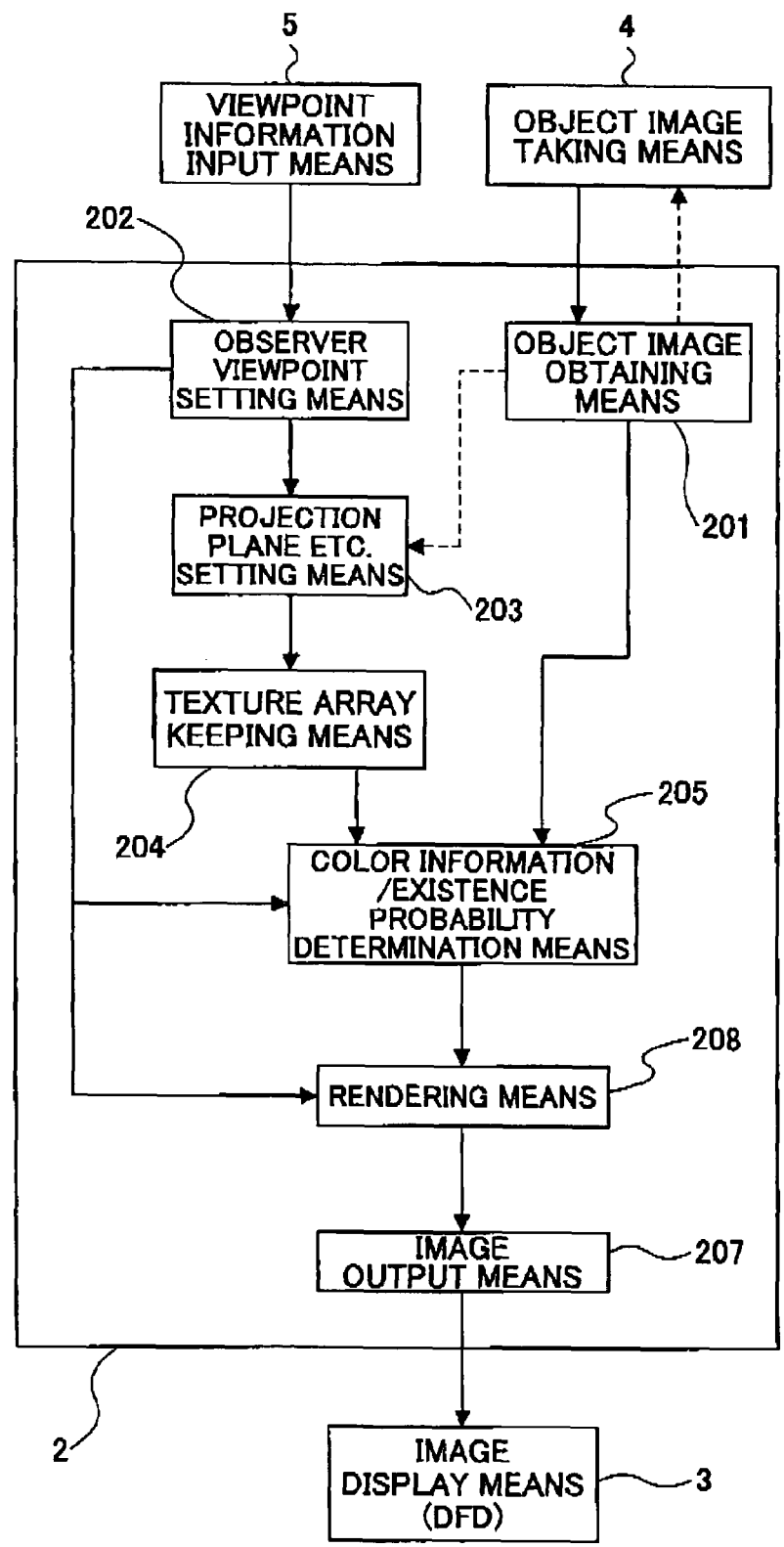
FIG. 86 is a schematic diagram showing a general configuration of the image generation apparatus of the embodiment 4-4.
Figure 87:
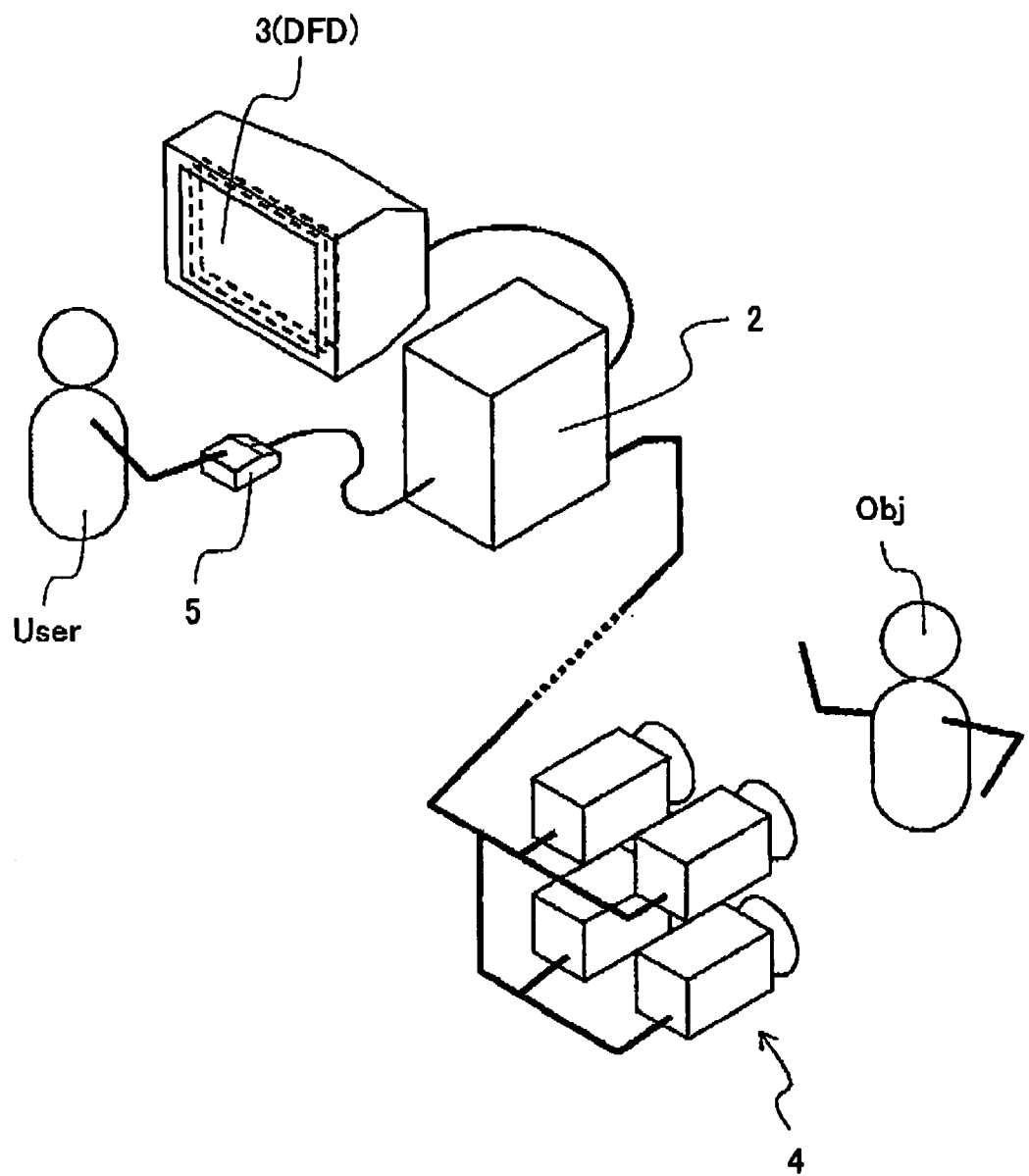
FIG. 87 is a schematic diagram showing a general configuration of the image generation apparatus of the embodiment 4-4, and is a diagram showing a configuration example of the image generation system using the image generation apparatus.
Figure 88:
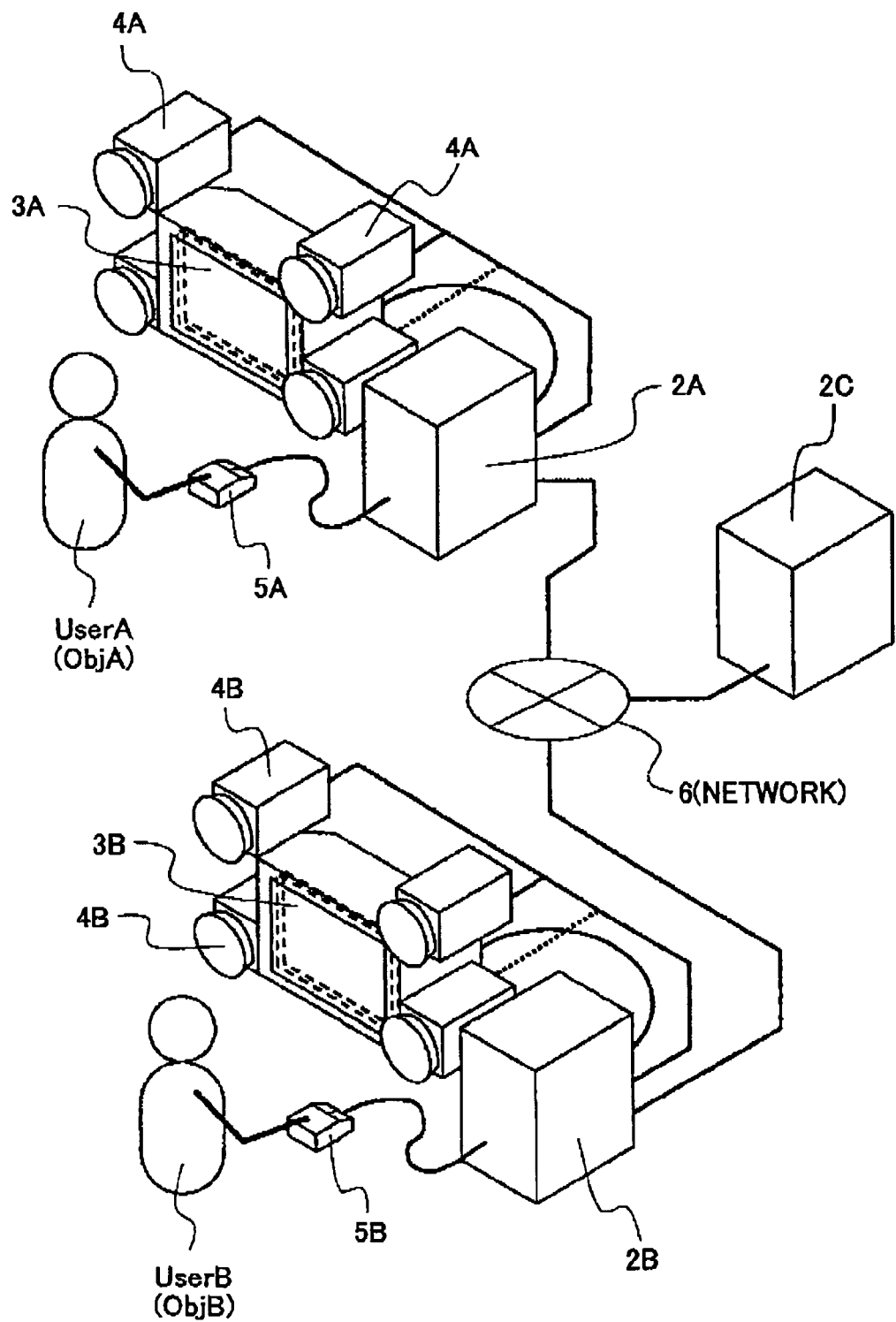
FIG. 88 is a schematic diagram showing a general configuration of the image generation apparatus of the embodiment 4-4, and is a diagram showing a configuration example of the image generation system using the image generation apparatus.

FIGS. 85-89 are schematic diagrams showing general configurations of an image generation apparatus this embodiment 4-4 according to the present invention. FIGS. 85 and 86 are block diagrams showing a configuration example of the image generation apparatus. FIGS. 87 and 88 are diagrams showing a configuration example of an image display system using the image generation apparatus.

In FIGS. 85 and 86, 2 indicates the three-dimensional image generation apparatus, 201 indicates an object image obtaining means, 202 indicates a observer viewpoint setting means, 203 indicates a projection plane etc. setting means, 204 indicates a texture array keeping means, 205 indicates a color information/existence probability determination means, 206 indicates a projection plane information—display plane information conversion means, 207 indicates an image output means, 208 indicates a rendering means, 3 indicates an image display means, 4 indicates an object image taking means, and 5 indicates an observer viewpoint input means.

The image generation apparatus 2 in this embodiment 4-4 is an apparatus for obtaining the three-dimensional shape of the object according to the procedure described in the embodiments 4-1 and 4-2, and generating the two-dimensional images to be displayed on each image display plane of the image display means 3 like the DFD having plural overlapping image display planes, and the image of the object viewed from arbitrary viewpoints. As shown in FIG. 85, for example, the apparatus for generating images to be displayed on the DFD includes the object image obtaining means 201 for obtaining plural object images taken under different photographing conditions, the observer viewpoint setting means 202 for setting a viewpoint of the observer who observes a generated image, the projection plane etc. setting means 203 for setting projection planes, projection point series, projection points, corresponding points and the like for determining the existence probability, the texture array keeping means 204 for keeping an area for storing color information and existence probability of points (projection points) on the projection plane, the color information/existence probability determination means 205 for determining the color information of the projection points and the probability (existence probability) that the object exist at the projection points, the projection plane information—display plane information conversion means 206 for converting the color information and the existence probability information of the projection point to color information and existence probability of a point of the two-dimensional image e to be displayed on the image display plane, and the image output means 207. An image output from the image output means 207 is displayed by the image display means 3 such as the DFD including plural overlapping display planes.

In addition, as described in the embodiment 4-3, in the apparatus for generating the image of the object viewed from the arbitrary viewpoint, the rendering means 208 is provided instead of the projection plane information—display plane information conversion means 206 as shown in FIG. 86. Although not shown in the figure, the apparatus may be configured to include both of the projection plane information—display plane information conversion means 206 and the rendering means 208 and to generate a specified image using either one of the means according to an instruction from the observer.

The object image obtaining means 201 obtains the images of the object taken by the object image taking means 4. The object image taking means 4 may be a taking means including plural cameras at plural viewpoints, or may be a taking means that can take images having different focal positions from one viewpoint. In this case, when the object image taking means 4 takes images having different focal positions from one viewpoint, the polarizing binary optical system (refer to document 12, for example) or a variable focus lens (refer to document 13, for example) can be used. In addition, images can be taken while switching plural lenses having different focal positions at high speed.

The observer viewpoint setting means 202 sets distance and the like between the observer's viewpoint and the image display plane of the image display means 3 based on information input using the viewpoint information input means 5 such as the mouse or a keyboard, by the observer for example. The viewpoint information input means 5 may be a means for detecting posture or line of sight of the observer so as to input information according to the posture or the line of sight.

The projection plane etc. setting means 203 sets parallel projection planes $L_j$, projection point series, corresponding points and the like as described in the embodiments 4-1 and 4-2.

The texture array keeping means 204 keeps the area for the color information $K_j$ and the existence probability $\beta_j$ of each projection point $T_j$ on each projection plane in a memory provided in the apparatus, for example, as described in the embodiments 4-1 and 4-2.

The color information/existence probability determination means 205 determines the color information from the projection point $T_j$ and corresponding points $G_{ij}$ on the image, and determines the probability $\beta_j$ that the surface of the object exists on the projection point $T_j$ as described in the embodiments 4-1 and 4-2.

The projection plane information—display plane information conversion means 207 converts the color information and the existence probability of the projection plane into color information and the brightness distribution ratio of a point (display point) on the two-dimensional image to be displayed on each image display plane of the image display means as described in the embodiment 4-1. In the case when the rendering means 208 is provided instead of the projection plane information—display plane information conversion means 206, color information of each point on images to be generated are determined based on the equation 59, or the relationship of the equation 62 and the equation 63 as described in the embodiment 4-3.

The image generation apparatus 2 in this embodiment 4-4 generates the images to be displayed on the DFD according to the procedure described in the embodiment 4-1 and the embodiment 4-2, for example. That is, the three-dimensional image generation apparatus 2 does not need to perform processing for obtaining the accurate three-dimensional shape of the object as was performed in the conventional technology. Therefore, even by an apparatus that does not have high processing ability can generate the images to be displayed on the DFD easily and at high speed.

The image generation apparatus 2 of this embodiment 4-4 can be also realized by a computer and a program executed by the computer, for example. In such as case, a program describes instructions corresponding to the processing procedure described in the embodiment 4-1, or instructions corresponding to the processing procedure described in the embodiment 4-2 is executed on the computer. In addition, the program can be provided by a recording medium that is magnetic, electrical or optical, or can be provided via a network such as the Internet.

In addition, the image display system using the image generation apparatus 2 of this embodiment 4-4 can be considered to be configured as shown in FIG. 87, for example. In the configuration, the object image taking means 4 may be placed at a place near the space where the observer User observes the image display means (DFD) 3, or may be placed at a place geographically apart. When the object image taking means 4 is placed at the geographically apart place, the taken image can be transferred to the three-dimensional image generation apparatus 2 using a network such as the Internet.

In addition, as shown in FIG. 87, the image display system using the image generation apparatus 2 of this embodiment 4-4 can be applied not only to a case where an observer User observes an object Obj but also to a bi-directional communication system such as TV phone and TV conference. In the case, spaces in which the observers UserA and UserB exist are respectively provided with image generation apparatuses 2A and 2B, image display means (DFDs) 3A and 3B, object image taking means 4A and 4B, and reference viewpoint setting means 5A and 5B as shown in FIG. 88, for example. Then, for example, by connecting between the image generation apparatuses placed at the spaces where the observers UserA and UserB exist by the network 6 such as the Internet, the observer UserA can observe, by the image display means 3A, the three-dimensional image of the observer UserB generated from the image taken by the object image taking means 4B. In the same way, the observer UserB can observe, by the image display means 3B, the three-dimensional image of the observer UserA generated from the image taken by the object image taking means 4A.

In addition, it is not necessary both of the image generation apparatuses 2A and 2B are configured as shown in FIG. 88 for applying to such bi-directional communication system, either one of the image generation apparatuses 2A and 2B can be a general communication terminal that does not include the configuration means shown in FIG. 86. In addition, each configuration means shown in FIG. 86 may be distributed to the image generation apparatuses 2A and 2B.

In addition, as shown in FIG. 88, if another image generation apparatus 2C is provided on the network 6, the three-dimensional image of the object to be displayed on the image display means (DFD) 3A and 3B can be obtained using the image generation apparatus 2C on the network 6 even when the image generation apparatuses 2A and 2B are not placed at the spaces where the observers UserA and UserB exists.

Figure 89:
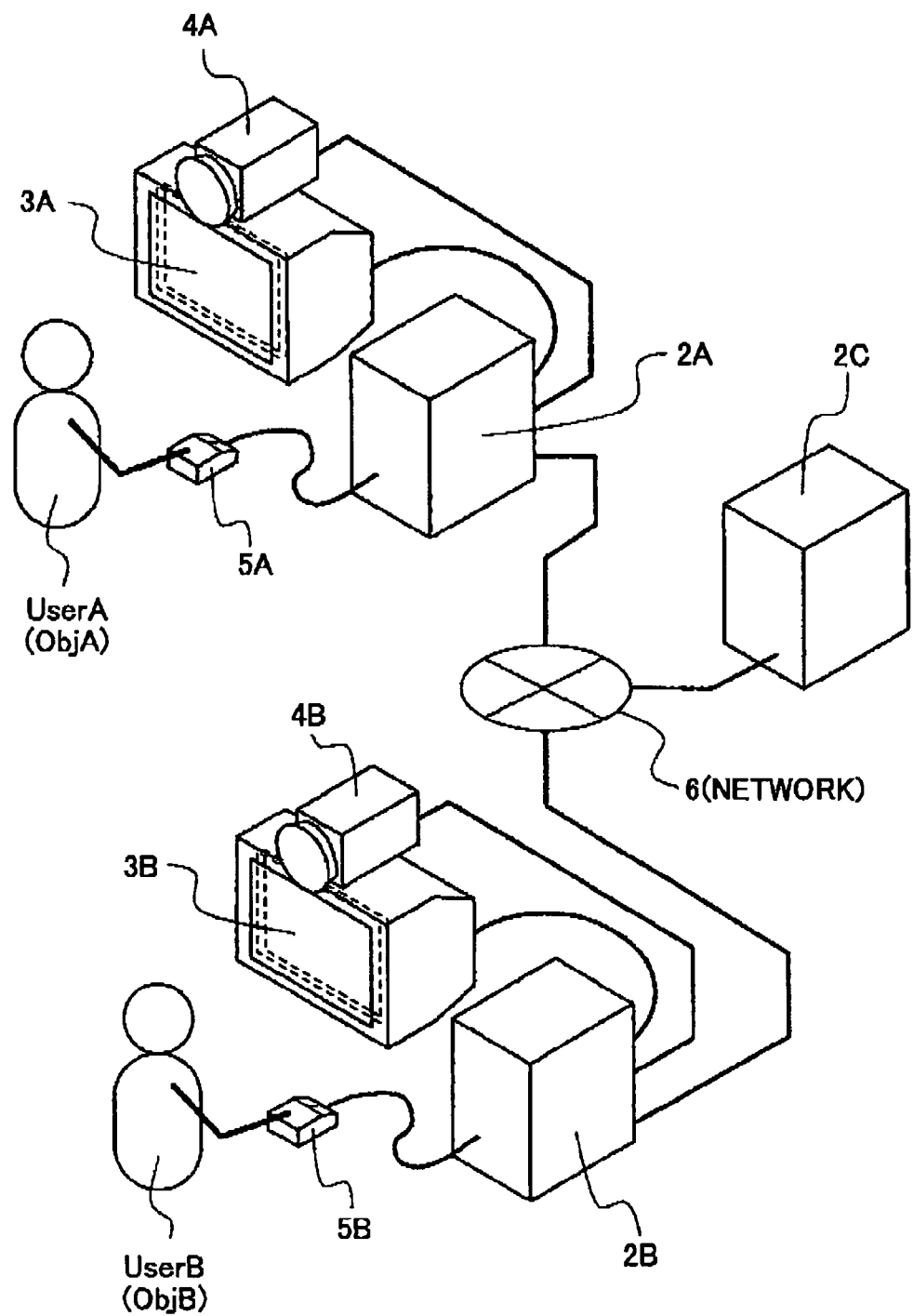
FIG. 89 is a schematic diagram showing a general configuration of the image generation apparatus of the embodiment 4-4, and is a diagram showing a configuration example of the image generation system using the image generation apparatus.

In addition, in FIGS. 87 and 88, although a system is shown in which the object image taking means 4 includes plural cameras, the number of cameras may be one for generating the display image as shown in FIG. 89, for example, when obtaining the three-dimensional shape of the object from images having different focusing distances as described in the embodiment 4-2.

As mentioned above, although the present invention is described concretely based on embodiments, the present invention is not limited to the specifically disclosed embodiments, and variations and modifications may be made without departing from the scope of the invention.

For example, although a method for displaying the three-dimensional image of the object based on images of different viewpoints is described in the embodiments 4-1, and a method for displaying the three-dimensional image of the object based on images having different focusing distances is described in the embodiment 4-2, the three-dimensional image of the object can be displayed by combining these methods. In this case, the correlation degree is obtained from corresponding points of images of different viewpoints with respect to a projection point $T_j$, the local space frequency is obtained from corresponding points of images taken by changing focal positions from a viewpoint, and the existence probability $\beta_j$ is obtained by combining them. By doing so, the reliability of the existence probability $\beta_j$ increases so that an image that looks natural for the observer can be displayed.

(Effects of the Fourth Embodiment)

In the image generation method of the fourth embodiment, when obtaining the three-dimensional shape of the object, as mentioned before, plural projection planes are set, and the probability (existence probability) that the surface of the object exists on the projection point is provided to each of the points (projection points), on each projection plane, overlapping when viewed from the reference viewpoint. That is, the method of this embodiment does not assume that the surface of the object exists on a projection point in the plural projection points overlapping viewed from the reference viewpoint like conventional methods for obtaining the three-dimensional shape, but assumes that the surface of the object exists on each projection point with the existence probability. In addition, when determining the existence probability, statistical processing is performed on the evaluation reference value that is calculated from the correlation degree or the focusing degree so that the existence probability of the object is generated from the evaluation reference value on which the statistical processing has been performed. At this time, in the statistical processing, a probability distribution model of the object is assumed, so that the fitting function of the evaluation reference value of each projection point is obtained, and the existence probability of each projection point is determined from that.

By doing so, when viewing a direction from the reference viewpoint, even when the reliability for estimating a distance (projection point) at which the object surface exists is low, the surface of the object exists with a probability on the projection point at which the surface of the object actually exists. As a result, by generating the image of the object viewed from the viewpoint of the observer based on the three-dimensional shape of the object obtained according to the procedure, discontinuous noise that may occur when erroneous distance estimation is performed can be made inconspicuous. In addition, by determining the existence probability by performing the statistical processing for the evaluation reference value, deterioration of the reliability of the existence probability due to effects of noise of the obtained images can be decreased.

In addition, according to this embodiment, even by an apparatus having low processing performance such as a generally used personal computer, each two-dimensional image can be generated at high speed.

Fifth Embodiment

Next, the fifth embodiment of the present invention is described. The fifth embodiment mainly corresponds to claims 40-48. In the fifth embodiment, the three-dimensional shape of the object is obtained from plural images obtained by taking the object under different taking conditions. Then, the three-dimensional image of the object is displayed on a display, like a DFD, including plural display planes based on the three-dimensional shape of the object. In the fifth embodiment, processing of the parameter fitting described in the fourth embodiment is not performed. In figures for explaining the fifth embodiment, the same signs are assigned to components having the same function.

When obtaining the three-dimensional shape of the object, projection planes of the multi-layered structure are set in a virtual three-dimensional space, and for points (projection points), on plural projection planes, that overlap when viewed from the observer's viewpoint, color information or brightness information of each projection point, and probability (existence probability) that the surface of the object exists on the projection point are determined. Then, when generating two-dimensional images to be displayed on the plural display planes based on the three-dimensional shape of the object, the color information or brightness information and the existence probability are assigned to each point of the two-dimensional images. When displaying the image on the image display plane, each point of the two-dimensional image is displayed with brightness according to the existence probability. By doing so, a part at which the reliability of estimation on distance of the surface of the object is displayed vaguely, so that a three-dimensional image that looks natural for the observer can be provided.

(Embodiment 5-1)

Figure 90:
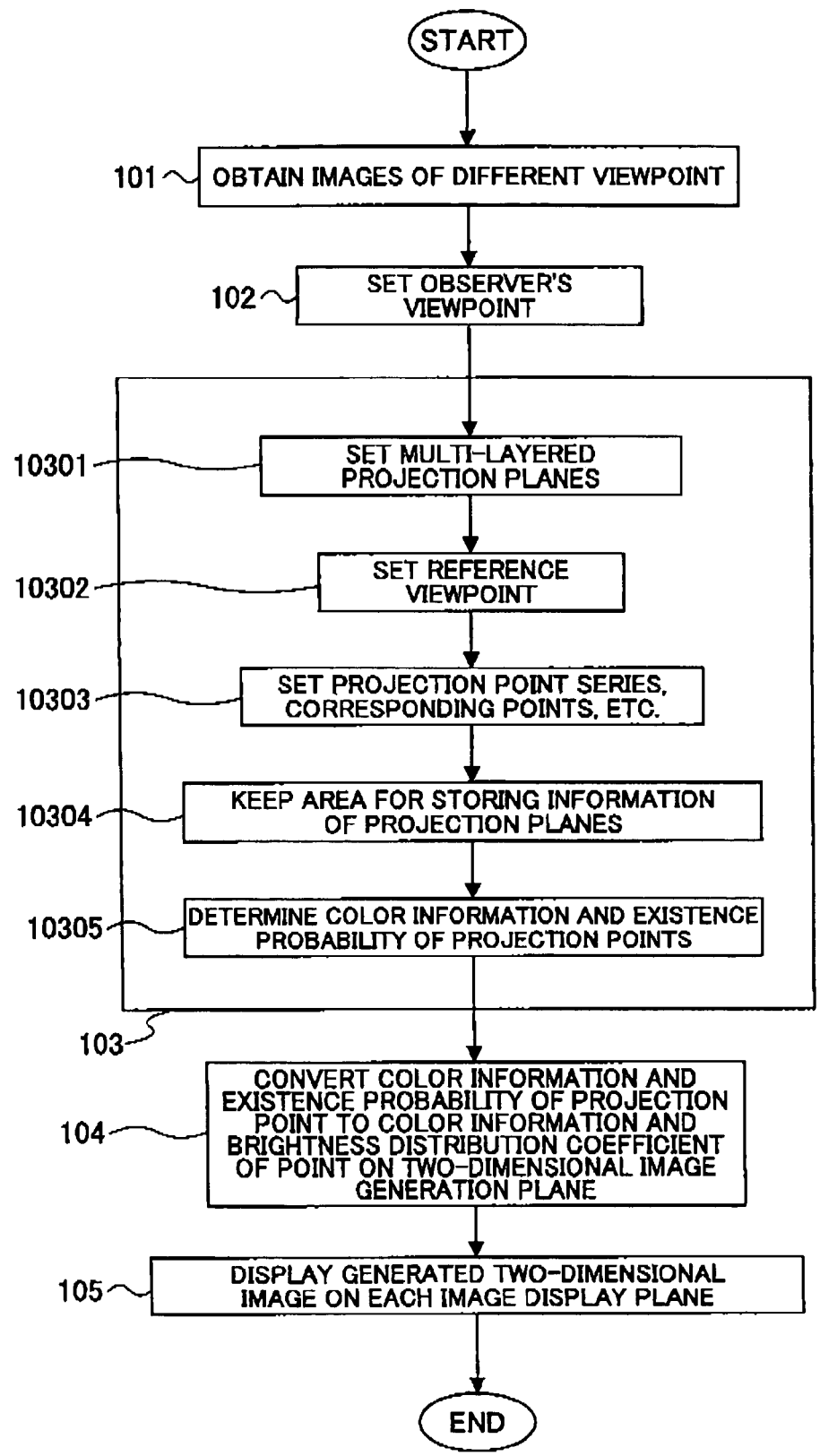
FIG. 90 is a schematic diagram for explaining the three-dimensional image display method of the embodiment 5-1 according to the fifth embodiment, and is a flow diagram showing an example of the whole processing procedure.
Figure 91F:
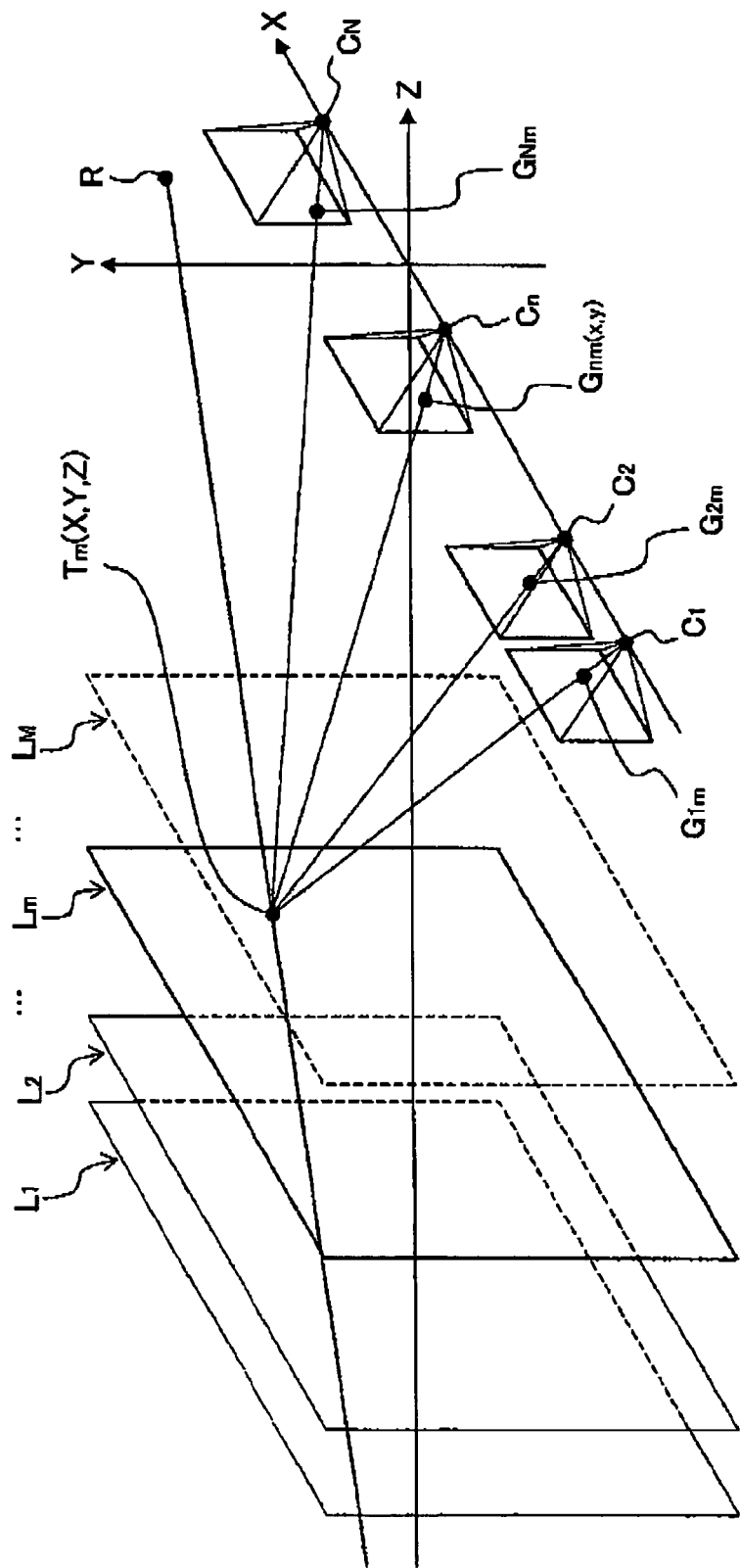
FIG. 91 is a schematic diagram for explaining the three-dimensional image display method of the embodiment 5-1, and is a diagram showing an example of a method for setting the projection plane.
Figure 93:
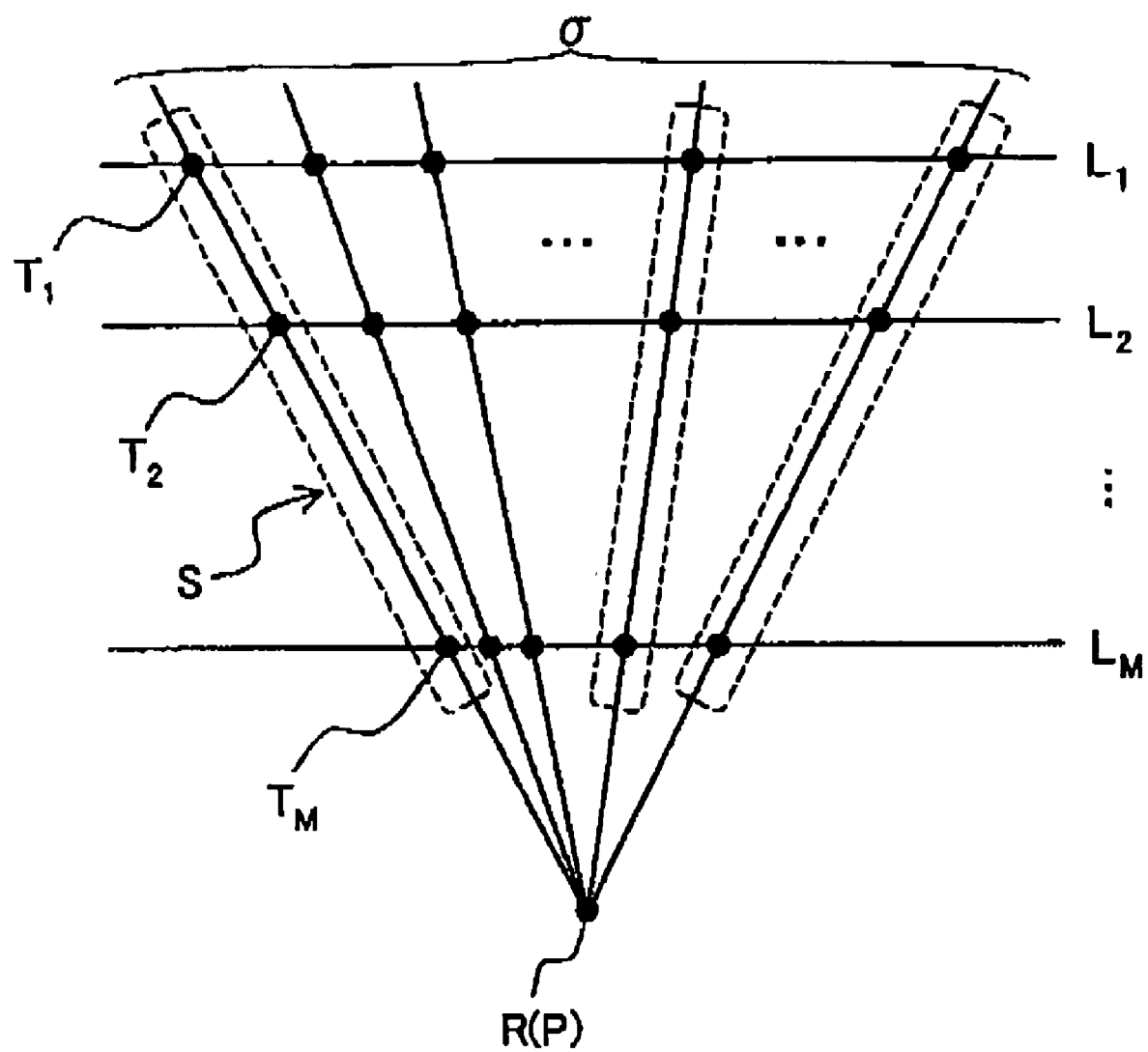
FIG. 93 is a schematic diagram for explaining the three-dimensional image display method of the embodiment 5-1, and is a diagram for explaining a method for setting projection points.
Figure 94:
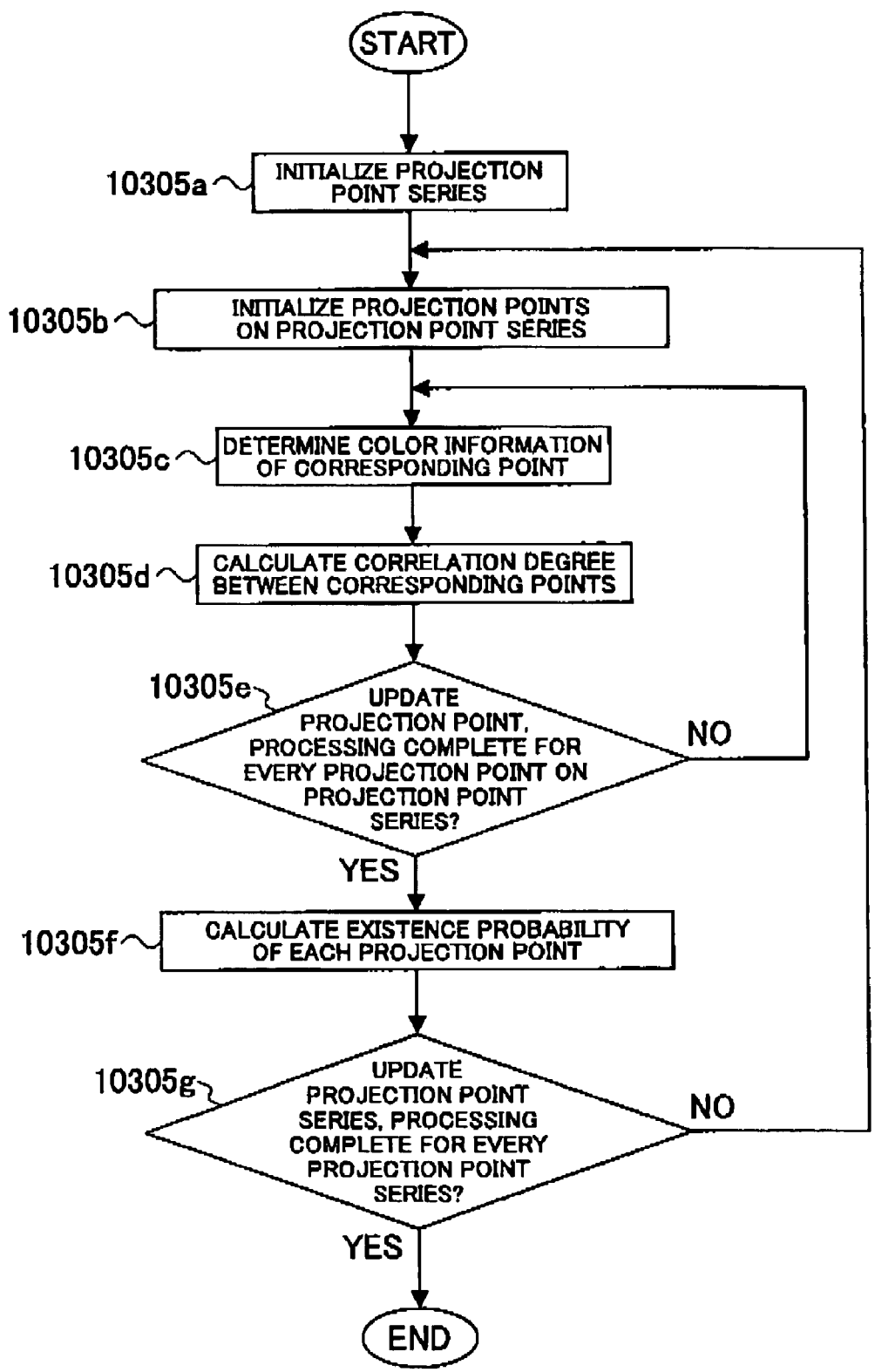
FIG. 94 is a schematic diagram for explaining the three-dimensional image display method of the embodiment 5-1, and is a flow diagram showing an example of processing procedure of steps for determining the color information and the existence probability of the projection point.
Figure 95:
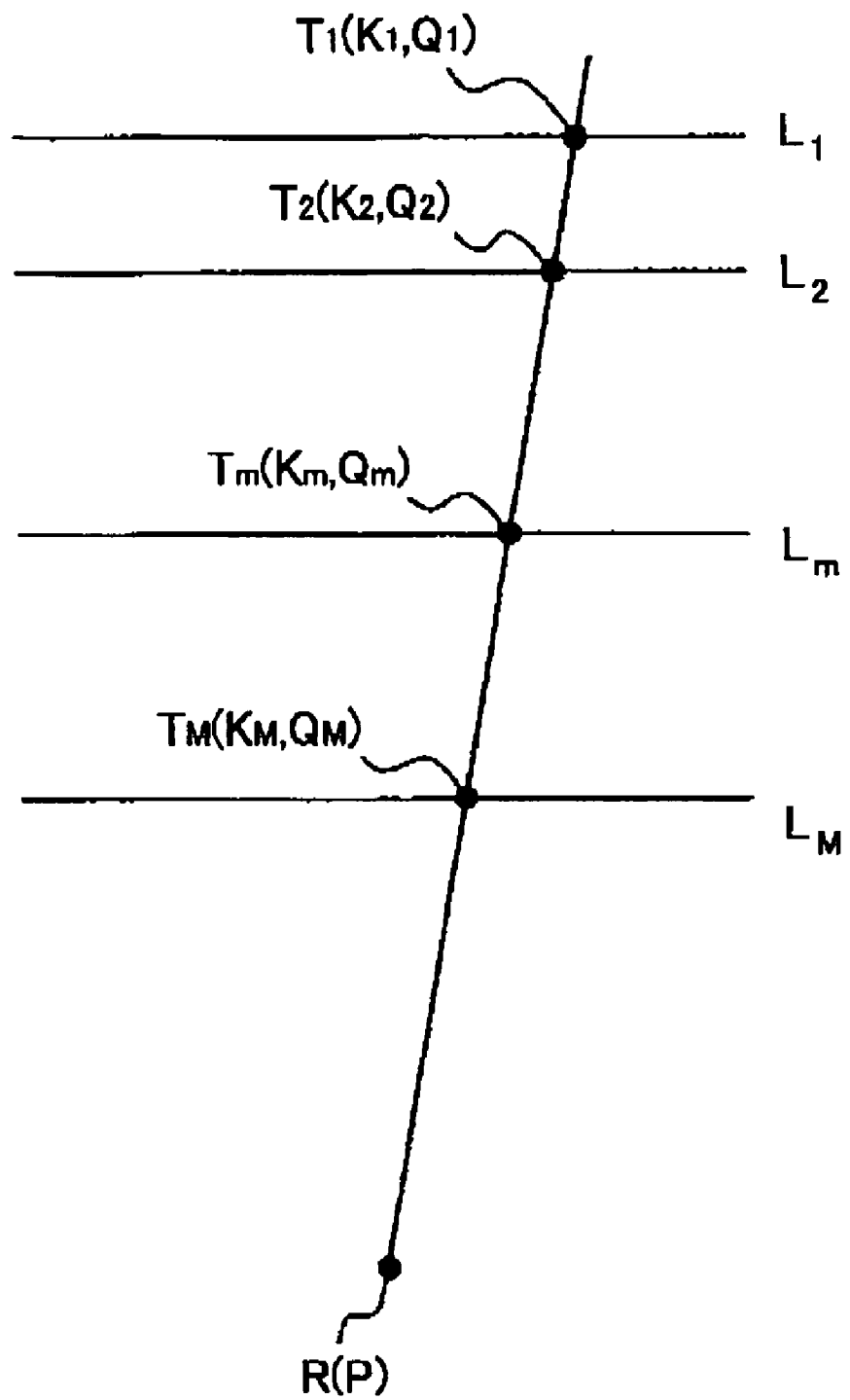
FIG. 95 is a schematic diagram for explaining the three-dimensional image display method of the embodiment 5-1, and is a diagram for explaining a method for determining the existence probability.
Figure 96A:
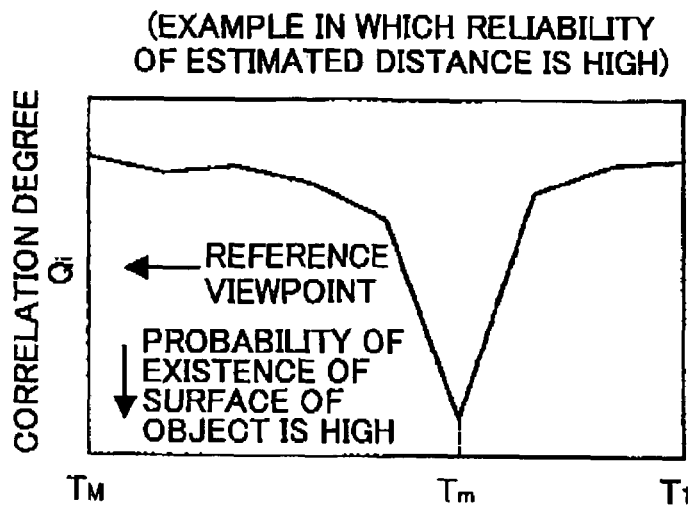
FIG. 96 is a schematic diagram for explaining the three-dimensional image display method of the embodiment 5-1, and is a diagram for explaining a method for determining the existence probability.
Figure 96B:
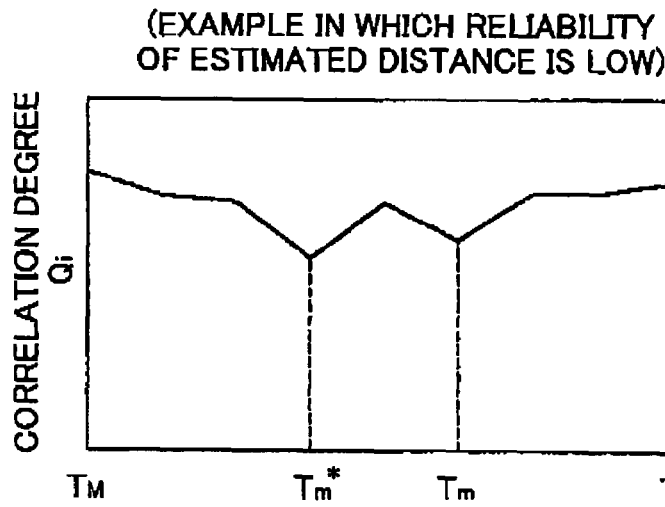
Figure 97:
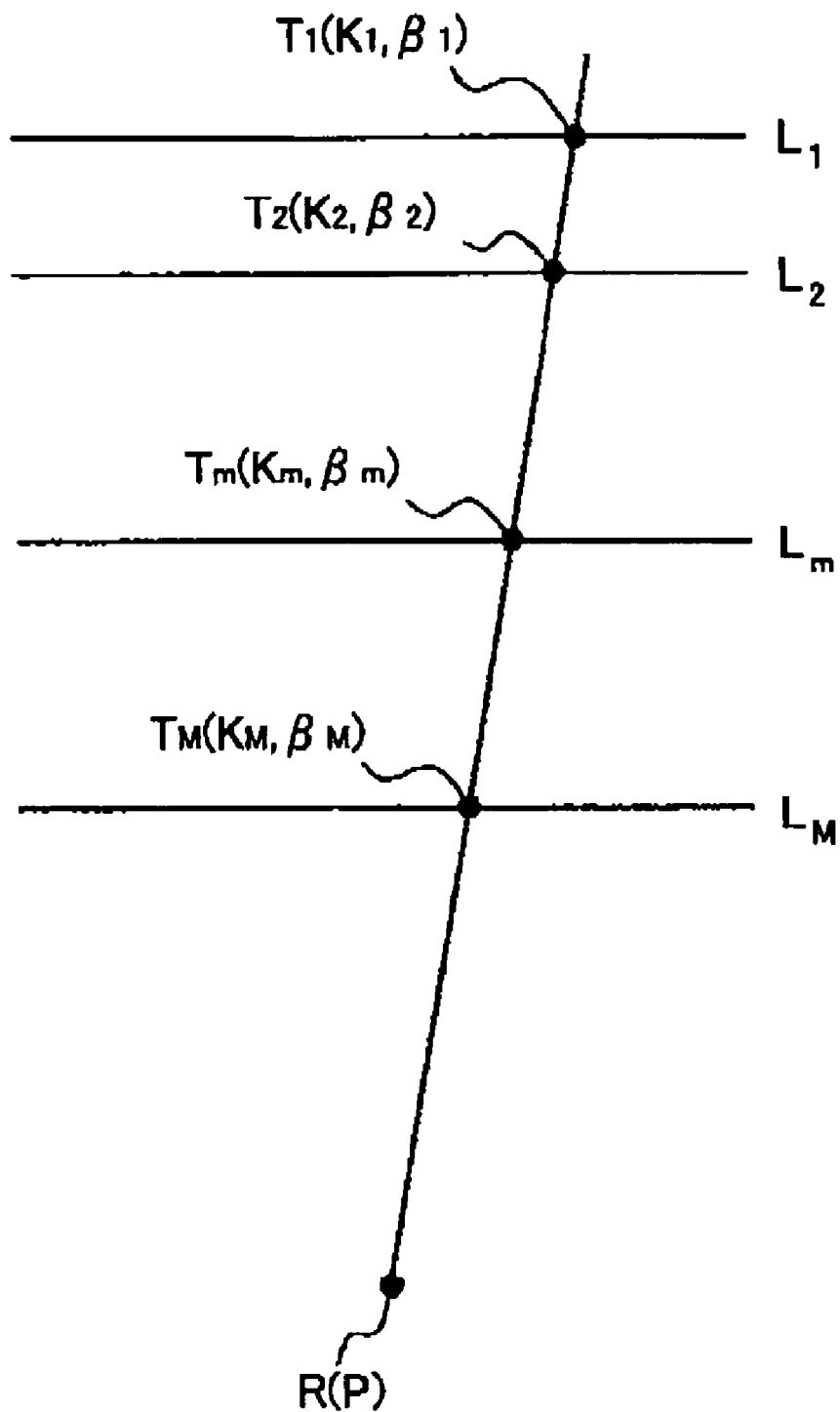
FIG. 97 is a schematic diagram for explaining the three-dimensional image display method of the embodiment 5-1, and is a diagram for explaining a method for determining the existence probability.
Figure 98:
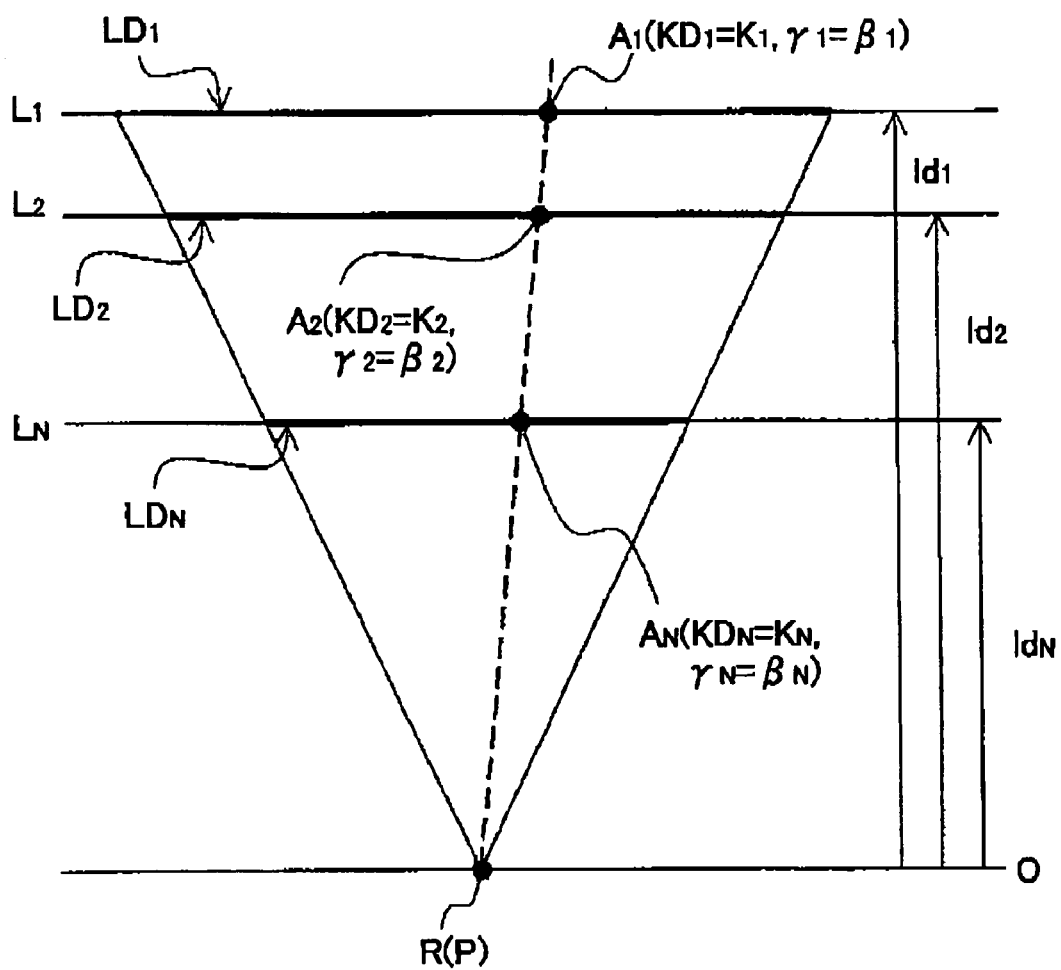
FIG. 98 is a schematic diagram for explaining the three-dimensional image display method of the embodiment 5-1, and is a diagram for explaining a method for generating the two-dimensional images to be displayed on each image display plane.
Figure 99:
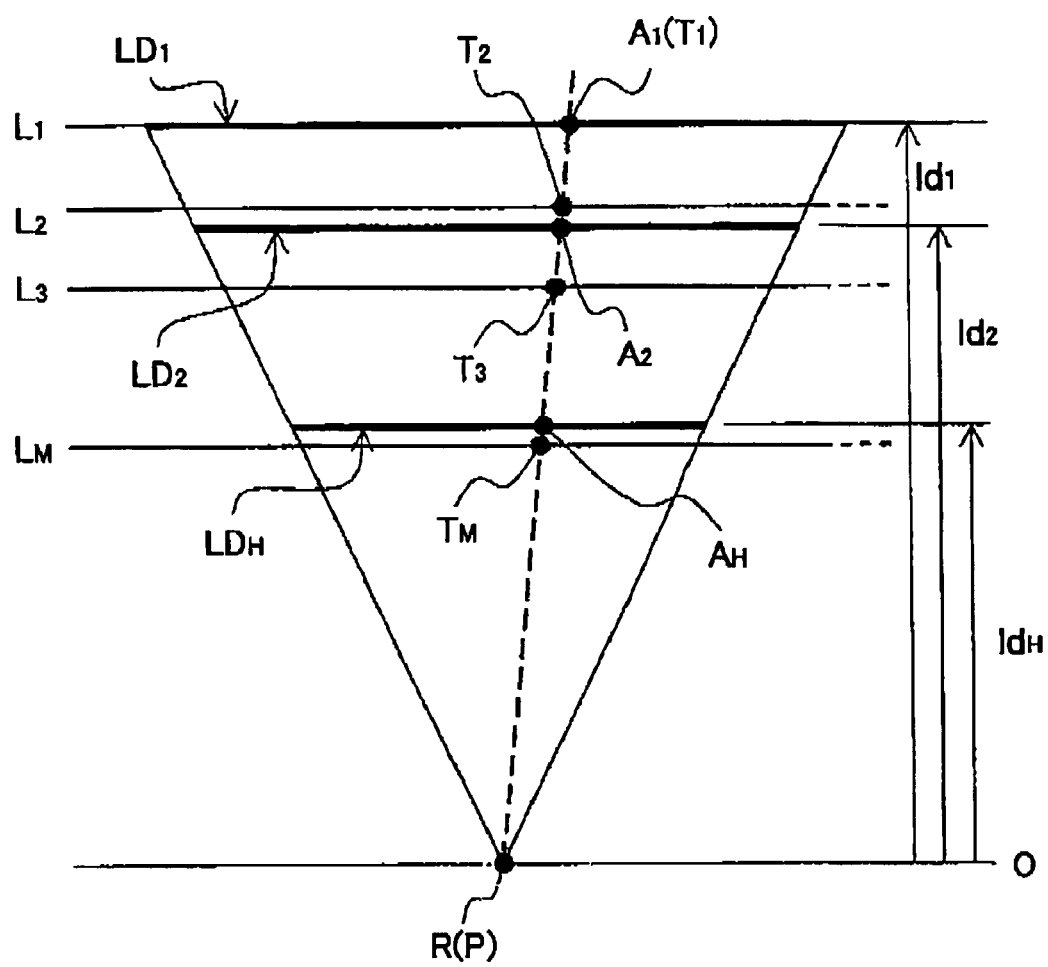
FIG. 99 is a schematic diagram for explaining the three-dimensional image display method of the embodiment 5-1, and is a diagram for explaining a method for generating the two-dimensional images to be displayed on each image display plane.

FIGS. 90-100 are schematic diagrams for explaining the three-dimensional image generation method of the embodiment 5-1. FIG. 90 is a flow diagram showing an example of the whole processing procedure. FIGS. 91 and 92 are diagrams showing an example of a method for setting the projection plane. FIG. 93 is a diagram for explaining a method for setting projection point series. FIG. 94 is a flow diagram showing an example of processing procedure of steps for determining the color information and the existence probability of the projection point. FIGS. 95-97 are diagrams for explaining a method for determining the existence probability. FIGS. 98-100 are diagrams for explaining a method for generating the two-dimensional images to be displayed on each image display plane.

The three-dimensional image generation method of this embodiment 5-1 is a method includes, as shown in FIG. 90, for example, a step 101 of obtaining plural images by taking the object from different viewpoints, a step 102 of setting a viewpoint (reference viewpoint) of the observer who observes the three-dimensional image, a step 103 for obtaining the three-dimensional shape of the object from plural images, a step 104 of generating two-dimensional images to be displayed on each image display plane based on the three-dimensional shape of the object obtained in the step 103, and a step 105 for providing the three-dimensional image of the object by displaying the two-dimensional images generated in the step 104 on each image display plane.

For displaying the tree-dimensional image of the object on the DFD using the image generation method of this embodiment 5-1, images are obtained by taking the object from different viewpoints (step 101). In this step, the viewpoints from which the images are taken may be arranged in a line or may be arranged like an arc or on any curved line, or may be arranged two-dimensionally on a plane or a curved surface. In addition, although the obtained image may be a color image or a black and white image, ot is assumed that the color image in which each pixel on the image is represented by color information using three-primary colors of red (R), green (G) and blue (B) is obtained in this embodiment 5-1.

Next, after obtaining the images in the step 101, the viewpoint of the observer who observes the object to be displayed on the DFD is set (step 102). In this step, as to the viewpoint of the observer, relative position relationship between the viewpoint of the observer and a reference image display plane in the plural image display planes, such as a distance from the image display plane, and direction of line of sight and the like are set.

Next, after setting the viewpoint of the observer in step 102, the three-dimensional shape of the object appearing in the images is obtained from the plural images obtained in the step 101 (step 103). In the step 3, first, projection planes $L_j$ (j=1, 2, ..., M) of the multi-layered structure are set (step 10301). Then, next, the reference viewpoint R for obtained the three-dimensional shape of the object is set (step 10302). As the projection planes $L_j$, plural planes parallel to the xy plane on the virtual three-dimensional space are set as shown in FIG. 91, for example. In addition, each projection plane $L_j$ is set at a distance $l_j$ from z=0 in a minus direction in the three-dimensional space. The reference viewpoint R is a viewpoint for obtaining the three-dimensional shape of the object, and can be set as any point in the three-dimensional space. Therefore, the reference viewpoint R is determined to be the viewpoint of the observer set in the step 102. In addition, for example, a projection plane $L_f$ farthest from z=0 is regarded as an image display plane existing in the deepest place from the observer of the DFD, and the reference viewpoint R is set such that the distance from the projection plane $L_l$ becomes the distance $ld$ from the observer's viewpoint to the image display plane deepest in the DFD.

Next, after setting the projection planes $L_j$ and the reference viewpoint R in the step 10301 and the step 10302, projection points on the projection planes, and points (corresponding points), on the obtained images, corresponding to each projection point are set (step 10303). In this step, lines are drawn to plural directions from the reference viewpoint R, and the projection point is set as a cross point of each line and each projection plane $L_j$ as shown in FIG. 93. When estimating the distance of the surface of the object, since a projection point at which the object surface exists is estimated from the plural projection points $T_j$ on the same line, projection points $T_j$ on the same line are dealt, as one, as projection point series s.

The corresponding point is a point $G_{ij}$, on the image plane of each camera, overlapping with the viewpoint of the camera when viewing the viewpoint $C_i$ of the camera from the projection point $T_j$, as shown in FIGS. 91 and 92. As shown in FIG. 91, when setting a two-dimensional coordinate system (xy coordinate system) on each image plane, two-dimensional coordinates $(x_{ij}, y_{ij})$ of the corresponding point $G_{ij}$ corresponding to the projection point $T_j$ $(X_j, Y_j, Z_j)$ can be obtained by projecting the projection point $T_j$ on a two-dimensional point of each image plane. This projection can be performed by using a 3 rows and 4 columns projection matrix for projecting a point $(X,Y,Z)$ in a three-dimensional space to a point $(x,y)$ in a two-dimensional plane. The relationship between the coordinates $(x_{ij}, y_{ij})$ of the corresponding point $G_{ij}$ in the virtual three-dimensional space and the digital image coordinates $(u,v)$ is as described so far.

In the step 10303, the coordinates $(X_j, Y_j, Z_j)$ of the projection point $T_j$ are associated with the digital image coordinates $(u_{ij}, v_{ij})$. The establishment of the association may be performed by providing values of $(X_j, Y_j, Z_j)$ in a table for every $(u_{ij}, v_{ij})$, or by setting values of $(X_j, Y_j, Z_j)$ only for representative values of $(u_{ij}, v_{ij})$ so as to obtain other points by performing interpolation processing such as linear interpolation, for example.

In addition, although $(u,v)$ take discrete values in the digital image coordinate system, it is assumed that $(u,v)$ take continuous values unless otherwise specified in the following descriptions, and it is assumed to perform proper discretization processing when accessing the two-dimensional array.

After determining the projection point series, corresponding points and the like in the step 10303, the array for storing, information of the projection plane $L_j$, that is, the image that is to be texture-mapped on the projection plane $L_j$ is kept (step 10304). At this time, the array to be kept includes color information and existence probability information for each pixel, by 8 bits for example, as texture information corresponding to the position of the projection point $T_j$.

Next, after keeping the array for storing information of the projection plane in the step 10304, color information and existence probability of each projection point $T_j$ is determined (step 10305). In the step 10305, as shown in FIG. 94, for example, double loop processing is performed in which processing for determining color information and the existence probability of each projection point $T_j$ of projection point series is repeated for every projection point series that are set. Then, first, the projection point series is initialized (step 10305*a*). Next, the projection point $T_j$ on the projection point series is initialized to j=1, for example (step 10305*b*).

Next, the color information of the projection point $T_j$ is determined (step 10305*c*). In the step 10305*c*, color information $K_j$ of the projection point $T_j$ is determined as an average value of color information $K_i$ of corresponding points $G_i$ set in the step 10303, for example.

Next, the correlation degree $Q_j$ of each point on the object that is appearing at each corresponding point $G_{ij}$ ($i \in I$) corresponding to the projection point $T_j$ is obtained (step 10305*d*). Assuming that a vector for representing the color information of the projection point $T_j$ is $K_j$, and that a vector repressing the color information of the corresponding point $G_{ij}$ is $K_{ij}$, the correlation degree $Q_j$ can be obtained by the following equation 105.

$$Q_j = \sum_{i \in I} (K_j - K_{ij})^2 \qquad \text{[Equation 105]}$$

By obtaining the correlation degree $Q_j$ using the equation 105, the correlation degree $Q_j$ always becomes a positive value, and, the higher the correlation, the smaller the value is.

The equation 105 is an example method for obtaining the correlation degree $Q_j$, and the correlation degree $Q_j$ can be obtained using equations other than the equation 86. In addition, for obtaining the correlation degree $Q_j$, not only each one point of the projection point $T_j$ and the corresponding points $G_{ij}$ is considered, but also a small region including plural points near the projection point $T_j$ and the corresponding point $G_{ij}$ can be considered.

After obtaining the correlation degree $Q_j$ at the step 10305*d*, the projection point $T_j$ is updated, and it is checked whether processing of the step 10305*c* and the step 10305*d* has been performed for every projection point on the projection point series that is a subject of processing (step 10305*e*). If there is any projection point for which the processing of the step 10305*c* and the step 10305*d* has not been performed, the step returns to the step 10305*c* to obtain the color information $K_j$ and the correlation degree $Q_j$.

After obtaining the color information and the correlation degree $Q_j$ for every projection point on the projection point series that is a subject of processing, the color information $K_j$ and the correlation degree $Q_j$ are provided to each projection point $T_j$ on the projection point series as shown in FIG. 95. When correlation degrees $Q_j$ of the projection points $T_j$ are compared with each other, only a correlation degree $Q_m$ of a projection point $T_m$ takes a distinctive small value, generally, as shown in FIG. 96A. In this case, it can be estimated that the surface of the object exists on the projection point $T_m$ on the subject projection point series, and the reliability is high.

However, as described in previous embodiments, there may be a case where there is no projection point at which the correlation degree has the distinctive small value, as shown in FIG. 96B when the correlation degrees $Q_j$ of each projection point $T_j$ on the projection point series are compared depending on the shape of the object, the texture of the surface, photographing conditions and the like. In this case, even if the surface of the object is estimated to exist at a projection point, the reliability is low and there is a case the estimation is erroneous. When the estimation is erroneous, the effect appears as a large noise on the generated image.

Thus, according to the image generation method of the present invention, next, the probability (existence probability) $\beta_j$ that the object surface exists at the projection point $T_j$ on the projection point series is obtained (step 10305*f*). It is necessary that the existence probability $\beta_j$ satisfies the following equations 106 and 107.

$$0 \leq \beta_j \leq 1 \quad \text{[Equation 106]}$$

$$\sum_{j=1}^{M} \beta_j = 1 \quad \text{[Equation 107]}$$

In addition, for defining the existence probability $\beta_j$ such that the higher the probability that the surface of the object exists at the projection point $T_j$ is, the closer to 1 the existence probability $\beta_j$ is, the existence probability $\beta_j$ ($j \in J$) can be calculated after performing conversion processing represented by the following equations 108 and 109, for example, to the correlation degrees $Q_j$ obtained for each projection point $T_j$ on the projection point series.

$$\tilde{\beta}_j = \frac{1}{Q_j} \quad \text{[Equation 108]}$$

$$\beta_j = \frac{\tilde{\beta}_j}{\sum_{j=1}^{M} \tilde{\beta}_j} \quad \text{[Equation 109]}$$

Basically, the existence probability $\beta_j$ only needs to satisfy the equation 106 and the equation 107. Therefore, for the conversion processing, equations other than the equation 108 and the equation 109 can be used.

After determining the existence probability $\beta_j$ of each projection point $T_j$ by the step 10305f, the color information $T_j$ and the existence probability $\beta_j$ of each projection point $T_j$ are stored in the area kept in the step 10304.

After storing the color information $K_j$ and the existence probability $\beta_j$ of each projection point $T_j$, the projection point series is updated and it is checked whether processing from the step 10305c to the step 10305f has been performed for every projection point series determined in the step 10303 (step 10305g). When there is any projection point series for which processing from the step 10305c to the step 10305f has not been performed, the step returns to the step 10305b so that the processing from the step 10305c to the step 10305f is repeated.

Accordingly, after the processing from the step 10305c to the step 10305f are performed for every projection point series determined in the step 10303, the processing of the step 10305 completes, so that the three-dimensional shape of the object can be obtained.

By performing the processing of the step 103, the texture array of each projection point $T_j$ ($j=1, 2, \ldots, M$) on the projection point series stores the color information $K_j$ and the existence probability $\beta_j$ as shown in FIG. 97, for example. That is, as to the three-dimensional shape of the object obtained by the three-dimensional image display method of the present invention, the surface of the object exits not only on one projection point on the projection point series as is in the conventional method, but the surface of the object exits on each projection point. In the three-dimensional image display method in the present invention, two-dimensional images to be displayed on each of the plural image display planes are generated using the three-dimensional shape of the object (step 104).

When generating the two-dimensional images to be displayed on each image display planes in step 104, the viewpoint of the observer, plural two-dimensional image generation planes, and the three-dimensional shape of the object obtained in the step 103 are set, first. In this step, the two-dimensional image generation planes $LD_n$ ($n=1, 2, \ldots, N$) are set such that they overlap with each other in the depth direction from the viewpoint P of the observer as shown in FIG. 98, for example. In addition, the distance $ld_n$ from the viewpoint P of the observer to the two-dimensional image generation plane LDn is set such that it becomes the distance set in the step 102. At this time, if the number of projection planes $L_j$ representing the three-dimensional shape of the object and the placement intervals are the same as the number of the two-dimensional image generation planes $LD_n$ and the placement intervals, the three-dimensional shape of the object is set such that the projection planes $L_j$ becomes the same as the two-dimensional image generation planes $LD_n$. In this case, when the two-dimensional image generation planes $LD_n$ are planes for generating the images displayed on the image display planes of the brightness modulation type DFD, it is necessary to determine the color information $KD_n$ and the brightness distribution coefficients $\gamma_n$ for points (display points) $A_n$, on the two-dimensional image generation plane $LD_n$, that overlap viewed from the viewpoint P of the observer. As shown in FIG. 98, when the projection planes $L_j$ representing the three-dimensional shape of the object are the same as the two-dimensional image generation planes $LD_n$, the color information $KD_n$ of each display point $A_n$ is determined to be the color information $K_j$ of the projection point $T_j$ on the projection plane $L_j$ that is overlapping the two-dimensional image generation plane $LD_n$ on which the display point $A_n$ exists. In addition, the brightness distribution ratio $\gamma_n$ of the display point $A_n$ is determined to be the existence probability $\beta_j$ of the projection point $T_j$ on the projection plane $L_j$ that is overlapping the two-dimensional image generation plane $LD_n$. After the color information KD and the brightness distribution coefficient $\gamma$ are determined for each display point A on the two-dimensional image generation planes $LD_n$, the images generated on the two-dimensional image generation planes $LD_n$ are output and are displayed on the image display planes of the actual DFD (step 105).

However, it is not necessary that the number and placement intervals of the projection planes $L_j$ for representing the three-dimensional shape of the object are the same as the number and placement intervals of the two-dimensional image generation plane $LD_n$. Therefore, next, another method for generating the two-dimensional images are described in a case where the number and placement intervals of the projection planes $L_j$ for representing the three-dimensional shape of the object are not the same as the number and placement intervals of the two-dimensional image generation plane $LD_n$.

In this case, when the distance from a projection plane closest to the viewpoint P of the observer to a projection plane farthest from the viewpoint P is almost the same as the distance from a two-dimensional image generation plane closest to the viewpoint P to a two-dimensional image generation plane farthest from the viewpoint P, the projection planes $L_j$ representing the three-dimensional shape of the object are set such that the projection plane $L_1$ farthest from the viewpoint P of the observer and the two-dimensional image generation plane $LD_1$ overlap as shown in FIG. 99, for example. By doing so, color information and brightness distribution coefficients $\gamma$ of each display point A on the two-dimensional image generation plane $LD_1$ farthest from the viewpoint P of the observer become the color information K and the existence probability $\beta$ of each projection point T on the projection plane $L_1$ farthest from the viewpoint P of the observer.

Color information and brightness KD distribution coefficients $\gamma$ of each display point A on the two-dimensional image generation plane LD which does not overlap any projection plane are determined in the following method.

As to the color information and brightness KD distribution coefficients γ of the display point A on the two-dimensional image generation plane LD which does not overlap any projection plane, color information K and existence probability β of the projection points T, on projection planes L, overlapping with the display point when viewed from the viewpoint P of the observer are assigned to the projection point A on the two-dimensional image generation plane LD closest for the projection planes L. In this case, the color information KD of the display point A is determined to be an average value of assigned color information K of projection points T, or to be color information L of the projection point T on the projection plane L closest to the two-dimensional image generation surface LD. The brightness distribution coefficient γ is determined to be a sum of pieces of assigned existence probabilities β of each projection point T. In this case, assuming that a set of projection planes $L_j$ to which the two-dimensional image generation plane $LD_n$ is the closest is $\{L_j | j \in \Gamma_n\}$, the brightness distribution ratio $\gamma_n$ of the display point $A_n$ on the two-dimensional image generation surface $LD_n$ is provided by the following equation 110 using the existence probability $\beta_j$ of the projection point $T_j$ of the projection plane $L_j$.

$$\gamma_n = \sum_{j \in \Gamma_n} \beta_j \quad \text{[Equation 110]}$$

Figure 100A:
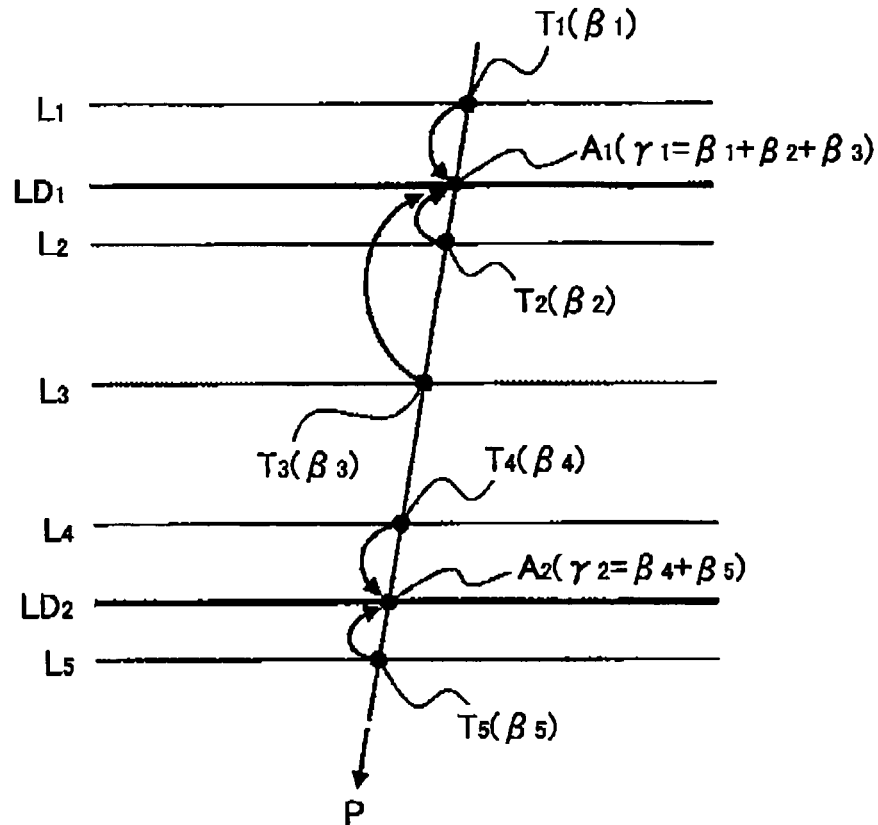
FIG. 100 is a schematic diagram for explaining the three-dimensional image display method of the embodiment 5-1, and is a diagram for explaining a method for generating the two-dimensional images to be displayed on each image display plane.

In the following, a case where position relationship between the projection planes $L_j$ and the two-dimensional image generation planes $LD_n$ is as shown in FIG. 100A is considered. Assuming that color information $K_j$ and each existence probability $\beta_j$ of each of projection points $T_j$ (j=1, 2,3,4,5) overlapping with the display points $A_1$ and $A_2$ when viewed from the viewpoint P of the observer are assigned to a display point A on a two-dimensional image generation plane that is closest for the projection planes, color information and existence probabilities of the projection points $T_1$, $T_2$ and $T_3$ are assigned to the display point $A_1$. In this case, the color information of the display point $A_1$ may be an average value of the color information $K_1$, $K_2$ and $K_3$ of the projection points $T_1$, $T_2$ and $T_3$, for example, or may be the color information $K_2$ of the projection point $T_2$ closest from the viewpoint of the display point $A_1$. The brightness distribution coefficient $\gamma_1$ of the display point $A_1$ is determined to be a sum of the existence probabilities $\beta_1$, $\beta_2$ and $\beta_3$ of the projection points $T_1$, $T_2$ and $T_3$ using the equation 110.

In the same way, color information and existence probabilities of the projection points $T_4$ and $T_5$ are assigned to the two-dimensional image generation plane $LD_2$. In this case, the color information $KD_2$ of the display point $A_2$ may be an average value of the color information $K_4$ and $K_5$ of the projection points $T_4$ and $T_5$, or may be the color information $K_5$ of the projection point $T_5$. The brightness distribution coefficient $\gamma_2$ is determined to be a sum of the existence probabilities $\beta_4$ and $\beta_5$ of the projection points $T_4$ and $T_5$ using the equation 110.

When the placement intervals of the two-dimensional image generation plane $LD_n$ and the placement intervals of the projection planes $L_j$ are different, color information and existence probability of the projection point on a projection plane $L_j$ existing between two successive two-dimensional image generation plane $LD_n$ and $LD_{n+1}$ can be distributed in a ratio of the distances of the two two-dimensional image generation plane $LD_n$ and $LD_{n+1}$. In this case, assuming that a set of the projection planes $L_j$ between the two-dimensional image generation planes $LD_n$ and $LD_{n+1}$ is $\{L_j | j \in \Gamma_n\}$, the brightness distribution ratio $\gamma_n$ of the display point $A_n$ on the two-dimensional image generation plane $LD_n$ can be calculated by the following equation 111 using the existence probability $\beta_j$ of each projection points $T_j$.

$$\gamma_n = \sum_{j \in \Gamma_n} w_{j,n} \beta_j \quad \text{[Equation 111]}$$

In the equation 111, $w_{j,n}$ is a coefficient indicating a degree of contribution of the projection plane $L_j$ to the two-dimensional image generation surface $LD_n$.

Figure 100B:
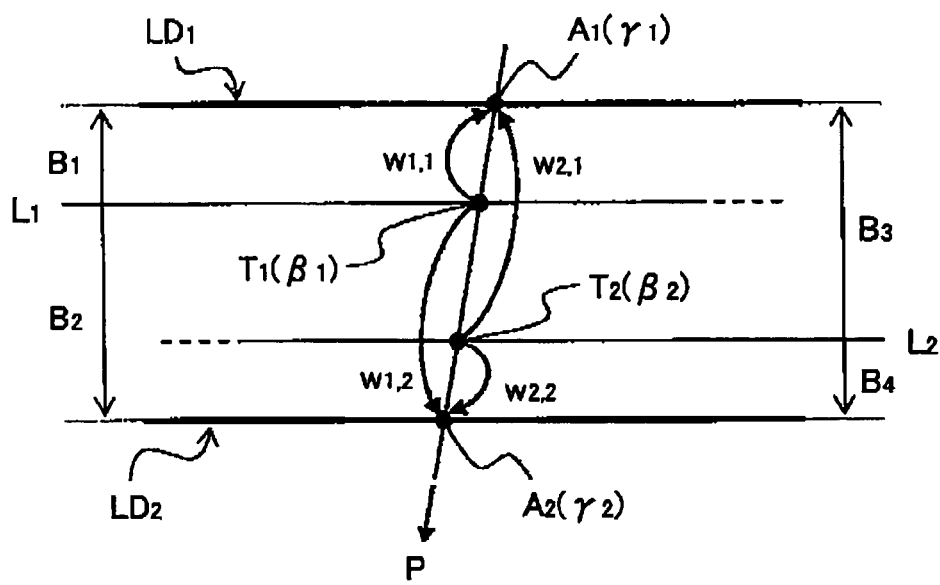

A case where projection planes $L_1$ and $L_2$ are set between the two-dimensional image generation planes $LD_1$ and $LD_2$ is considered as shown in FIG. 100B, for example. In this case, assuming that distances from the projection plane $L_1$ to the display planes $LD_1$ and $LD_2$ are $B_1$ and $B_2$ respectively, the degrees $w_{1,1}$ and $w_{1,2}$ of contribution of the projection plane $L_1$ to the two-dimensional image generation planes $LD_1$ and $LD_2$ can be provided by the following equation 112.

$$w_{1,1} = \frac{B_2}{B_1 + B_2}, \quad w_{1,2} = \frac{B_1}{B_1 + B_2} \quad \text{[Equation 112]}$$

In the same way, when distances from the projection plane $L_2$ to the two-dimensional image generation planes $LD_1$ and $LD_2$ are $B_3$ and $B_4$ respectively, the degrees $w_{2,1}$ and $w_{2,2}$ of contribution of the projection plane $L_2$ to the two-dimensional image generation planes $LD_1$ and $LD_2$ can be provided by the following equation 113.

$$w_{2,1} = \frac{B_4}{B_3 + B_4}, \quad w_{2,2} = \frac{B_3}{B_3 + B_4} \quad \text{[Equation 113]}$$

As a result, each of the brightness distribution ratio $\gamma_1$ of the display point $A_1$ of the two-dimensional image generation plane $LD_1$ and the brightness distribution ratio $\gamma_2$ of the display point $A_2$ of the two-dimensional image generation plane $LD_2$ is shown in the following equation 114.

$$\gamma_1 = w_{1,1}\beta_1 + W_{2,1}\beta_2, \gamma_2 = W_{1,2}\beta_1 + W_{2,2}\beta_2 \quad \text{[Equation 114]}$$

As mentioned above, when obtaining the three-dimensional shape of the object, a shape is obtained in which the probability (existence probability) $\beta_j$ that the surface of the object exists on each projection point $T_j$ is provided from the correlation degree $Q_j$ of the projection point $T_j$ on the projection point series, Then, the brightness distribution coefficient of the display point A on the two-dimensional image generation plane LD is provided as the existence probability $\beta_j$. Accordingly, when there is no projection point having the correlation degree $Q_j$ of a distinctive value in the projection points $T_j$ on the projection point series, so that reliability for estimation of the distance of the surface of the object is low, the surface of the object is represented vaguely on plural projection planes on the projection point series. Then, the brightness distribution coefficient γ of the point on the two-dimensional image generation plane LD is determined from the existence probability β of each projection point $T_j$. Accordingly, when the two-dimensional images generated on the two-dimensional image generation planes are displayed on the actual image display planes so as to present the three-dimensional image of the object, the surface of the object is displayed vaguely on the projection point series in which reliability for distance estimation is low and the existence probability β is dispersed to plural projection points. Therefore, a noise on the three-dimensional image displayed on the DFD becomes inconspicuous so that an image that looks natural for the observer can be displayed.

As described above, according to the image generation method of this embodiment 5-1, the three-dimensional image that looks natural for the observer can be displayed without obtaining the accurate three-dimensional shape of the object to be displayed.

In addition, in the image generation method of this embodiment 5-1, although a case is described as an example in which a color image in which the point (pixel) is represented by color information using three primary color of red (R), green (G) and blue (B) is obtained and the three-dimensional shape of the object is generated, the image to be obtained is not limited to the color image. In the image generation method of this embodiment 5-1, a black and white image in which the point (pixel) is represented by brightness (Y) and color-difference (U,V) may be obtained to obtain the three-dimensional shape of the object. In the case when the image to be obtained is the black and white image, the three-dimensional shape can be obtained by the procedure described in the embodiment 5-1 using the brightness information (Y) as information corresponding to the color information so that the two-dimensional images can be generated.

(Embodiment 5-2)

Figure 101:
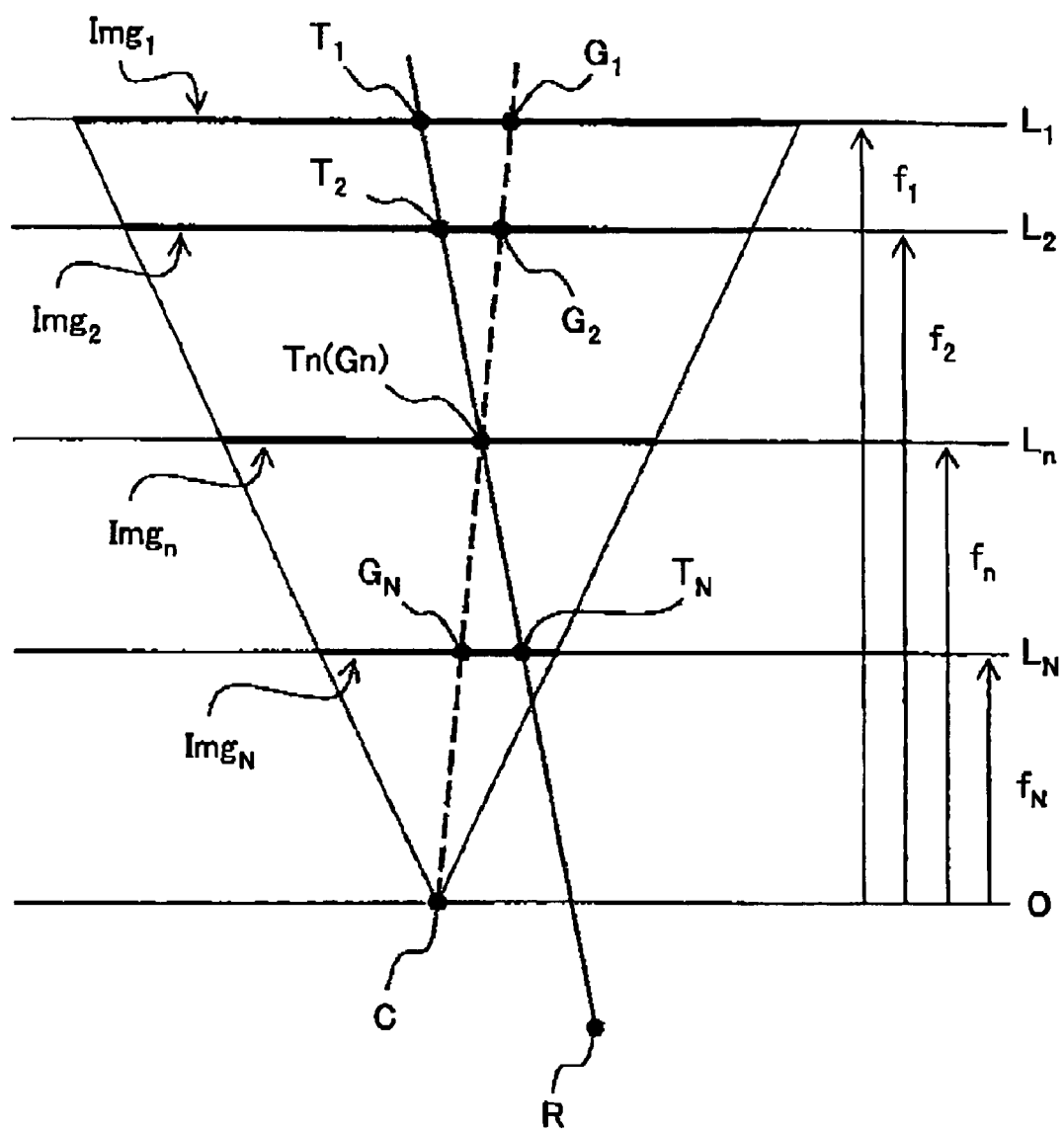
FIG. 101 is a schematic diagram for explaining the three-dimensional image display method of the embodiment 5-2, and is a diagram showing relationship between the projection point and the corresponding point.
Figure 102:
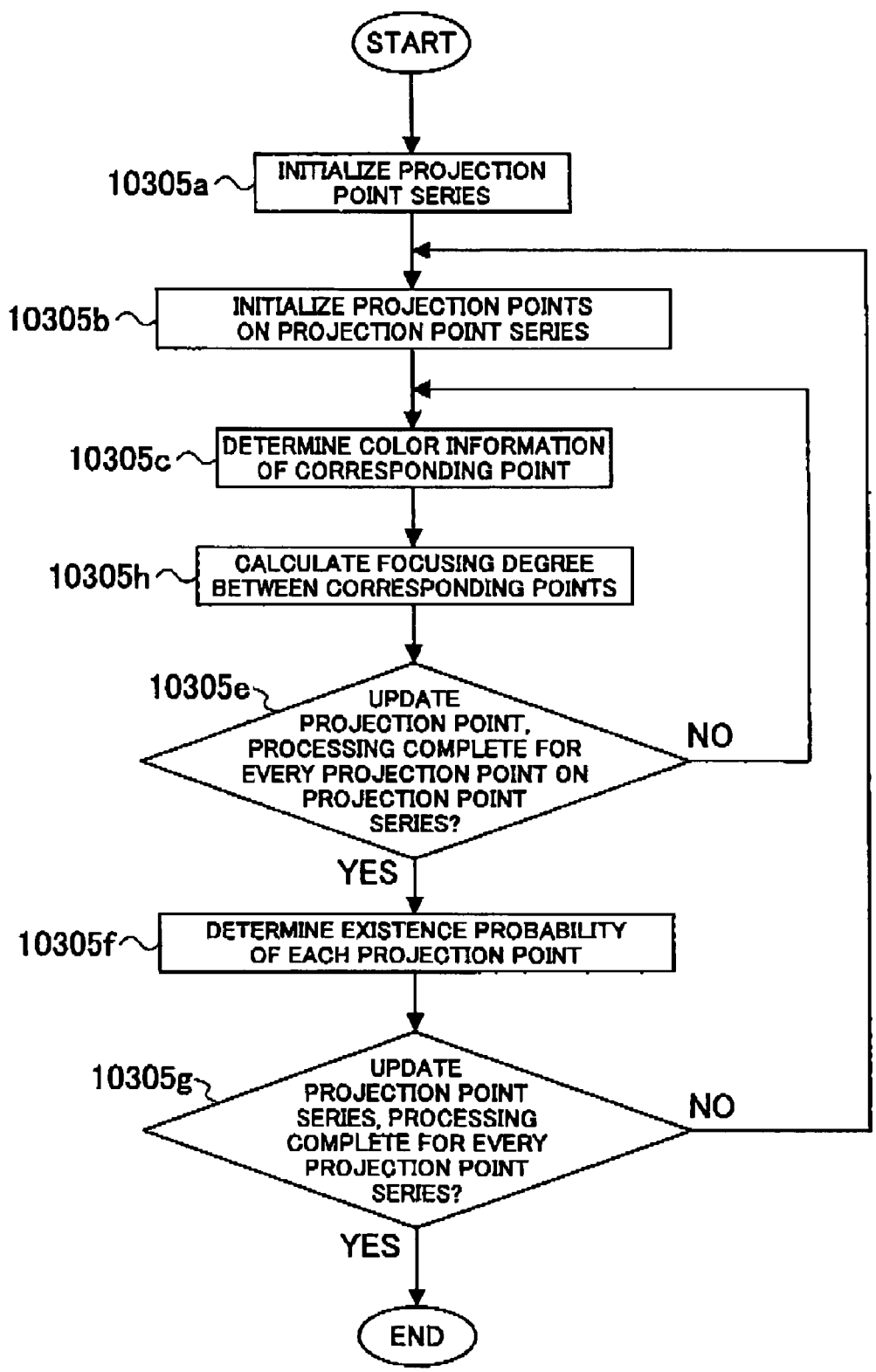
FIG. 102 is a schematic diagram for explaining the three-dimensional image display method of the embodiment 5-2, and is a flow diagram showing an example of steps for determining the color information and the existence probability of the projection point.
Figure 103:
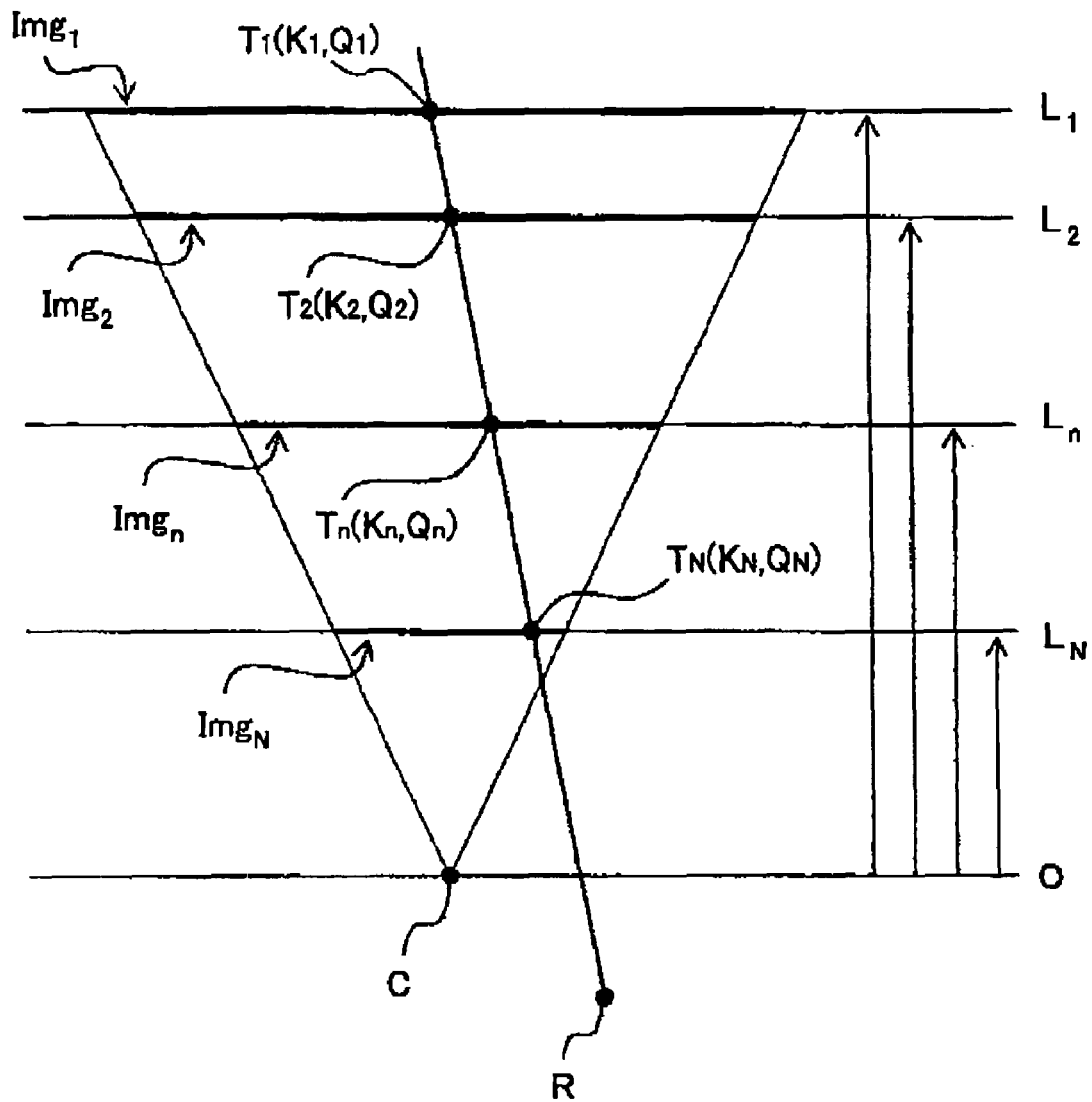
FIG. 103 is a schematic diagram for explaining the three-dimensional image display method of the embodiment 5-2, and is a diagram for explaining a method for obtaining the existence probability.
Figure 104:
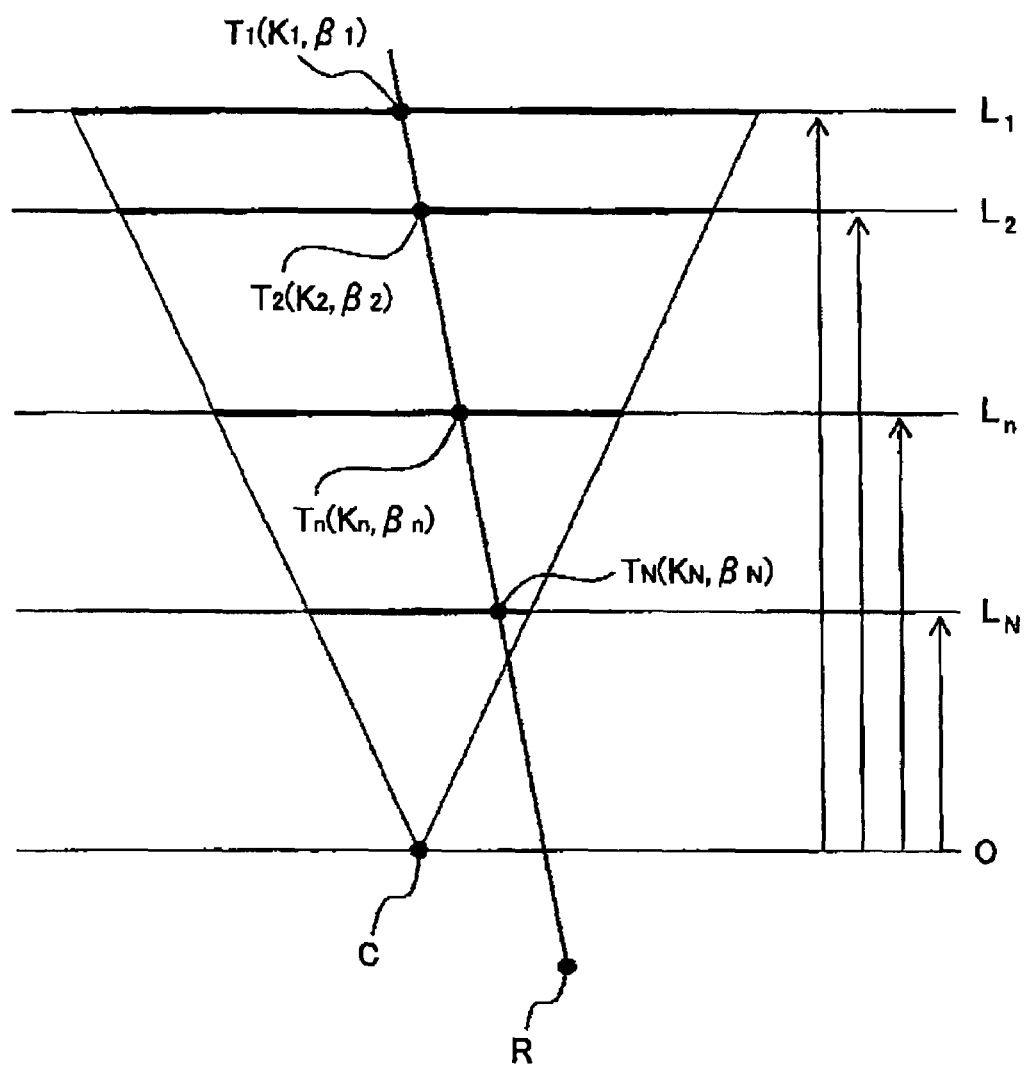
FIG. 104 is a schematic diagram for explaining the three-dimensional image display method of the embodiment 5-2, and is a diagram for explaining a method for obtaining the existence probability.

FIGS. 101-104 are schematic diagrams for explaining the three-dimensional image generation method of the embodiment 5-2. FIG. 101 is a diagram showing relationship between the projection point and the corresponding point. FIG. 102 is a flow diagram showing an example of steps for determining the color information and the existence probability of the projection point. FIGS. 103 and 104 are diagrams for explaining a method for obtaining the existence probability.

The basic procedure of the image generation method of this embodiment 5-2 is the same as the three-dimensional image generation method of the embodiment 5-1, and processing from the step 101 to the step 105 shown in FIG. 90 are performed. The different point of the three-dimensional image generation method of this embodiment 5-2 compared to the three-dimensional image generation method of the embodiment 5-1 is that plural images of different focusing distances are obtained instead of the plural images of different viewpoints in step 101, and the three-dimensional shape of the object is obtained using the images having different focusing distances in the step 103.

For displaying the three-dimensional image of the object on the DFD using the three-dimensional image generation method of the embodiment 5-2, plural images are taken from a viewpoint while changing the focusing distance, first. At this time, the plural images are taken using the polarizing binary optical system, a variable focus lens and the like, for example. The image to be obtained may be a color image in the same way as the embodiment 5-1 or may be a black and white image. Next, as described in the embodiment 5-1, after setting the viewpoint of the observer (step 102), processing of the step 103 for obtaining the three-dimensional shape of the object is performed.

In the processing of the step 103, as described in the embodiment 5-1, projection planes $L_j(j=1,2,\ldots,M)$ and the reference viewpoint R are set first (step 10301, step 10302).

Then, next, the projection point series and the corresponding points are set, and the array (area) for storing the information of the projection plane is kept (step 10303, step 10304).

In the three-dimensional image display method of this embodiment 5-2 in which the three-dimensional image of the object is displayed using plural images having different focusing distances, when setting the projection planes $L_j$ in step 10301, the planes are set such that the distances from the viewpoint c of the camera are the same as the focusing distances $f_i(i=1,2,\ldots,N)$ of the images taken by the camera as shown in FIG. 101, for example. Then, in the step 10303, the corresponding points $G_i$ corresponding to the projection point $T_j$ are determined to be points, on images $Img_i$, overlapping with the projection point $T_j$ when viewing the projection point $T_j$ from the viewpoint C of each camera. Methods for setting the projection point series, and for associating the coordinates of the projection point $T_j$ with the digital image coordinates of the corresponding point $G_i$ are the same as the methods described in the embodiment 5-1. Thus, detailed descriptions are not provided here.

In addition, the processing for keeping the area for storing the information of the projection planes in the step 10304 is also the same as that described in the embodiment 5-1. Thus, detailed descriptions are not provided here.

Next, the color information and the existence probability information of each projection point $T_j$ are determined using the obtained plural images (step 10305). Also in the three-dimensional image display method of this embodiment 5-2, in the step 10305, double loop processing is performed in which processing for determining the color information and the existence probability of each projection point $T_j$ on the projection point series is repeated for every projection point series. Thus, first, the projection point series is initialized (step 10305*a*). Then, next, the projection point $T_j$ on the projection point series is initialized to j=1, for example (step 10305*b* ).

Next, the color information of the projection point $T_j$ is determined (step 10305*c*). In the step 10305*c*, an average value of color information of the corresponding points $G_i$ set in the step 10303 is determined to be the color information $K_j$ of the projection point $T_j$.

Next, the focusing degree $Q_j$ of the projection point $T_j$ is obtained based on degree (focusing degree) by which focus is achieved for a point, of the object, appearing on each corresponding point $G_i$ corresponding to the projection point $T_j$ (step 10305*j*). The focusing degree can be determined according to sharpness or blurriness at a point or a small region on the image. As a calculation method for the focusing degree, there are various methods based on Depth from Focus theory or Depth from Defocus theory. The focusing degree $Q_j$ can be obtained by comparing sizes of local spatial frequency of each corresponding point $G_i$, for example.

The Depth from Focus theory or the Depth from Defocus theory is a method for analyzing plural images having different focusing distance to measure the surface shape of the object. In the method, the surface of the object is estimated to exist at a distance corresponding to a focusing distance of an image having the highest local spatial frequency among the images taken by changing the focusing distance, for example. Thus, the focusing degree $Q_j$ of the projection point $T_j$ is calculated using an evaluation function of the local spatial frequency represented by the following equation 115, for example.

$$Q = \frac{1}{D} \sum_{x=x_i}^{x_f} \sum_{y=y_i}^{y_f} \left\{ \sum_{p=-L_c}^{L_c} \sum_{q=-L_r}^{L_r} \left| \frac{f(x,y) -}{f(x+p, y+q)} \right| \right\}$$ [Equation 115]

wherein f indicates a gray scale of a pixel, D indicates a constant for normalization that is a number of all pixels, (−Lc, −Lr)−(Lc, Lr) and (xi, yi)−(xf, yf) indicate small regions for performing distribution evaluation and smoothing respectively.

The equation 115 is one example for a method for obtaining the focusing degree $Q_j$, and the focusing degree $Q_j$ can be obtained by using equations other than the equation 115.

After obtaining the focusing degree $Q_j$ by the step 10305h, the projection point $T_j$ is updated, and it is checked whether processing of the steps 10305c and 10305h are performed for every projection point on the projection point series that is a subject for processing (step 10305e). When there is any projection point for which the processing of the steps 10305c and 10305h has not been performed, the step returns to the step 10305c so that the color information $K_j$ and the focusing degree $Q_j$ are obtained.

When the color information and the focusing degree $Q_j$ are obtained for every projection point on the projection point series that is a subject of processing, color information $K_j$ and the focusing degree $Q_j$ are provided for each projection point $T_j$ on the projection point series as shown in FIG. 103. The focusing degree $Q_j$ of the projection point $T_j$ is a degree corresponding to the correlation degree used for determining the existence probability β in the embodiment 5-1. There may be a case where there is no projection point at which the focusing degree has the distinctive small value when the focusing degrees $Q_j$ of each projection point $T_j$ on the projection point series are compared depending on the shape of the object, the texture of the surface, photographing conditions and the like. In this case, even if the surface of the object is estimated to exist at a projection point, the reliability is low and there is a case the estimation is erroneous. When the estimation is erroneous, the effect appears as a large noise on the generated image.

Thus, according to the three-dimensional image display method of this invention, next, the probability (existence probability) $β_j$ that the surface of the object exists on each projection point $T_j$ on the projection point series is determined (step 10305f). In this case, it is necessary that the existence probability $β_j$ satisfies the equations 106 and 107. Thus, in this embodiment 5-2, the existence probability $β_j$ of the projection point $T_k$ is determined using the equation 116, for example.

$$β_k = \frac{Q_k}{\sum_{j=1}^{M} Q_j}$$ [Equation 116]

Basically, it is only necessary that the existence probability $β_j$ satisfies the conditions of the equations 106 and 107. Therefore, the existence probability $β_j$ can be determined using equations other than the equation 116.

After calculating the existence probability $β_j$ in step 10305f as shown in FIG. 104, next, the color information $K_j$ and the existence probability $β_j$ of each projection point $T_j$ are stored in the area kept in the step 10304.

After storing the color information $K_j$ and the existence probability $β_j$ of each projection point $T_j$, the projection point series is updated and it is checked whether processing from the step 10305c to the step 10305f has been performed for every projection point series determined in the step 10303 (step 10305g). When there is any projection point series for which processing from the step 10305c to the step 10305f has not been performed, the step returns to the step 10305b so that the processing from the step 10305c to the step 10305f is repeated.

Accordingly, after the processing from the step 10305c to the step 10305f are performed for every projection point series determined in the step 10303, the processing of the step 10305 completes, so that the three-dimensional shape of the object can be obtained. Then, after obtaining the three-dimensional shape of the object by the processing of the step 103, color information and the brightness distribution coefficient γ of the display point A on the two-dimensional image generation plane LD are determined based on the three-dimensional shape of the object, so as to generate the two-dimensional images to be displayed on the plural overlapping image display planes such as the DFD according to the same procedure as the embodiment 5-1 (step 104). Then, by displaying the generated images on actual image display planes (step 105), the three-dimensional image of the object can be presented.

Also in the three-dimensional image display method of this embodiment 5-2, like the three-dimensional image display method of the embodiment 5-1, when there is no projection point having the focusing degree $Q_j$ of a distinctive value in the projection points $T_j$ on the projection point series, so that reliability for estimation of the distance of the surface of the object is low, the surface of the object is represented vaguely on plural projection planes on the projection point series. Then, the brightness distribution coefficient γ of points on the two-dimensional image generation plane LD is determined from the existence probability β of each projection point $T_j$. Accordingly, when the two-dimensional images generated on the two-dimensional image generation planes are displayed on the actual image display planes so as to present the three-dimensional image of the object, the surface of the object is displayed vaguely on the projection point series in which reliability for distance estimation is low and the existence probability β is dispersed to plural projection points. Therefore, a noise on the three-dimensional image displayed on the DFD becomes inconspicuous so that an image that looks natural for the observer can be displayed.

As described above, according to the three-dimensional image generation method of this embodiment 5-2, the three-dimensional image that looks natural for the observer can be displayed without obtaining the accurate three-dimensional shape of the object to be displayed.

In addition, also in the case of the image generation method of this embodiment 5-2, the image to be obtained may be either of the color image or a black and white image. When using the black and white image, processing described in this embodiment 5-2 is performed using the brightness information (Y) as the information corresponding to the color information.

(Embodiment 5-3)

Also in this embodiment, a three-dimensional image generation apparatus having a configuration similar to that shown in FIG. 85 in the fourth embodiment can be provided. In addition, an image display system having a configuration similar to that shown in FIGS. 87-89 in the fourth embodiment can be provided. In the configurations of this embodiment, processing performed by the apparatuses corresponds to the embodiments 5-1 and 5-2.

As mentioned above, although the present invention is described concretely based on embodiments, the present invention is not limited to the specifically disclosed embodiments, and variations and modifications may be made without departing from the scope of the invention.

For example, although a method for displaying the three-dimensional image of the object based on images of different viewpoints is described in the embodiments 5-1, and a method for displaying the three-dimensional image of the object based on images having different focusing distances is described in the embodiment 5-2, the three-dimensional image of the object can be displayed by combining these methods. In this case, the correlation degree is obtained from corresponding points of images of different viewpoints with respect to a projection point $T_j$, the local space frequency is obtained from corresponding points of images taken by changing focal positions from a viewpoint, and the existence probability $\beta_j$ is obtained by combining them. By doing so, the reliability of the existence probability $\beta_j$ increases so that an image that looks natural for the observer can be displayed.

(Effects of the Fifth Embodiment)

Also in the three-dimensional image generation method of the fifth embodiment, when viewing a direction from the reference viewpoint, even when the reliability for estimating a distance (projection point) at which the object surface exists is low, the surface of the object exists with a probability on the projection point at which the surface of the object actually exists. As a result, by displaying each point on the image display plane with brightness according to the existence probability, discontinuous noise that may occur in the conventional method when erroneous distance estimation is performed can be made inconspicuous. In addition, even by an apparatus having low processing performance such a generally used personal computer, each two-dimensional image can be generated at high speed.

The present invention is not limited to the specifically disclosed embodiments, and variations and modifications may be made without departing from the scope of the invention.

The invention claimed is:

1. A virtual viewpoint image generation method comprising:
    a step of obtaining plural images of an object taken by plural cameras;
    a step of determining a virtual viewpoint that is a position from which the object is viewed; and
    a step of generating a virtual viewpoint image that is an image of the object viewed from the virtual viewpoint based on the obtained images of the object,
    the step of generating the virtual viewpoint image comprising:
        a step 1 of setting projection planes having a multi-layered structure;
        a step 2 of obtaining each corresponding point, on the images of the object, corresponding to a projection point of a projection plane;
        a step 3 of determining color information or brightness information of each projection point based on color information or brightness information of corresponding points;
        a step 4 of calculating with a data processor, for each of the projection points overlapping when viewed from a reference viewpoint in a space, a degree of probability that the object exists at a distance corresponding to a position of the projection point based on a degree of correlation of the corresponding points or neighborhoods of the corresponding points;
        a step 5 of performing mixing processing on color information or brightness information of reference points overlapping when viewed from the virtual viewpoint according to the degree of probability of existence of the object so as to determine color information or brightness information of each pixel of the virtual viewpoint image; and
        a step 6 of repeating steps from the step 1 to the steps 5 for every point corresponding to pixels of the virtual viewpoint image.

2. The virtual viewpoint image generation method as claimed in claim 1, the step 3 comprising:
    mixing the color information or the brightness information of the corresponding points or selecting the color information or the brightness information of one corresponding point from the color information or the brightness information of the corresponding points.

3. The virtual viewpoint image generation method as claimed in claim 1 or 2, the step 4 or the step 5 comprising:
    a step of setting, in each reference point on the projection plane, transparency having plural gradations from transparent to opaque by converting the degree of probability that the object exists; and
    the step 5 comprising:
    performing the mixing processing according to the transparency instead of the degree of probability that the object exists.

4. The virtual viewpoint image generation method as claimed in claim 3, the mixing processing of the step 5 comprising:
    processing projection points successively from a projection point far from the virtual viewpoint to a projection point near the virtual viewpoint,
    wherein color information or brightness information obtained by the mixing processing up to a projection point is obtained by calculating interior division between color information or brightness information at the projection point and color information or brightness information obtained by the mixing processing up to a previous projection point in a ratio according to the transparency.

5. The virtual viewpoint image generation method as claimed in claim 1, wherein
    projection planes specific to each camera taking each image of the object are set in the step 1;
    the color information or the brightness information of the step 3 are determined only by using color information or brightness information of the corresponding points of the images of the object taken by the plural cameras;
    the degree of probability that the object exists in step 4 is calculated using, as the reference viewpoint, a viewpoint of the camera specific to the projection plane to which the projection point belongs; and
    correction is performed based on position relationship between the virtual viewpoint and each reference viewpoint in the mixing processing of the color information or the brightness information.

6. A virtual viewpoint image generation apparatus, comprising:
    object image obtaining means for obtaining plural images of an object taken by plural cameras;
    virtual viewpoint determination means for determining a virtual viewpoint that is a position from which the object is viewed; and image generation means for generating a virtual viewpoint image that is an image of the object viewed from the virtual viewpoint based on the obtained images of the object, the image generation means comprising:
projection plane determination means for determining projection planes having a multi-layered structure;
reference viewpoint determination means for determining a position of the reference viewpoint;
texture array keeping means for keeping an array of texture images to be mapped to the projection planes;
corresponding point matching processing means for associating parts, in the images of the object, on which the same region of the object appears with each other;
color information determination means for determining color information or brightness information in the array of the texture images by performing mixing processing on the images of the object;
existence probability information determination means for calculating a degree of probability that the object exists at a distance corresponding to a position of the projection point in the array of the texture images based on the processing result of the corresponding point matching processing means;
rendering means for rendering the projection planes viewed from the virtual viewpoint based on the color information or the brightness information determined by the color information determination means and the existence probability determined by the existence probability determination means.

7. The virtual viewpoint image generation apparatus as claimed in claim 6, the existence probability information determination means comprising:
means for setting, in each reference point on the projection plane, transparency having plural gradations from transparent to opaque by converting the degree of possibility that the object exists;
wherein the rendering means performs rendering using the transparency instead of the degree of possibility that the object exists.

8. The virtual viewpoint image generation apparatus as claimed in claim 7, the rendering means comprising:
means for processing projection points successively from a projection point far from the virtual viewpoint to a projection point near the virtual viewpoint,
wherein color information or brightness information obtained by the mixing processing up to a projection point is obtained by calculating interior division between color information or brightness information at the projection point and color information or brightness information obtained by the mixing processing up to a previous projection point in a ratio according to the transparency.

9. The virtual viewpoint image generation apparatus as claimed in claim 6, wherein
the projection plane determination means determines projection planes specific to each camera taking each image of the object;
the color information determination means determines the color information or the brightness information only by using color information or brightness information of the corresponding points of the images of the object taken by the plural cameras;
the existence probability information determination means calculates the degree of probability that the object exists by using, as the reference viewpoint, a viewpoint of the camera specific to the projection plane to which the projection point belongs; and
the rendering means includes a means for performing correction based on position relationship between the virtual viewpoint and each reference viewpoint.

10. A computer readable storage medium encoded with a computer readable virtual viewpoint image generation program configured to cause an information processing apparatus to execute a method, the method comprising:
a step of obtaining plural images of an object taken by plural cameras;
a step of determining a virtual viewpoint that is a position from which the object is viewed; and
a step of generating a virtual viewpoint image that is an image of the object viewed from the virtual viewpoint based on the obtained images of the object,
the step of generating the virtual viewpoint image comprising:
a step 1 of setting projection planes having a multi-layered structure;
a step 2 of obtaining each corresponding point, on the images of the object, corresponding to a projection point of a projection plane;
a step 3 of determining color information or brightness information of each projection point based on color information or brightness information of corresponding points;
a step 4 of calculating, for each of the projection points overlapping when viewed from a reference viewpoint in a space, a degree of probability that the object exists at a distance corresponding to a position of the projection point based on a degree of correlation of the corresponding points or neighborhoods of the corresponding points;
a step 5 of performing mixing processing on color information or brightness information of reference points overlapping when viewed from the virtual viewpoint according to the degree of probability of existence of the object so as to determine color information or brightness information of each pixel of the virtual viewpoint image; and
a step 6 of repeating steps from the step 1 to the steps 5 for every point corresponding to pixels of the virtual viewpoint image.

11. An image generation method, comprising:
a step of obtaining images of an object taken from different viewpoints;
a step of obtaining a thee-dimensional shape of the object based on the images; and
a step of generating an image of the object viewable from a viewpoint based on the obtained thee-dimensional shape of the object,
the step of obtaining the thee-dimensional shape of the object comprising:
a step of setting projection planes having a multi-layered structure in a virtual thee-dimensional space;
a step of determining a reference viewpoint for obtaining the three-dimensional shape of the object;
a step of determining color information or brightness information of projection points that are points on the projection planes based on color information or brightness information of corresponding points, on the obtained images, corresponding to the projection points;
a step of calculating with a data processor correlation degrees among corresponding points corresponding to the projection points;

a step of calculating, for each of the projection points overlapping when viewed from the reference viewpoint, an existence probability that is a probability that the object exists at the projection point based on the correlation degree of each projection point;

the step of calculating the correlation degree comprising:
a step of preparing plural groups of camera sets each being a group of some viewpoints selected from the plural viewpoints; and
a step of obtaining the correlation degree from the corresponding points on images included in each camera set, the step of determining the existence probability comprising:
a step of calculating the existence probability based on the correlation degree of each projection point obtained for each camera set; and
a step of determining the existence probability of each projection point by performing integrating processing for the existence probability determined for each camera set.

12. The image display method as claimed in claim 11, the step of calculating the existence probability based on the correlation degree of each projection point obtained for each camera set comprising:
a step of calculating an evaluation reference value based on the correlation degree of each projection point calculated for each camera set;
a step of calculating a distribution function of the existence probability by performing statistical processing on the evaluation reference value of each projection point calculated for each camera set; and
a step of determining the existence probability of each projection point based on the distribution function of the existence probability.

13. The image generation method as claimed in claim 11 or 12, the step of generating the image of the object viewable from the viewpoint comprising:
mixing color information or brightness information of the projection points overlapping when viewable from the viewpoint in a ratio of the existence probability to determine color information or brightness information of each point on the image to be generated so as to generate a two-dimensional image.

14. The image generation method as claimed in claim 11 or 12, the step of generating the image of the object viewable from the viewpoint comprising:
a step of setting plural image generation planes at positions having different depths when viewable from the viewpoint; and
a step of converting the color information or brightness information and the existence probability of each projection point into color information or brightness information and a brightness distribution coefficient on each image generation plane based on position relationship among projection points overlapping when viewable from the viewpoint and points on each image generation plane.

15. An image generation apparatus, comprising:
object image obtaining means for obtaining images of an object taken from different viewpoints;
three-dimensional shape obtaining means for obtaining a three-dimensional shape of the object based on the images; and
object image generation means for generating an image of the object viewable from a viewpoint based on the obtained three-dimensional shape of the object, the three-dimensional shape obtaining means comprising:
means for setting projection planes having a multi-layered structure in a virtual three-dimensional space;
means for determining a reference viewpoint for obtaining the three-dimensional shape of the object;
means for determining color information or brightness information of projection points that are points on the projection planes based on color information or brightness information of corresponding points, on the obtained images, corresponding to the projection points;
means for calculating correlation degrees among corresponding points corresponding to the projection points;
means for determining, for each of the projection points overlapping when viewed from the reference viewpoint, an existence probability that is a probability that the object exists at the projection point based on the correlation degree of each projection point;

the means for calculating the correlation degree comprising:
means for preparing plural groups of camera sets each being a group of some viewpoints selected from the plural viewpoints; and
means for obtaining the correlation degree from the corresponding points on images included in each camera set, the means for determining the existence probability comprising:
means for calculating the existence probability based on the correlation degree of each projection point obtained for each camera set; and
means for determining the existence probability of each projection point by performing integrating processing for the existence probability determined for each camera set.

16. The image generation apparatus as claimed in claim 15, the means for calculating the existence probability based on the correlation degree of each projection point obtained for each camera set comprising:
means for calculating an evaluation reference value based on the correlation value of each projection point calculated for each camera set;
means for calculating a distribution function of the existence probability by performing statistical processing on the evaluation reference value of each projection point calculated for each camera set; and
means for determining the existence probability of each projection point based on the distribution function of the existence probability.

17. The image generation apparatus as claimed in claim 15 or 16, wherein the means for generating the image of the object viewable from the viewpoint is a means for:
mixing color information or brightness information of the projection points overlapping when viewable from the viewpoint in a ratio of the existence probability to determine color information or brightness information of each point on the image to be generated so as to determine a two-dimensional image.

18. The image generation apparatus as claimed in claim 15 or 16, the means for generating the image of the object viewable from the viewpoint comprising:
means for setting plural image generation planes at positions having different depths when viewable from the viewpoint; and
means for converting the color information or brightness information and the existence probability of each projection point into color information or brightness information and a brightness distribution coefficient on each image generation plane based on position relationship among projection points overlapping viewable from the viewpoint and points on the image generation planes.

19. A computer readable storage medium encoded with a computer readable image generation program configured to cause an information processing apparatus to execute a method, the method comprising:
a step of obtaining images of an object taken from different viewpoints;
a step of obtaining a three-dimensional shape of the object based on the images; and
a step of generating an image of the object viewable from a viewpoint based on the obtained three-dimensional shape of the object,
the step of obtaining the three-dimensional shape of the object comprising:
a step of setting projection planes having a multi-layered structure in a virtual three-dimensional space;
a step of determining a reference viewpoint for obtaining the three-dimensional shape of the object;
a step of determining color information or brightness information of projection points that are points on the projection planes based on color information or brightness information of corresponding points, on the obtained images, corresponding to the projection points;
a step of calculating correlation degrees among corresponding points corresponding to the projection points;
a step of calculating, for each of the projection points overlapping when viewed from the reference viewpoint, an existence probability that is a probability that the object exists at the projection point based on the correlation degree of each projection point;
the step of calculating the correlation degree comprising:
a step of preparing plural groups of camera sets each being a group of some viewpoints selected from the plural viewpoints; and
a step of obtaining the correlation degree from the corresponding points on images included in each camera set,
the step of determining the existence probability comprising:
a step of calculating the existence probability based on the correlation degree of each projection point obtained for each camera set; and
a step of determining the existence probability of each projection point by performing integrating processing for the existence probability determined for each camera set.

20. An image generation method comprising:
a step of obtaining images of an object taken by changing focusing distance;
a step of obtaining a virtual viewpoint that is a viewpoint from which the object appearing in the images is viewed;
a step of obtaining a three-dimensional shape of the object based on the images; and
a step of generating an image of the object viewed from the virtual viewpoint based on the obtained three-dimensional shape of the object,
the step of obtaining the three-dimensional shape of the object comprising:
a step of setting projection planes having a multi-layered structure in a virtual three-dimensional space;
a step of determining a reference viewpoint for obtaining the three-dimensional shape of the object;
a step of determining color information or brightness information of projection points, that are points on the projection planes, based on color information or brightness information of corresponding points, on the obtained images, corresponding to the projection points;
a step of determining focusing degrees of the projection points based on focusing degrees of the corresponding points corresponding to the projection points;
a step of calculating with a data processor, for each of the projection points overlapping when viewed from the reference viewpoint, an existence probability that is a probability that the object exists at a distance corresponding to a position of the projection point based on the focusing degree of each projection point;
the step of generating the image of the object viewed from the virtual viewpoint comprising:
mixing color information or brightness information of the projection points overlapping when viewed from the virtual viewpoint in a ratio corresponding to the existence probability to determine color information or brightness information of each point of the image to be generated.

21. The image generation method as claimed in claim 20, the step of obtaining the three-dimensional shape of the object or the step of generating the image of the object viewed from the virtual viewpoint comprising:
a step of setting transparency having plural gradations from transparent to opaque on each projection point based on the existence probability of the projection points overlapping when viewed from the reference viewpoint or the virtual viewpoint;
the step of generating the image of the object viewed from the virtual viewpoint comprising:
mixing the color information or the brightness information of the projection points overlapping when viewed from the virtual viewpoint in a ratio according to the transparency set based on the existence probability so as to determine the color information or brightness information of each point of the image to be generated.

22. The image generation method as claimed in claim 21, the step of generating the image of the object viewed from the virtual viewpoint comprising:
mixing the color information or the brightness information for projection points successively from a projection point far from the virtual viewpoint to a projection point near the virtual viewpoint,
wherein color information or brightness information obtained by the mixing processing up to a projection point is obtained by calculating interior division between color information or brightness information at the projection point and color information or brightness information obtained by the mixing processing up to a previous projection point in a ratio according to the transparency.

23. An image generation apparatus, comprising:
object image obtaining means for obtaining images of an object taken by changing focusing distance;
virtual viewpoint setting means for setting a virtual viewpoint that is a viewpoint from which the object appearing in the images is viewed;
three-dimensional shape obtaining means for obtaining a three-dimensional shape of the object based on the images; and
rendering means for generating an image of the object viewed from the virtual viewpoint based on the obtained three-dimensional shape of the object,
the three-dimensional shape obtaining means comprising:

means for setting projection planes having a multi-layered structure in a virtual three-dimensional space;

means for determining a reference viewpoint for obtaining the three-dimensional shape of the object;

means for determining color information or brightness information of projection points, that are points on the projection planes, based on color information or brightness information of corresponding points, on the obtained images, corresponding to the projection points;

means for determining focusing degrees of the projection points based on focusing degrees of the corresponding points corresponding to the projection points;

means for determining, for each of the projection points overlapping when viewed from the reference viewpoint, an existence probability that is a probability that the object exists at a distance corresponding to a position of the projection point based on the focusing degree of each projection point;

the rendering means comprising:

means for mixing color information or brightness information of the projection points overlapping when viewed from the virtual viewpoint in a ratio corresponding to the existence probability to determine color information or brightness information of each point of the image to be generated.

24. The image generation apparatus as claimed in claim 23, the three-dimensional shape obtaining means or the rendering means comprising:

means for setting transparency having plural gradations from transparent to opaque on each projection point based on the existence probability of the projection points overlapping when viewed from the reference viewpoint or the virtual viewpoint; and the rendering means comprising:

means for mixing the color information or the brightness information of the projection points overlapping when viewed from the virtual viewpoint in a ratio according to the transparency set based on the existence probability so as to determine the color information or brightness information of each point of the image to be generated.

25. The image generation apparatus as claimed in claim 24, the rendering means comprising:

a means for mixing the color information or the brightness information for projection points successively from a projection point far from the virtual viewpoint to a projection point near the virtual viewpoint, wherein color information or brightness information obtained by the mixing processing up to a projection point is obtained by calculating interior division between color information or brightness information at the projection point and color information or brightness information obtained by the mixing processing up to a previous projection point in a ratio according to the transparency.

26. A computer readable storage medium encoded with a computer readable image generation program configured to cause an information processing apparatus to execute a method, the method comprising:

a step of obtaining images of an object taken by changing focusing lengths;

a step of obtaining a virtual viewpoint that is a viewpoint from which the object appearing in the images is viewed;

a step of obtaining a three-dimensional shape of the object based on the images; and a step of generating an image of the object viewed from the virtual viewpoint based on the obtained three-dimensional shape of the object, the step of obtaining the three-dimensional shape of the object comprising:

a step of setting projection planes having a multi-layered structure in a virtual three-dimensional space;

a step of determining a reference viewpoint for obtaining the three-dimensional shape of the object;

a step of determining color information or brightness information of projection points, that are points on the projection planes, based on color information or brightness information of corresponding points, on the obtained images, corresponding to the projection points;

a step of determining focusing degrees of the projection points based on focusing degrees of the corresponding points corresponding to the projection points;

a step of calculating, for each of the projection points overlapping when viewed from the reference viewpoint, an existence probability that is a probability that the object exists at a distance corresponding to a position of the projection point based on the focusing degree of each projection point;

the step of generating the image of the object viewed from the virtual viewpoint comprising:

mixing color information or brightness information of the projection points overlapping when viewed from the virtual viewpoint in a ratio corresponding to the existence probability to determine color information or brightness information of each point of the image to be generated.

27. An image generation method, comprising:

a step of obtaining images of an object taken under different conditions;

a step of obtaining a three-dimensional shape of the object based on the images; and a step of generating an image of the object viewable from a viewpoint based on the obtained three-dimensional shape of the object, the step of obtaining the three-dimensional shape of the object comprising:

a step of setting projection planes having a multi-layered structure in a virtual three-dimensional space;

a step of determining a reference viewpoint for obtaining the three-dimensional shape of the object;

a step of determining color information or brightness information of projection points, that are points on the projection planes, based on color information or brightness information of corresponding points, on the obtained images, corresponding to the projection points;

a step of determining, for each of the projection points overlapping when viewed from the reference viewpoint, an existence probability that is a probability that a surface of the object exists at the projection point;

the step of determining the existence probability comprising:

a step of calculating with a data processor an evaluation reference value of each projection point from image information of the corresponding points;

a step of performing statistical processing on the evaluation reference value of each projection point; and a step of calculating the existence probability of each projection point based on the evaluation reference value on which the statistical processing has been performed.

28. The image generation method as claimed in claim 27, the step of obtaining the plural images comprising:
   obtaining images by taking the object from different viewpoints;
   the step of determining the existence probability comprising:
      a step of obtaining correlation degrees among corresponding points corresponding to the projection points;
      a step of calculating the evaluation reference value based on the correlation degree of each projection point;
      a step of performing the statistical processing on the evaluation reference value; and
      a step of calculating the existence probability of each projection point based on the evaluation reference value on which the statistical processing has been performed.

29. The image generation method as claimed in claim 27, the step of obtaining the plural images comprising:
   obtaining the images of the object taken from a viewpoint by changing focusing distance;
   the step of determining the existence probability comprising:
      a step of calculating focusing degrees of the projection points from focusing degrees of the corresponding points corresponding to the projection points;
      a step of calculating the evaluation reference value based on the focusing degree of each projection point;
      a step of performing the statistical processing on the evaluation reference value; and
      a step of calculating the existence probability of each projection point based on the evaluation reference value on which the statistical processing has been performed.

30. The image generation method as claimed in claim 27, the step of obtaining the plural images comprising:
   obtaining images of the object taken from plural viewpoints, and images of the object taken from equal to one or more viewpoints among the plural viewpoints by changing focusing distance;
   the step of determining the existence probability comprising:
      a step of obtaining correlation degrees between the projection points and corresponding points on the plural images of different viewpoints;
      a step of obtaining a first evaluation reference value based on the correlation degrees of each projection point; and
      a step of performing the statistical processing on the first evaluation reference value;
      a step of calculating focusing degrees of the projection points based on focusing degrees of the corresponding points on the images of different focusing distances;
      a step of calculating a second evaluation reference value based on the focusing degrees of each projection point; and
      a step of calculating the existence probability of each projection point based on the first evaluation reference value and the second evaluation reference value on which the statistical processing has been performed.

31. The image generation method as claimed in any one of claims 27-30, the step of generating the image of the object viewable from the viewpoint comprising:
   mixing color information or brightness information of the projection points overlapping when viewable from the viewpoint in a ratio of the existence probability to determine color information or brightness information of each point on the image to be generated so as to determine a two-dimensional image.

32. The image generation method as claimed in any one of claims 27-30, the step of generating the image of the object viewable from the viewpoint comprising:
   a step of setting plural image generation planes at positions having different depths when viewable from the viewpoint; and
   a step of converting the color information or brightness information and the existence probability of each projection point into color information or brightness information and a brightness distribution coefficient on each image generation plane based on position relationship among projection points overlapping viewable from the viewpoint and points on the image generation planes.

33. An image generation apparatus, comprising:
   an object image obtaining means for obtaining images of an object taken under different conditions;
   object shape obtaining means for obtaining a three-dimensional shape of the object based on the images; and
   object image generation means for generating an image of the object viewable from a viewpoint based on the obtained three-dimensional shape of the object,
   the object shape obtaining means comprising:
      means for setting projection planes having a multi-layered structure in a virtual three-dimensional space;
      means for determining a reference viewpoint for obtaining the three-dimensional shape of the object;
      means for determining color information or brightness information of projection points, that are points on the projection planes, based on color information or brightness information of corresponding points, on the obtained images, corresponding to the projection points;
      means for determining, for each of the projection points overlapping when viewed from the reference viewpoint, an existence probability that is a probability that a surface of the object exists at the projection point;
   the means for determining the existence probability comprising:
      means for calculating an evaluation reference value of each projection point from image information of the corresponding points;
      means for performing statistical processing on the evaluation reference value of each projection point; and
      means for calculating the existence probability of each projection point based on the evaluation reference value on which the statistical processing has been performed.

34. The image generation apparatus as claimed in claim 33, wherein the object image obtaining means obtains images of the object taken from different viewpoints;
   the means for determining the existence probability comprising:
      means for obtaining correlation degrees among corresponding points corresponding to the projection points;
      means for calculating the evaluation reference value based on the correlation degree of each projection point;

means for performing the statistical processing on the evaluation reference value; and means for calculating the existence probability of each projection point based on the evaluation reference value on which the statistical processing has been performed.

35. The image generation apparatus as claimed in claim 33, wherein the object image obtaining means obtains the images of the object taken from a viewpoint by changing focusing distance;

the means for determining the existence probability comprising:

means for calculating focusing degrees of the projection points from focusing degrees of the corresponding points corresponding to the projection points;

means for calculating the evaluation reference value based on the focusing degree of each projection point;

means for performing the statistical processing on the evaluation reference value; and means for calculating the existence probability of each projection point based on the evaluation reference value on which the statistical processing has been performed.

36. The image generation apparatus as claimed in claim 33, wherein the object image obtaining means obtains images of the object taken from plural viewpoints, and images of the object taken from equal to one or more viewpoints among the plural viewpoints by changing focusing distance;

the means for determining the existence probability comprising:

means for obtaining correlation degrees between the projection points and corresponding points on the plural images having different projection points;

means for obtaining a first evaluation reference value based on the correlation degrees of each projection point; and means for performing the statistical processing on the first evaluation reference value;

means for calculating focusing degrees of the projection points based on focusing degrees of the corresponding points on the images of different focusing distances taken from a viewpoint;

means for calculating a second evaluation reference value based on the focusing degrees of each projection point; and means for calculating the existence probability of each projection point based on the first evaluation reference value and the second evaluation reference value on which the statistical processing has been performed.

37. The image generation apparatus as claimed in any one of claims 33-36, the means for generating the image of the object viewable from the viewpoint comprising:

means for mixing color information or brightness information of the projection points overlapping when viewable from the viewpoint in a ratio of the existence probability to determine color information or brightness information of each point on the image to be generated so as to determine a two-dimensional image.

38. The image generation apparatus as claimed in any one of claims 33-36, the means for generating the image of the object viewable from the viewpoint comprising:

means for setting plural image generation planes at positions having different depths when viewable from the viewpoint; and means for converting the color information or brightness information and the existence probability of each projection point into color information or brightness information and a brightness distribution coefficient on each image generation plane based on position relationship among projection points overlapping viewable from the and points on the image generation planes.

39. A computer readable storage medium encoded with a computer readable image generation program configured to cause an information processing apparatus to execute a method, the method comprising:

a step of obtaining images of an object taken under different conditions;

a step of obtaining a three-dimensional shape of the object based on the images; and a step of generating an image of the object viewable from a viewpoint based on the obtained three-dimensional shape of the object, the step of obtaining the three-dimensional shape of the object comprising:

a step of setting projection planes having a multi-layered structure in a virtual three-dimensional space;

a step of determining a reference viewpoint for obtaining the three-dimensional shape of the object;

a step of determining color information or brightness information of projection points, that are points on the projection planes, based on color information or brightness information of corresponding points, on the obtained images, corresponding to the projection points;

a step of determining, for each of the projection points overlapping when viewed from the reference viewpoint, an existence probability that is a probability that a surface of the object exists at the projection point;

the step of determining the existence probability comprising:

a step of calculating an evaluation reference value of each projection point from image information of the corresponding points;

a step of performing statistical processing on the evaluation reference value of each projection point; and a step of calculating the existence probability of each projection point based on the evaluation reference value on which the statistical processing has been performed.

40. A three-dimensional image display methods, comprising:

a step of obtaining images of an object taken under different conditions;

a step of obtaining a three-dimensional shape of the object based on the images;

a sep of setting a viewpoint position such that plural image display planes existing at different depth positions are viewable;

a step of generating two-dimensional images to be displayed on each image display plane based on the obtained three-dimensional shape of the object; and a step of presenting a three-dimensional image of the object by displaying the generated two-dimensional images on each display plane, the step of obtaining the three-dimensional shape of the object comprising:

a step of setting projection planes having a multi-layered structure in a virtual three-dimensional space;

a step of determining a reference viewpoint for obtaining the three-dimensional shape of the object;

a step of determining color information or brightness information of projection points, that are points on the projection planes, based on color information or brightness information of corresponding points, on the obtained images, corresponding to the projection points;

a step of determining with a data processor, for each of the projection points overlapping when viewed from the reference viewpoint, an existence probability that is a probability that a surface of the object exists at the projection point;

the step of generating the two-dimensional images comprising:

converting the color information or the brightness information and the existence probability of the projection point into color information or brightness information and existence probability of each display point that is a point on the image display plane corresponding to the projection plane on which the projection point exists so as to generate the two dimensional images;

the step of presenting the three-dimensional image of the object comprising:

displaying the color information or brightness information on each display point with brightness according to the existence probability.

41. The three-dimensional image display method as claimed in claim 40, the step of obtaining the plural images comprising:

obtaining images of the object taken from different viewpoints, the step of determining the existence probability comprising:

a step of calculating correlation degrees among corresponding points corresponding to the projection points;

a step of determining, for projection points overlapping when viewed from the reference viewpoint, the existence probability of each projection point based on the correlation degree of each projection point.

42. The three-dimensional image display method as claimed in claim 40, the step of obtaining the plural images comprising:

obtaining images of the object taken from a viewpoint by changing focusing distance, the step of determining the existence probability comprising:

a step of calculating focusing degrees of the projection points from focusing degrees of corresponding points corresponding to the projection points;

a step of determining, for projection points overlapping when viewed from the reference viewpoint, the existence probability of each projection point based on the focusing degree of each projection point.

43. The three-dimensional image display method as claimed in claim 40, the step of obtaining the plural images comprising:

obtaining images of the object taken from plural viewpoints, and images of the object taken from equal to one or more viewpoints among the plural viewpoints by changing focusing distance;

the step of determining the existence probability comprising:

a step of obtaining correlation degrees between the projection points and corresponding points on the plural images of different viewpoints;

a step of calculating focusing degrees of the projection points based on focusing degrees of the corresponding points on the images, having different focusing distance, of each viewpoint; and a step of determining, for projection points overlapping when viewed from the reference viewpoints, the existence probability of each projection point based on the correlation degree and the focusing degree of each projection point.

44. A three-dimensional image display apparatus comprising:

an object image obtaining means for obtaining images of an object taken under different conditions;

three-dimensional shape obtaining means for obtaining a three-dimensional shape of the object based on the images;

means for setting a viewpoint position such that plural image display planes existing at different depth positions are viewable;

two-dimensional image generation means for generating two-dimensional images to be displayed on each image display plane based on the obtained three-dimensional shape of the object; and wherein the three-dimensional image display apparatus presents a three-dimensional image of the object by displaying the generated two-dimensional images on each display plane, the three-dimensional shape obtaining means comprising:

means for setting projection planes having a multi-layered structure in a virtual three-dimensional space;

means for determining a reference viewpoint for obtaining the three-dimensional shape of the object;

means for determining color information or brightness information of projection points, that are points on the projection planes, based on color information or brightness information of corresponding points, on the obtained images, corresponding to the projection points;

means for determining, for each of the projection points overlapping when viewed from the reference viewpoint, an existence probability that is a probability that a surface of the object exists at the projection point;

the two-dimensional image generation means comprising:

means for converting the color information or the brightness information and the existence probability of the projection point into color information or brightness information and existence probability of each display point that is a point on the image display plane corresponding to the projection plane on which the projection point exists to generate the two dimensional images;

wherein the three-dimensional image display apparatus displays the color information or brightness information on each display point with brightness according to the existence probability.

45. The three-dimensional image display apparatus as claimed in claim 44, wherein the object image obtaining means is a means for obtaining images of the object taken from different viewpoints, the means for determining the existence probability comprising:

means for calculating correlation degrees among corresponding points corresponding to the projection points;

means for determining, for projection points overlapping when viewed from the reference viewpoint, the existence probability of each projection point based on the correlation degree of each projection point.

46. The three-dimensional image display apparatus as claimed in claim 44, wherein the object image obtaining means is a means for obtaining images of the object taken from a viewpoint by changing focusing distance, the means for determining the existence probability comprising:

means for calculating focusing degrees of the projection points from focusing degrees of corresponding points corresponding to the projection points; and means for determining, for projection points overlapping when viewed from the reference viewpoint, the existence probability of each projection point based on the focusing degree of each projection point.

47. The three-dimensional image display apparatus as claimed in claim 44, wherein the object image obtaining means is a means for obtaining images of the object taken from plural viewpoints, and images of the object taken from equal to one or more viewpoints among the plural viewpoints by changing focusing distance;

the means for determining the existence probability comprising:

means for obtaining correlation degrees between the projection points and corresponding points on the plural images of different viewpoints;

means for calculating focusing degrees of the projection points based on focusing degrees of the corresponding points on the images, having different focusing length, of each viewpoint; and means for determining, for projection points overlapping when viewed from the reference viewpoints, the existence probability of each projection point based on the correlation degree and the focusing degree of each projection point.

48. A computer readable storage medium encoded with a computer readable three-dimensional image display program configured to cause an information processing apparatus to execute a method, the method comprising:

a step of obtaining images of an object taken under different conditions;

a step of obtaining a three-dimensional shape of the object based on the images;

a step of setting a viewpoint position such that plural image display planes existing at different depth positions are viewable;

a step of generating two-dimensional images to be displayed on each image display plane based on the obtained three-dimensional shape of the object; and a step of presenting a three-dimensional image of the object by displaying the generated two-dimensional images on each display plane, the step of obtaining the three-dimensional shape of the object comprising:

a step of setting projection planes having a multi-layered structure in a virtual three-dimensional space;

a step of determining a reference viewpoint for obtaining the three-dimensional shape of the object;

a step of determining color information or brightness information of projection points, that are points on the projection planes, based on color information or brightness information of corresponding points, on the obtained images, corresponding to the projection points;

a step of determining, for each of the projection points overlapping when viewed from the reference viewpoint, an existence probability that is a probability that a surface of the object exists at the projection point;

the step of generating the two-dimensional images comprising:

a step of converting the color information or the brightness information and the existence probability of the projection point into color information or brightness information and existence probability of each display point that is a point on the image display plane corresponding to the projection plane on which the projection point exists to generate the two dimensional images;

the step of presenting the three-dimensional image of the object comprising:

a step of displaying the color information or brightness information on each display point with brightness according to the existence probability.

\* \* \* \* \*